(12) United States Patent
Thomas et al.

(10) Patent No.: US 12,305,705 B2
(45) Date of Patent: *May 20, 2025

(54) MODULAR CRANKSHAFT

(71) Applicant: Kerr Machine Co., Sulphur, OK (US)

(72) Inventors: Micheal Cole Thomas, Azle, TX (US); Christopher Todd Barnett, Stratford, OK (US); Kelcy Jake Foster, Sulphur, OK (US); Nicholas Son, Davis, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,580

(22) Filed: Aug. 5, 2024

(65) Prior Publication Data

US 2024/0392828 A1    Nov. 28, 2024

Related U.S. Application Data

(63) Continuation of application No. 18/324,242, filed on May 26, 2023, now Pat. No. 12,055,181.

(60) Provisional application No. 63/488,358, filed on Mar. 3, 2023, provisional application No. 63/408,910, filed on Sep. 22, 2022, provisional application No. 63/394,740, filed on Aug. 3, 2022, provisional
(Continued)

(51) Int. Cl.
*F16C 3/06* (2006.01)
*E21B 43/26* (2006.01)
*F16B 37/08* (2006.01)
*F16C 3/12* (2006.01)

(52) U.S. Cl.
CPC .............. *F16C 3/12* (2013.01); *F16C 3/06* (2013.01); *E21B 43/2607* (2020.05); *F16B 37/08* (2013.01); *F16C 2226/60* (2013.01)

(58) Field of Classification Search
CPC ...... F16C 3/06; F16C 3/10; F16C 3/12; F16C 3/20; F16C 2226/60; F16B 23/0007; F16B 37/08; E21B 43/2607
See application file for complete search history.

(56) References Cited

U.S. PATENT DOCUMENTS

| | | |
|---|---|---|
| 290,565 A | 12/1883 | Fry, Jr. |
| 1,363,957 A | 12/1920 | Cote |
| (Continued) | | |

FOREIGN PATENT DOCUMENTS

| | | |
|---|---|---|
| DE | 3210088 A1 | 9/1983 |
| DE | 10346405 A1 | 6/2005 |
| (Continued) | | |

OTHER PUBLICATIONS

Machine translation of FR 690,609 A obtained on Oct. 1, 2024.*

*Primary Examiner* — Adam D Rogers
(74) *Attorney, Agent, or Firm* — Tomlinson McKinstry, P.C.

(57) ABSTRACT

A modular crankshaft configured for use within a power end assembly. The modular crankshaft is configured to interconnect a drive shaft and a plurality of linear drive assemblies. The various embodiments of modular crankshafts disclosed herein are assembled by interconnecting a plurality of individual main bearing journals using a plurality of fasteners. One or more embodiments of modular crankshafts may also include individual connecting rod journals that are attached to individual main bearing journals using a plurality of fasteners.

17 Claims, 122 Drawing Sheets

Related U.S. Application Data application No. 63/394,012, filed on Aug. 1, 2022, provisional application No. 63/346,372, filed on May 27, 2022.

(56) References Cited

U.S. PATENT DOCUMENTS

| | | | |
|---|---|---|---|
| 1,690,296 A | 11/1928 | Hirth | |
| 2,151,624 A | 3/1939 | Smith-Clark | |
| 2,331,541 A | 10/1943 | Dusevoir | |
| 2,340,458 A * | 2/1944 | Dusevoir | F16C 3/12 74/597 |
| 2,364,109 A | 12/1944 | Taylor | |
| 2,471,982 A | 5/1949 | Shulda | |
| 2,730,912 A | 1/1956 | Marinelli | |
| 2,735,314 A | 2/1956 | Meile | |
| 2,771,846 A | 11/1956 | Horton et al. | |
| 2,957,422 A | 10/1960 | Loeber | |
| 3,005,412 A | 10/1961 | Camp | |
| 4,494,415 A | 1/1985 | Elliston | |
| 4,553,298 A | 11/1985 | Grable | |
| 4,566,370 A | 1/1986 | Hanafi | |
| 8,083,504 B2 | 12/2011 | Williams | |
| 8,528,462 B2 | 9/2013 | Pacht | |
| 8,701,546 B2 | 4/2014 | Pacht | |
| 8,757,028 B2 | 6/2014 | Broughton | |
| 9,568,039 B2 | 2/2017 | Minton | |
| 10,352,321 B2 | 7/2019 | Byrne et al. | |
| 10,677,380 B1 | 6/2020 | Surjaatmadja et al. | |
| 10,871,227 B1 | 12/2020 | Belshan et al. | |
| 11,208,996 B2 | 12/2021 | Foster et al. | |
| 11,346,339 B2 | 5/2022 | Nowell et al. | |
| 11,846,282 B2 | 12/2023 | Nowell et al. | |
| 12,055,181 B2 * | 8/2024 | Thomas | F16C 3/06 |
| 2010/0038070 A1 | 2/2010 | Blanco et al. | |
| 2010/0064847 A1 | 3/2010 | Henderson | |
| 2012/0272764 A1 | 11/2012 | Pendleton | |
| 2014/0196570 A1 | 7/2014 | Small et al. | |
| 2015/0132157 A1 | 5/2015 | Whaley et al. | |
| 2016/0090980 A1 | 3/2016 | Howard et al. | |
| 2016/0369792 A1 | 12/2016 | Wagner | |
| 2018/0045187 A1 | 2/2018 | Nagel et al. | |
| 2019/0049052 A1 | 2/2019 | Shuck | |
| 2019/0277279 A1 | 9/2019 | Byrne et al. | |
| 2019/0277341 A1 | 9/2019 | Byrne et al. | |
| 2020/0362678 A1 | 11/2020 | Lesko | |
| 2022/0389916 A1 | 12/2022 | Keith et al. | |
| 2024/0077076 A1 | 3/2024 | Nowell et al. | |

FOREIGN PATENT DOCUMENTS

| | | |
|---|---|---|
| DE | 102012007725 A1 | 11/2012 |
| DE | 102020110793 A1 | 10/2021 |
| EP | 2494140 A1 | 5/2017 |
| FR | 690609 A | 9/1930 |
| FR | 722345 A | 3/1932 |
| GB | 724025 A | 2/1955 |
| GB | 906694 A | 9/1962 |
| GB | 1254984 A | 11/1971 |
| WO | 2010051843 A1 | 5/2010 |

* cited by examiner

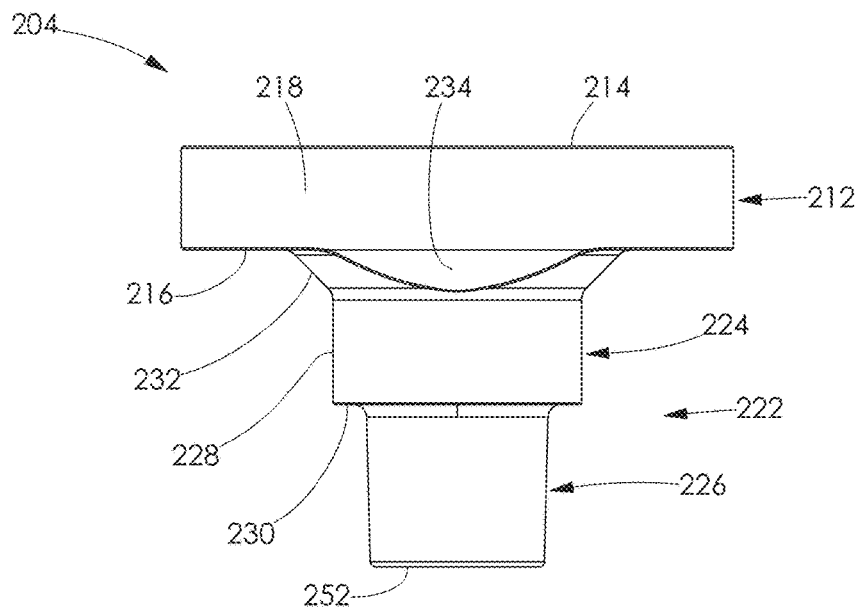
FIG. 28
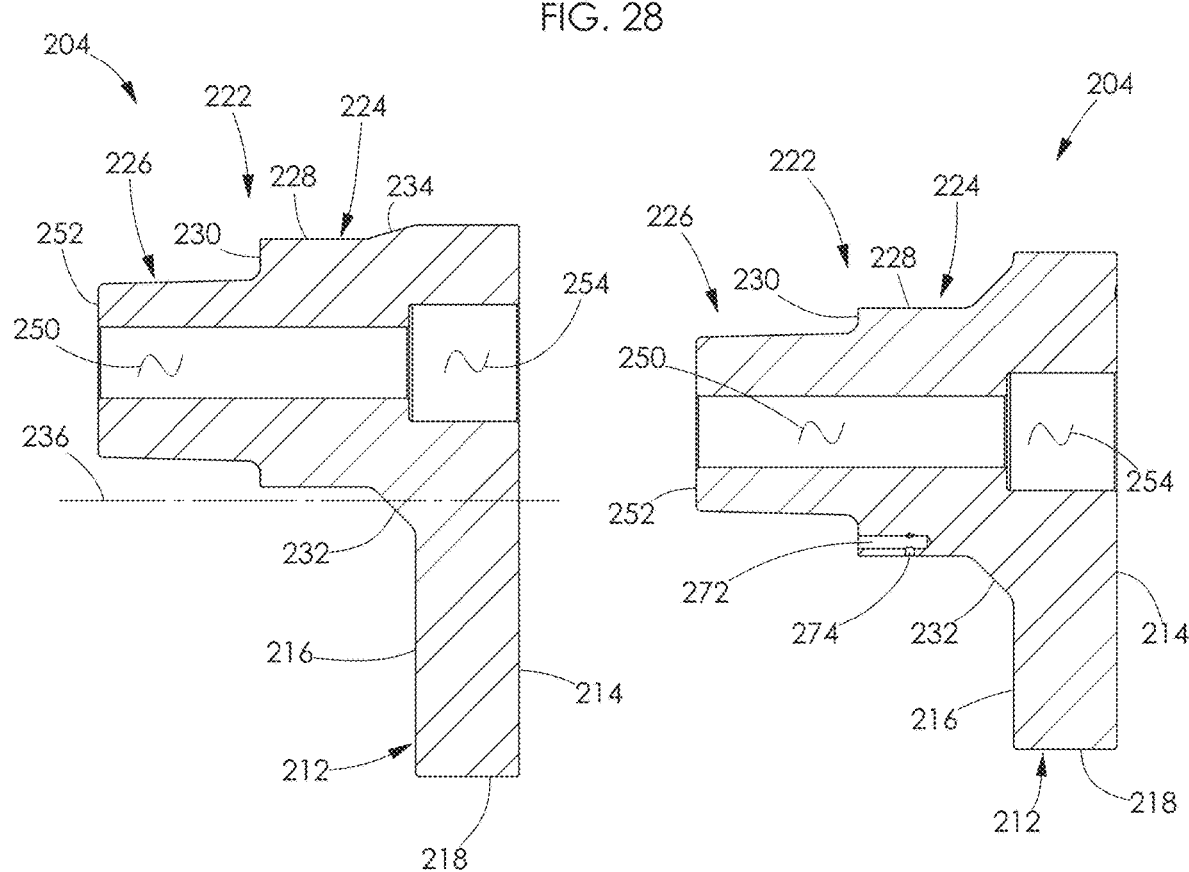
FIG. 29
FIG. 30

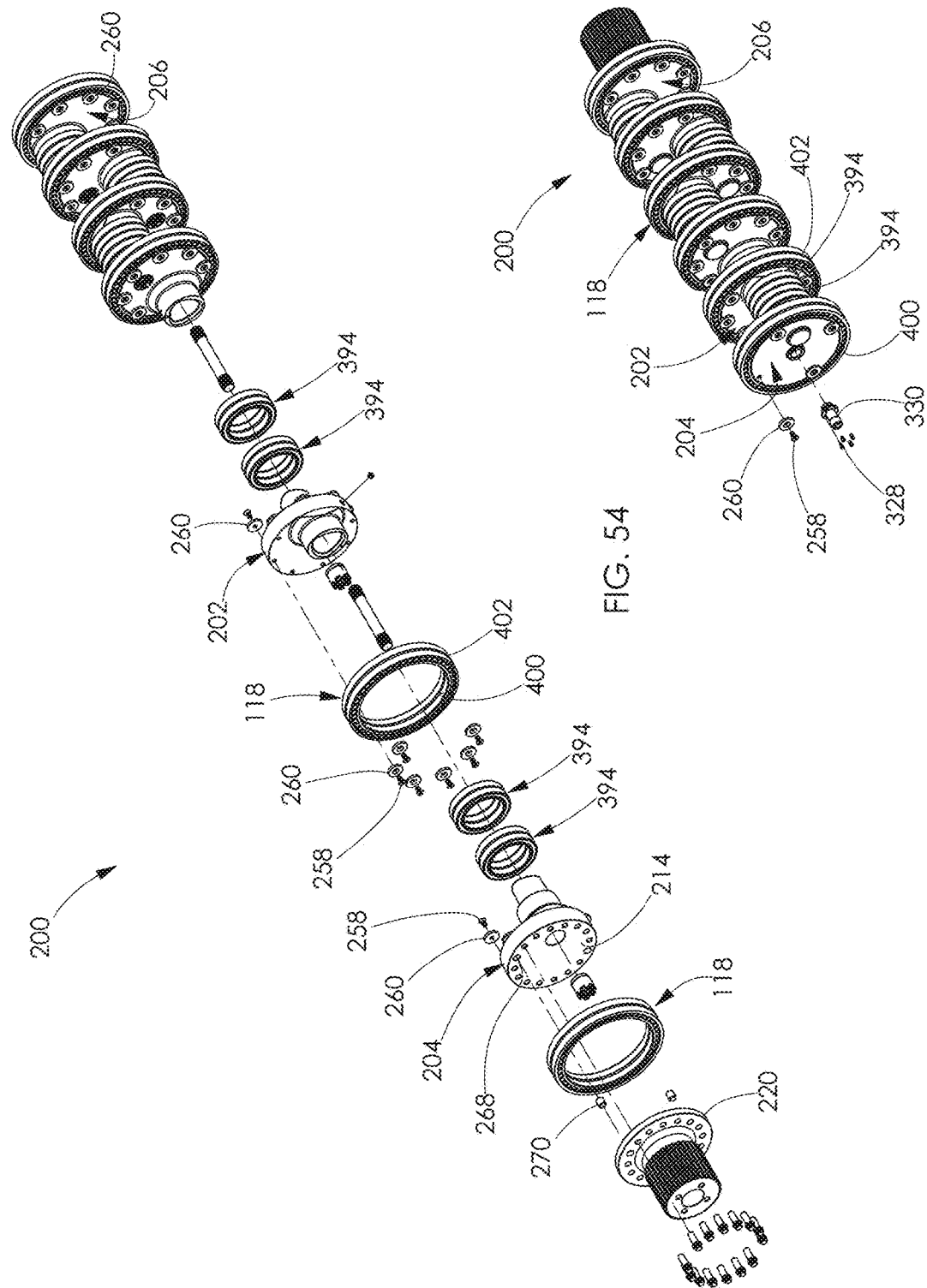

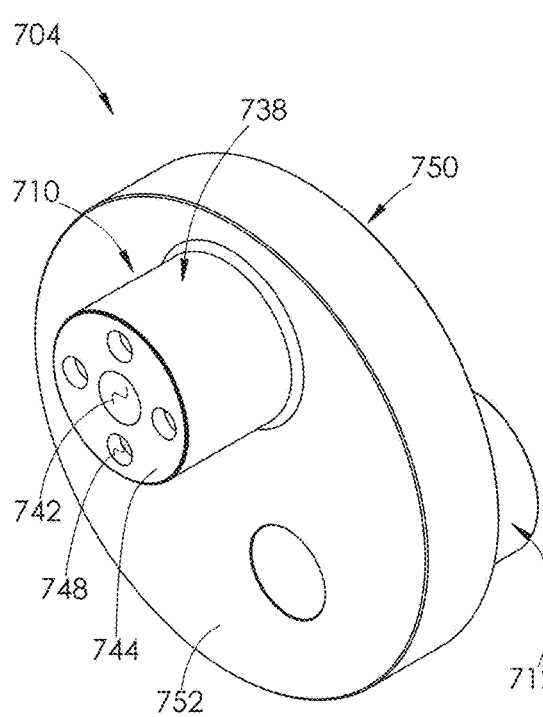
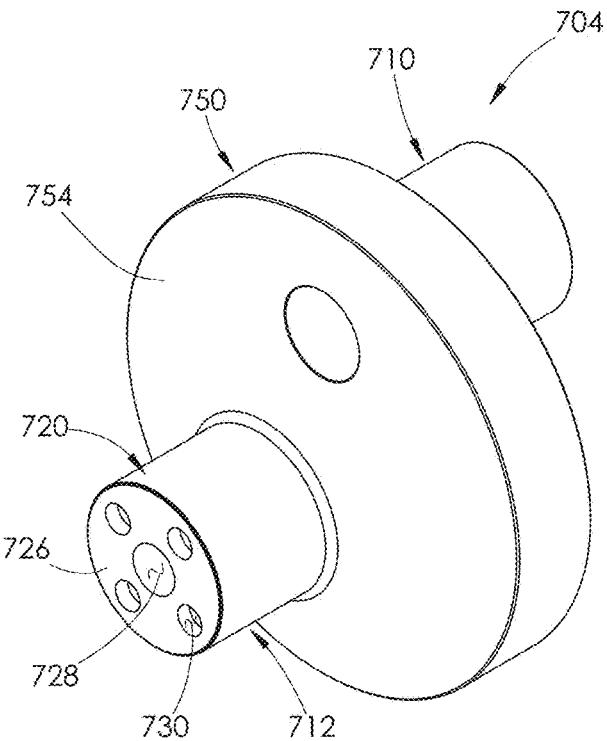
FIG. 120
FIG. 121
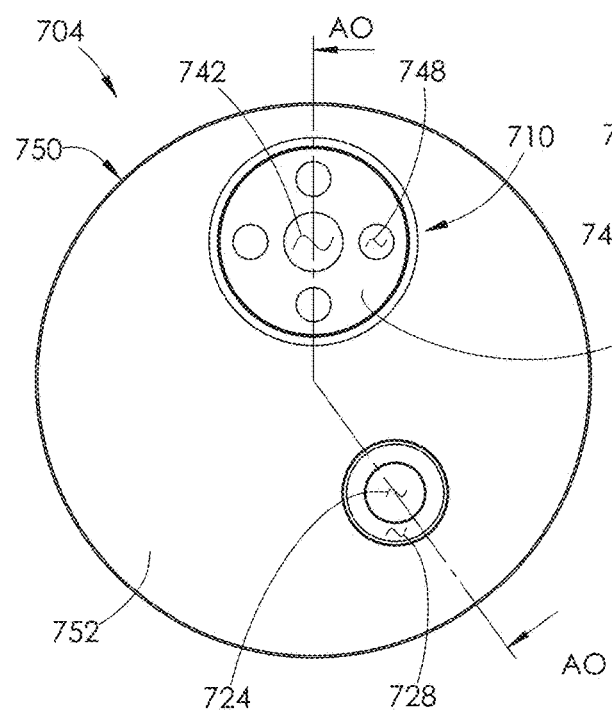
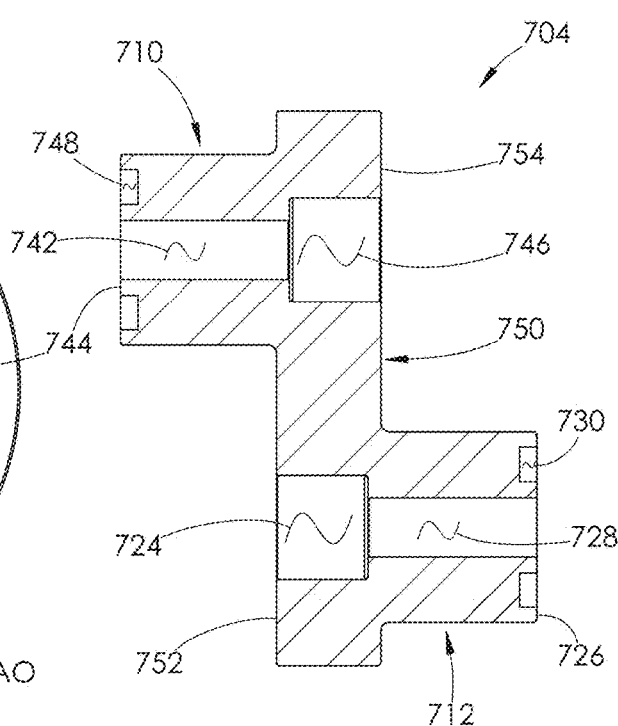
FIG. 122
FIG. 123

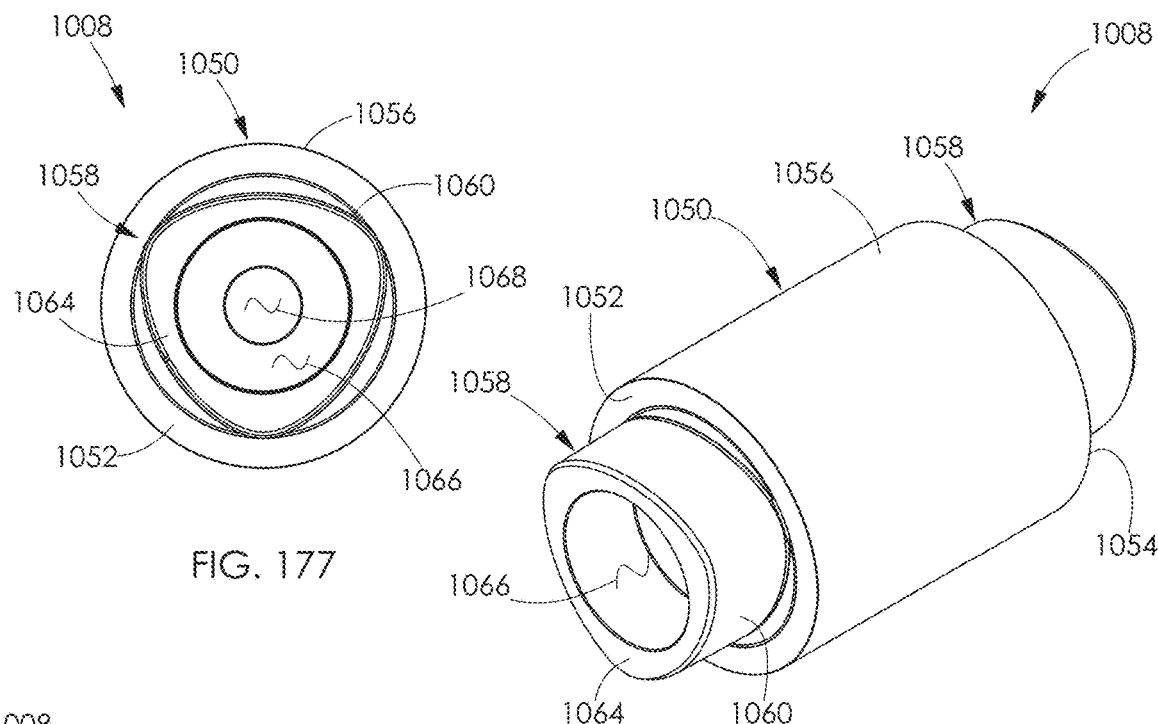
FIG. 177
FIG. 178
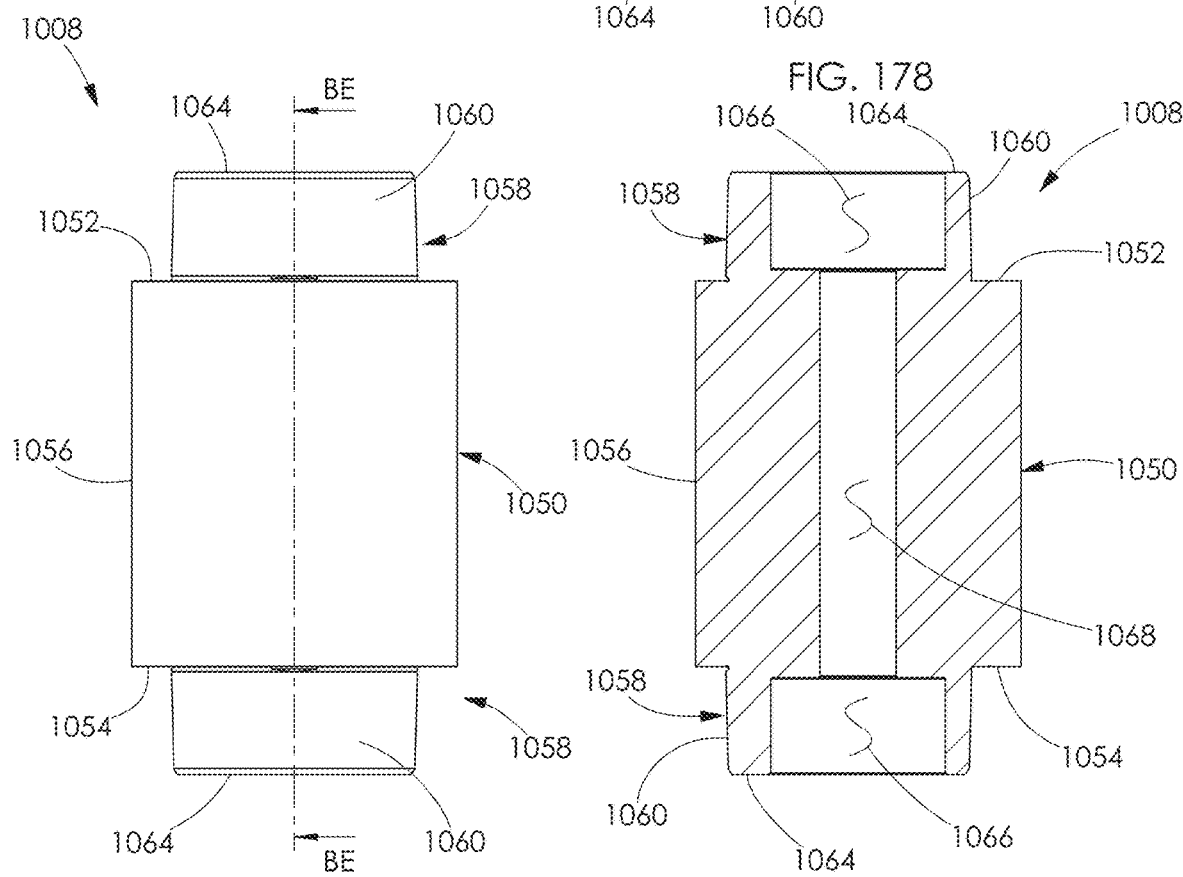
FIG. 179
FIG. 180

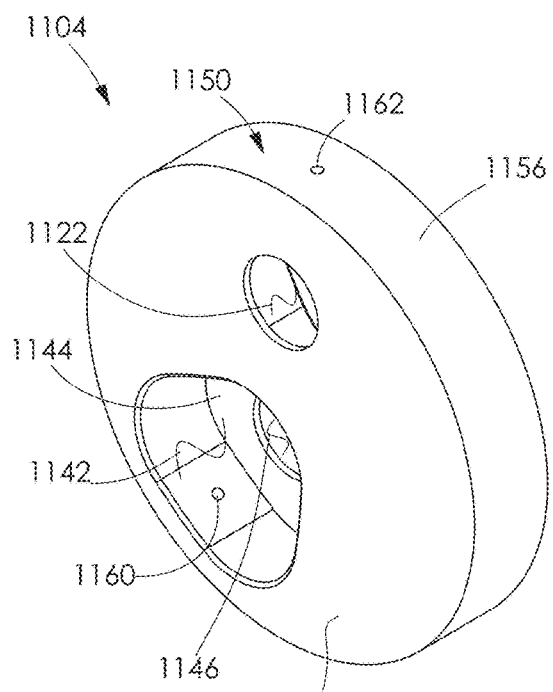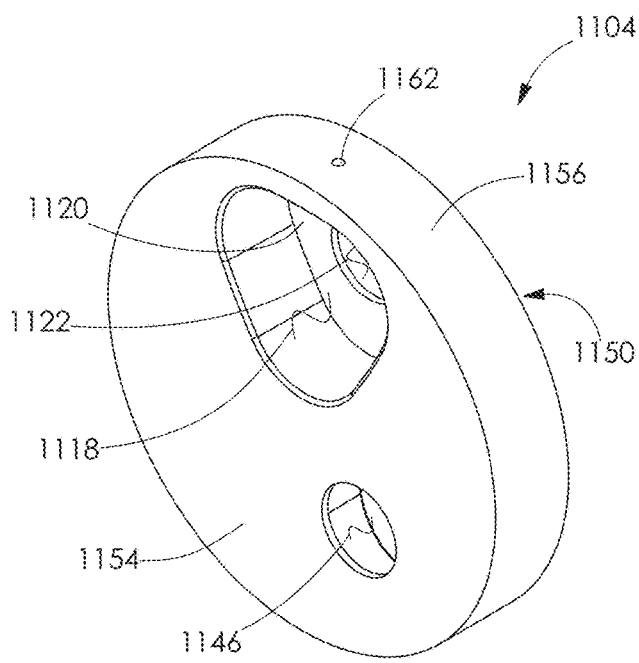
FIG. 196  FIG. 197
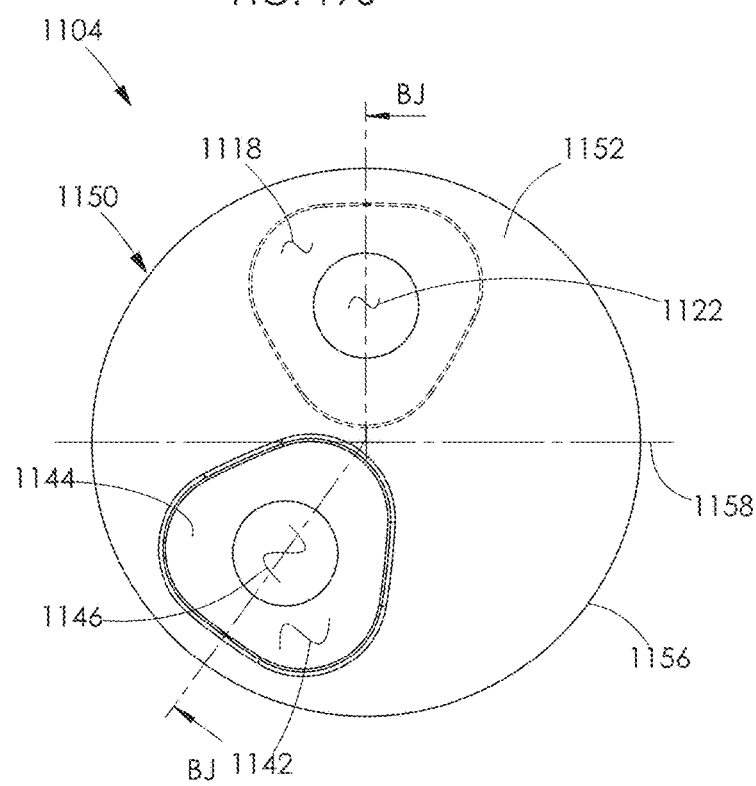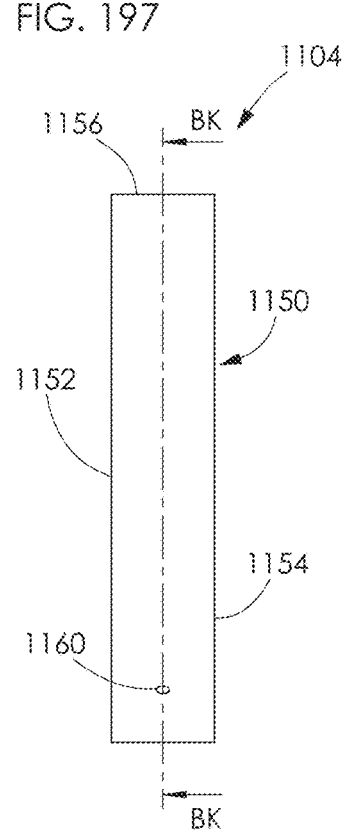
FIG. 198  FIG. 199

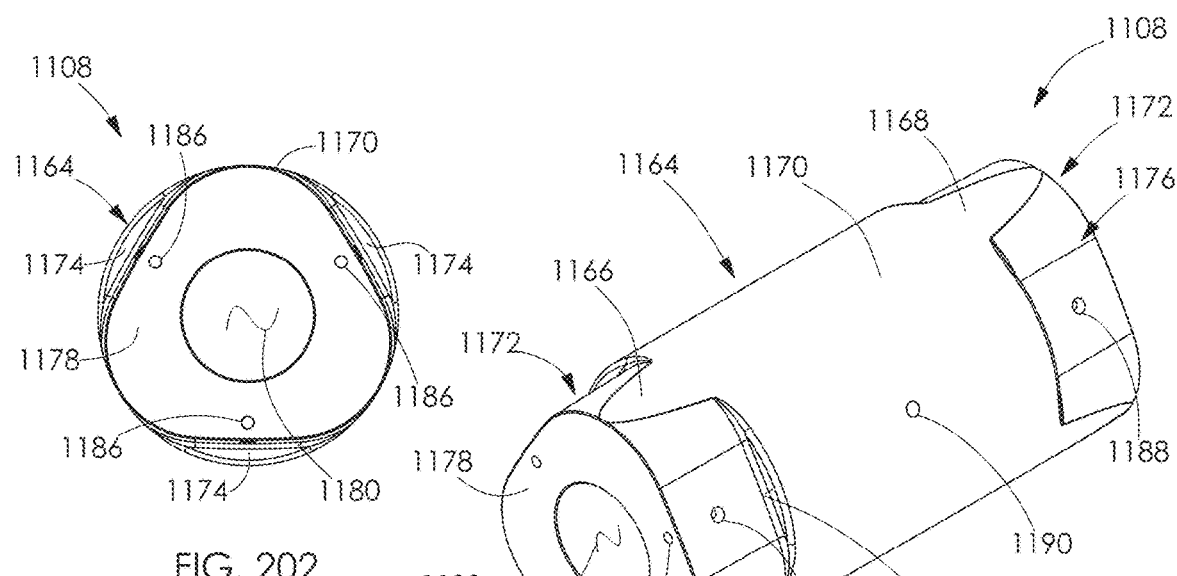
FIG. 202
FIG. 203
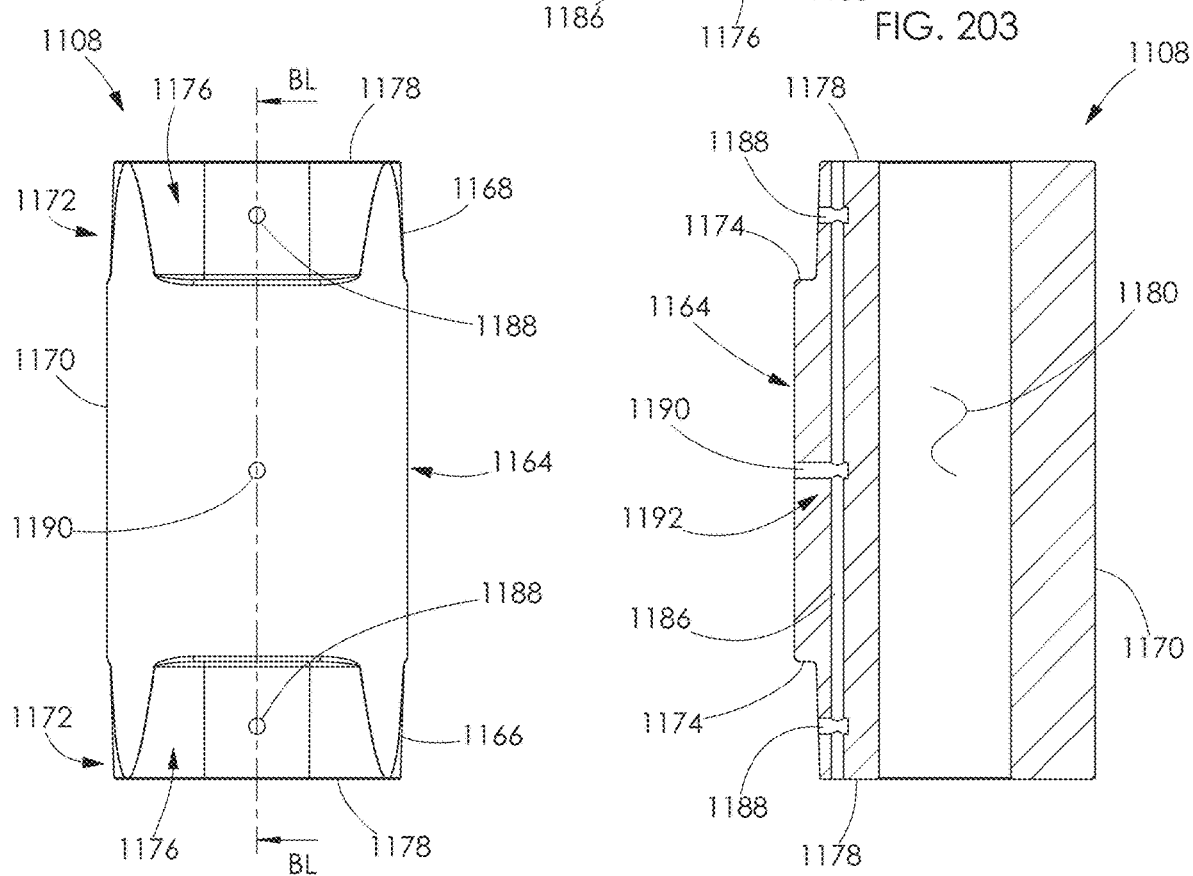
FIG. 204
FIG. 205

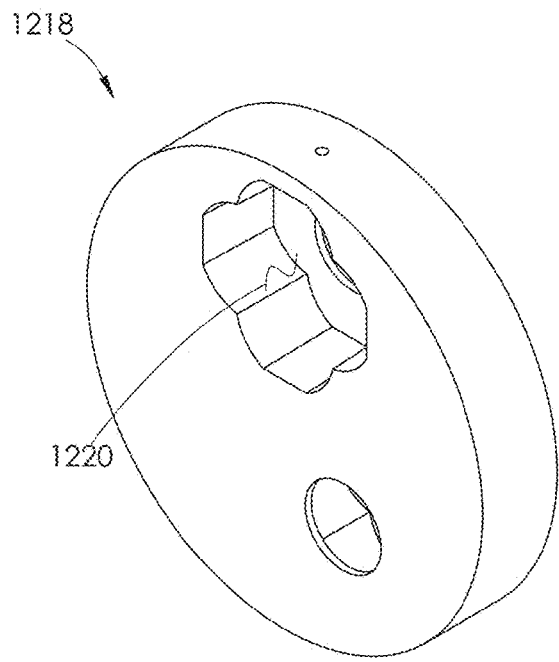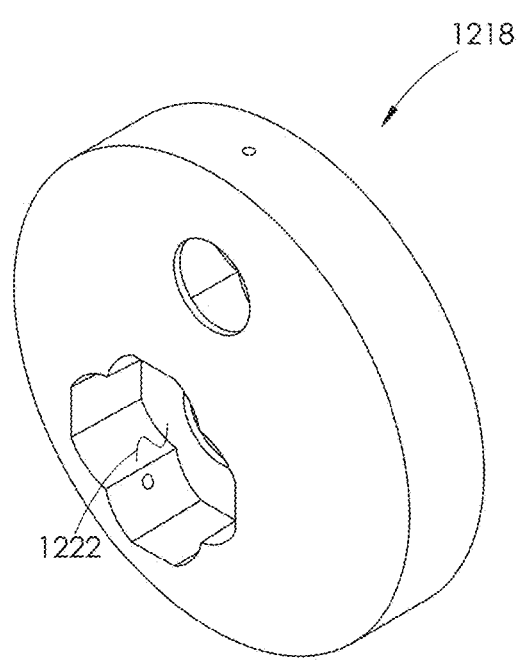
FIG. 214  FIG. 215
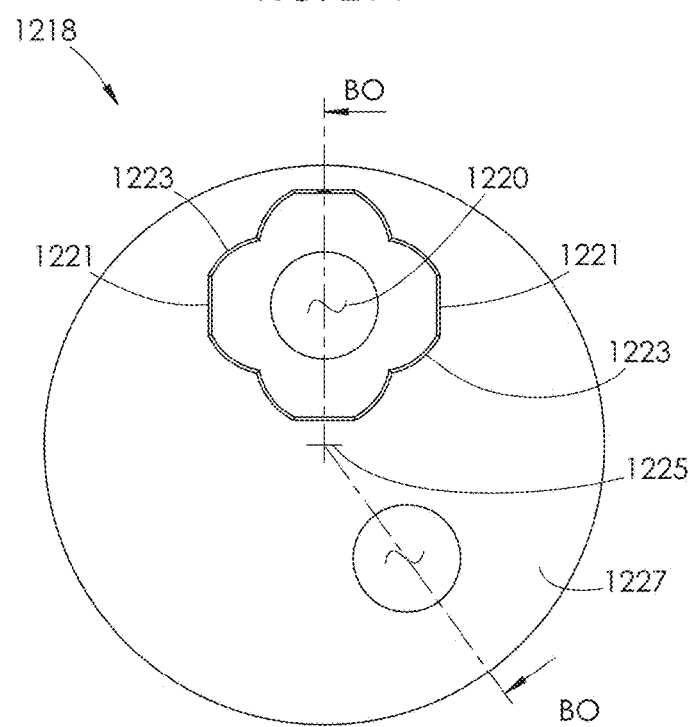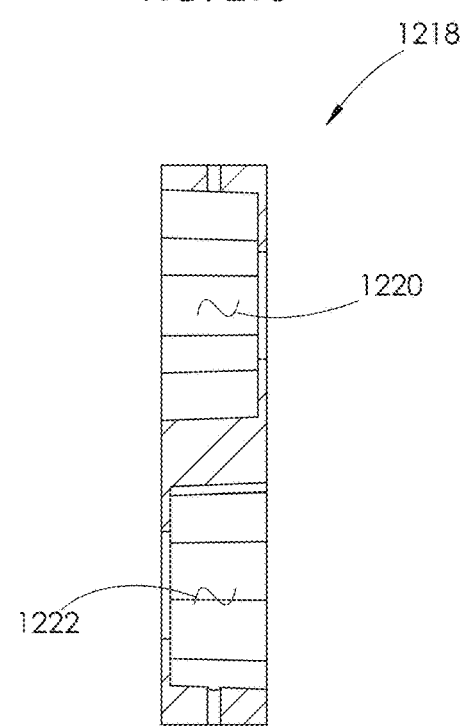
FIG. 216  FIG. 217

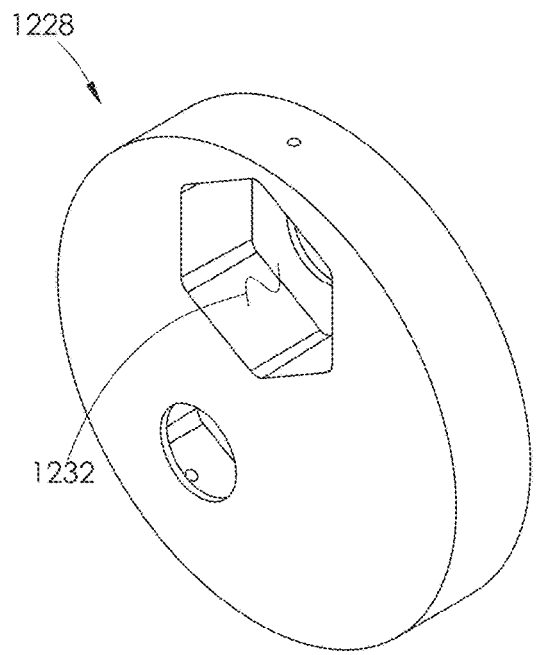
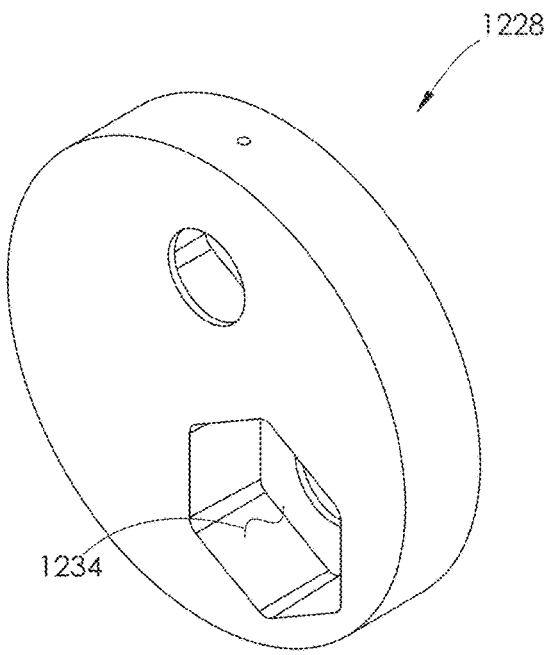
FIG. 222
FIG. 223
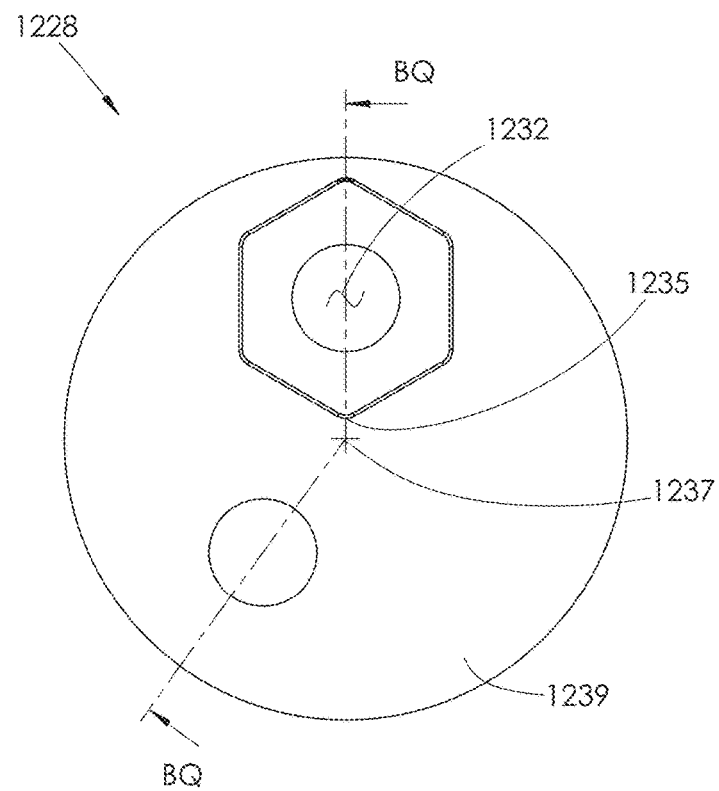
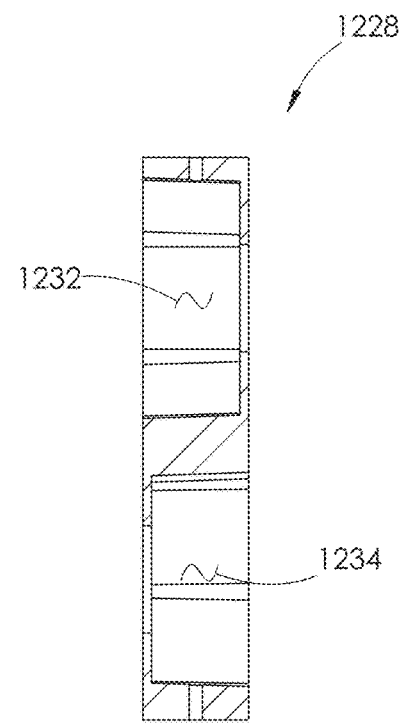
FIG. 224
FIG. 225

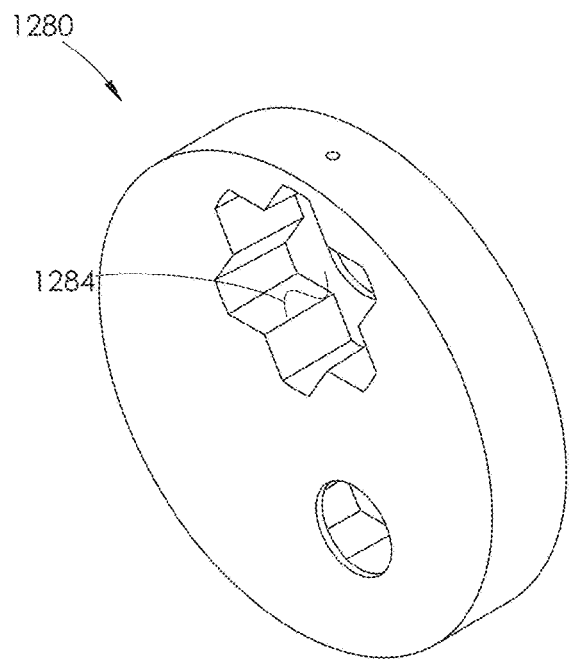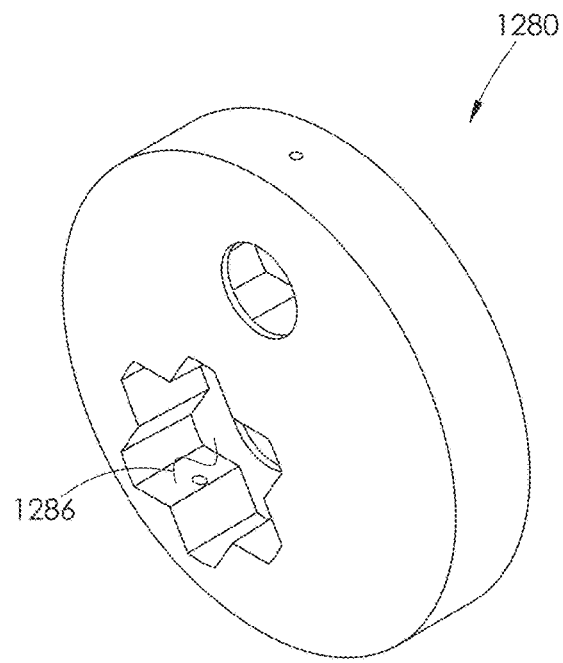
FIG. 246  FIG. 247
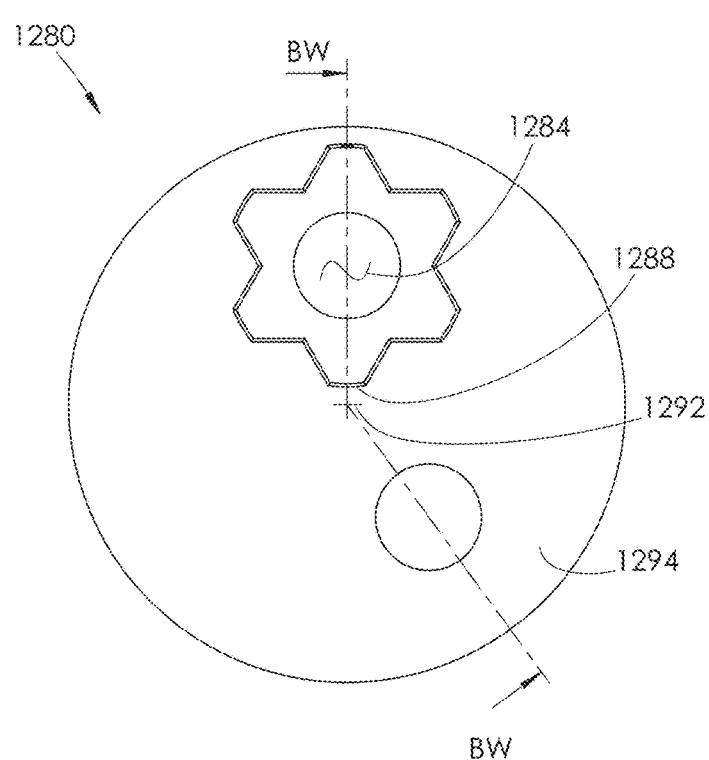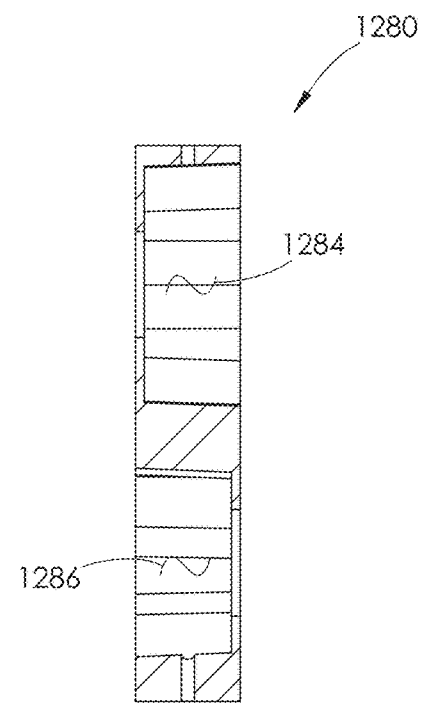
FIG. 248  FIG. 249

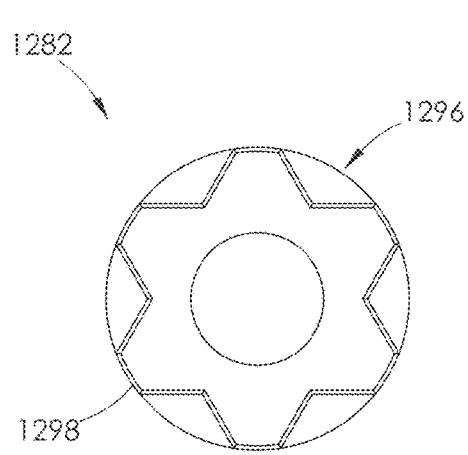
FIG. 250
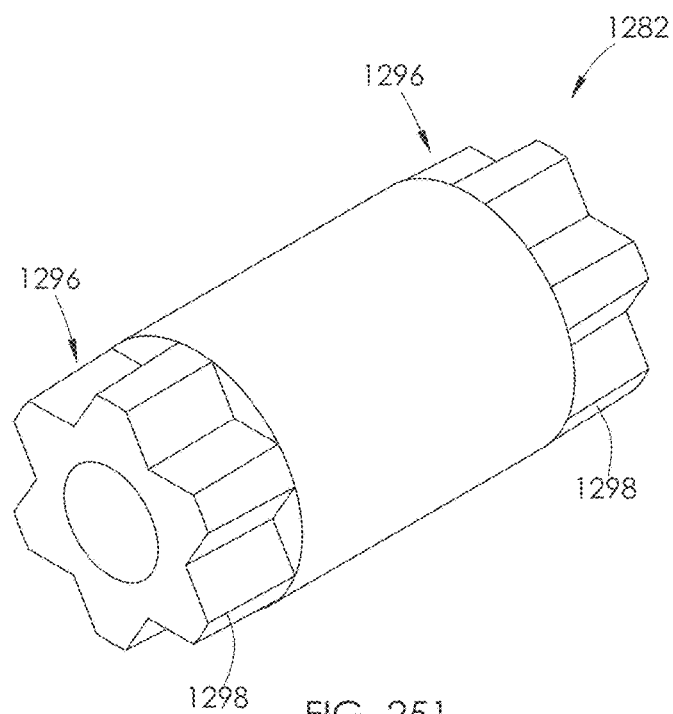
FIG. 251
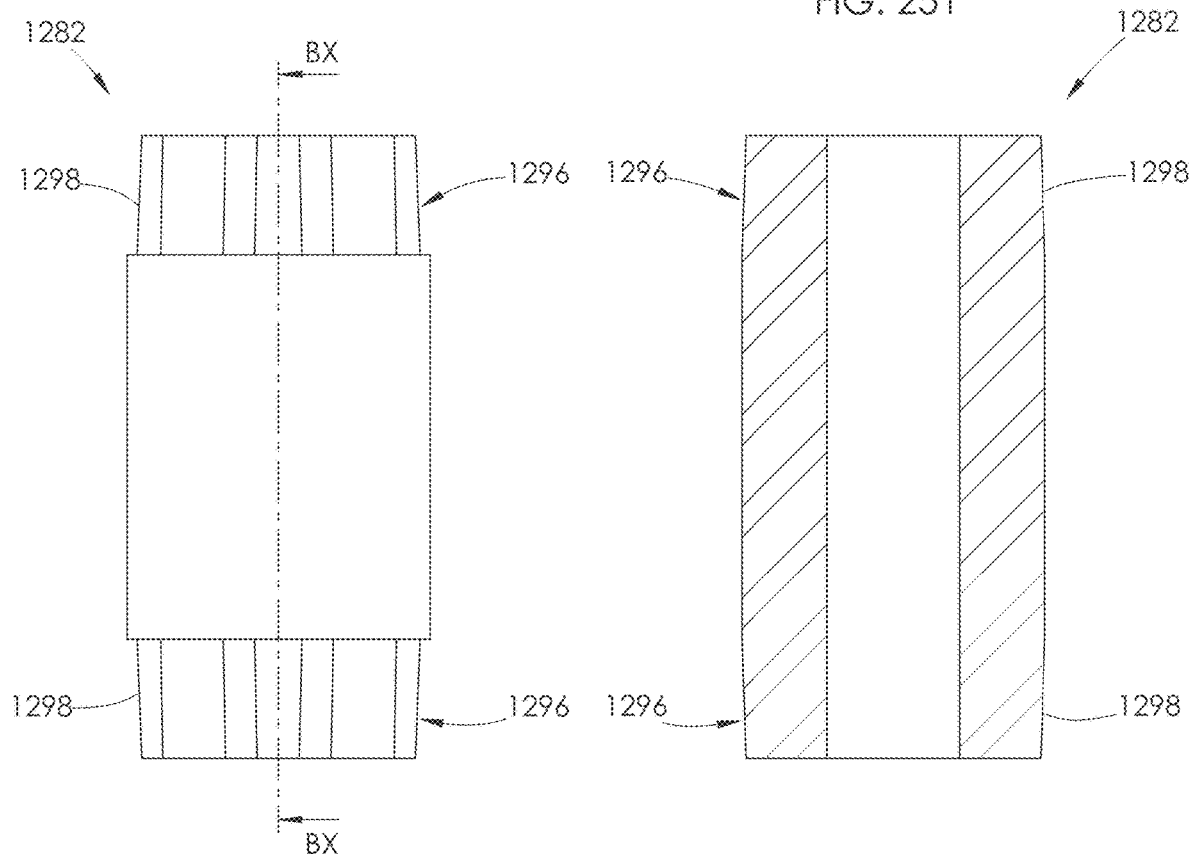
FIG. 252
FIG. 253

MODULAR CRANKSHAFT

RELATED APPLICATIONS

This application claims the benefit of the following U.S. provisional patent applications: Ser. No. 63/346,372, authored by Thomas et al., and filed on May 27, 2022; Ser. No. 63/394,012, authored by Thomas et al., and filed on Aug. 1, 2022; Ser. No. 63/394,740, authored by Thomas et al., and filed on Aug. 3, 2022; Ser. No. 63/408,910, authored by Thomas et al., and filed on Sep. 22, 2022; and Ser. No. 63/488,358, authored by Thomas et al., and filed on Mar. 3, 2023. Further, this application is a continuation of U.S. Pat. No. The entire contents of all of the above listed patent applications are incorporated herein by reference.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressurized fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating in an ambient environment at a wellsite 24 in FIG. 2. Each of the fluid ends 22 is attached to a power end 26 in a one-to-one relationship. The power end 26 drives, or provides power to, the fluid end 22. Together, the fluid end 22 and power end 26 function as a high-pressure pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations 16, shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi.

The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively may deliver as much as 4,200 gallons per minute or 100 barrels per minute to the wellbore.

BRIEF DESCRIPTION OF THE DRAWINGS

FIG. 28 is a top plan view of the first end journal shown in FIG. 24.

FIG. 29 is a cross-sectional view of the first end journal shown in FIG. 27, taken along line F-F.

FIG. 30 is a cross-sectional view of the first end journal shown in FIG. 27, taken along line G-G.

FIG. 54 is a first end perspective and partially exploded view of the modular crankshaft, roller bearings, and drive shaft shown in FIG. 49.

FIG. 55 is the second end perspective view of the components shown in FIG. 50, but the lubricant swivel is shown in exploded form.

FIG. 120 is a perspective view of the first side of an inner journal used with the modular crankshaft shown in FIG. 106.

FIG. 121 is a perspective view of the second side of the inner journal shown in FIG. 120.

FIG. 122 is an elevational view of the first side of the inner journal shown in FIG. 120.

FIG. 123 is a cross-sectional view of the inner journal shown in FIG. 122, taken along line AO-AO.

FIG. 124 is a first end perspective view of another embodiment of a modular crankshaft disclosed herein.

FIG. 125 is a second end perspective view of the modular crankshaft shown in FIG. 124.

FIG. 126 is a front elevational view of the modular crankshaft shown in FIG. 124.

FIG. 127 is a cross-sectional view of the modular crankshaft shown in FIG. 126, taken along line AP-AP.

FIG. 128 is an enlarged view of area AQ, shown in FIG. 127.

FIG. 129 is a first end perspective and exploded view of the modular crankshaft shown in FIG. 124.

FIG. 130 is a perspective view of the first side of the first end journal used with the modular crankshaft shown in FIG. 124.

FIG. 131 is a perspective view of the second side of the first end journal shown in FIG. 130.

Figure 130:
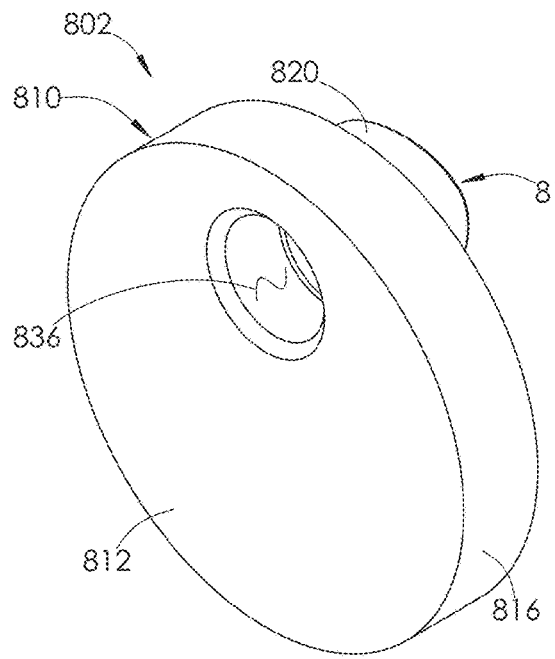
Figure 131:
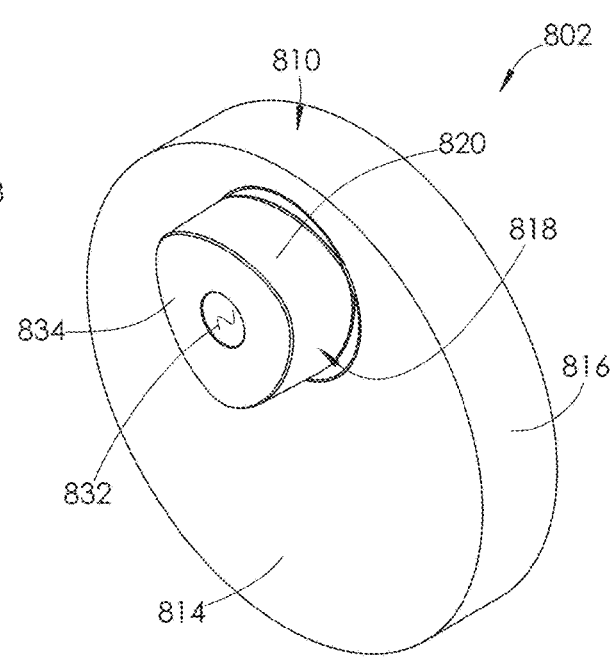
Figure 132:
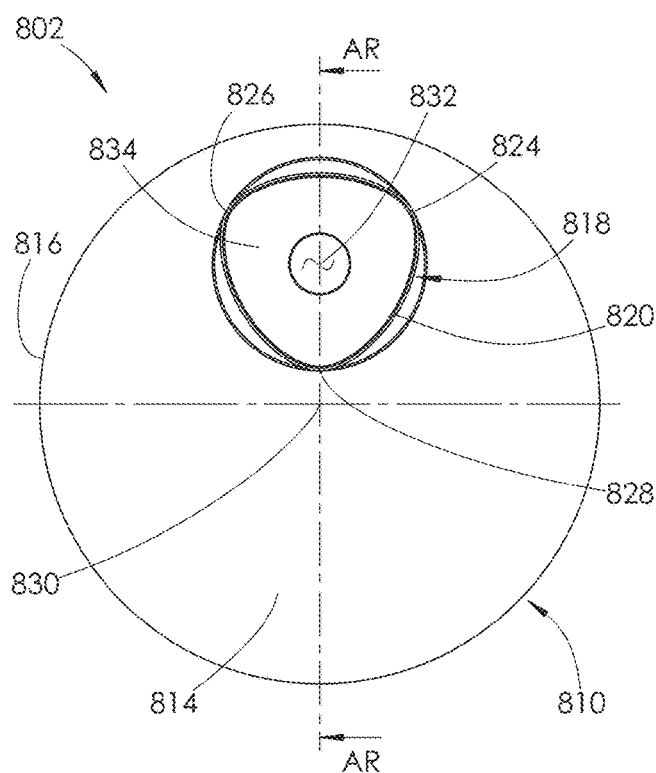

FIG. 132 is a top plan view of the second side of the first end journal shown in FIG. 130.

Figure 133:
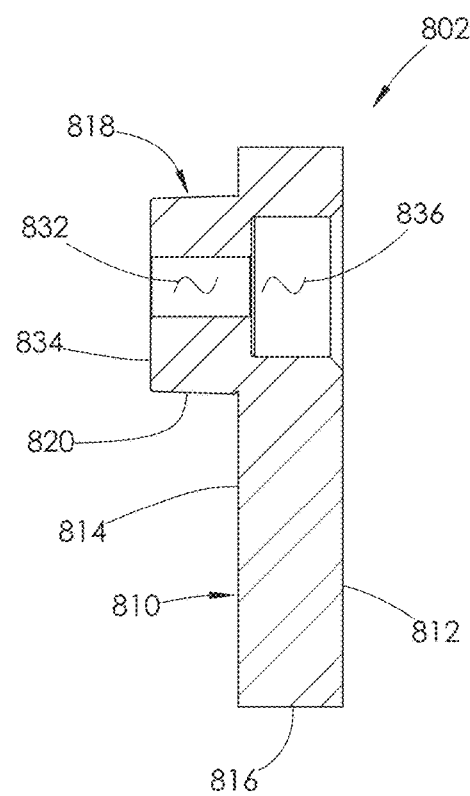

FIG. 133 is a cross-sectional view of the first end journal shown in FIG. 132, taken along line AR-AR.

Figure 124:
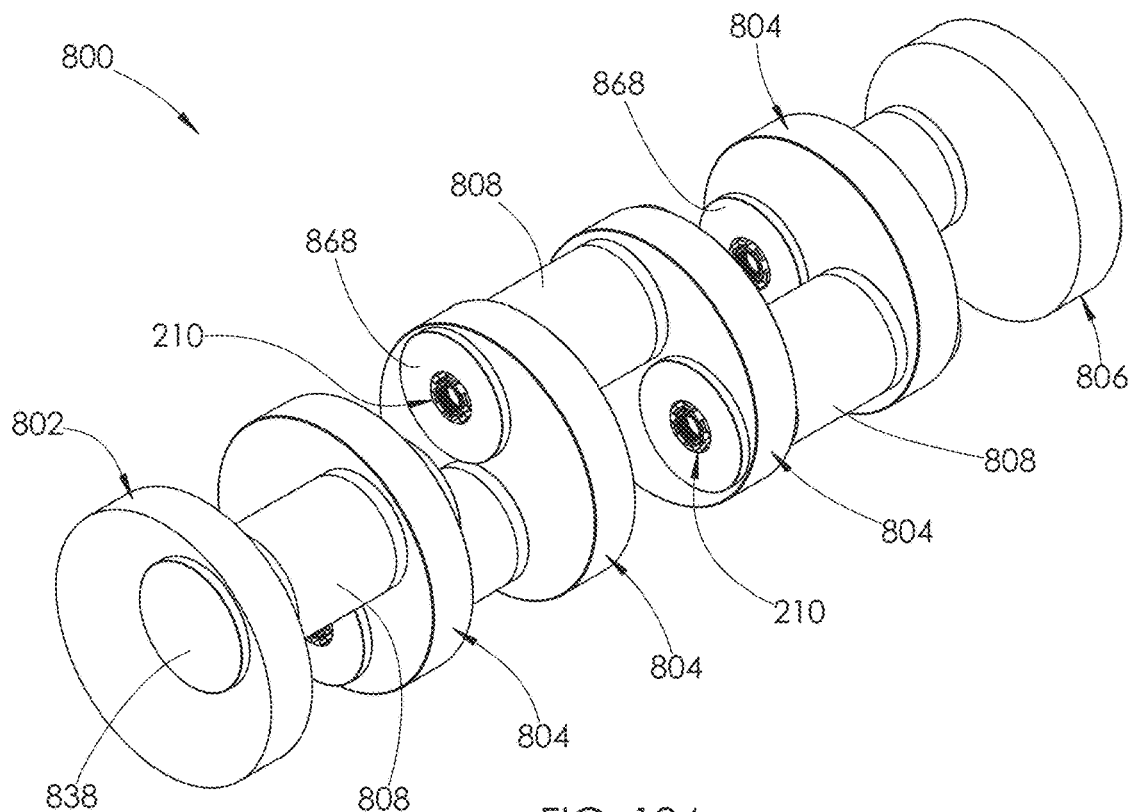
Figure 125:
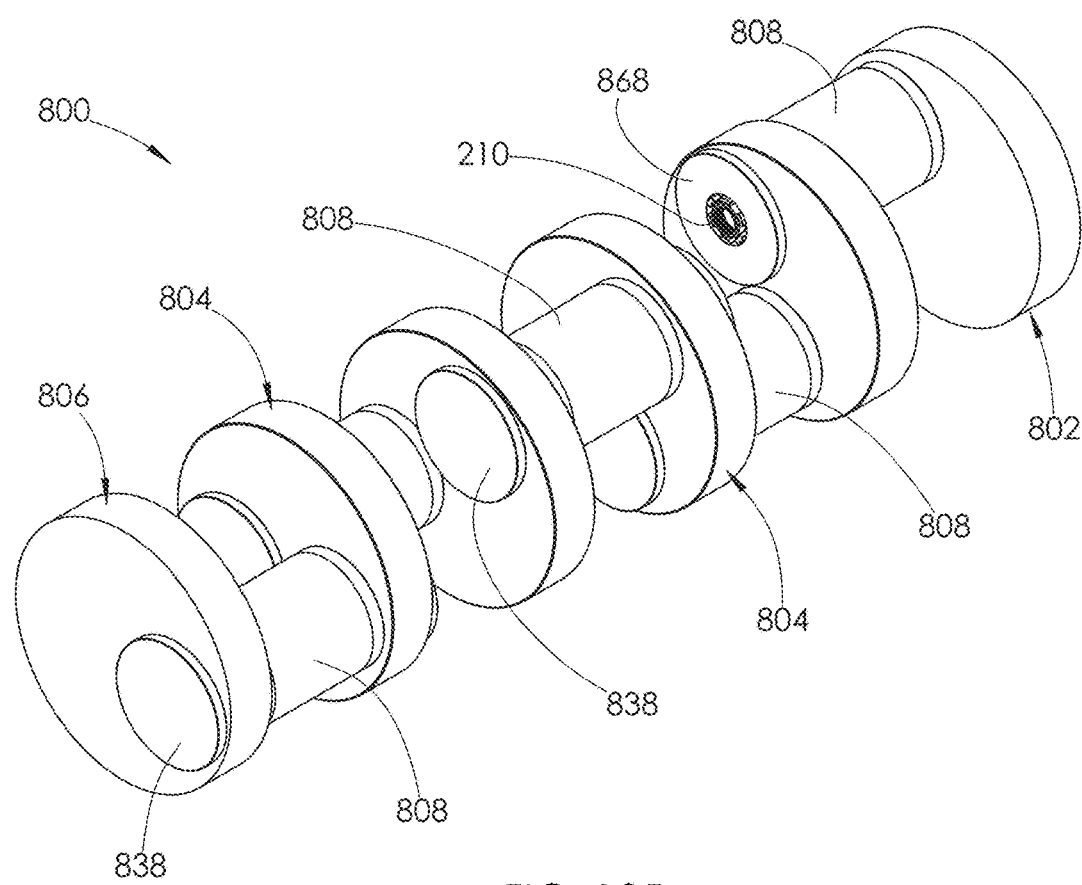
Figure 126:
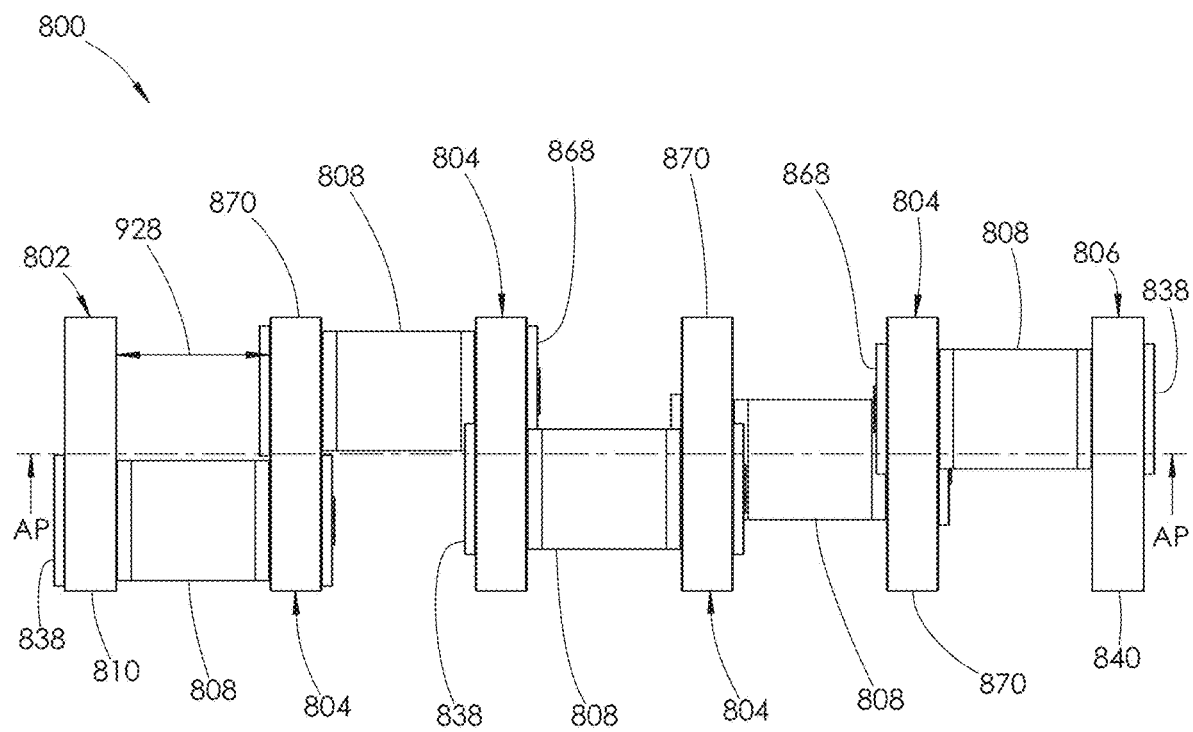
Figure 127:
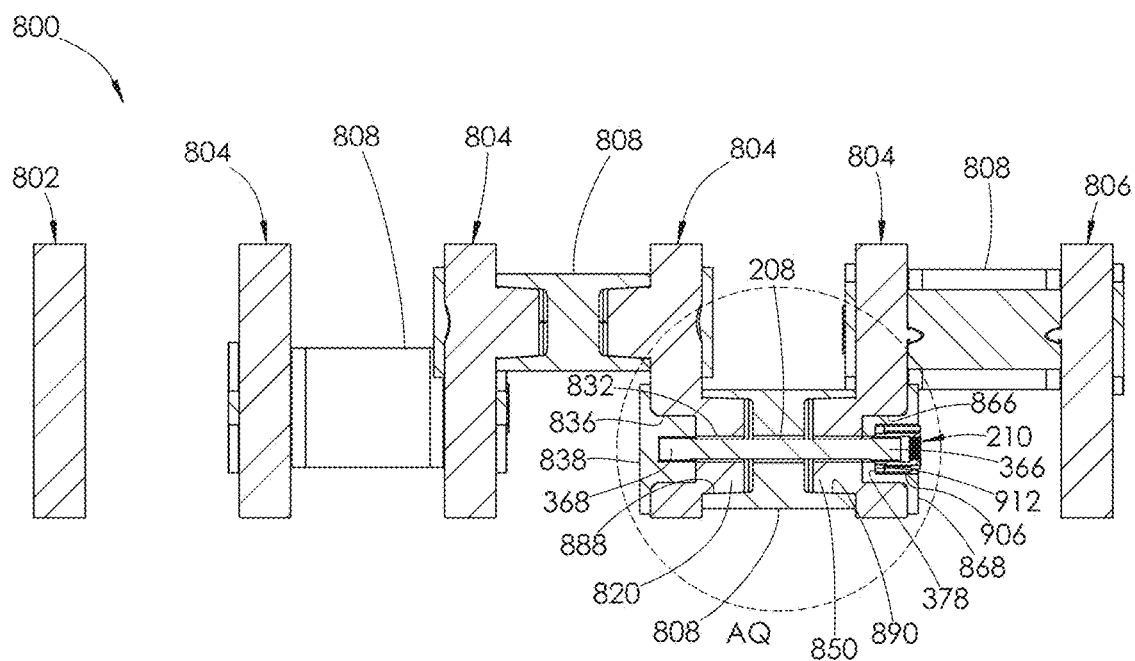
Figure 134:
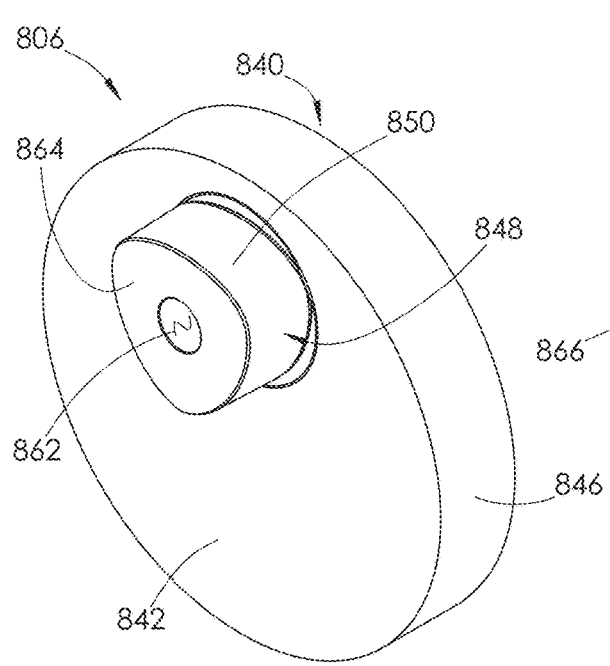

FIG. 134 is a perspective view of the first side of the second end journal used with the modular crankshaft shown in FIG. 124.

Figure 135:
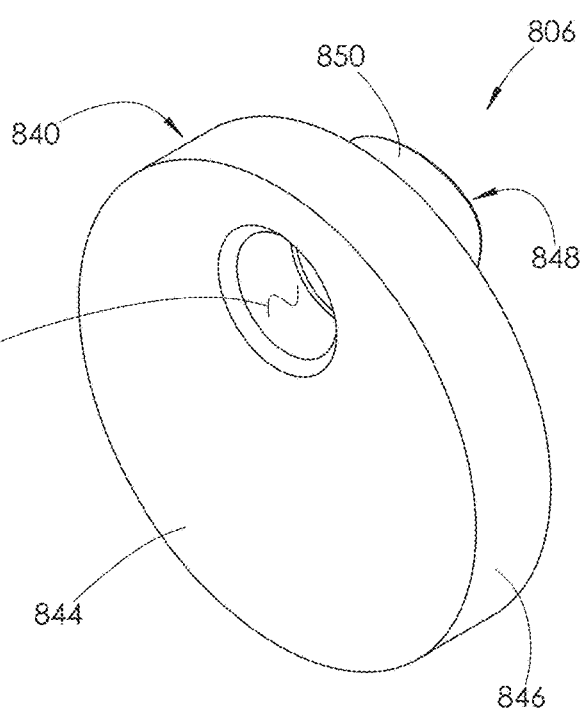

FIG. 135 is a perspective view of the second side of the second end journal shown in FIG. 134.

Figure 136:
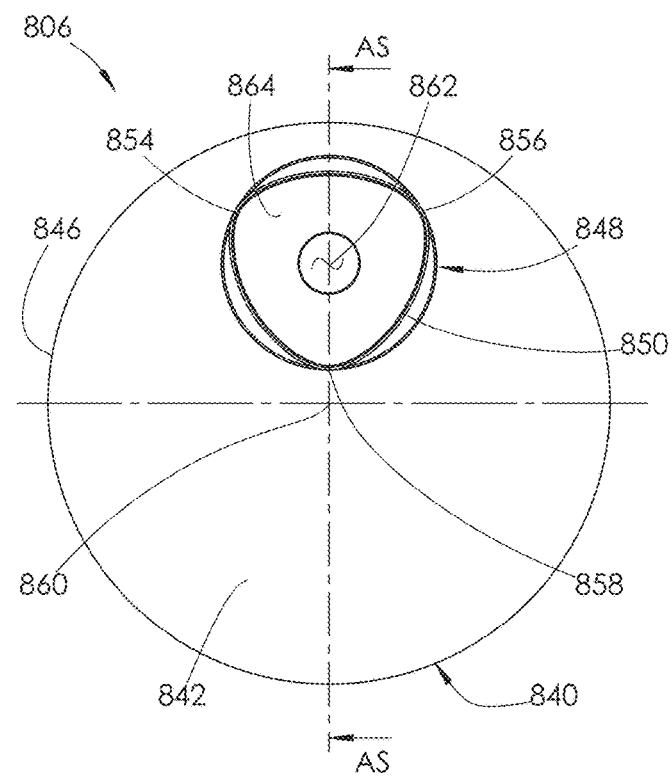

FIG. 136 is an elevational view of the first side of the second end journal shown in FIG. 134.

Figure 137:
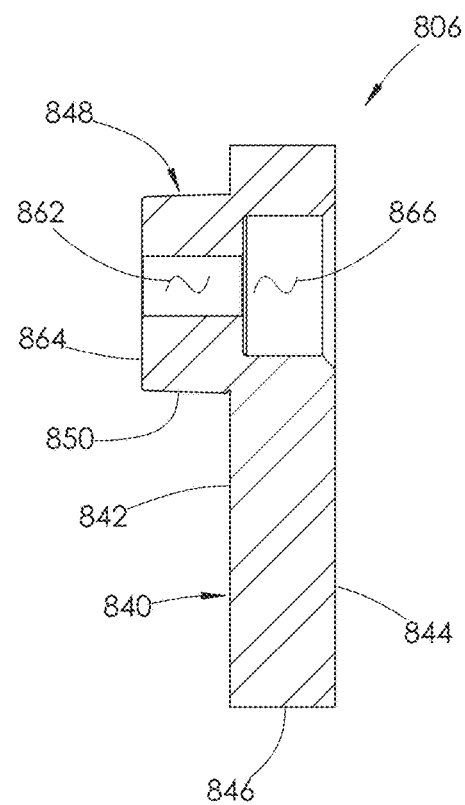

FIG. 137 is a cross-sectional view of the second end journal shown in FIG. 136, taken along line AS-AS.

Figures 138, 139:
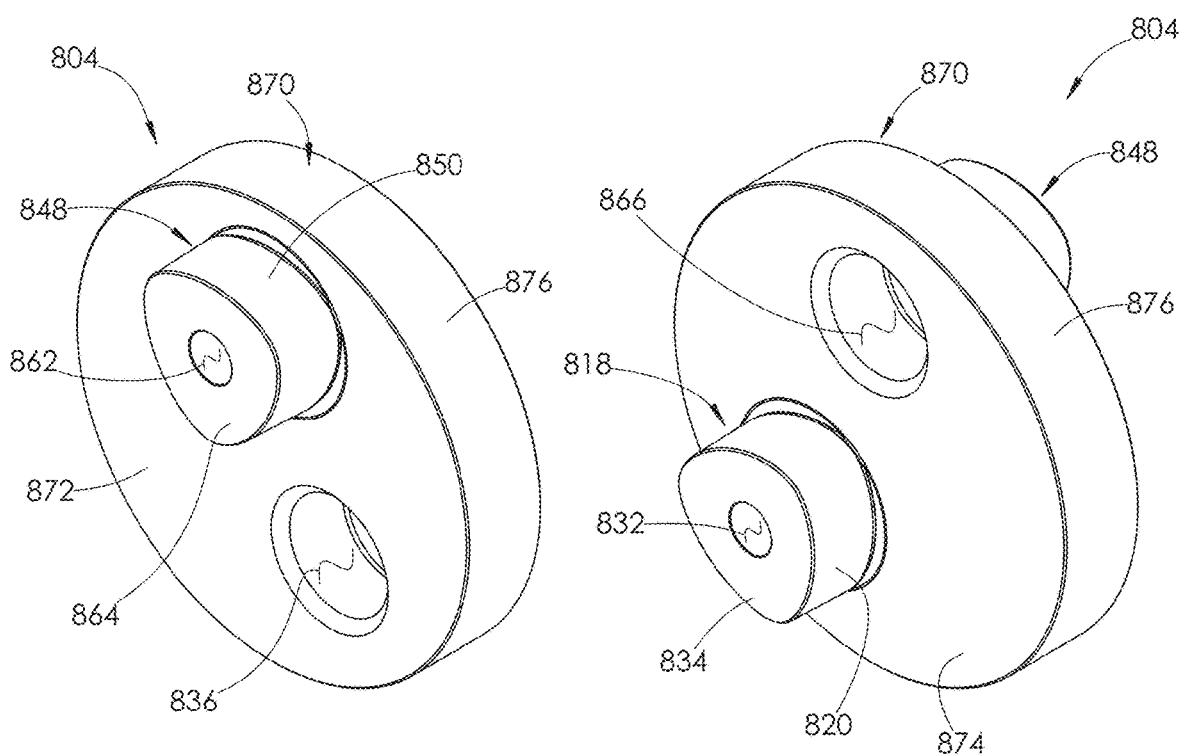

FIG. 138 is a perspective view of the first side of an inner journal used with the modular crankshaft shown in FIG. 124.

FIG. 139 is a perspective view of the second side of the inner journal shown in FIG. 138.

Figure 140:
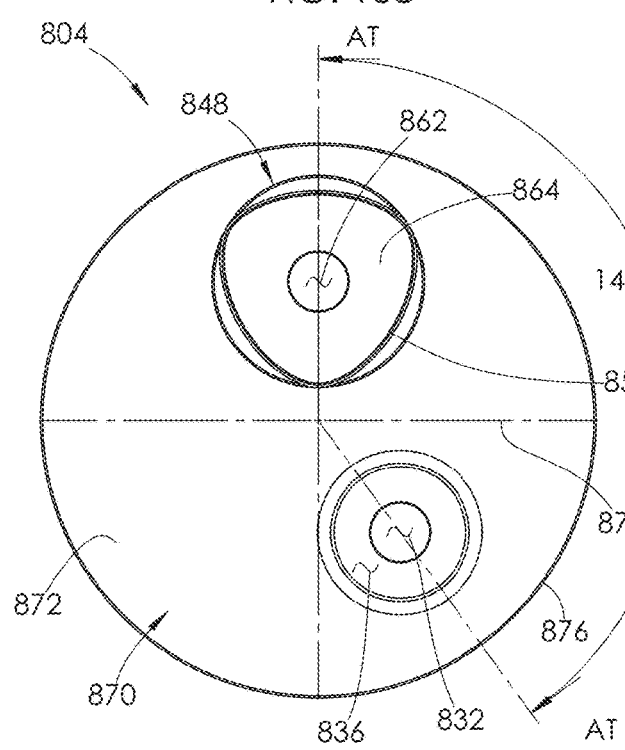

FIG. 140 is an elevational view of the first side of the inner journal shown in FIG. 138.

Figure 141:
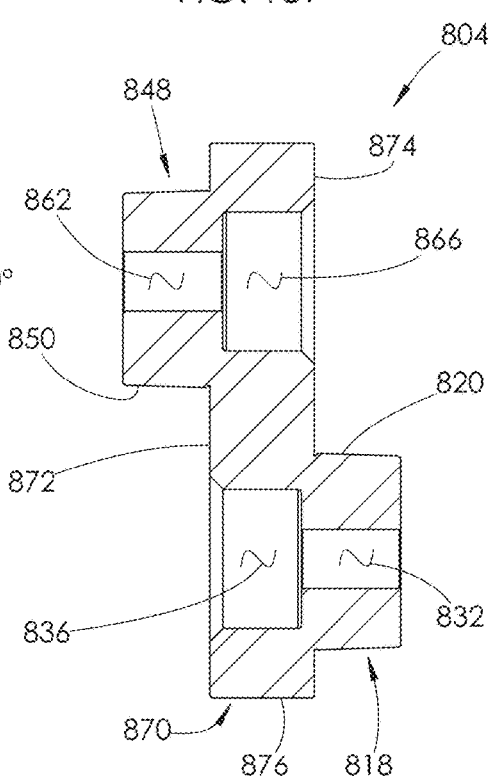

FIG. 141 is a cross-sectional view of the inner journal shown in FIG. 140, taken along line AT-AT.

Figure 142:
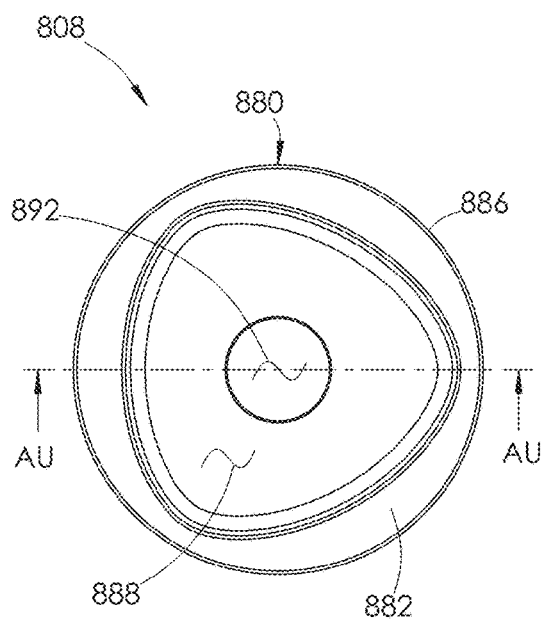

FIG. 142 is a side elevational view of a connecting rod journal used with the modular crankshaft shown in FIG. 124.

Figure 143:
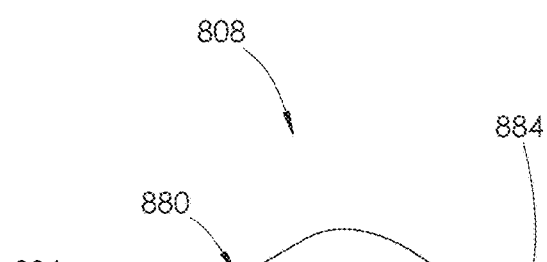

FIG. 143 is a perspective view of the connecting rod journal shown in FIG. 142.

Figure 144:
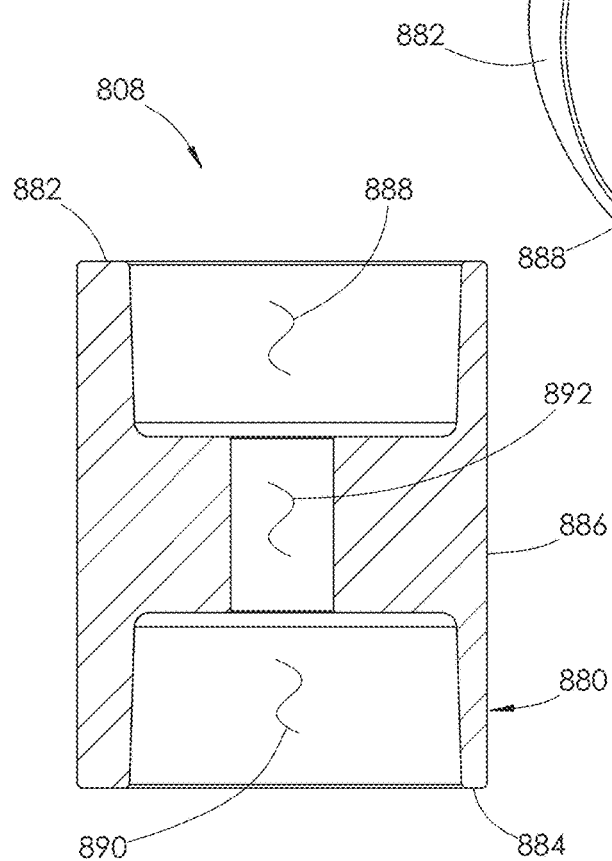

FIG. 144 is a cross-sectional view of the connecting rod journal shown in FIG. 142, taken along line AU-AU.

Figure 145:
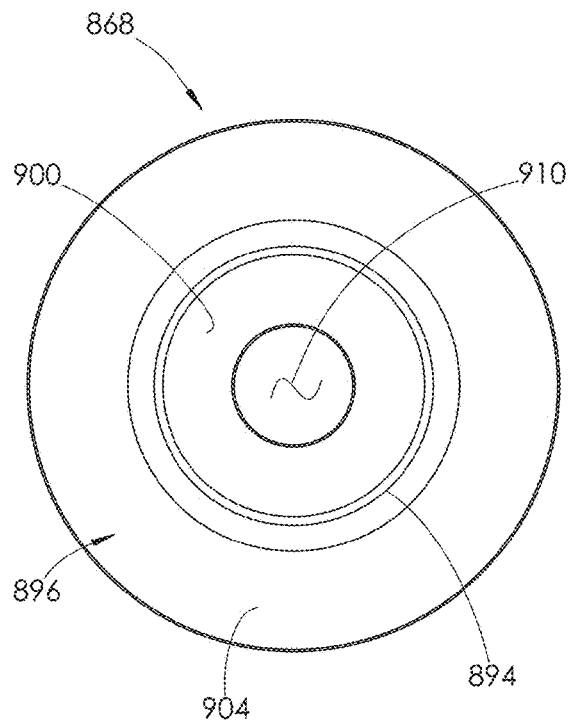

FIG. 145 is a front elevational view of a flanged washer used with the modular crankshaft shown in FIG. 124.

Figure 146:
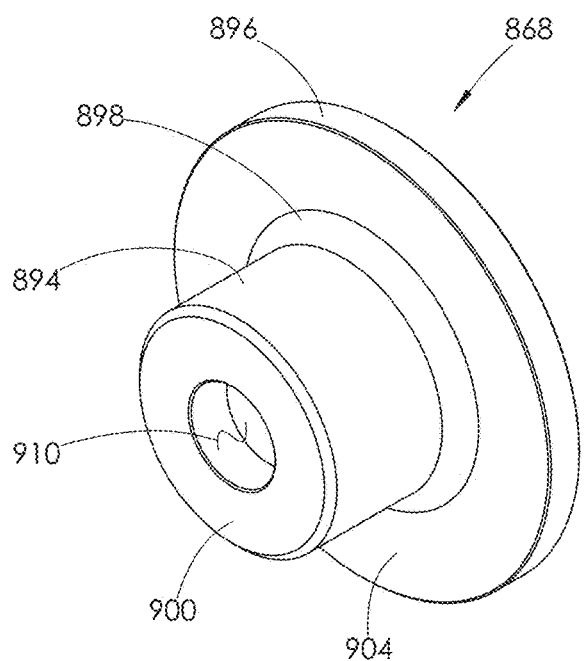

FIG. 146 is a perspective view of the flanged washer shown in FIG. 145.

Figure 147:
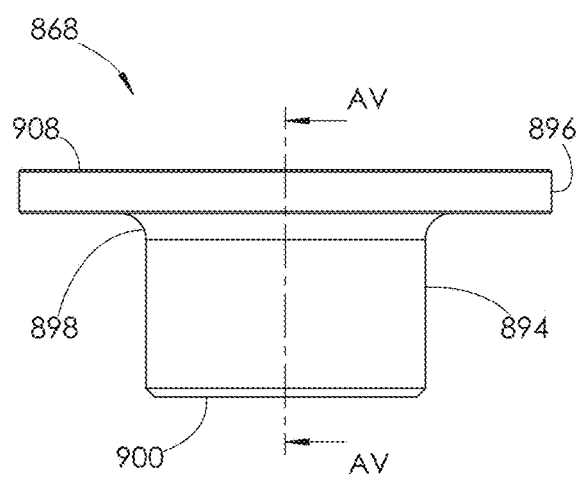

FIG. 147 is a side elevational view of the flanged washer shown in FIG. 145.

Figure 148:
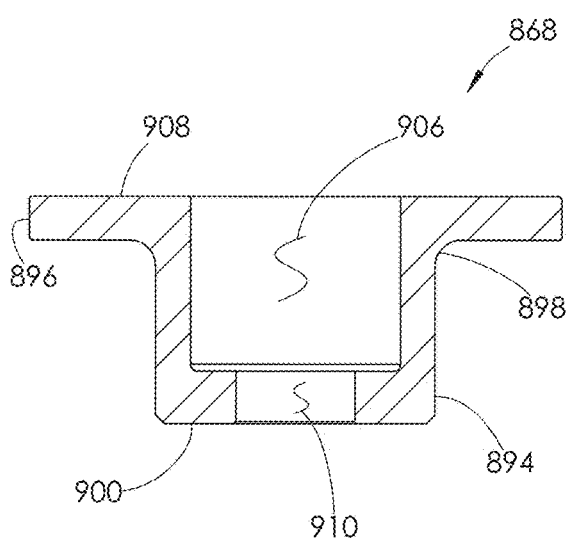

FIG. 148 is a cross-sectional view of the flanged washer shown in FIG. 147, taken along line AV-AV.

Figure 149:
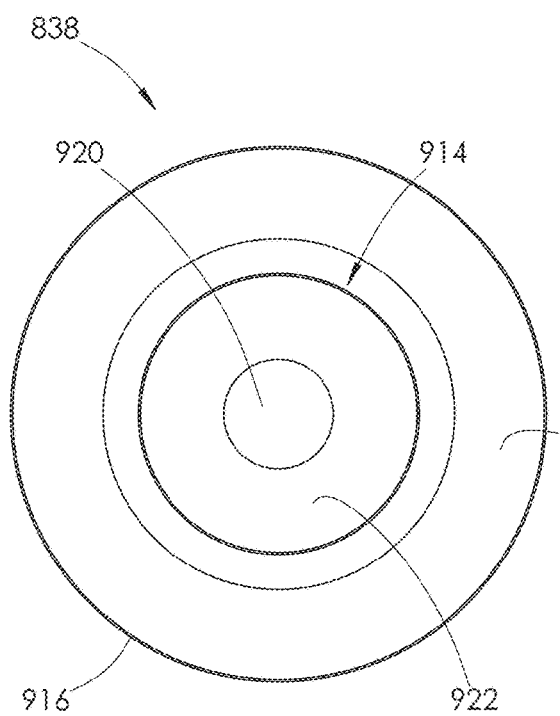

FIG. 149 is a front elevational view of a flanged nut used with the modular crankshaft shown in FIG. 124.

Figure 150:
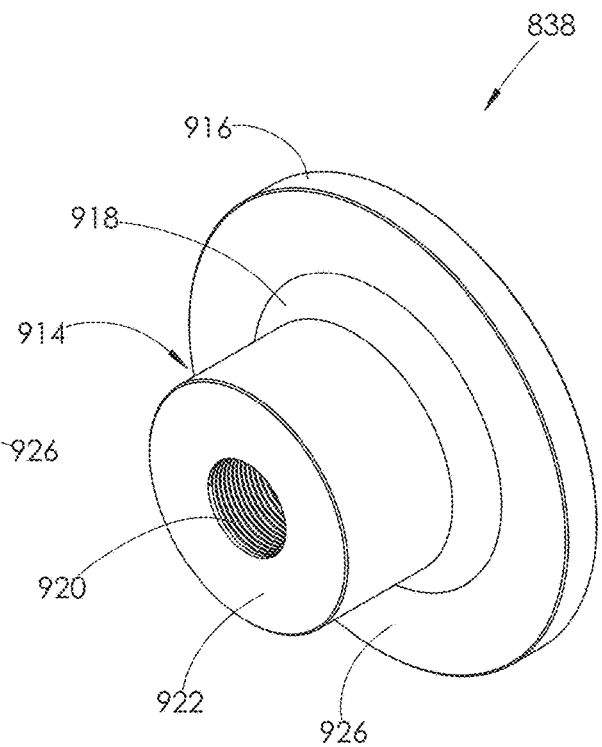

FIG. 150 is a perspective view of the flanged nut shown in FIG. 149.

Figure 151:
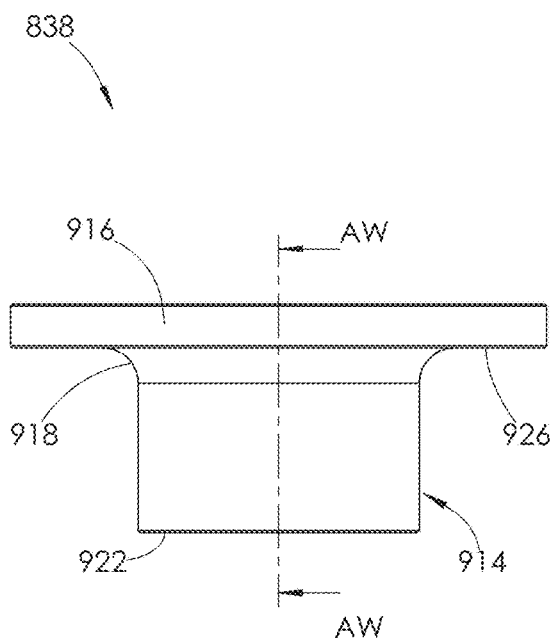

FIG. 151 is a side elevational view of the flanged nut shown in FIG. 149.

Figure 152:
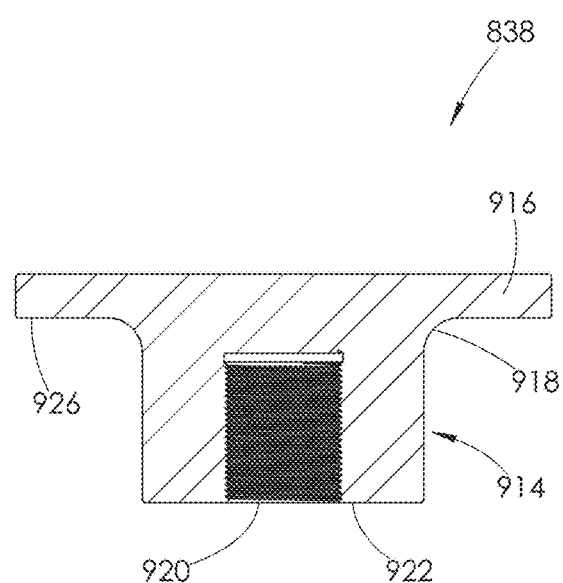

FIG. 152 is a cross-sectional view of the flanged nut shown in FIG. 151, taken along line AW-AW.

Figure 153:
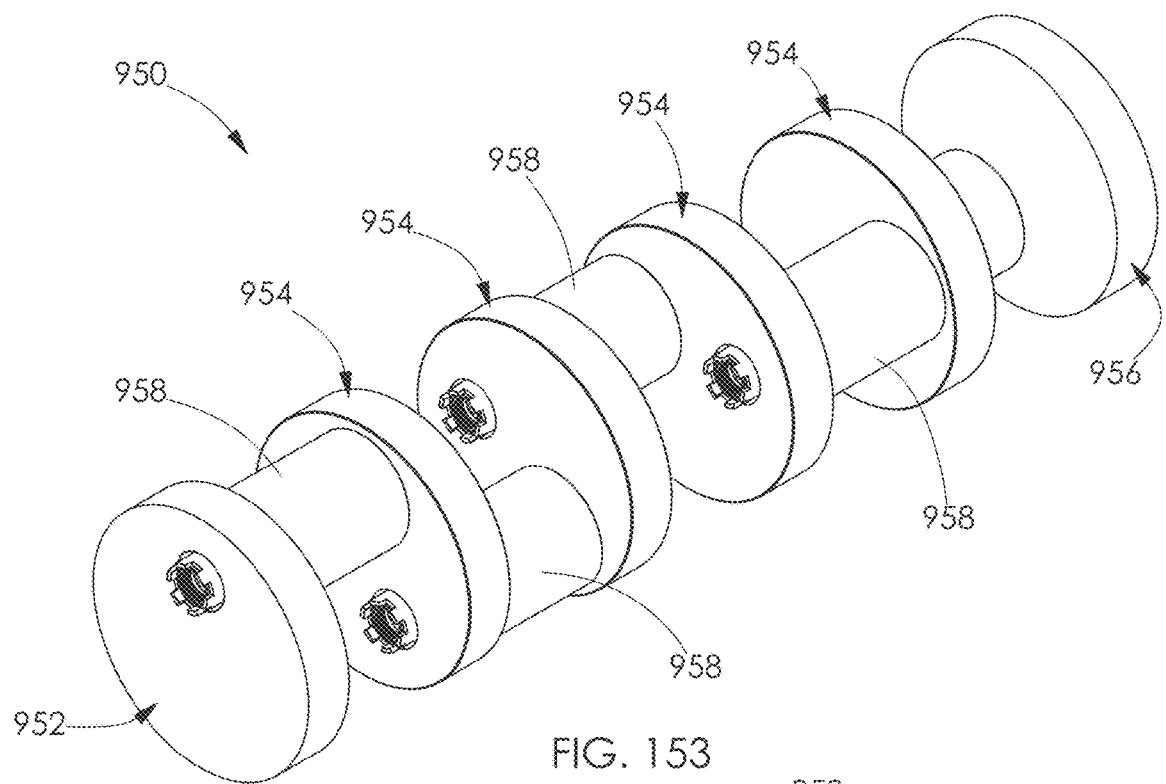

FIG. 153 is a first end perspective view of another embodiment of a modular crankshaft disclosed herein.

Figure 154:
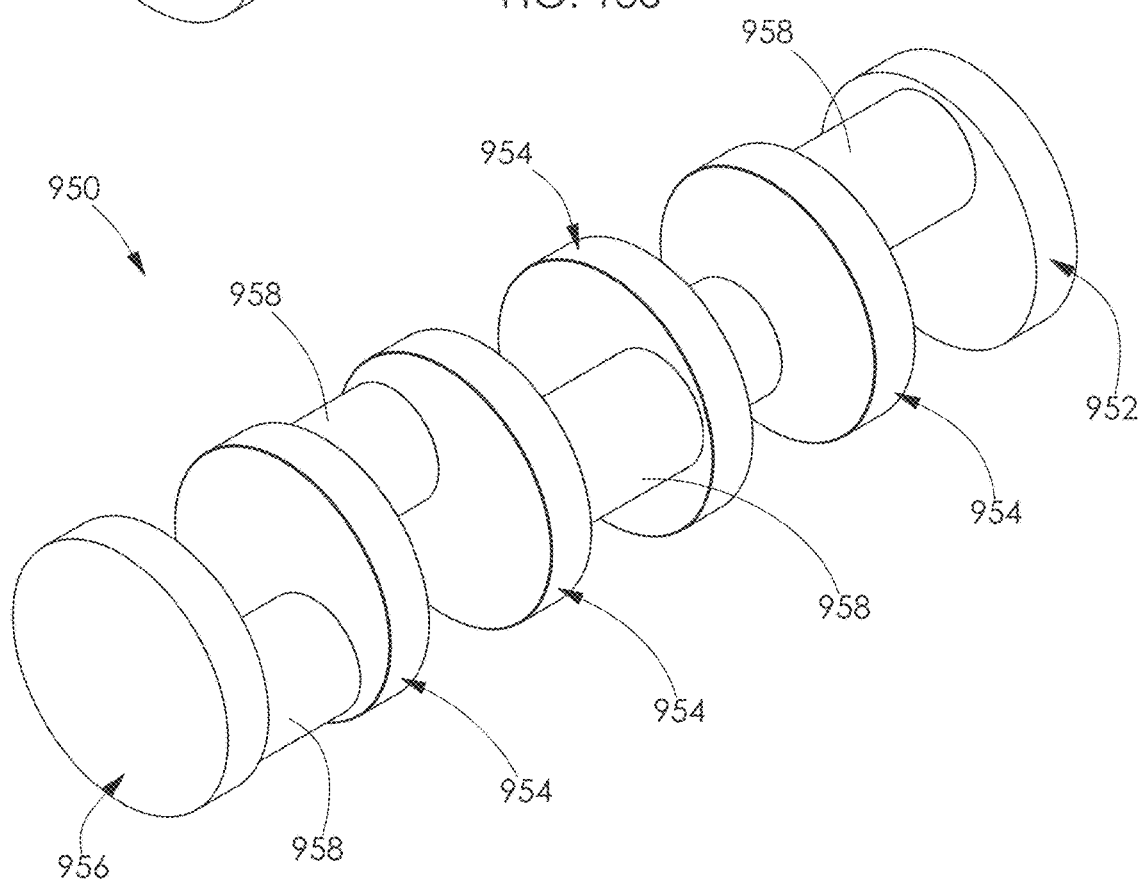

FIG. 154 is a second end perspective view of the modular crankshaft shown in FIG. 153.

Figure 155:
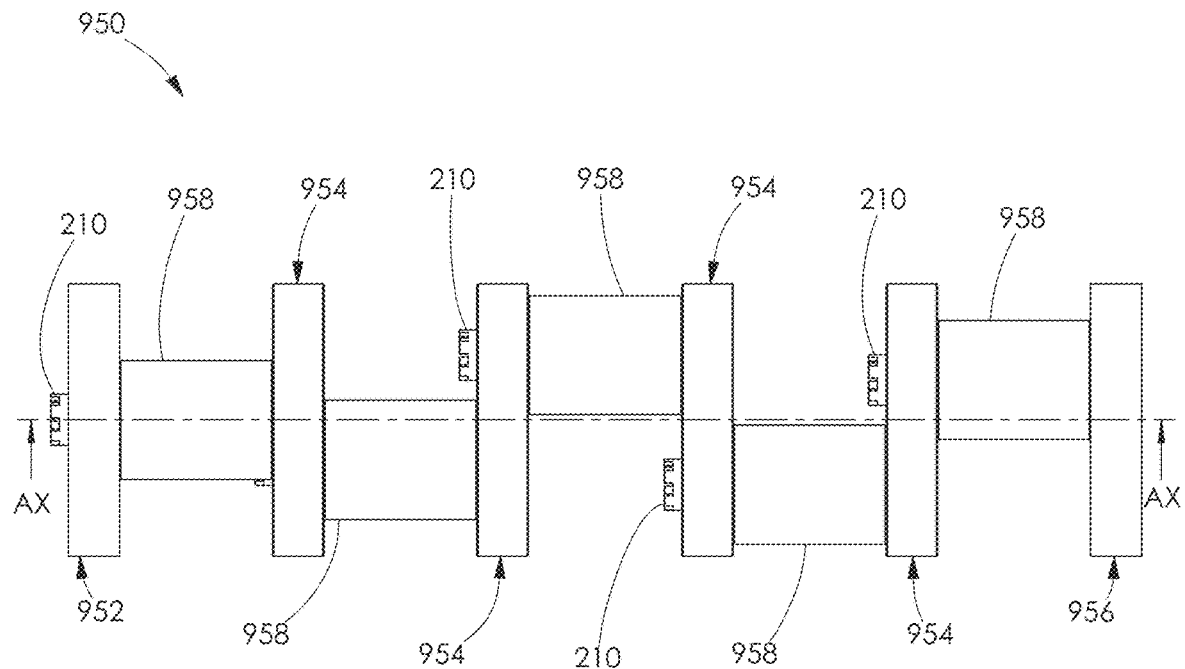

FIG. 155 is a top plan view of the modular crankshaft shown in FIG. 153.

Figure 156:
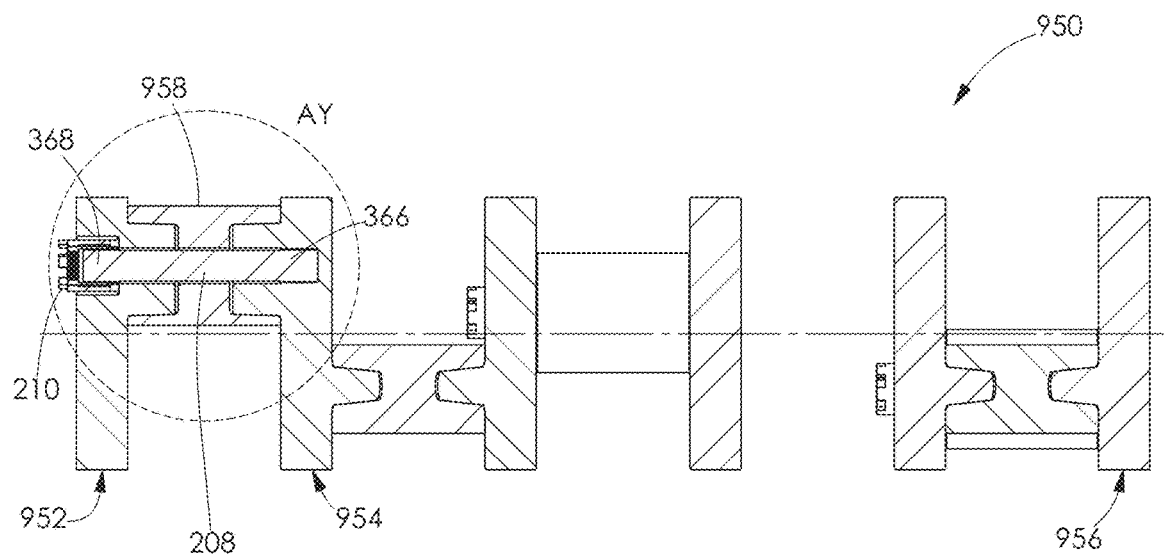

FIG. 156 is a cross-sectional view of the modular crankshaft shown in FIG. 155, taken along line AX-AX.

Figure 157:
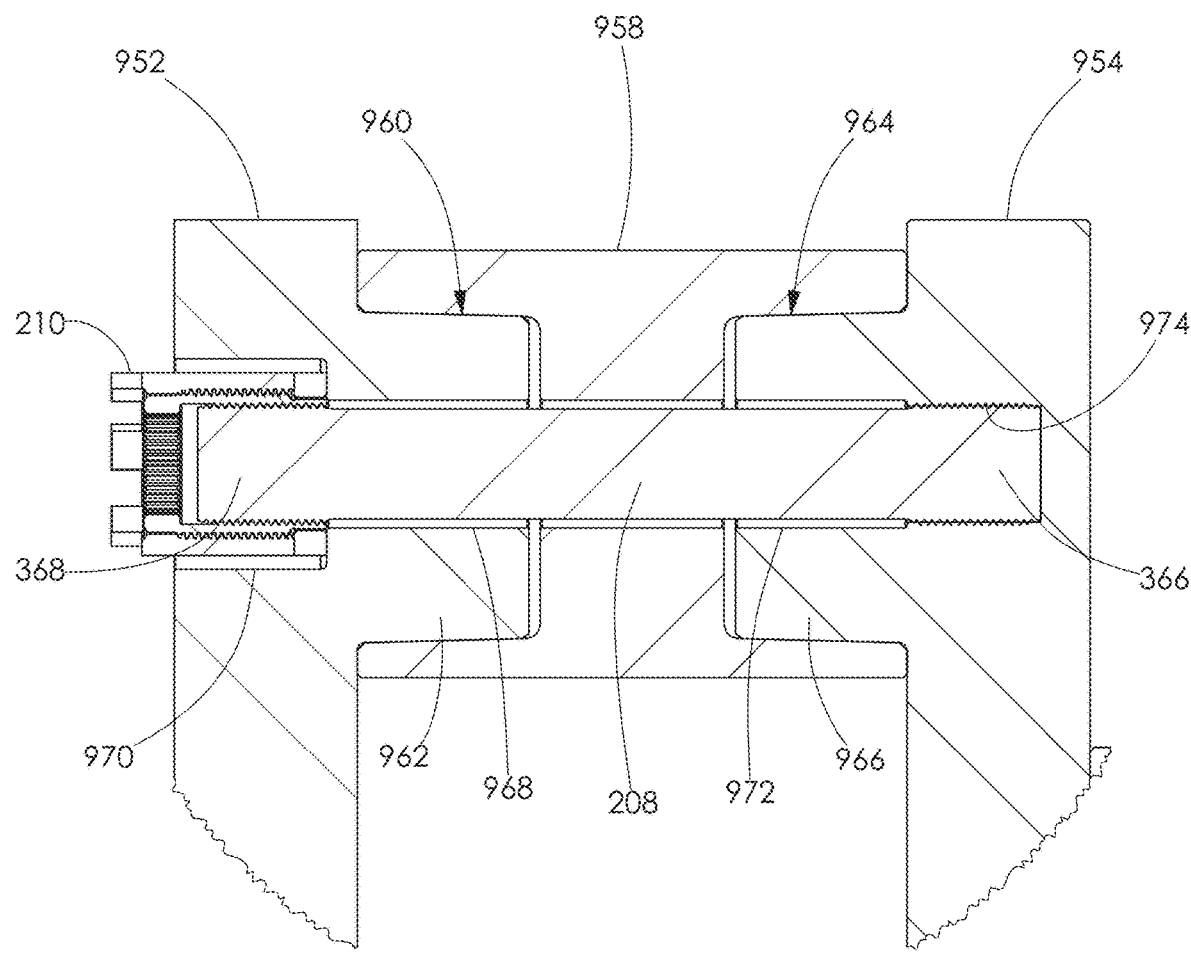

FIG. 157 is an enlarged view of area AY, shown in FIG. 156.

Figure 158:
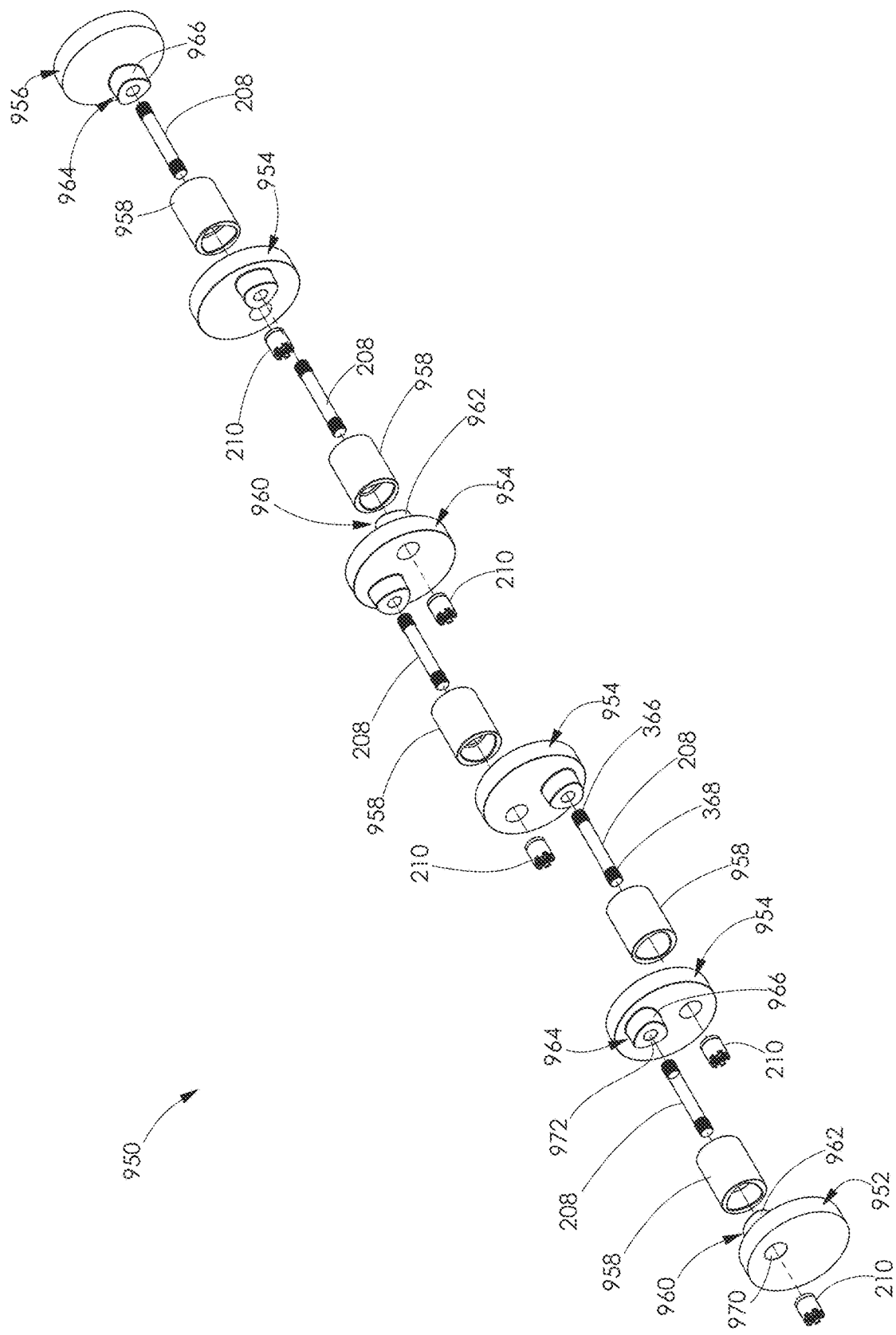

FIG. 158 is a first end perspective and exploded view of the modular crankshaft shown in FIG. 153.

Figure 159:
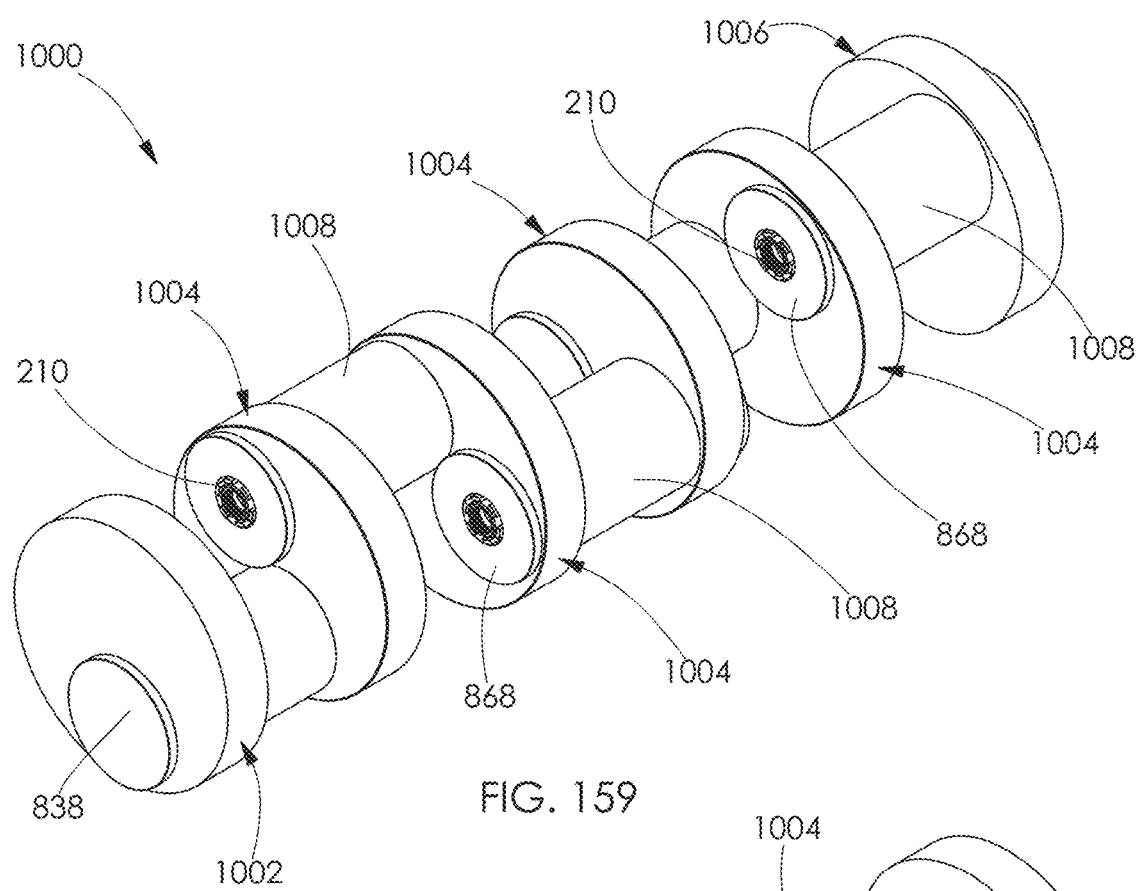

FIG. 159 is a first end perspective view of another embodiment of a modular crankshaft disclosed herein.

Figure 160:
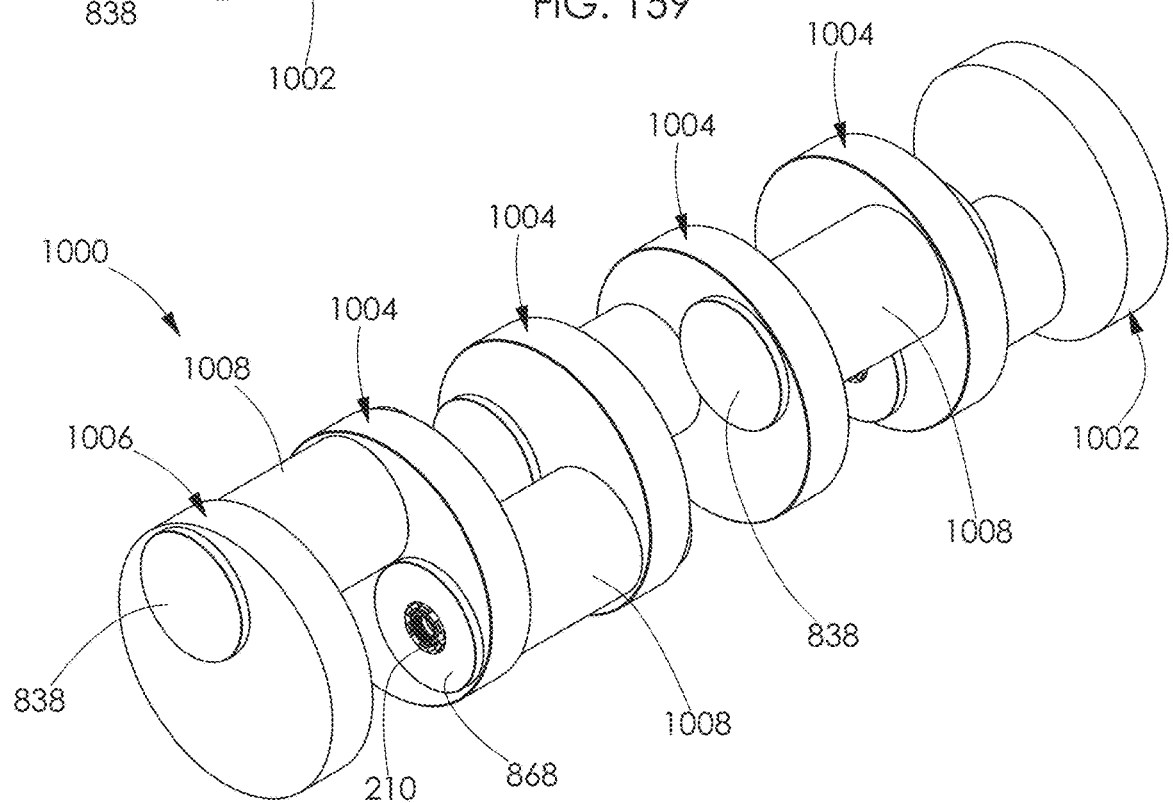

FIG. 160 is a second end perspective view of the modular crankshaft shown in FIG. 159.

Figure 161:
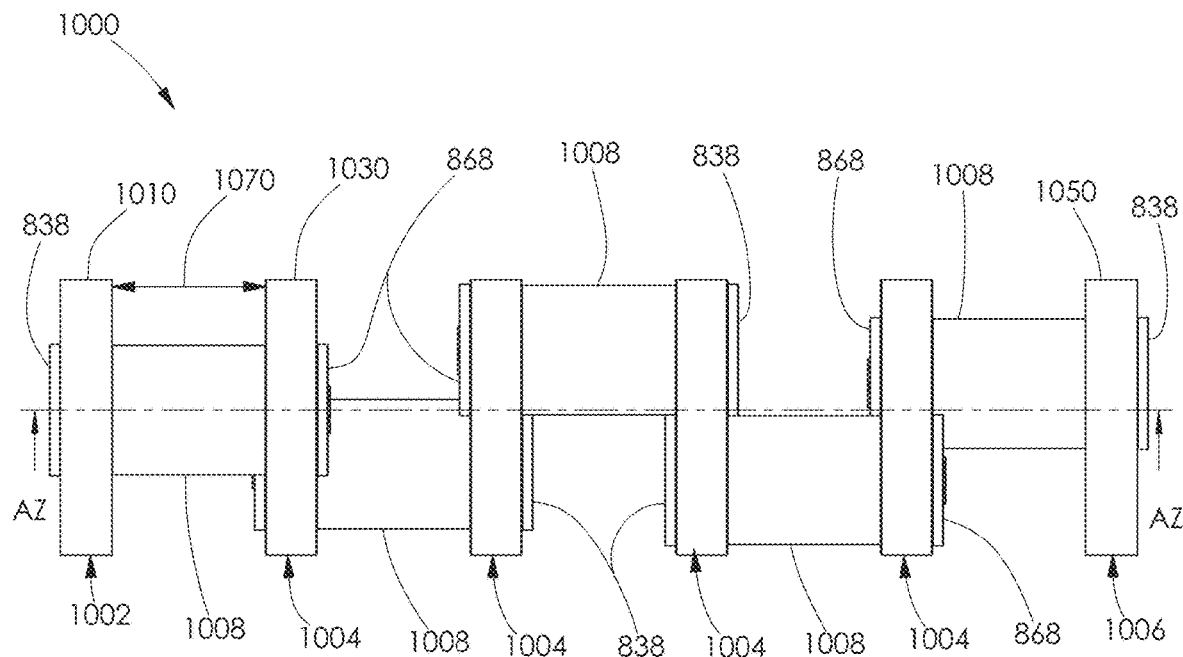

FIG. 161 is a bottom plan view of the modular crankshaft shown in FIG. 159.

Figure 162:
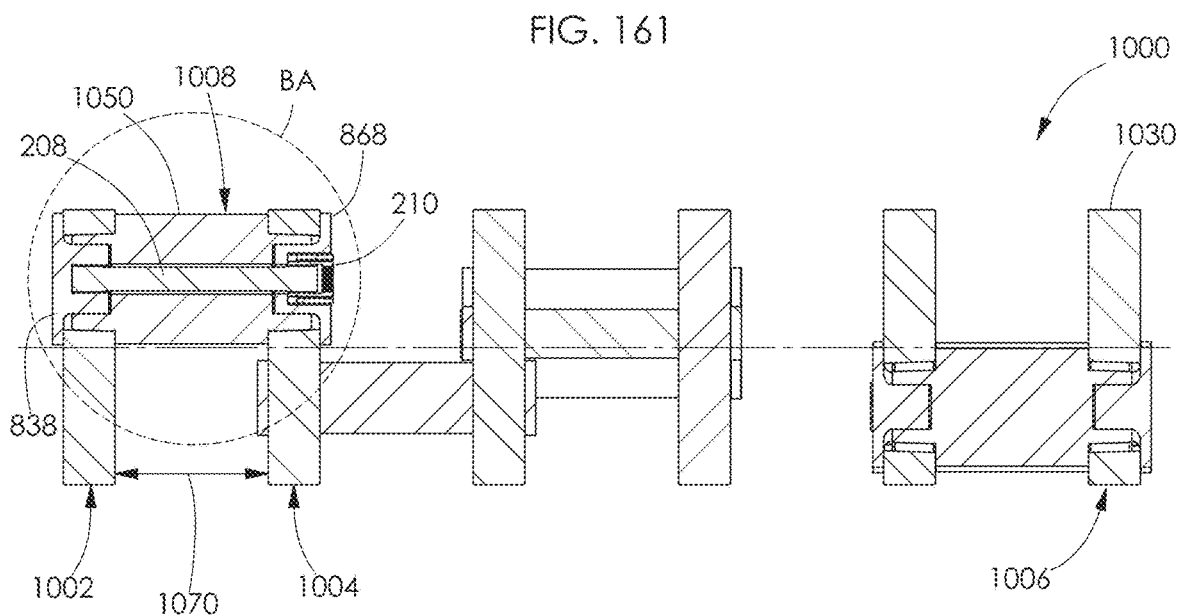

FIG. 162 is a cross-sectional view of the modular crankshaft shown in FIG. 161, taken along line AZ-AZ.

Figure 163:
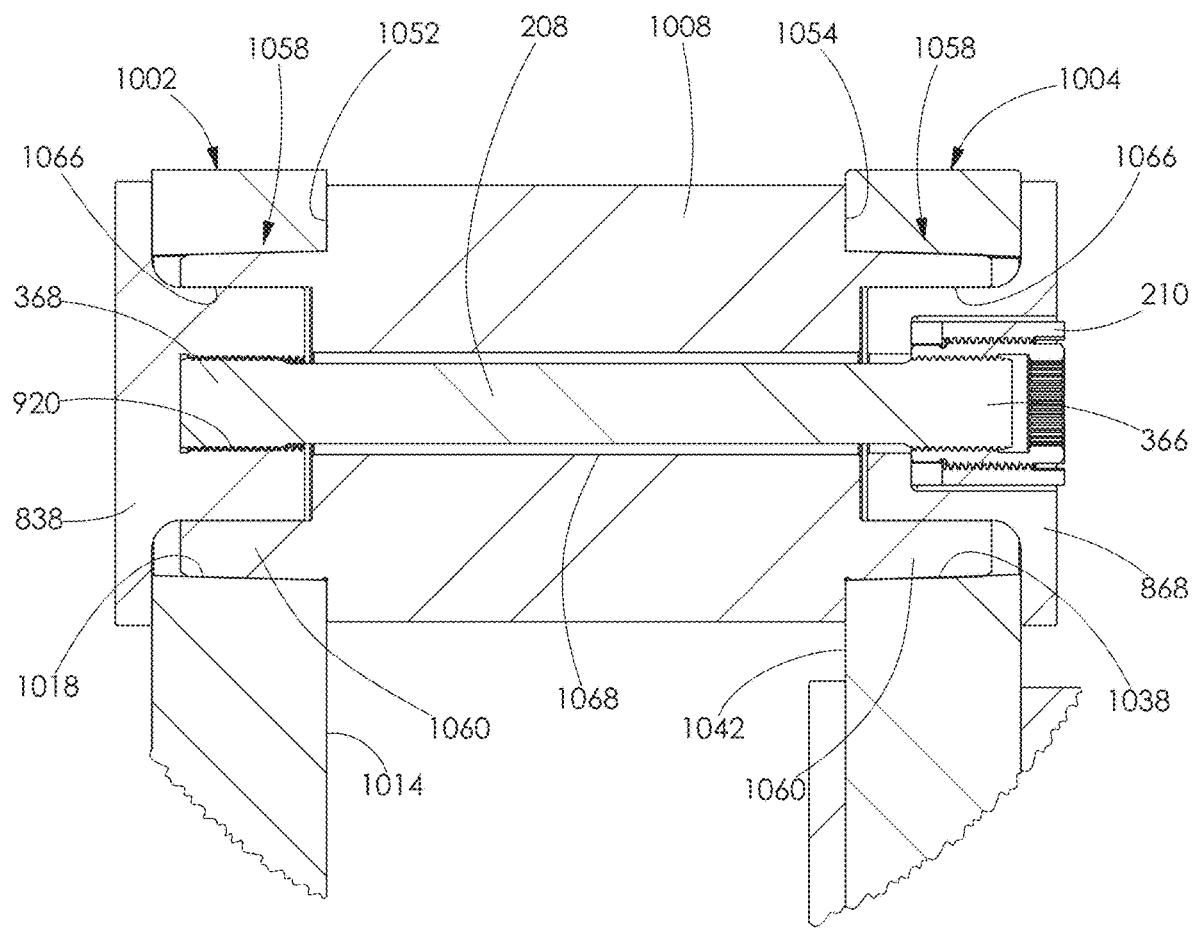

FIG. 163 is an enlarged view of area BA, shown in FIG. 162.

Figure 164:
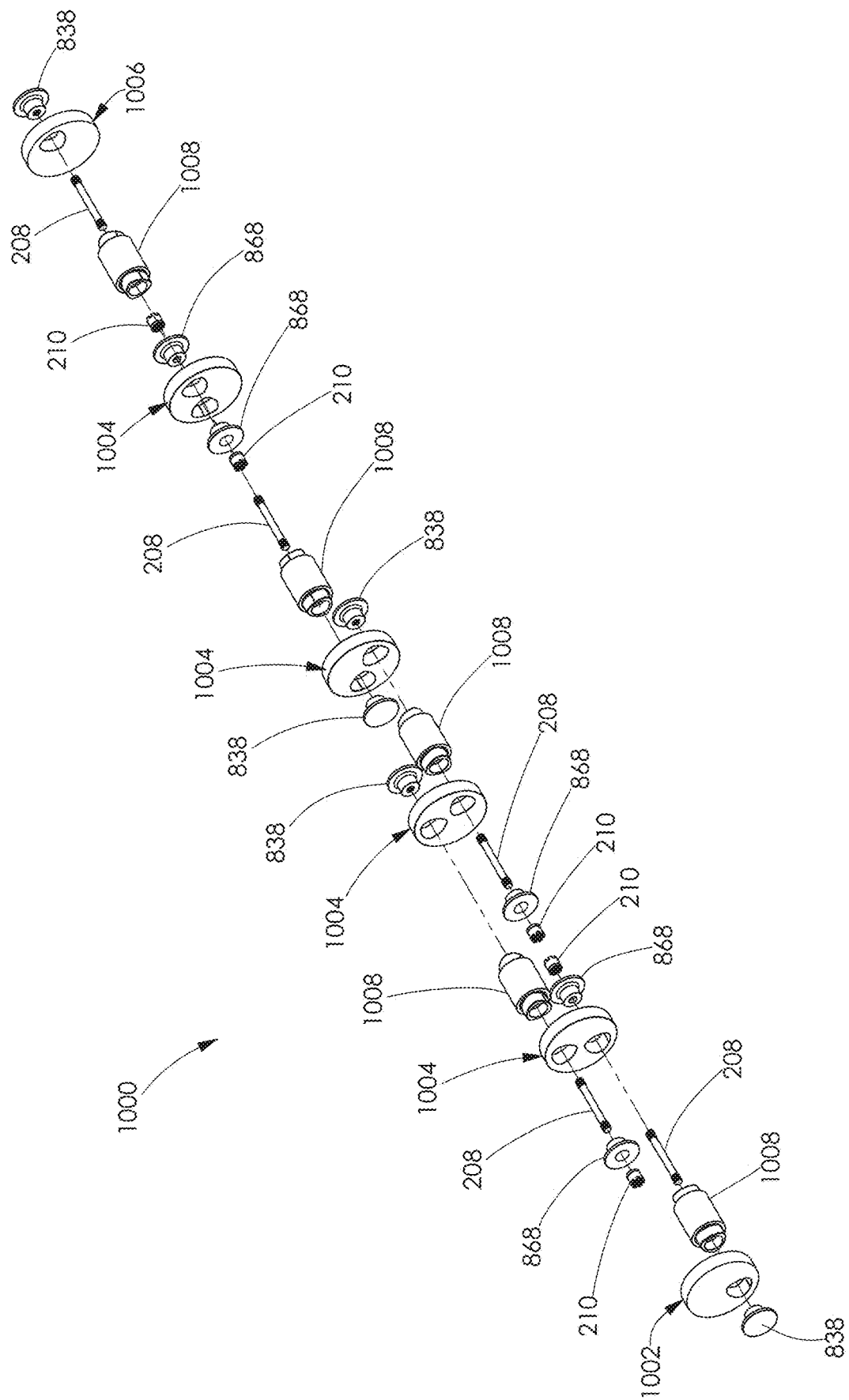

FIG. 164 is a first end perspective and exploded view of the modular crankshaft shown in FIG. 159.

Figure 165:
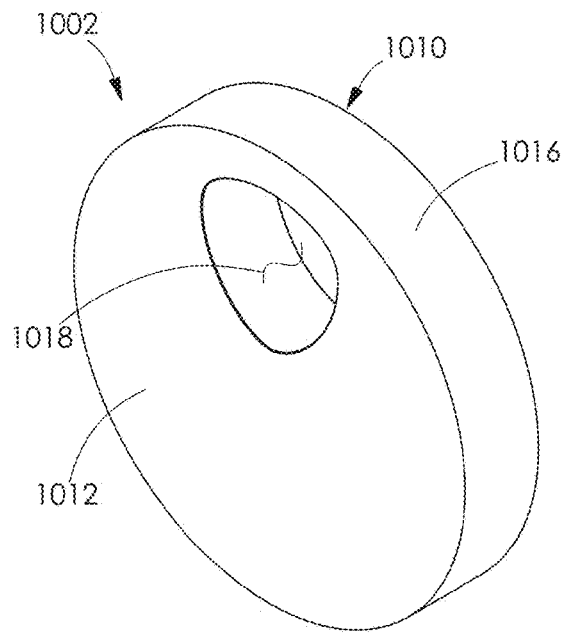

FIG. 165 is a perspective view of the first side of the first end journal used with the modular crankshaft shown in FIG. 159.

Figure 166:
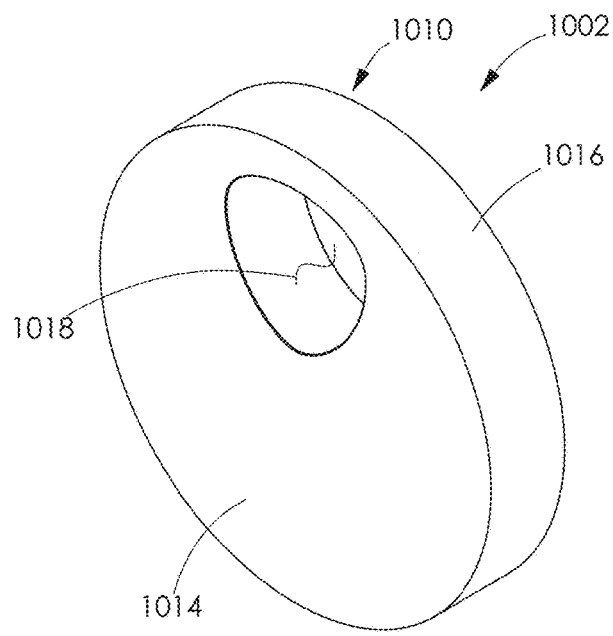

FIG. 166 is a perspective view of the second side of the first end journal shown in FIG. 165.

Figure 167:
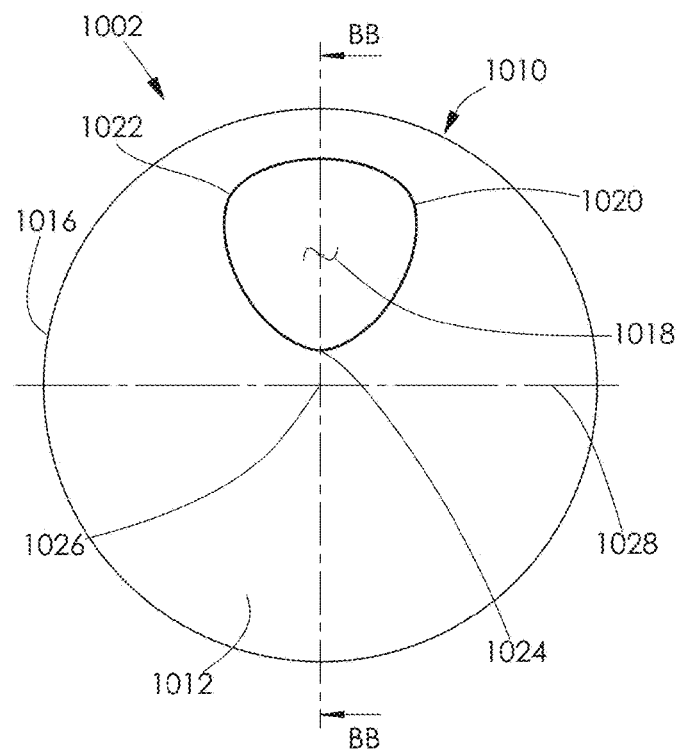

FIG. 167 is an elevational view of the first side of the first end journal shown in FIG. 165.

Figure 168:
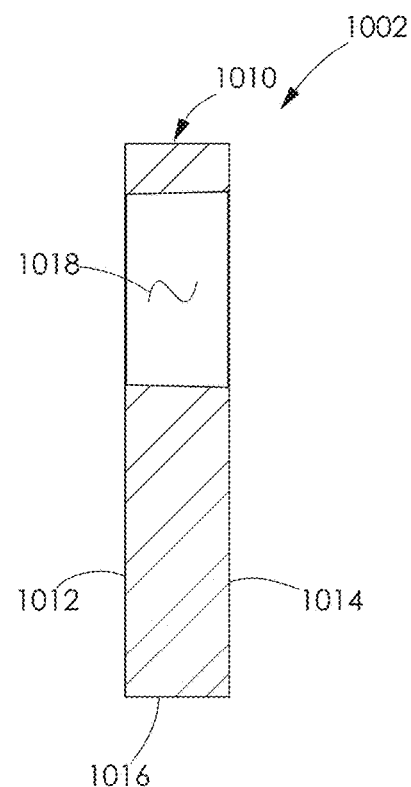

FIG. 168 is a cross-sectional view of the first end journal shown in FIG. 167, taken along line BB-BB.

Figure 169:
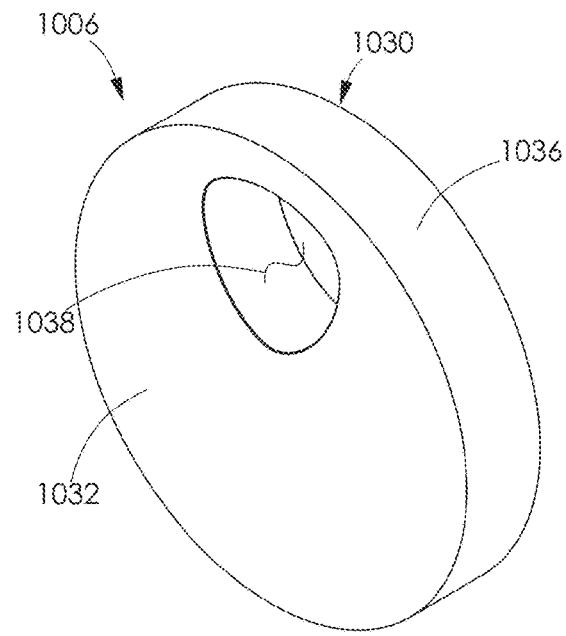

FIG. 169 is a perspective view of the first side of the second end journal used with the modular crankshaft shown in FIG. 159.

Figure 170:
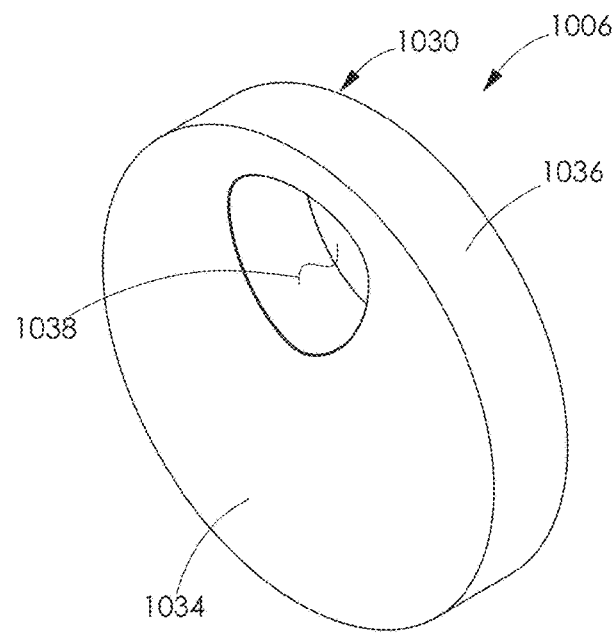

FIG. 170 is a perspective view of the second side of the second end journal shown in FIG. 169.

Figure 171:
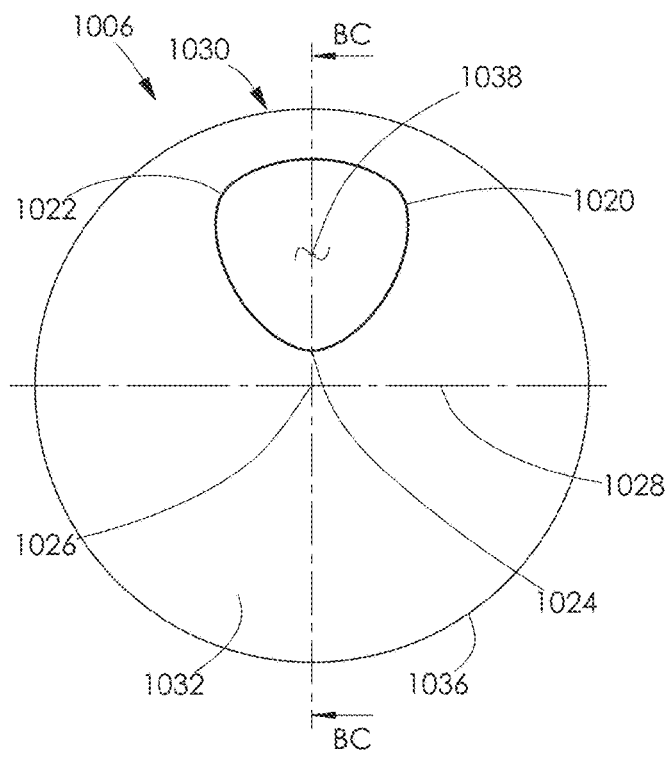

FIG. 171 is an elevational view of the first side of the second end journal shown in FIG. 169.

Figure 172:
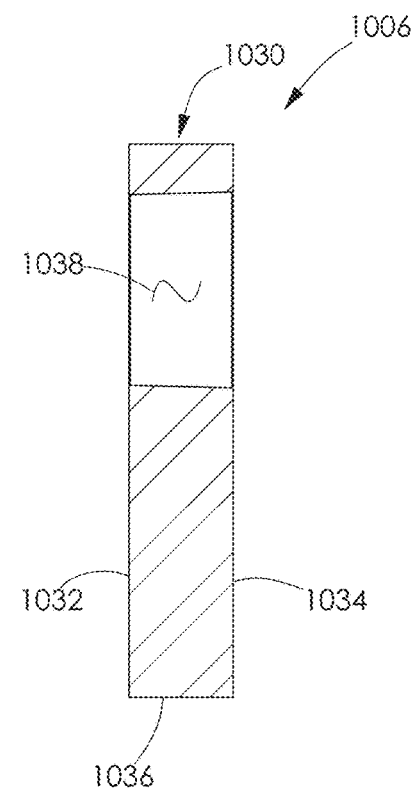

FIG. 172 is a cross-sectional view of the second end journal shown in FIG. 171, taken along line BC-BC.

Figure 173:
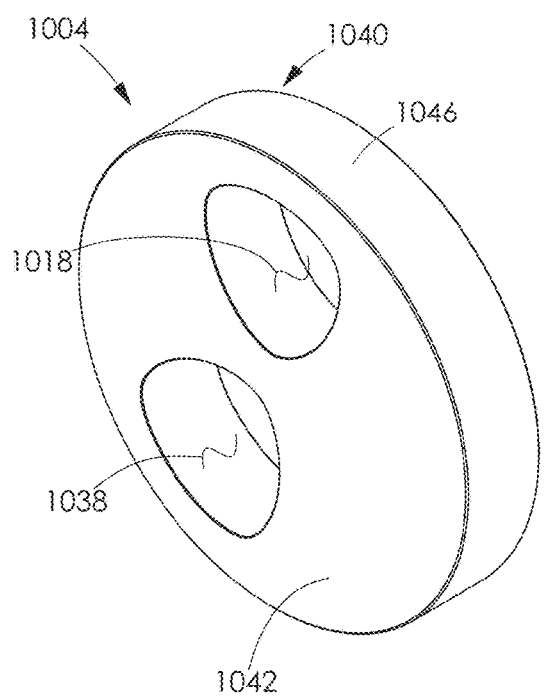

FIG. 173 is a perspective view of the first side of an inner journal used with the modular crankshaft shown in FIG. 159.

Figure 174:
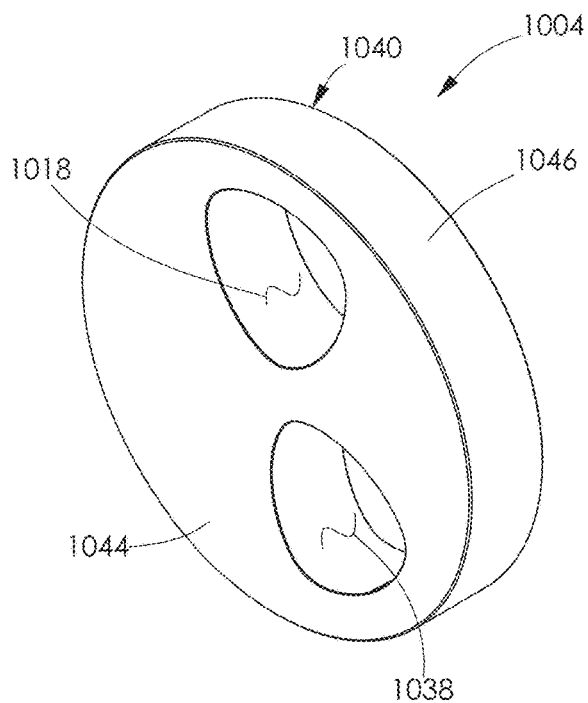

FIG. 174 is a perspective view of the second side of the inner journal shown in FIG. 173.

Figure 175:
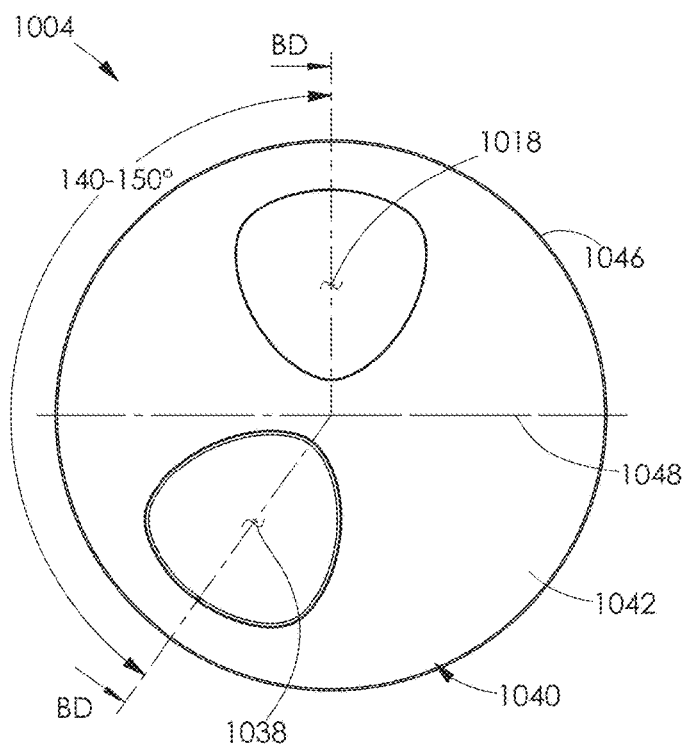

FIG. 175 is an elevational view of the first side of the inner journal shown in FIG. 173.

Figure 176:
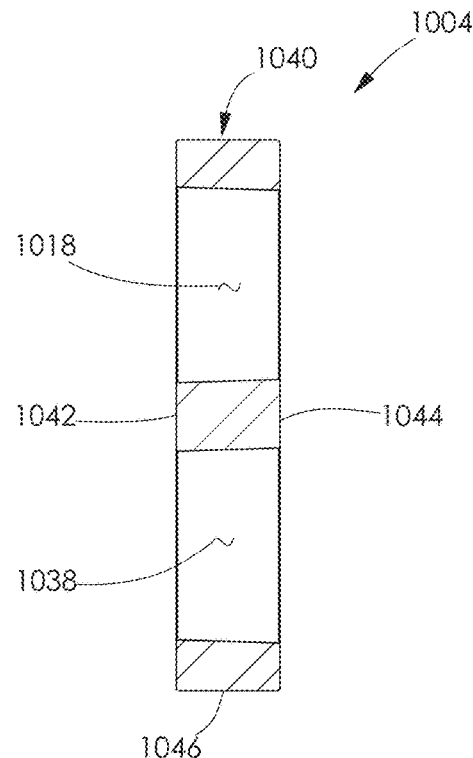

FIG. 176 is a cross-sectional view of the inner journal shown in FIG. 175, taken along line BD-BD.

FIG. 177 is a side elevational view of a connecting rod journal used with the modular crankshaft shown in FIG. 159.

FIG. 178 is a perspective view of the connecting rod journal shown in FIG. 177.

FIG. 179 is a top plan view of the connecting rod journal shown in FIG. 177.

FIG. 180 is a cross-sectional view of the connecting rod journal shown in FIG. 179, taken along line BE-BE.

Figure 181:
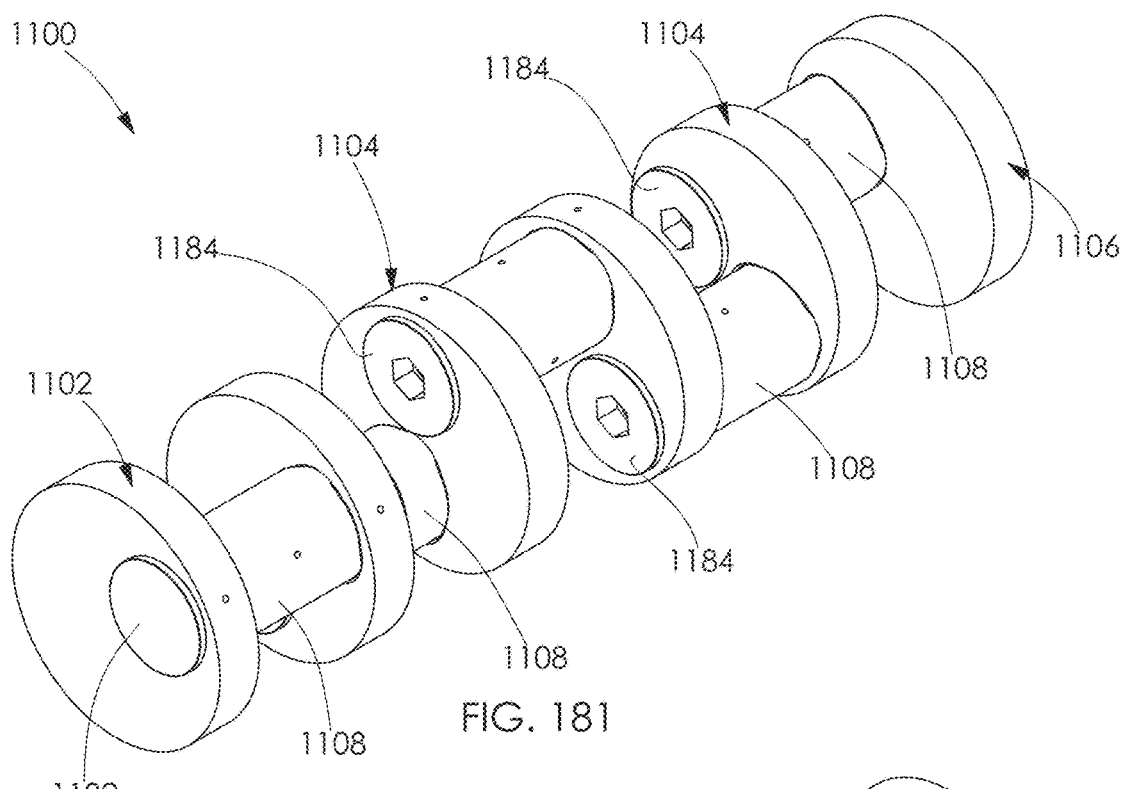

FIG. 181 is a first end perspective view of another embodiment of a modular crankshaft disclosed herein.

Figure 182:
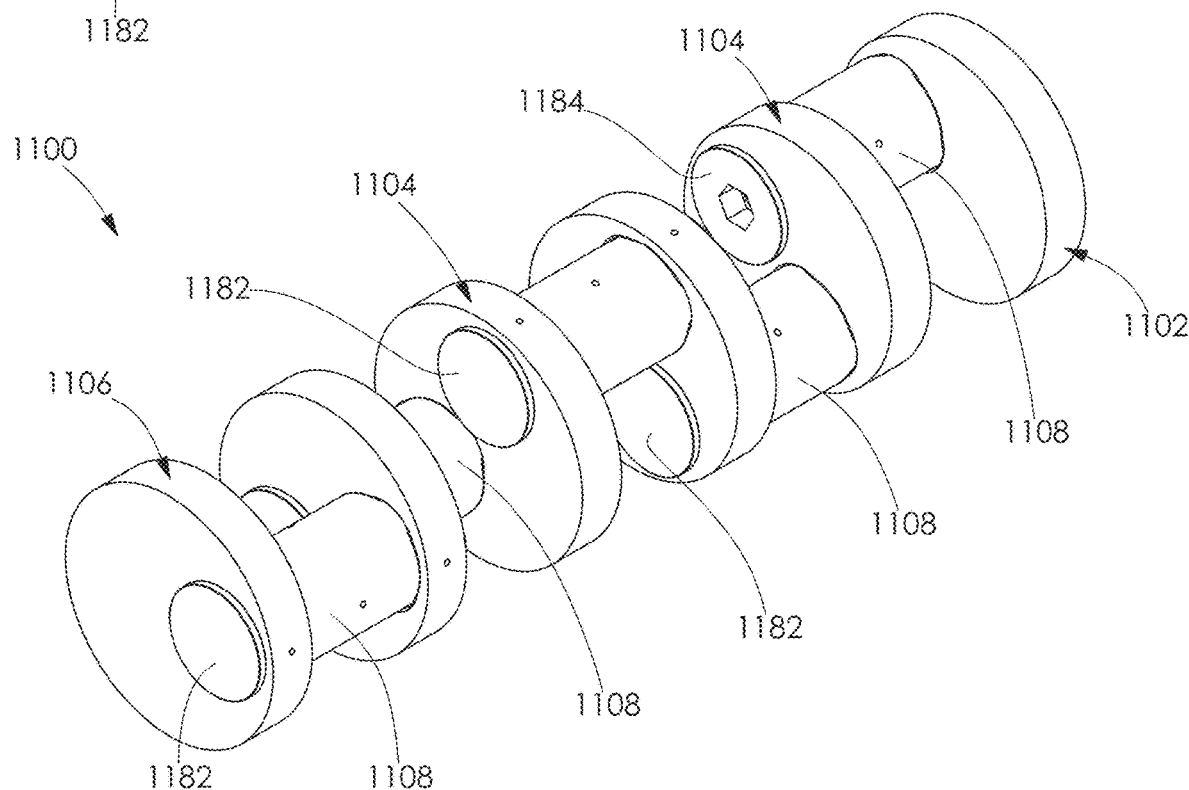

FIG. 182 is a second end perspective view of the modular crankshaft shown in FIG. 181.

Figure 183:
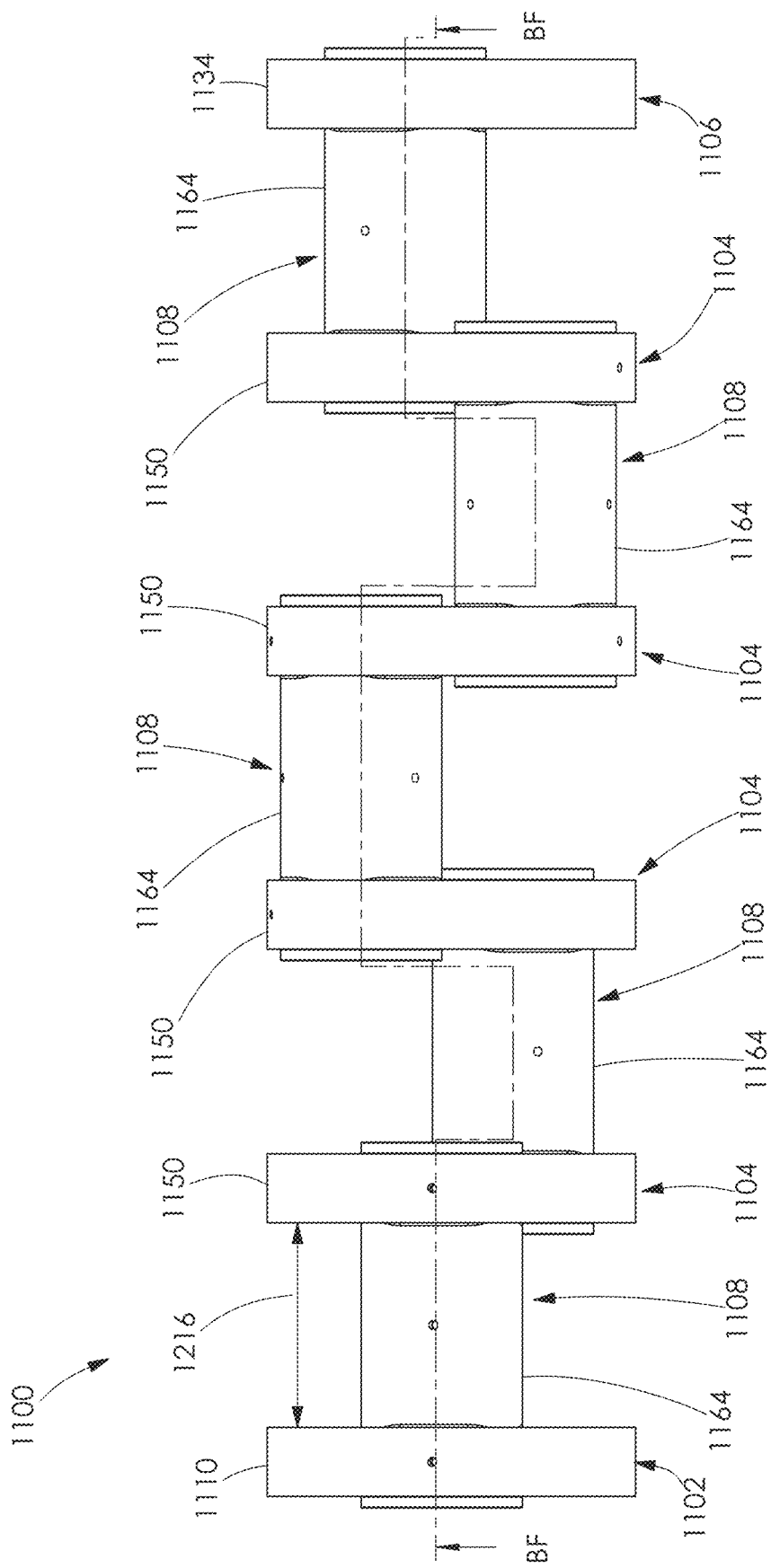

FIG. 183 is a front elevational view of the modular crankshaft shown in FIG. 181.

Figure 184:
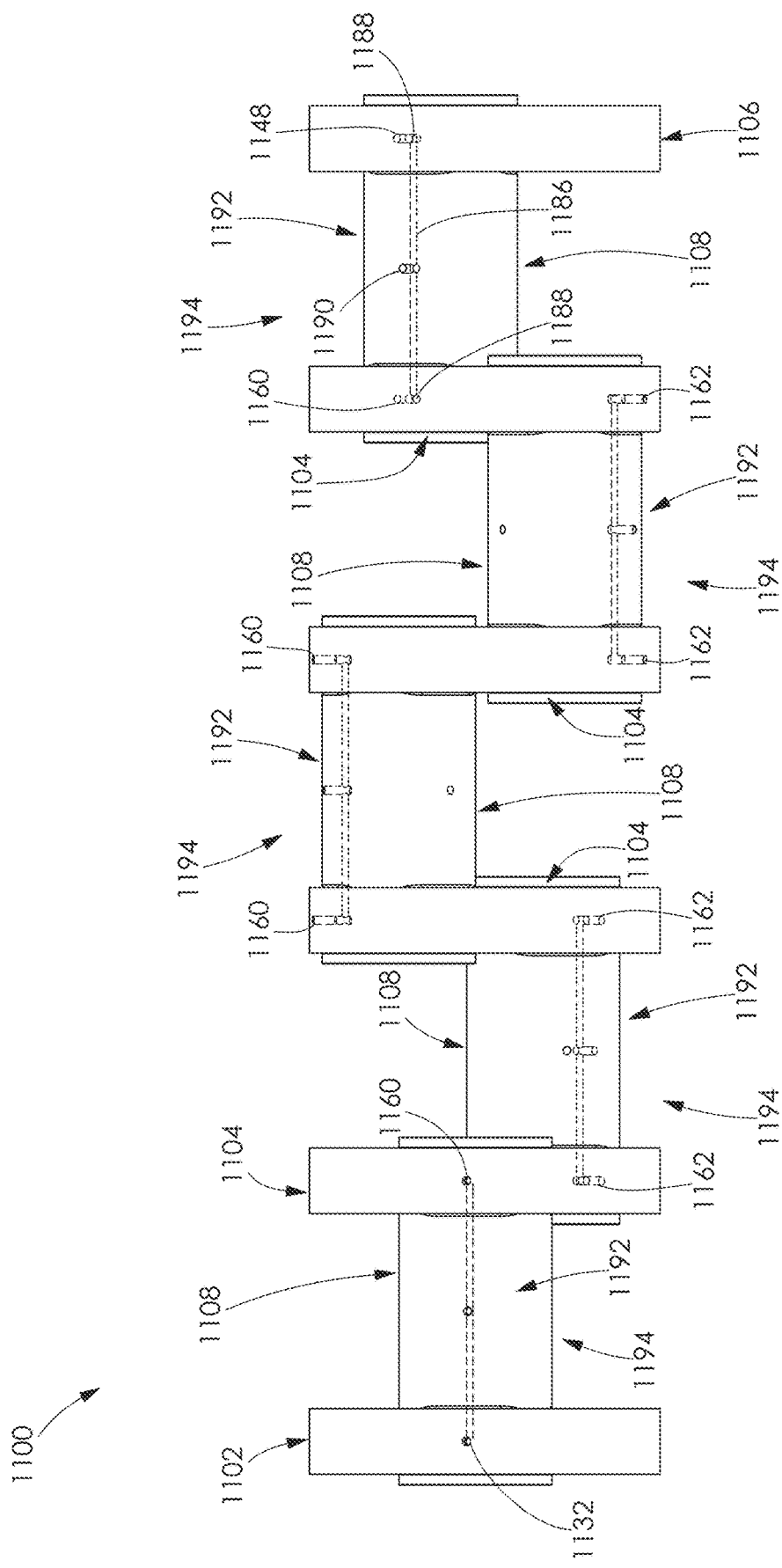

FIG. 184 is a front elevational view of the modular crankshaft shown in FIG. 181 with a lubrication passageway shown in hidden lines.

Figure 185:
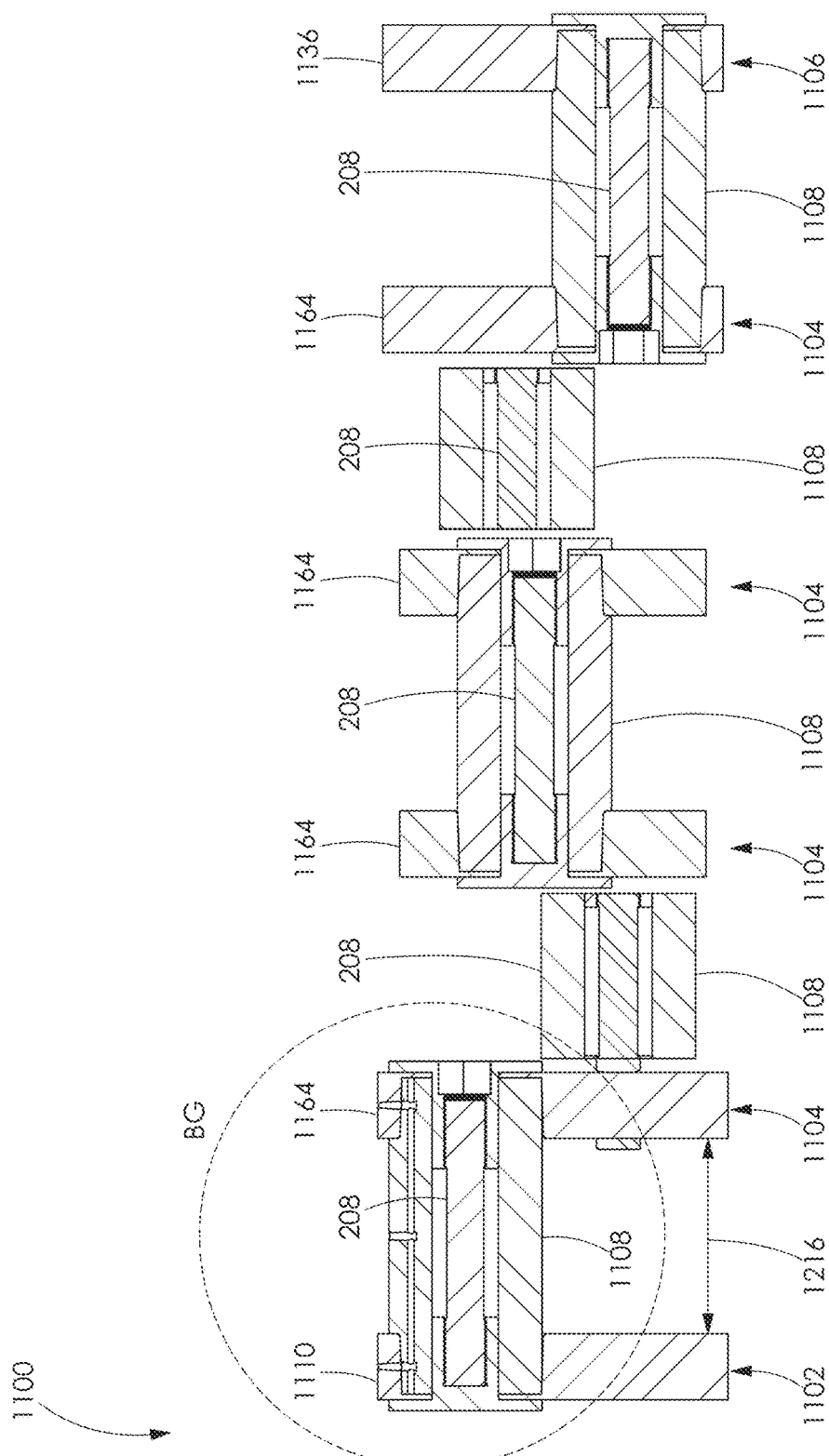

FIG. 185 is a cross-sectional view of the modular crankshaft shown in FIG. 183, taken along line BF-BF.

Figure 186:
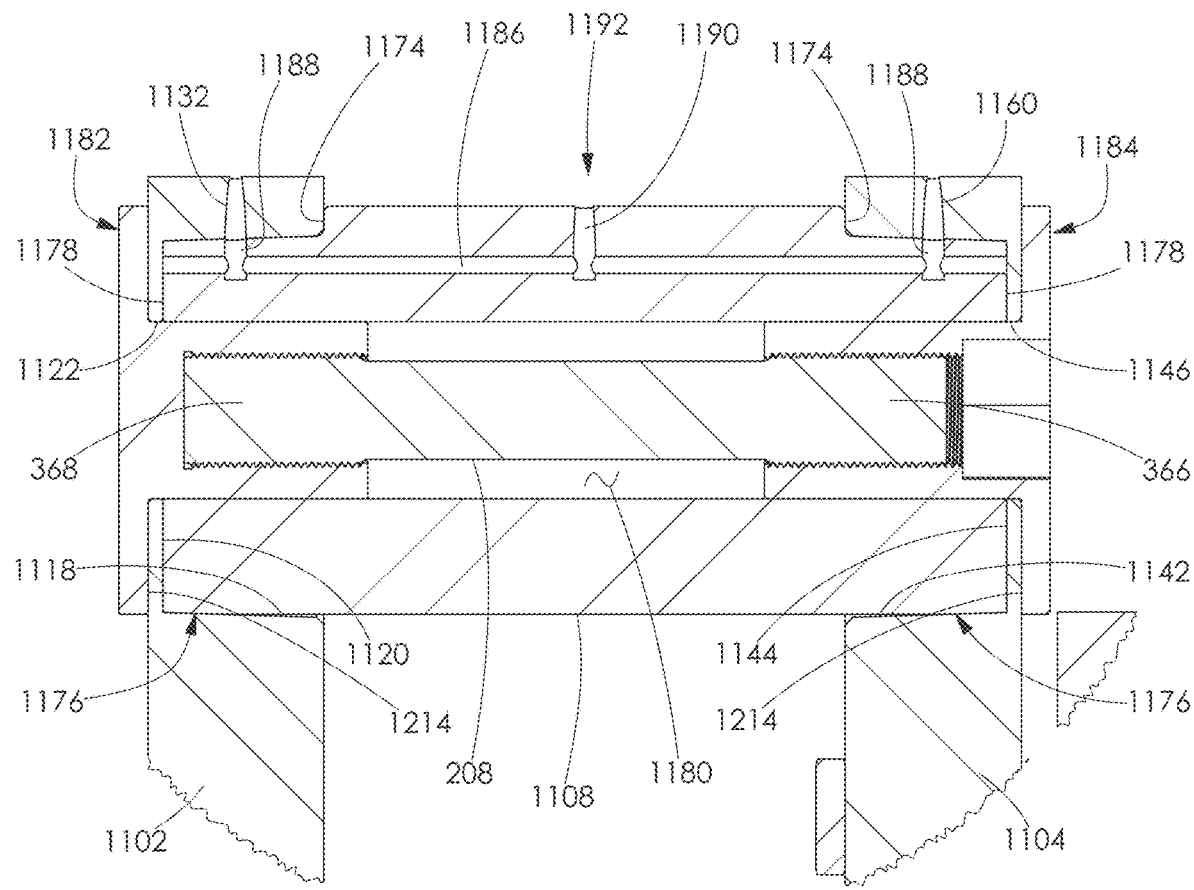

FIG. 186 is an enlarged view of area BG, shown in FIG. 185.

Figure 187:
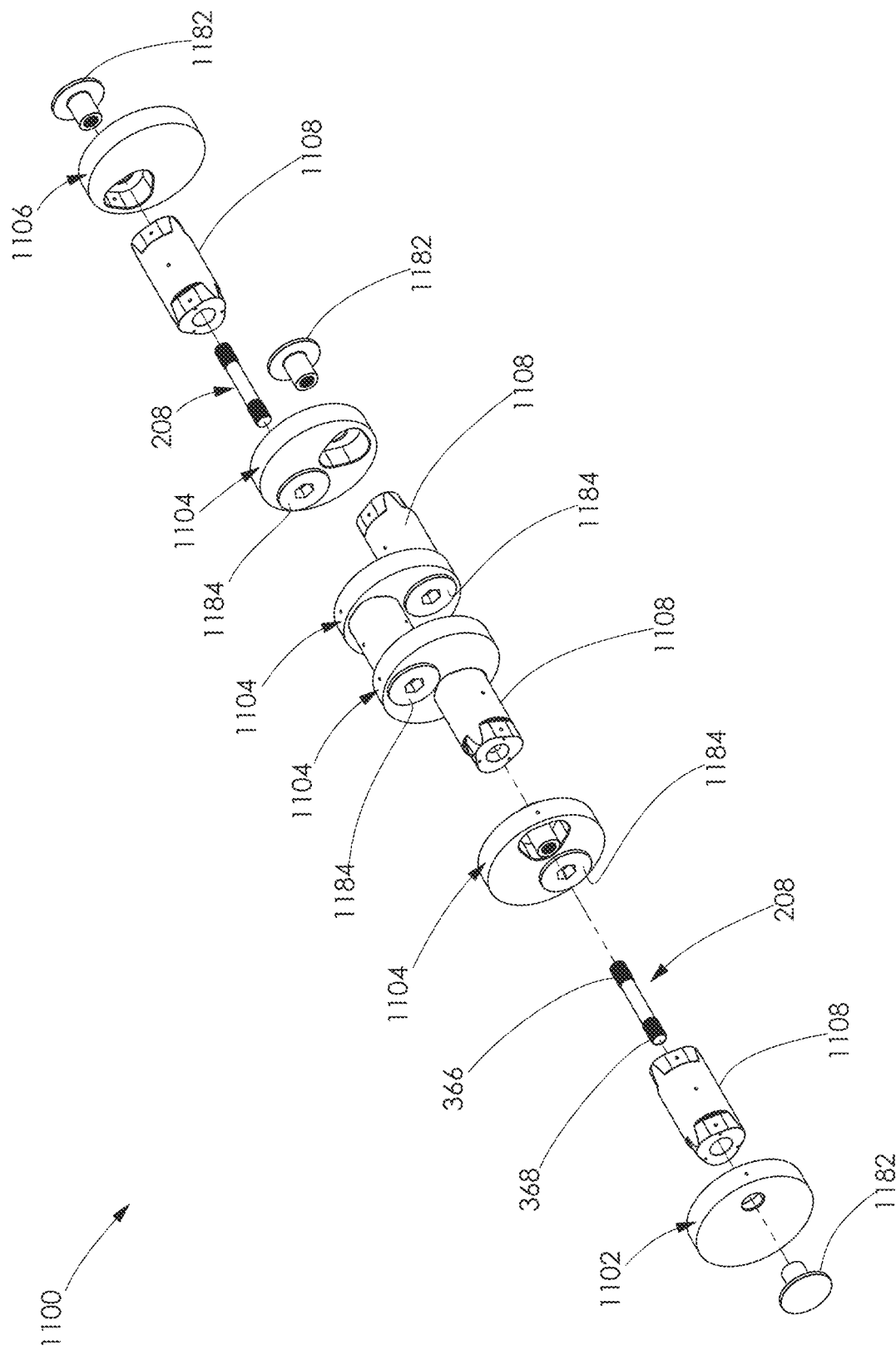

FIG. 187 is a first end perspective and exploded view of the modular crankshaft shown in FIG. 181.

Figure 188:
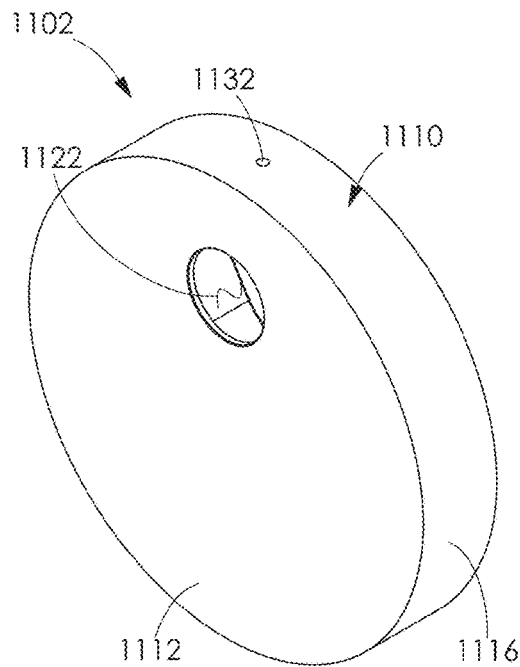

FIG. 188 is a perspective view of the first side of the first end journal used with the modular crankshaft shown in FIG. 181.

Figure 189:
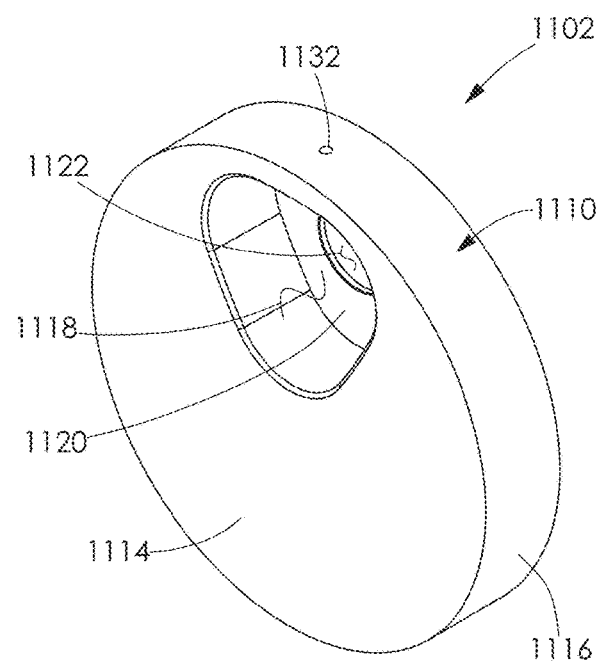

FIG. 189 is a perspective view of the second side of the first end journal shown in FIG. 188.

Figure 190:
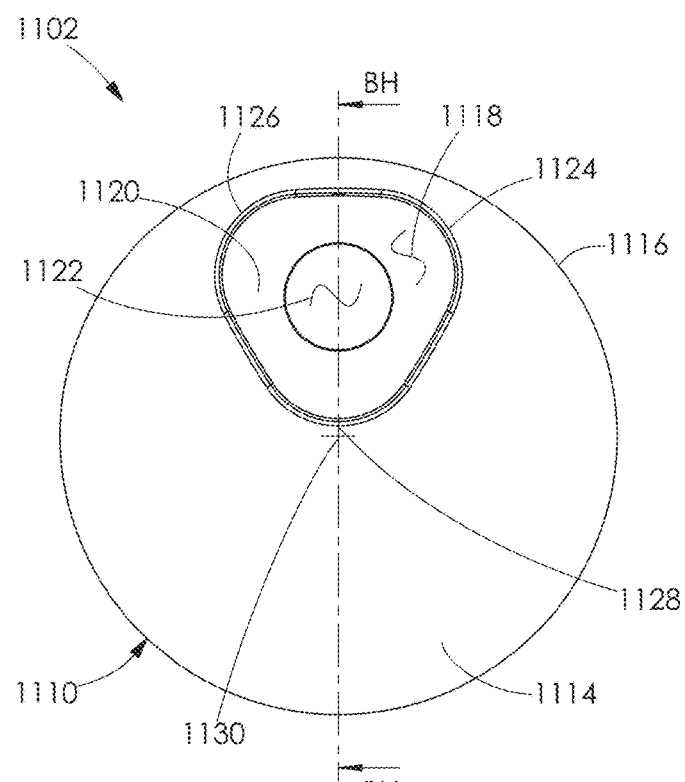

FIG. 190 is an elevational view of the second side of the first end journal shown in FIG. 188.

Figure 191:
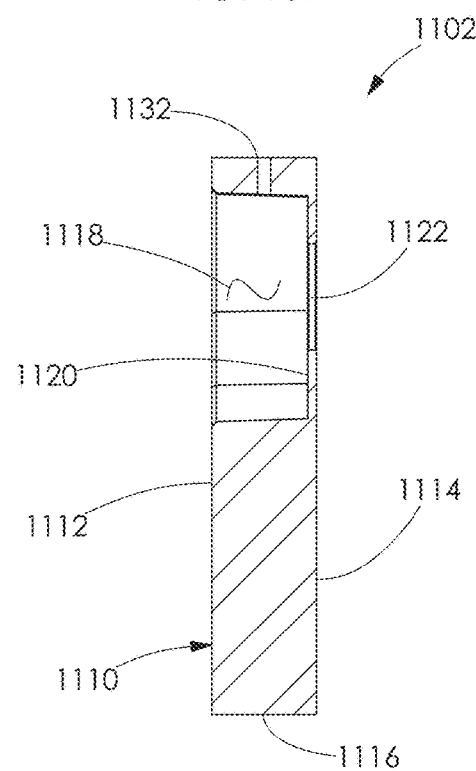

FIG. 191 is a cross-sectional view of the first end journal shown in FIG. 190, taken along line BH-BH.

Figure 192:
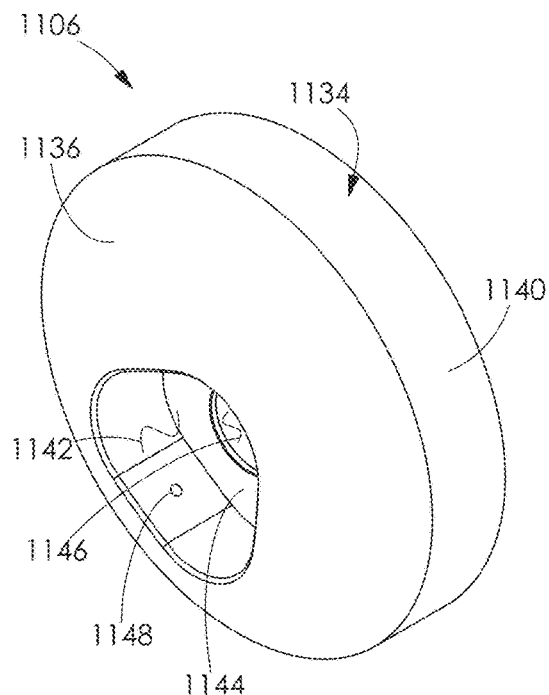

FIG. 192 is a perspective view of the first side of the second end journal used with the modular crankshaft shown in FIG. 181.

Figure 193:
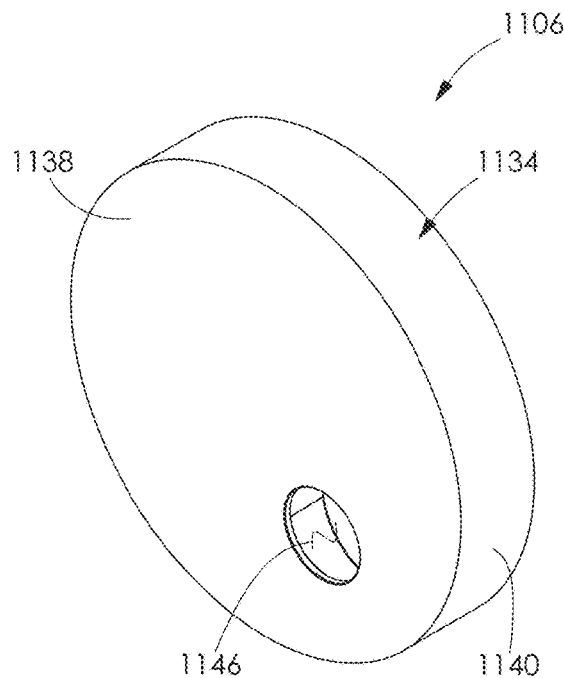

FIG. 193 is a perspective view of the second side of the second end journal shown in FIG. 192.

Figure 194:
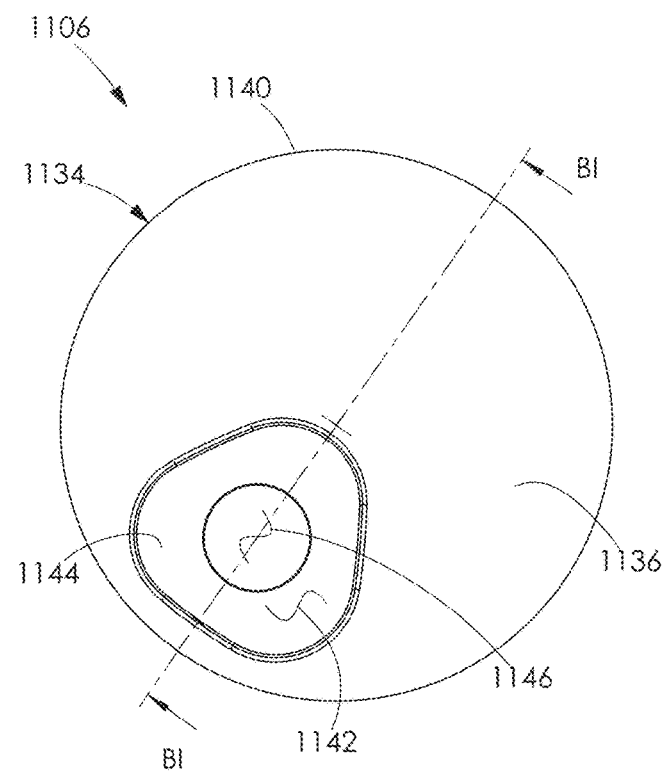

FIG. 194 is an elevational view of the first side of the second end journal shown in FIG. 192.

Figure 195:
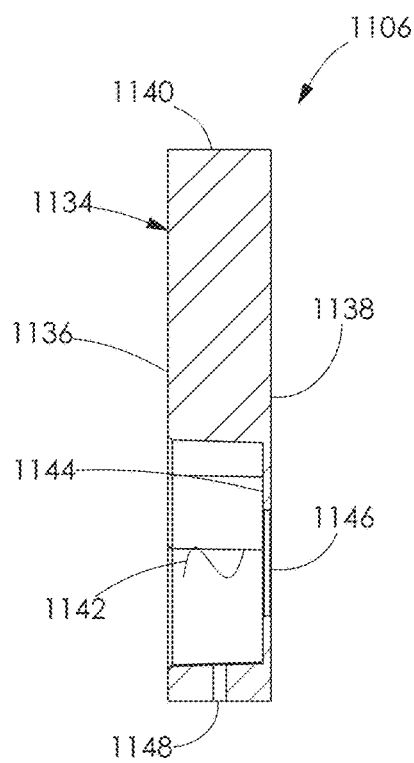

FIG. 195 is a cross-sectional view of the second end journal shown in FIG. 194, taken along line BI-BI.

FIG. 196 is a perspective view of the first side of an inner journal used with the modular crankshaft shown in FIG. 181.

FIG. 197 is a perspective view of the second side of the inner journal shown in FIG. 196.

FIG. 198 is an elevational view of the first side of the inner journal shown in FIG. 196.

FIG. 199 is a top plan view of the inner journal shown in FIG. 196.

Figure 200:
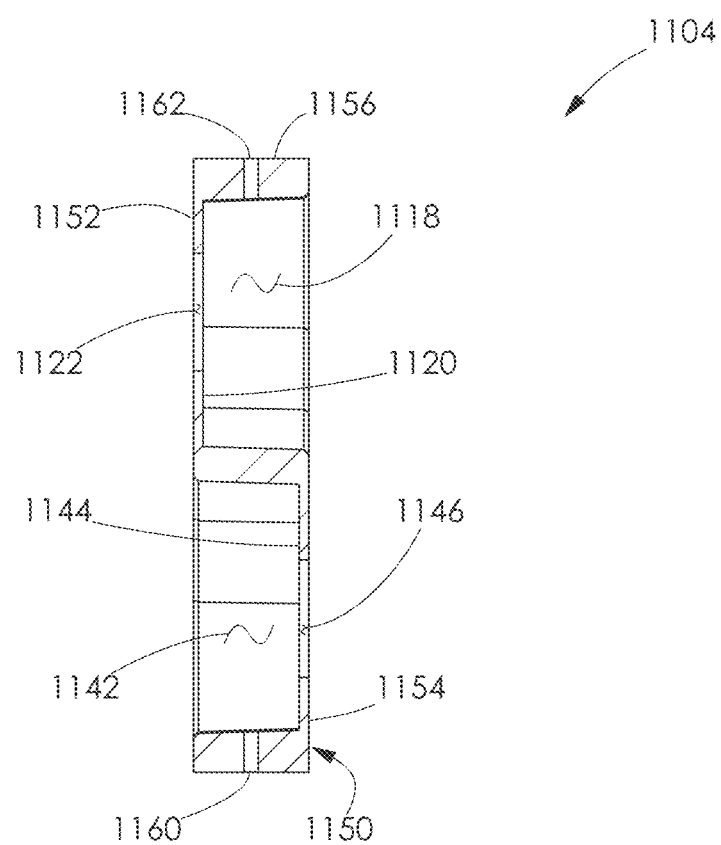

FIG. 200 is a cross-sectional view of the inner journal shown in FIG. 198, taken along line BJ-BJ.

Figure 201:
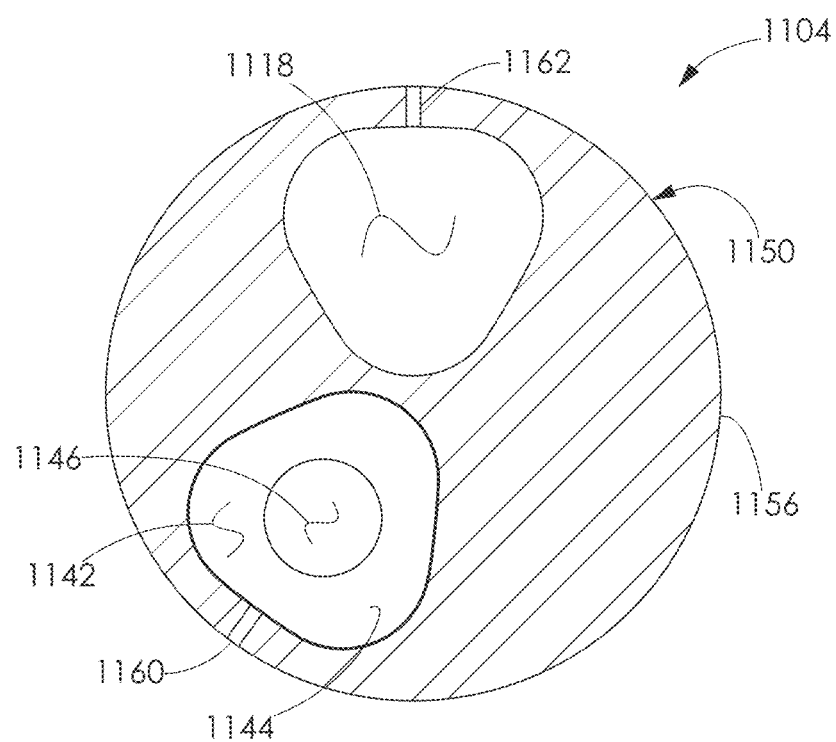

FIG. 201 is a cross-sectional view of the inner journal shown in FIG. 199, taken along line BK-BK.

FIG. 202 is a side elevational view of a connecting rod journal used with the modular crankshaft shown in FIG. 181.

FIG. 203 is a perspective view of the connecting rod journal shown in FIG. 202.

FIG. 204 is a top plan view of the connecting rod journal shown in FIG. 202.

FIG. 205 is a cross-sectional view of the connecting rod journal shown in FIG. 204, taken along line BL-BL.

Figures 206, 207:
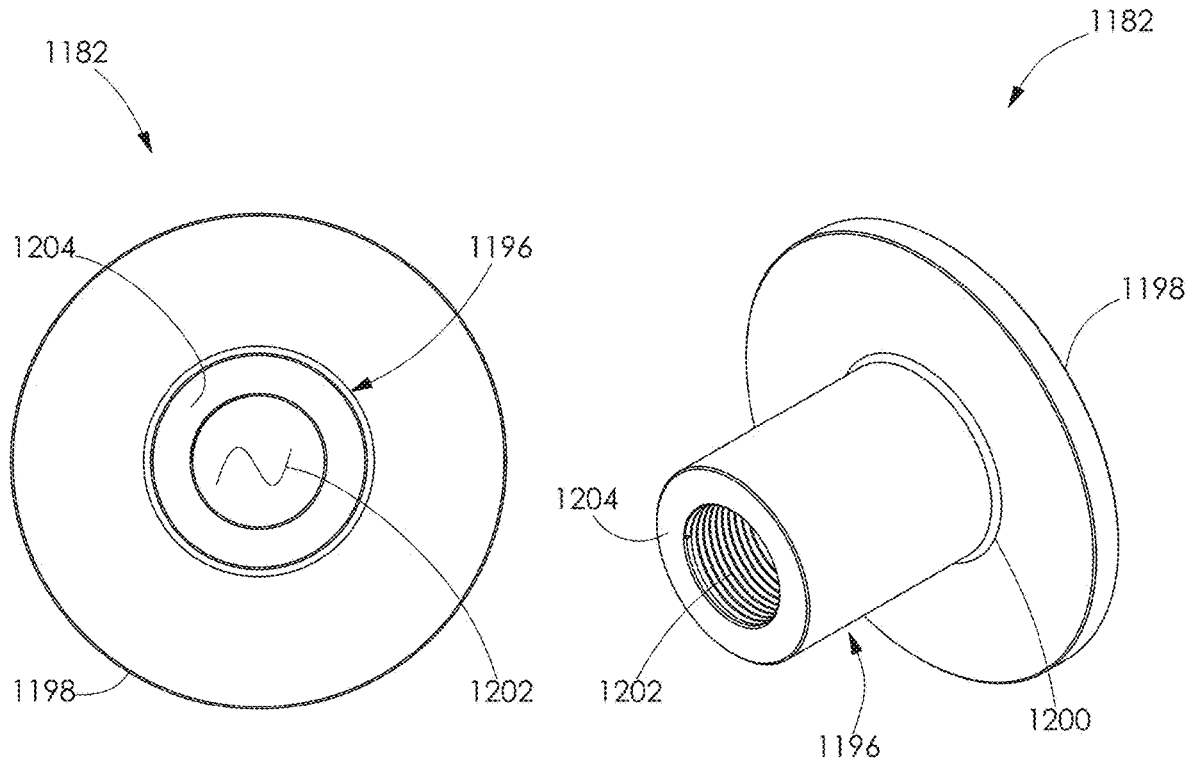

FIG. 206 is a side elevational view of a first flanged nut used with the modular crankshaft shown in FIG. 181.

FIG. 207 is a rear perspective view of the first flanged nut shown in FIG. 206.

Figures 208, 209:
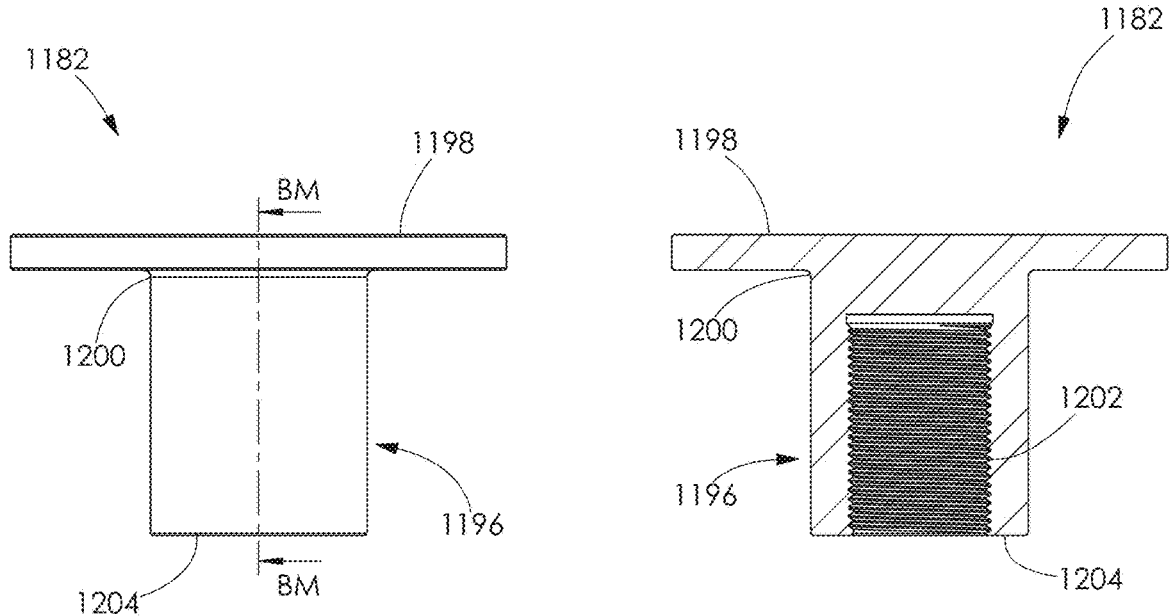

FIG. 208 is a top plan view of the first flanged nut shown in FIG. 206.

FIG. 209 is a cross-sectional view of the first flanged nut shown in FIG. 208, taken along line BM-BM.

Figure 210:
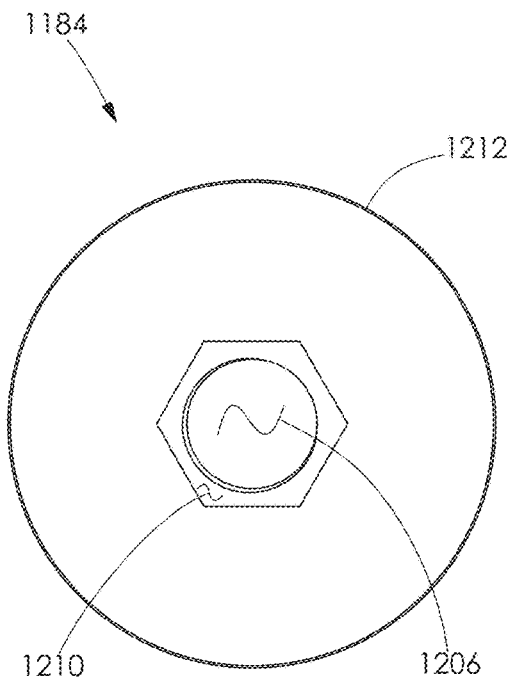

FIG. 210 is a side elevational view of a second flanged nut used with the modular crankshaft shown in FIG. 181.

Figure 211:
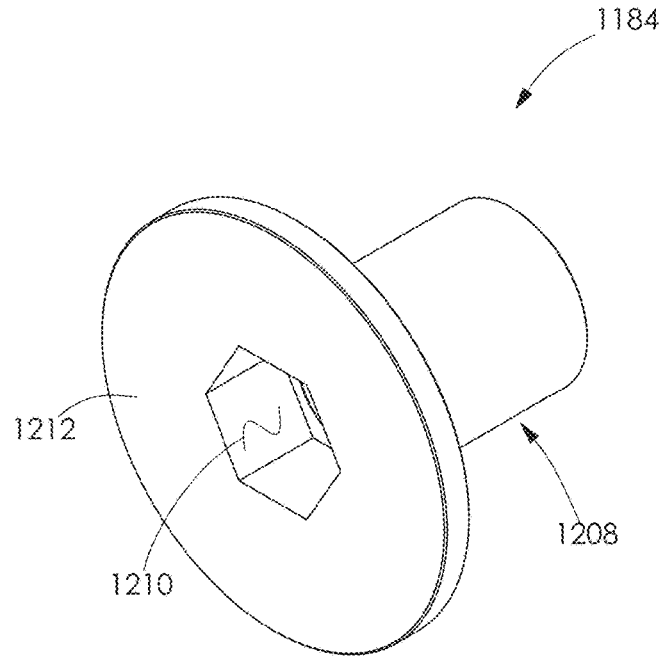

FIG. 211 is a front perspective view of the second flanged nut shown in FIG. 210.

Figure 212:
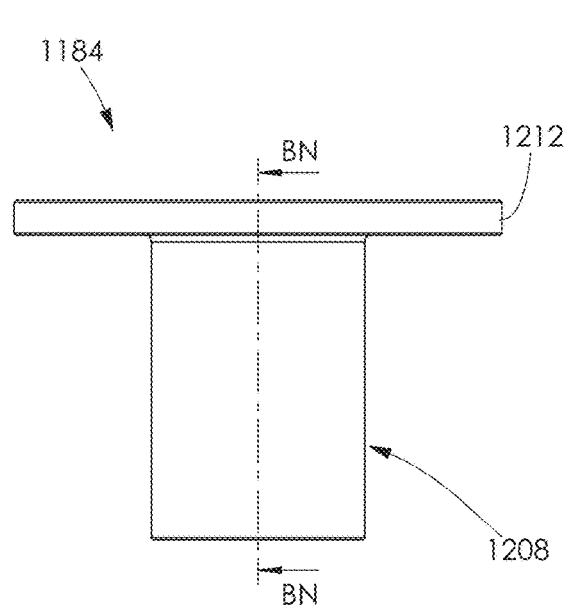

FIG. 212 is a top plan view of the second flanged nut shown in FIG. 210.

Figure 213:
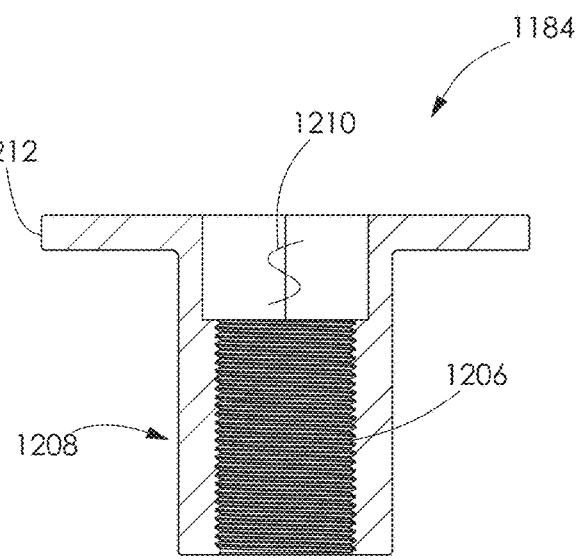

FIG. 213 is a cross-sectional view of the second flanged nut shown in FIG. 212, taken along line BN-BN.

FIG. 214 is a perspective view of the first side of another embodiment of an inner journal for use with the modular crankshaft shown in FIG. 181.

FIG. 215 is a perspective view of the second side of the inner journal shown in FIG. 214.

FIG. 216 is an elevational view of the first side of the inner journal shown in FIG. 214.

FIG. 217 is a cross-sectional view of the inner journal shown in FIG. 216, taken along line BO-BO.

Figure 218:
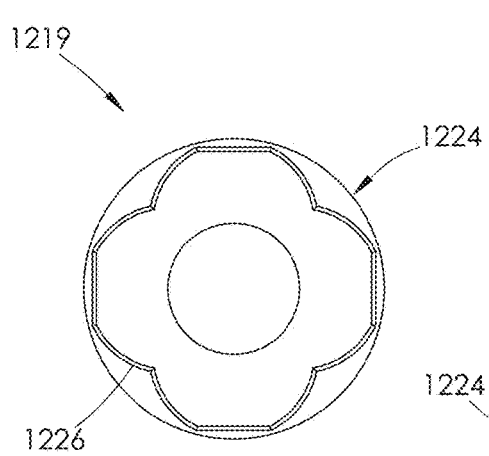

FIG. 218 is a side elevational view of another embodiment of a connecting rod journal for use with the inner journal shown in FIG. 214 and the modular crankshaft shown in FIG. 181.

Figure 219:
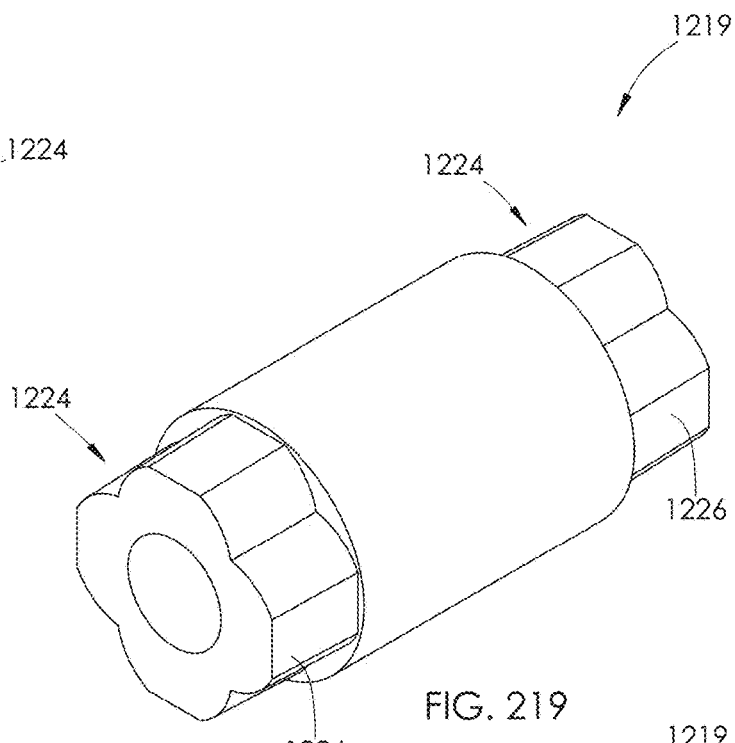

FIG. 219 is a perspective view of the connecting rod journal shown in FIG. 218.

Figure 220:
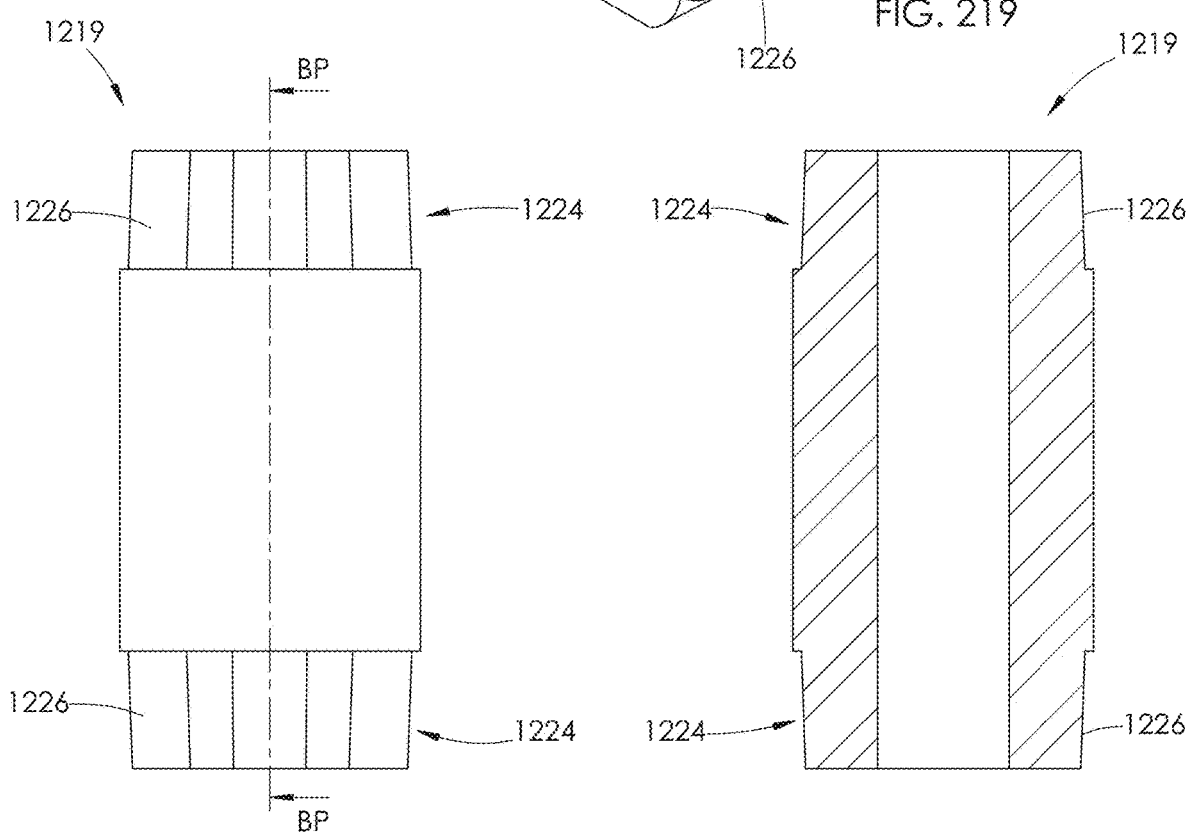

FIG. 220 is a top plan view of the connecting rod journal shown in FIG. 218.

Figure 221:
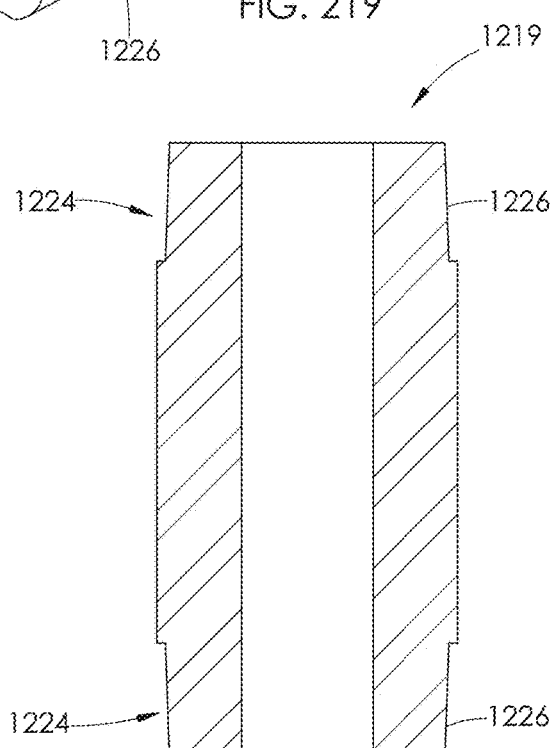

FIG. 221 is a cross-sectional view of the connecting rod journal shown in FIG. 220, taken along line BP-BP.

FIG. 222 is a perspective view of the first side of another embodiment of an inner journal for use with the modular crankshaft shown in FIG. 181.

FIG. 223 is a perspective view of the second side of the inner journal shown in FIG. 222.

FIG. 224 is an elevational view of the first side of the inner journal shown in FIG. 222.

FIG. 225 is a cross-sectional view of the inner journal shown in FIG. 224, taken along line BQ-BQ.

Figure 226:
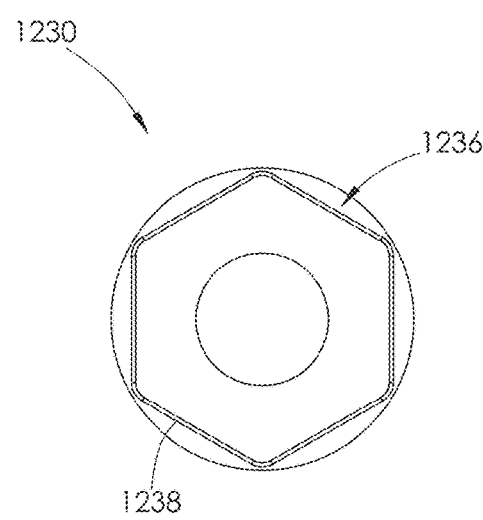

FIG. 226 is a side elevational view of another embodiment of a connecting rod journal for use with the inner journal shown in FIG. 222 and the modular crankshaft shown in FIG. 181.

Figure 227:
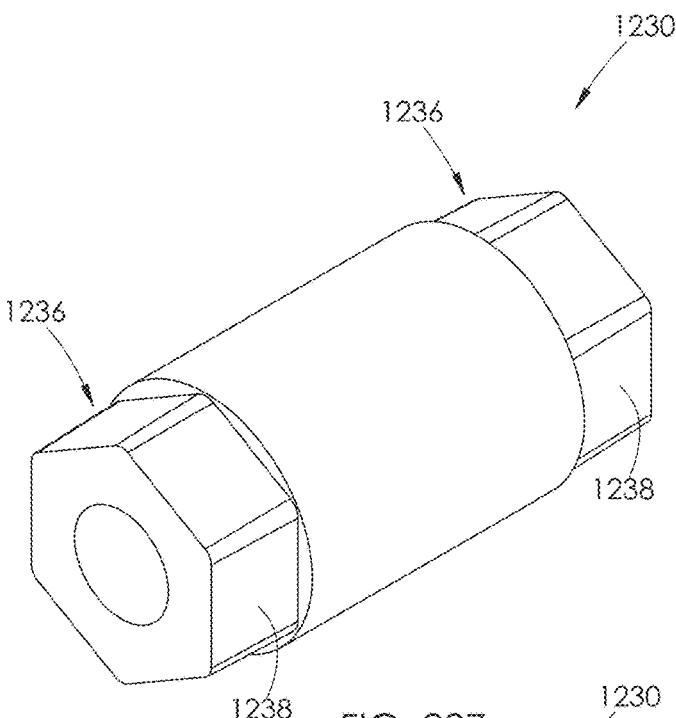

FIG. 227 is a perspective view of the connecting rod journal shown in FIG. 226.

Figure 228:
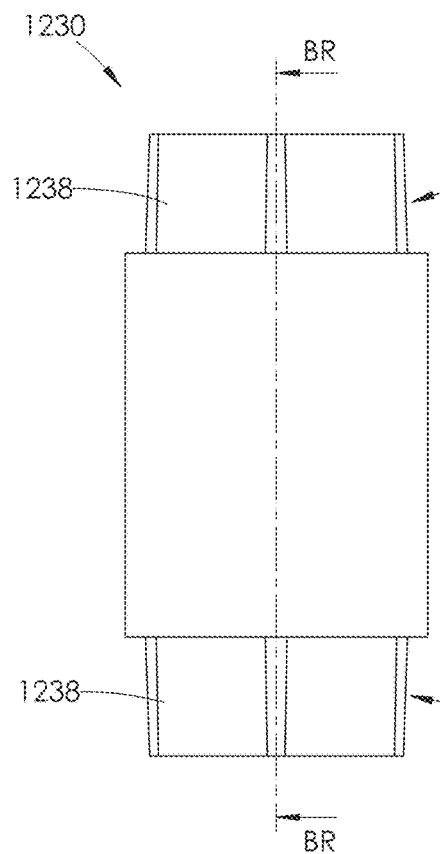

FIG. 228 is a top plan view of the connecting rod journal shown in FIG. 226.

Figure 229:
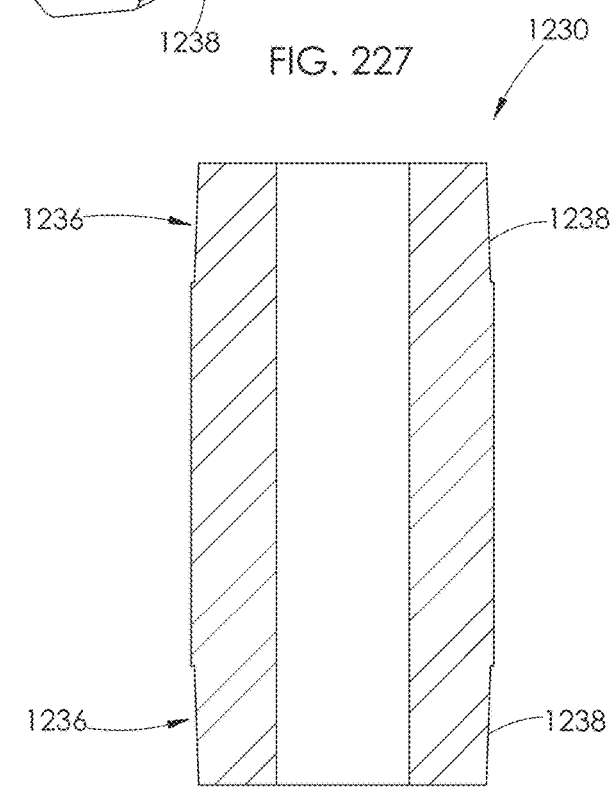

FIG. 229 is a cross-sectional view of the connecting rod journal shown in FIG. 228, taken along line BR-BR.

Figure 230:
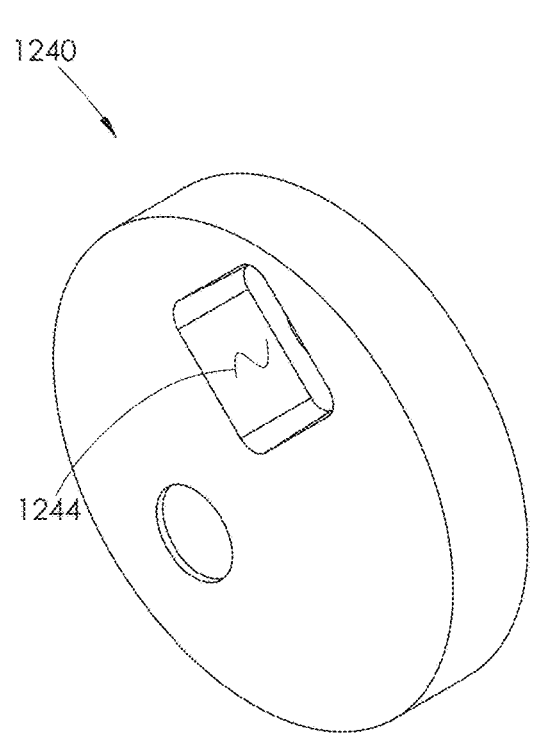

FIG. 230 is a perspective view of the first side of another embodiment of an inner journal for use with the modular crankshaft shown in FIG. 181.

Figure 231:
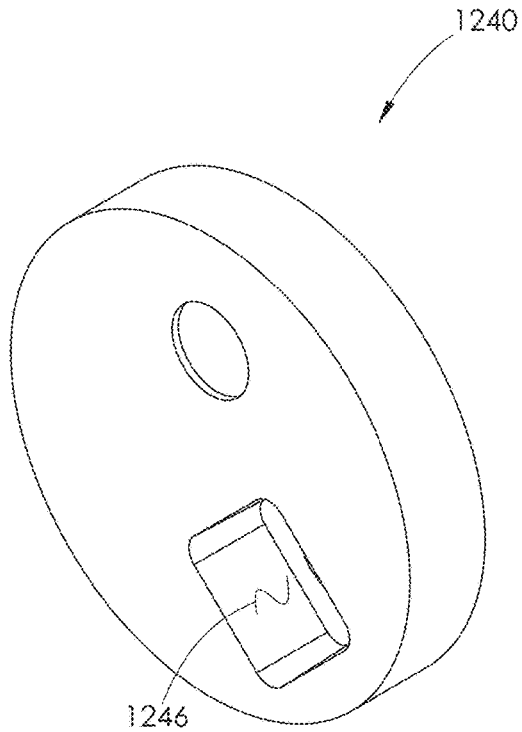

FIG. 231 is a perspective view of the second side of the inner journal shown in FIG. 230.

Figure 232:
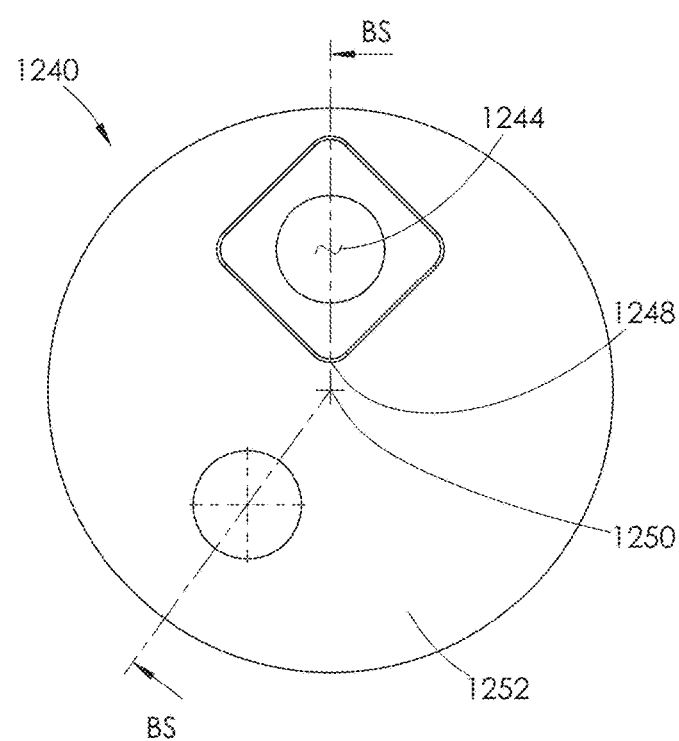

FIG. 232 is an elevational view of the first side of the inner journal shown in FIG. 230.

Figure 233:
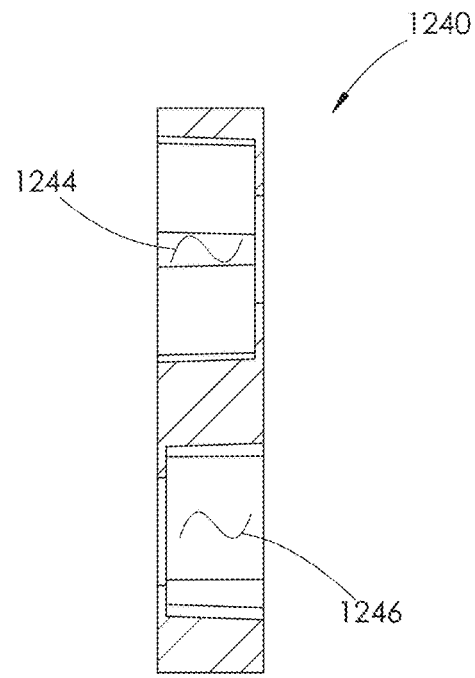

FIG. 233 is a cross-sectional view of the inner journal shown in FIG. 232, taken along line BS-BS.

Figure 234:
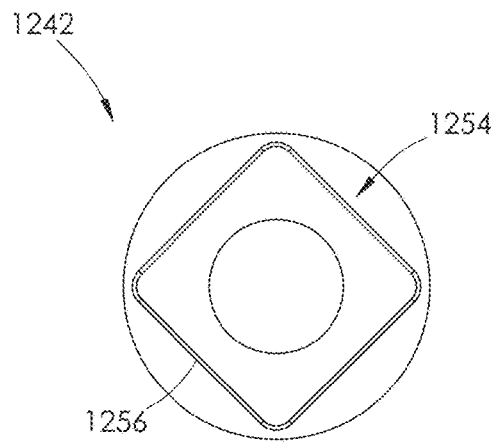

FIG. 234 is a side elevational view of another embodiment of a connecting rod journal for use with the inner journal shown in FIG. 230 and the modular crankshaft shown in FIG. 181.

Figure 235:
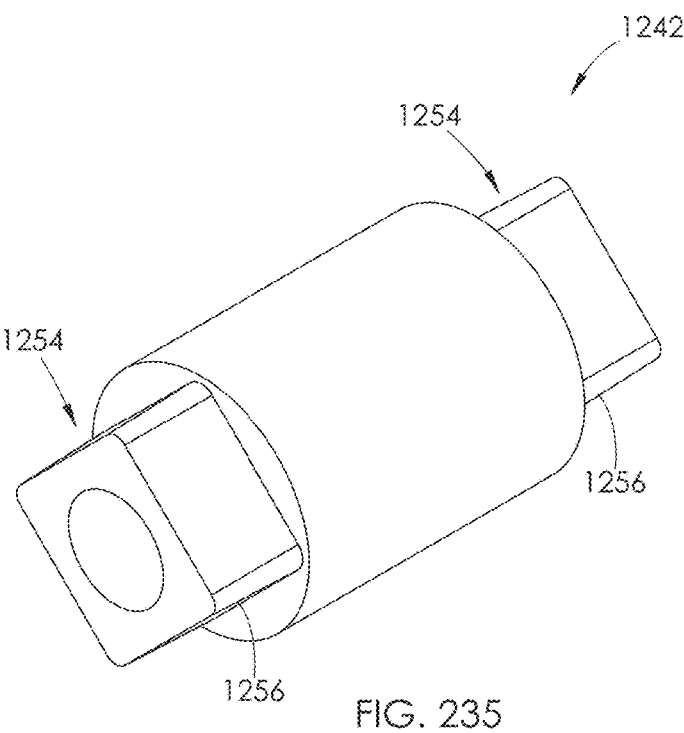

FIG. 235 is a perspective view of the connecting rod journal shown in FIG. 234.

Figure 236:
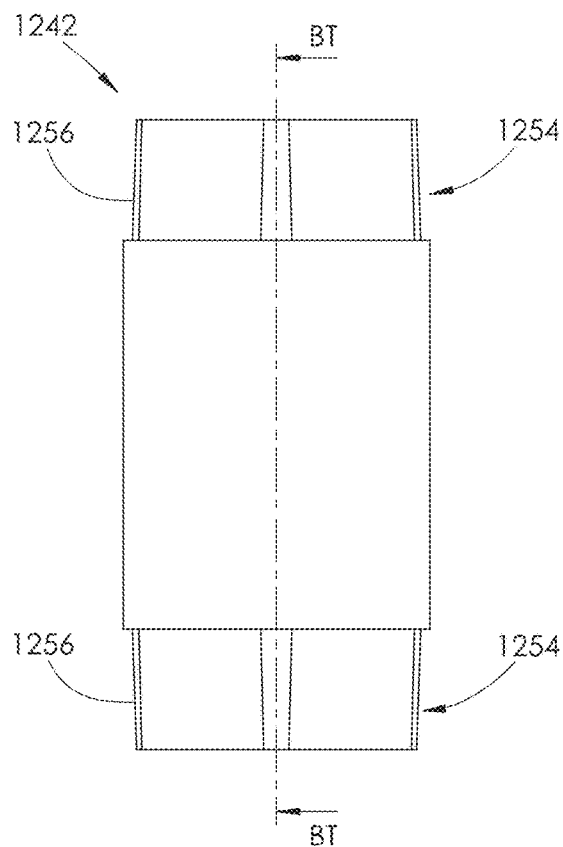

FIG. 236 is a top plan view of the connecting rod journal shown in FIG. 234.

Figure 237:
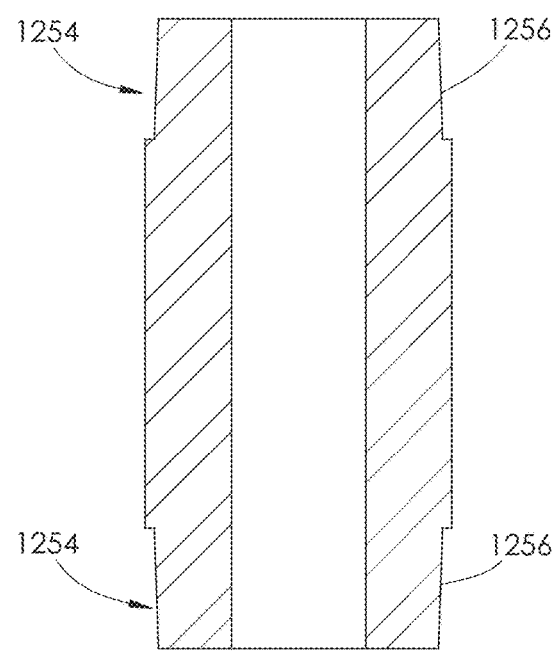

FIG. 237 is a cross-sectional view of the connecting rod journal shown in FIG. 236, taken along line BT-BT.

Figure 238:
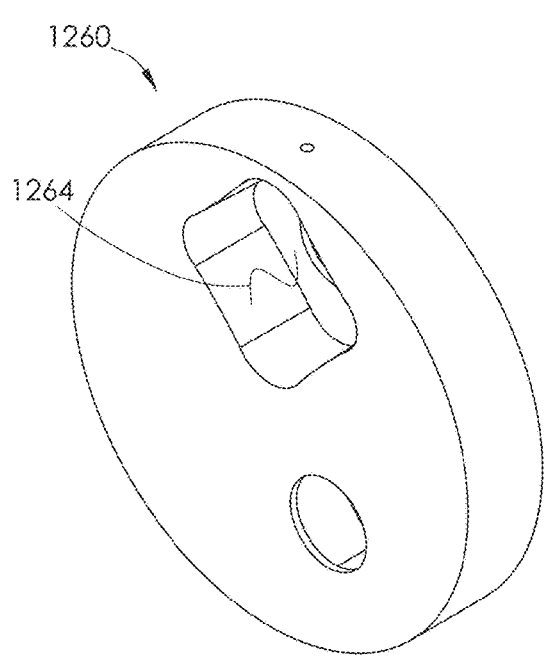

FIG. 238 is a perspective view of the first side of another embodiment of an inner journal for use with the modular crankshaft shown in FIG. 181.

Figure 239:
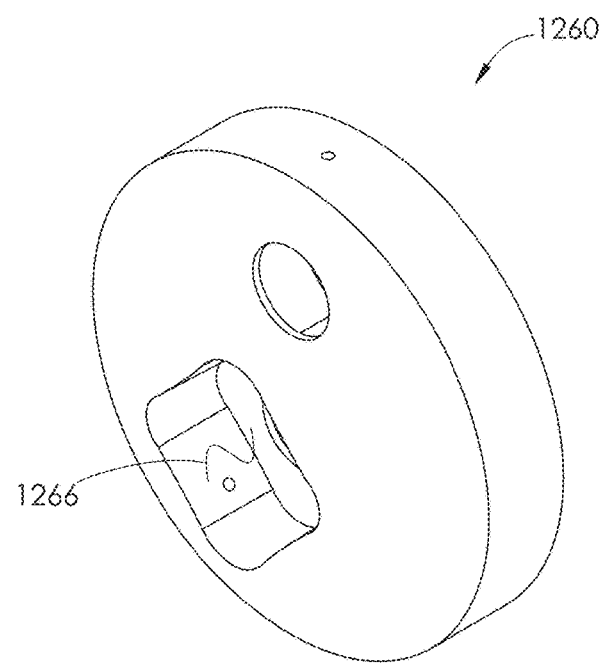

FIG. 239 is a perspective view of the second side of the inner journal shown in FIG. 238.

Figure 240:
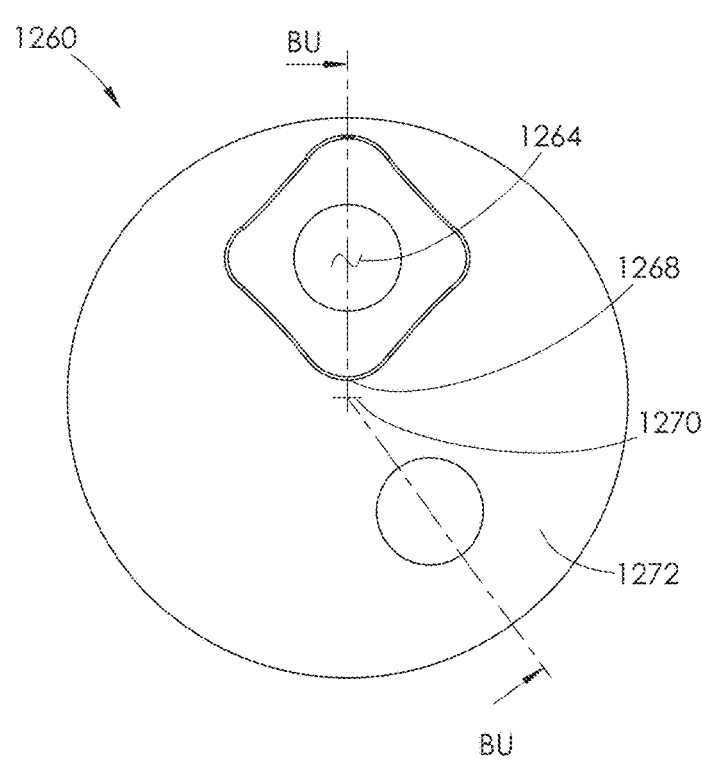

FIG. 240 is an elevational view of the first side of the inner journal shown in FIG. 238.

Figure 241:
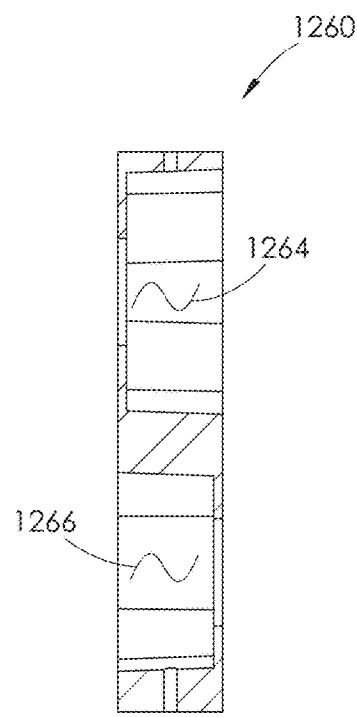

FIG. 241 is a cross-sectional view of the inner journal shown in FIG. 240, taken along line BU-BU.

Figure 242:
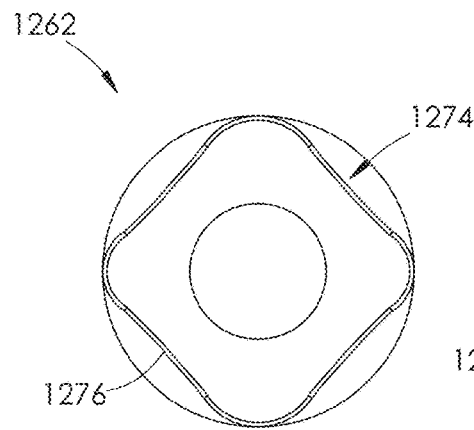

FIG. 242 is a side elevational view of another embodiment of a connecting rod journal for use with the inner journal shown in FIG. 238 and the modular crankshaft shown in FIG. 181.

Figure 243:
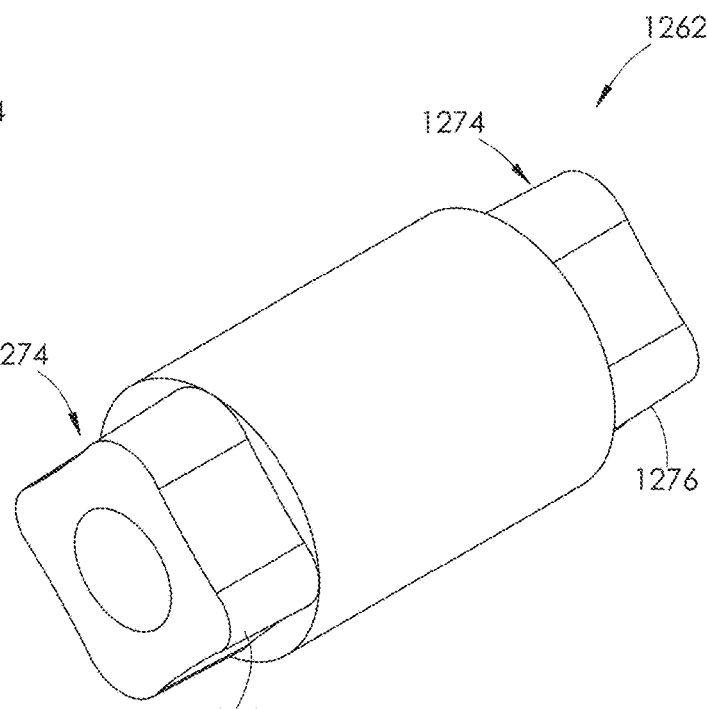

FIG. 243 is a perspective view of the connecting rod journal shown in FIG. 242.

Figure 244:
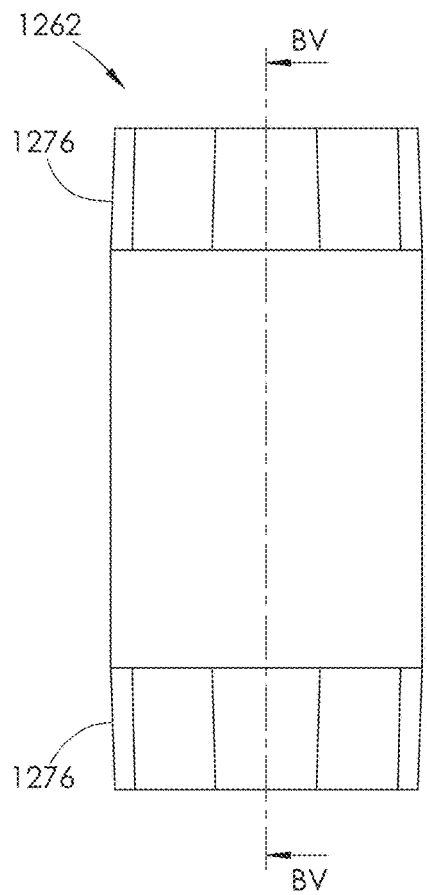

FIG. 244 is a top plan view of the connecting rod journal shown in FIG. 242.

Figure 245:
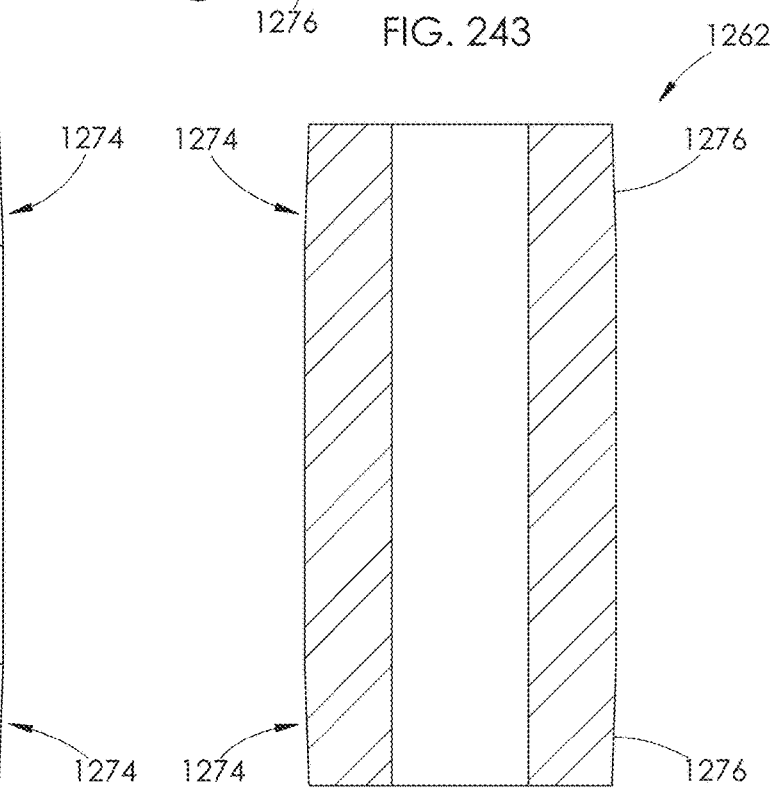

FIG. 245 is a cross-sectional view of the connecting rod journal shown in FIG. 244, taken along line BV-BV.

FIG. 246 is a perspective view of the first side of another embodiment of an inner journal for use with the modular crankshaft shown in FIG. 181.

FIG. 247 is a perspective view of the second side of the inner journal shown in FIG. 246.

FIG. 248 is an elevational view of the first side of the inner journal shown in FIG. 246.

FIG. 249 is a cross-sectional view of the inner journal shown in FIG. 248, taken along line BW-BW.

FIG. 250 is a side elevational view of another embodiment of a connecting rod journal for use with the inner journal shown in FIG. 246 and the modular crankshaft shown in FIG. 181.

FIG. 251 is a perspective view of the connecting rod journal shown in FIG. 250.

FIG. 252 is a top plan view of the connecting rod journal shown in FIG. 250.

FIG. 253 is a cross-sectional view of the connecting rod journal shown in FIG. 252, taken along line BX-BX.

Figures 254, 255:
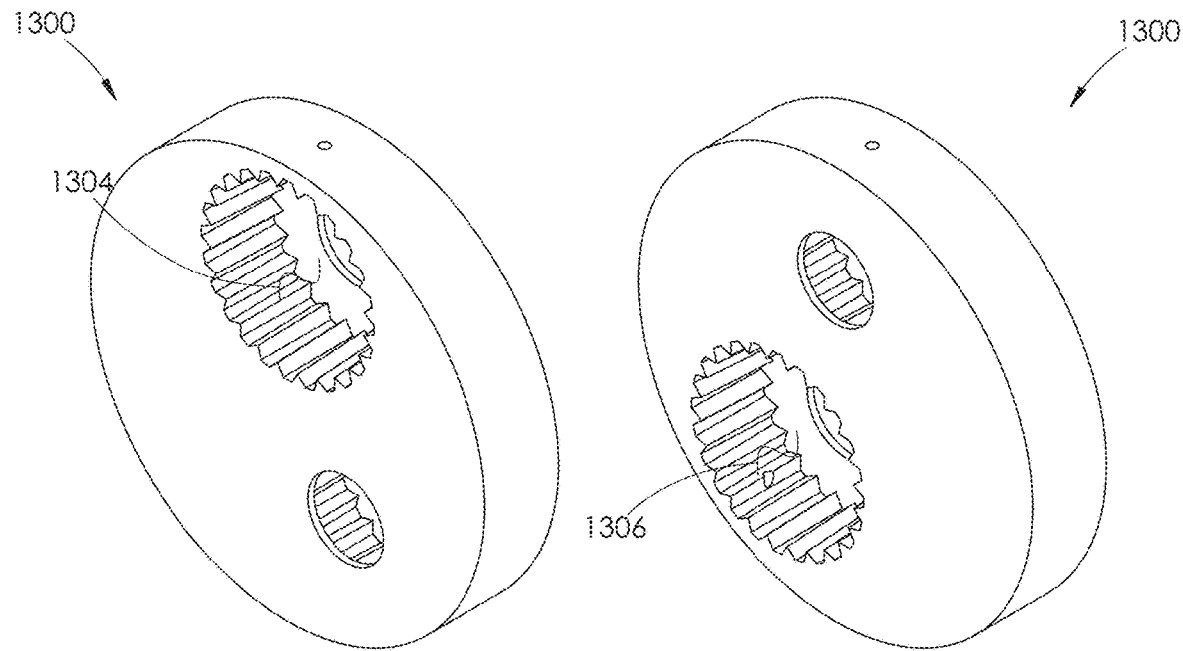

FIG. 254 is a perspective view of the first side of another embodiment of an inner journal for use with the modular crankshaft shown in FIG. 181.

FIG. 255 is a perspective view of the second side of the inner journal shown in FIG. 254.

Figures 256, 257:
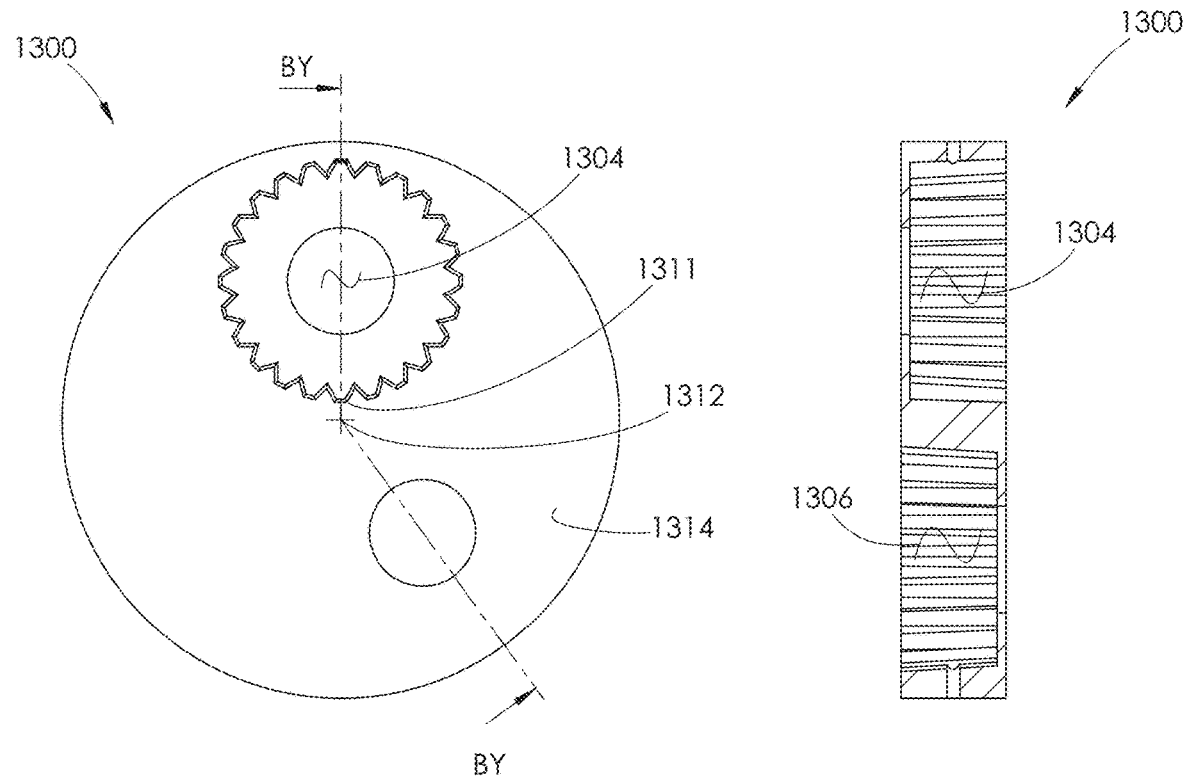

FIG. 256 is an elevational view of the first side of the inner journal shown in FIG. 254.

FIG. 257 is a cross-sectional view of the inner journal shown in FIG. 256, taken along line BY-BY.

Figure 258:
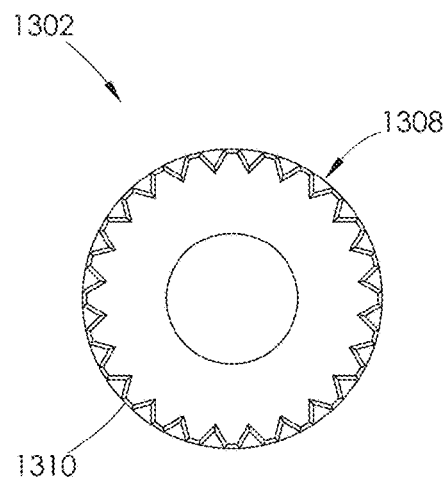

FIG. 258 is a side elevational view of another embodiment of a connecting rod journal for use with the inner journal shown in FIG. 254 and the modular crankshaft shown in FIG. 181.

Figure 259:
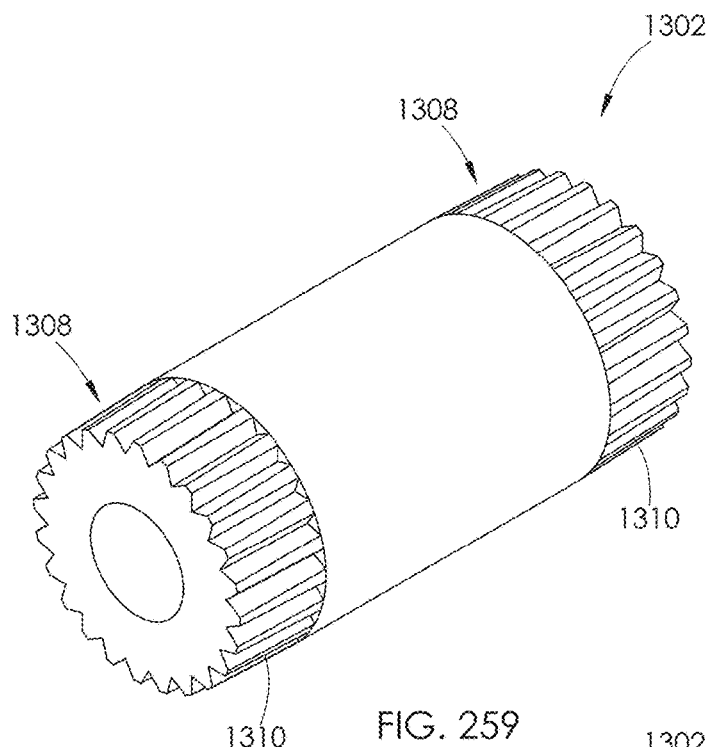

FIG. 259 is a perspective view of the connecting rod journal shown in FIG. 258.

Figure 260:
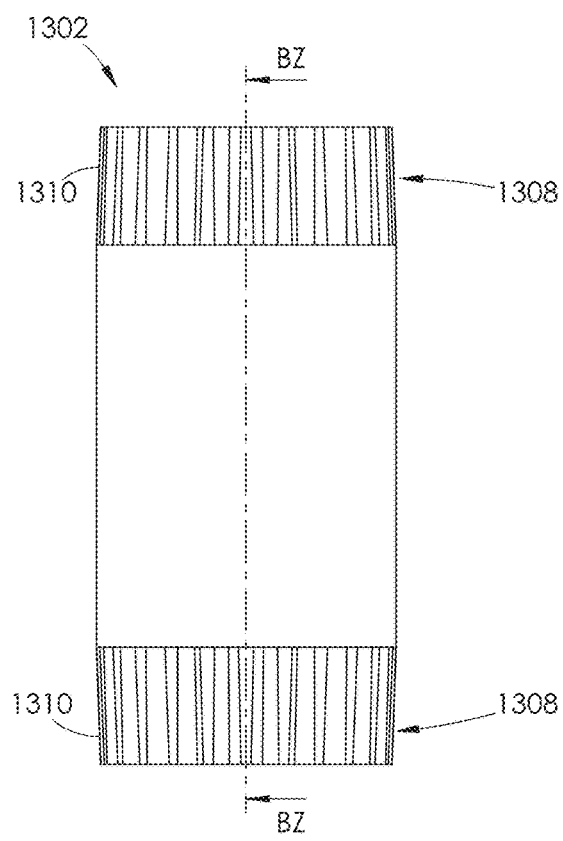

FIG. 260 is a top plan view of the connecting rod journal shown in FIG. 258.

Figure 261:
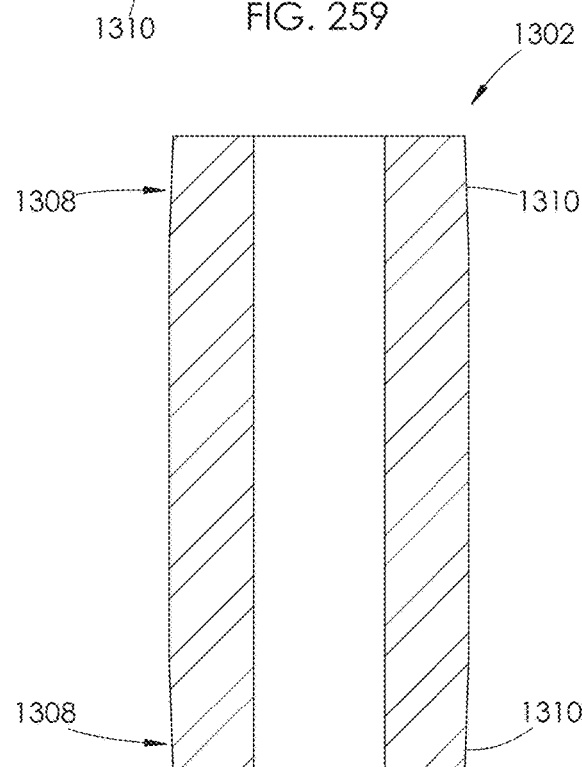

FIG. 261 is a cross-sectional view of the connecting rod journal shown in FIG. 260, taken along line BZ-BZ.

Figure 262:
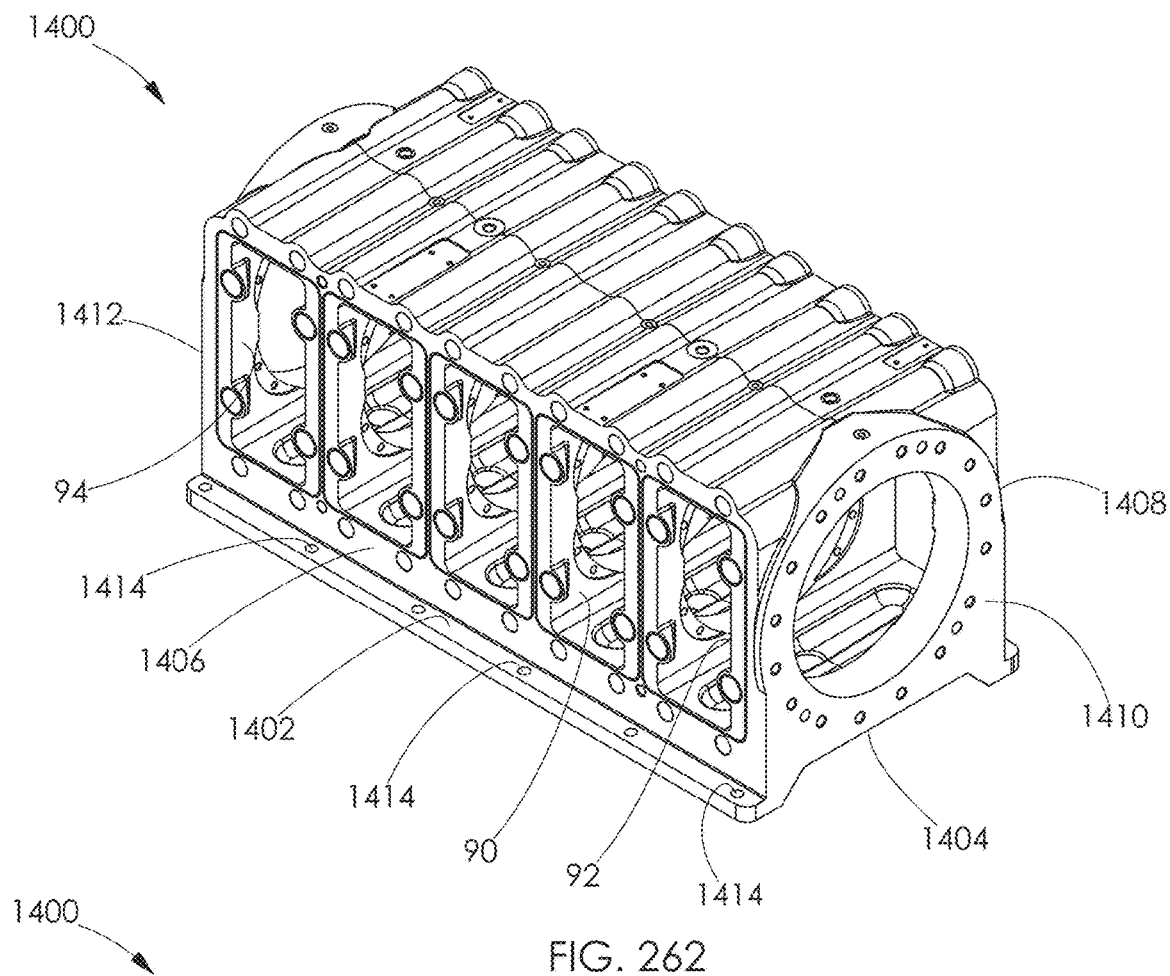

FIG. 262 is a front perspective view of another embodiment of a crank frame.

Figure 263:
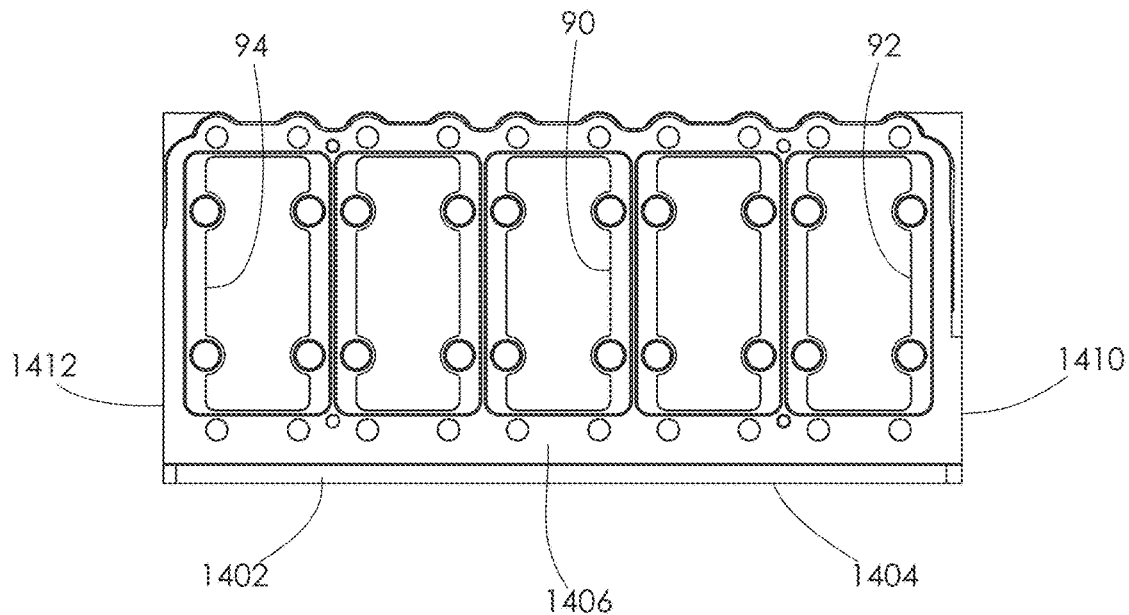

FIG. 263 is a front elevational view of the crank frame shown in FIG. 262.

Figure 264:
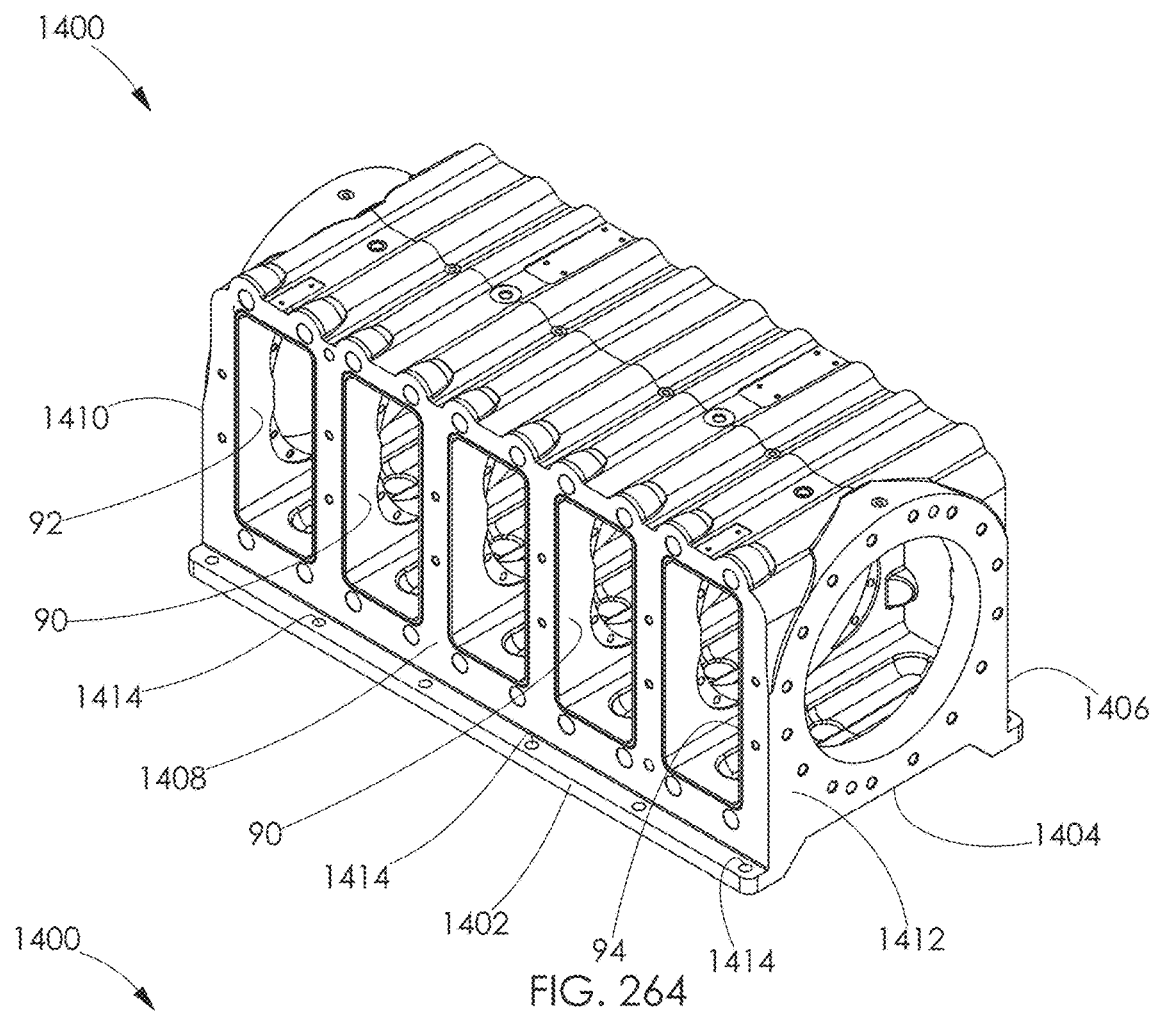

FIG. 264 is a rear perspective view of the crank frame shown in FIG. 262.

Figure 265:
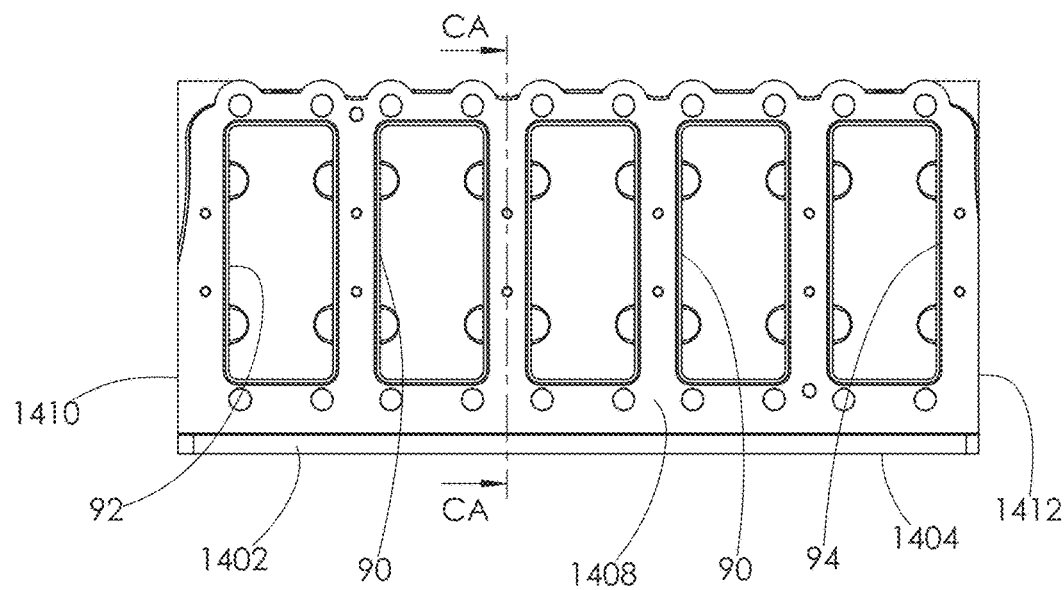

FIG. 265 is a rear elevational view of the crank frame shown in FIG. 262.

Figure 266:
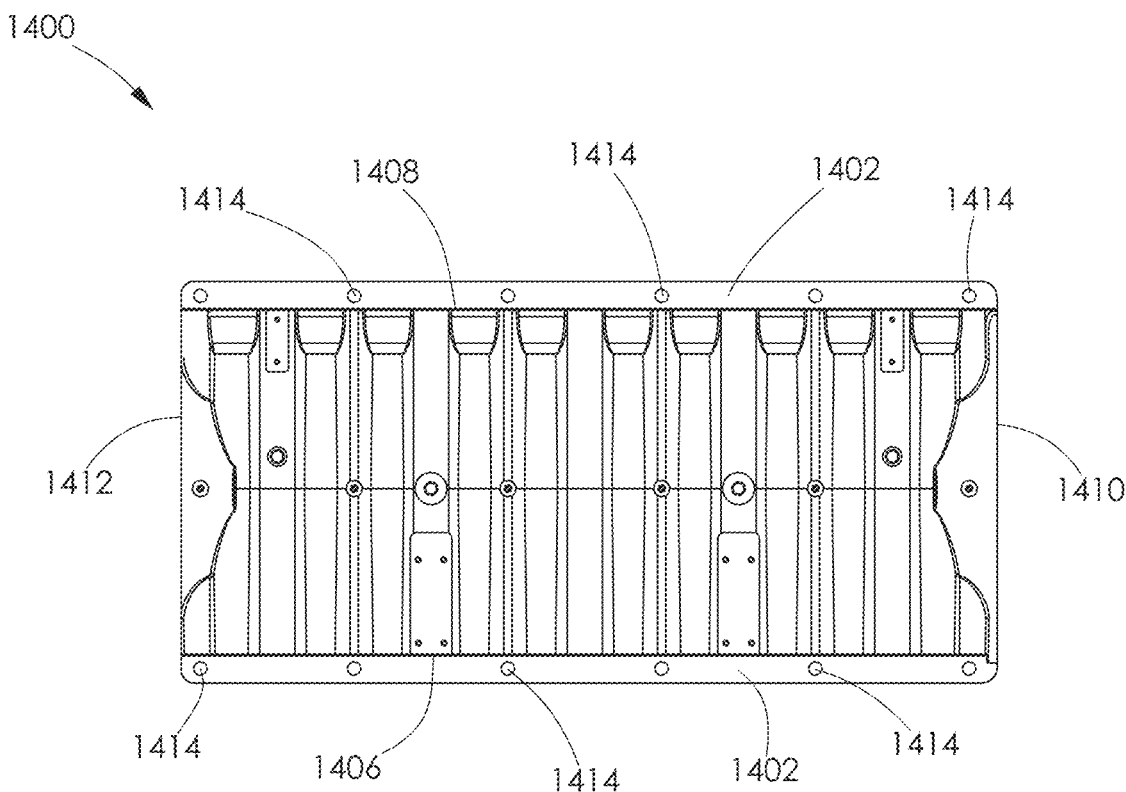

FIG. 266 is a top plan view of the crank frame shown in FIG. 262.

Figure 267:
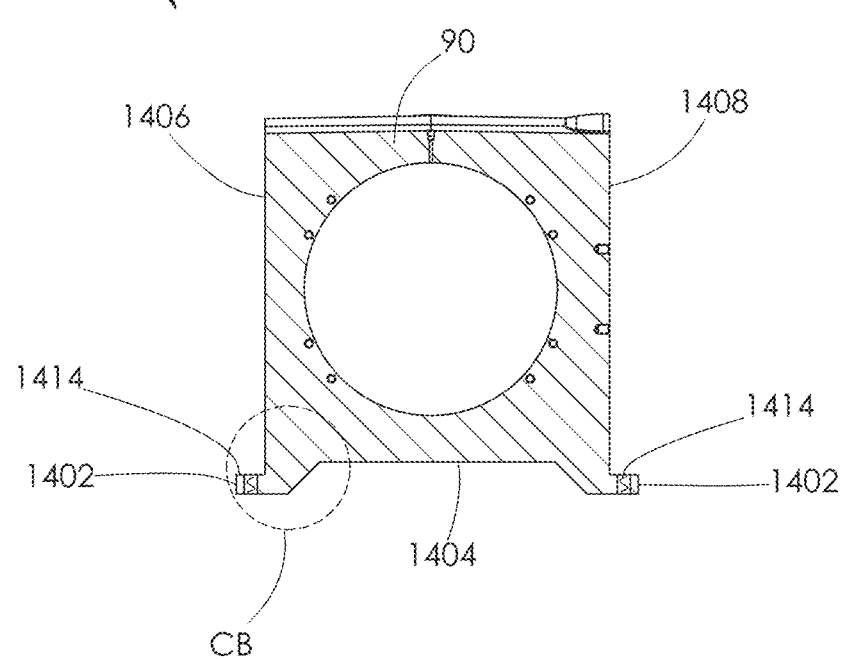

FIG. 267 is a cross-sectional view of the crank frame shown in FIG. 265, taken along line CA-CA.

Figure 268:
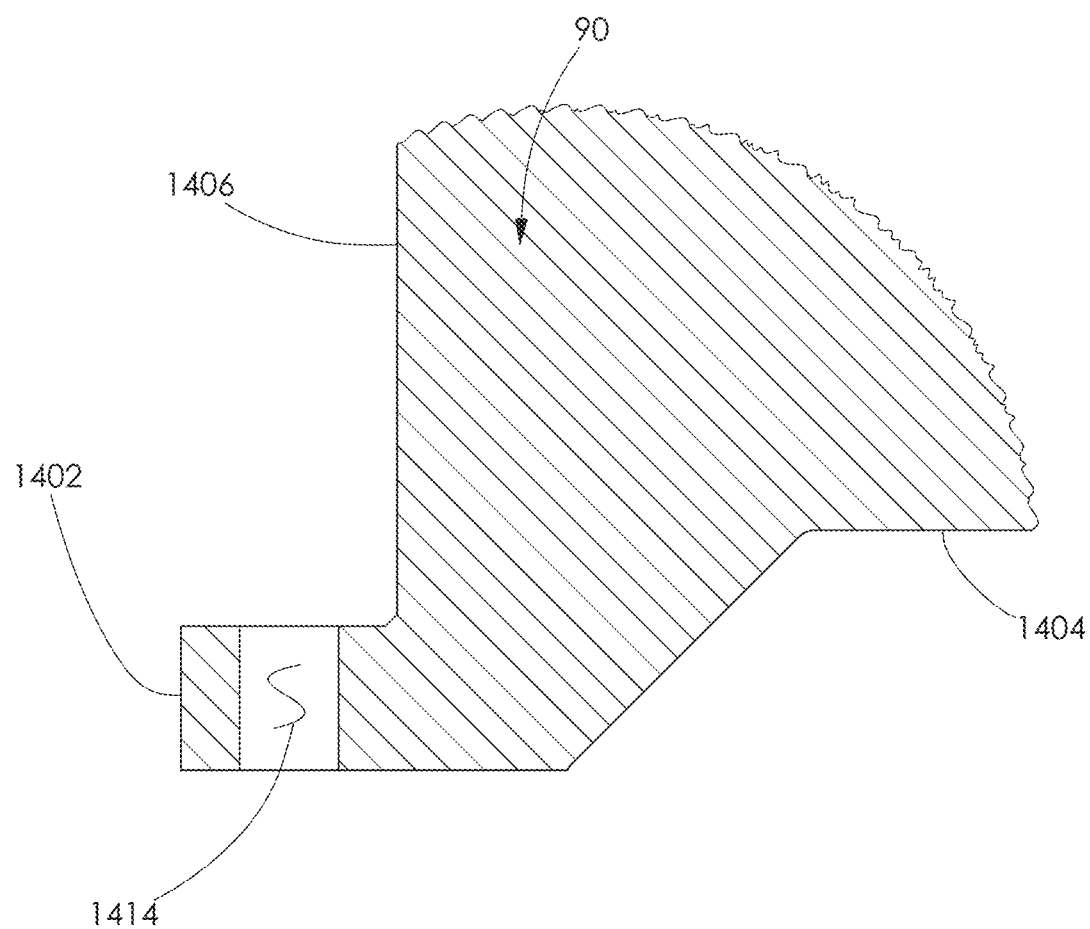

FIG. 268 is an enlarged view of area CB, shown in FIG. 267.

DETAILED DESCRIPTION

Figure 5:
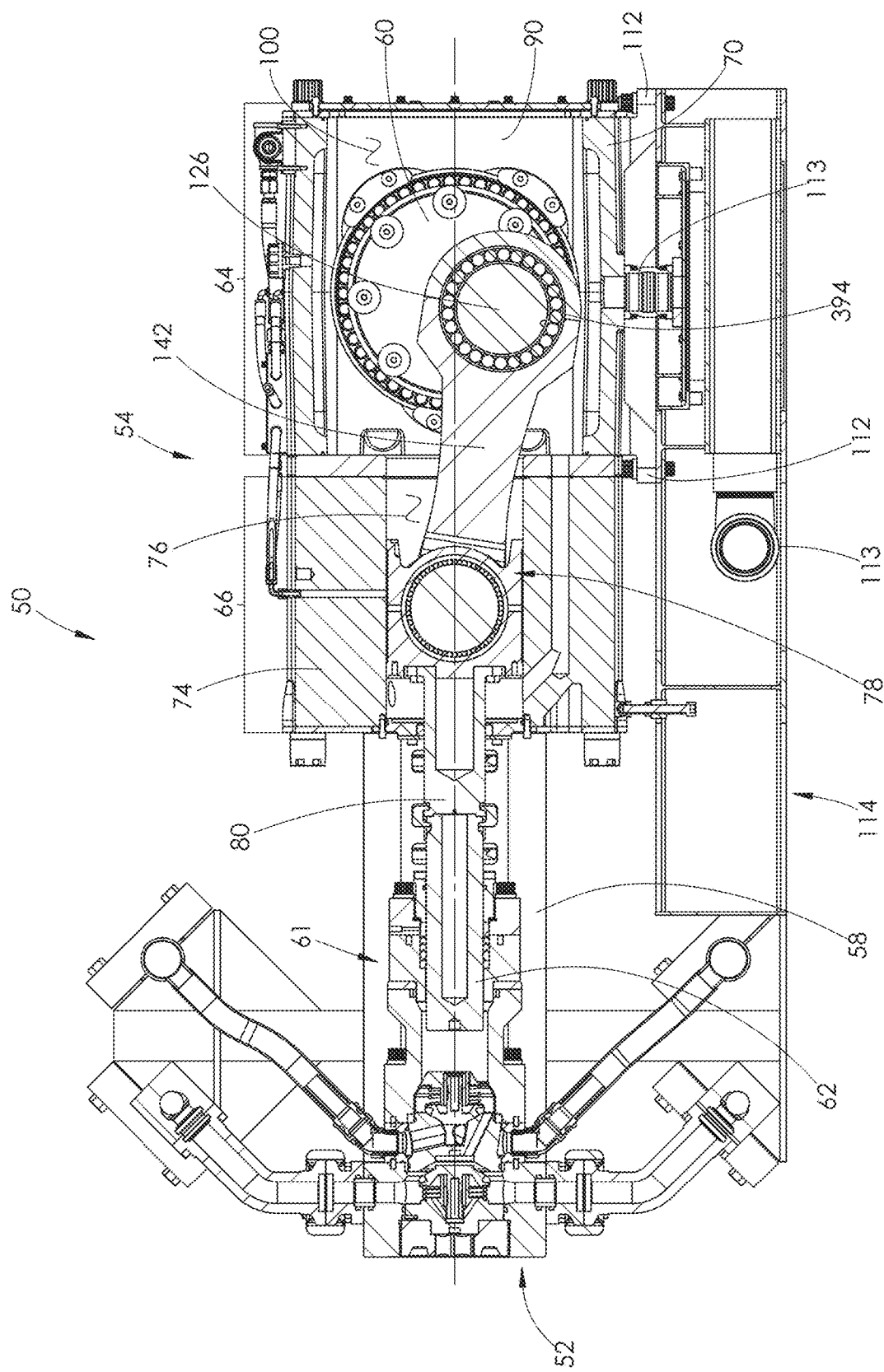
FIG. 5 is a cross-sectional view of the high-pressure pump shown in FIG. 4, taken along line A-A.
Figure 6:
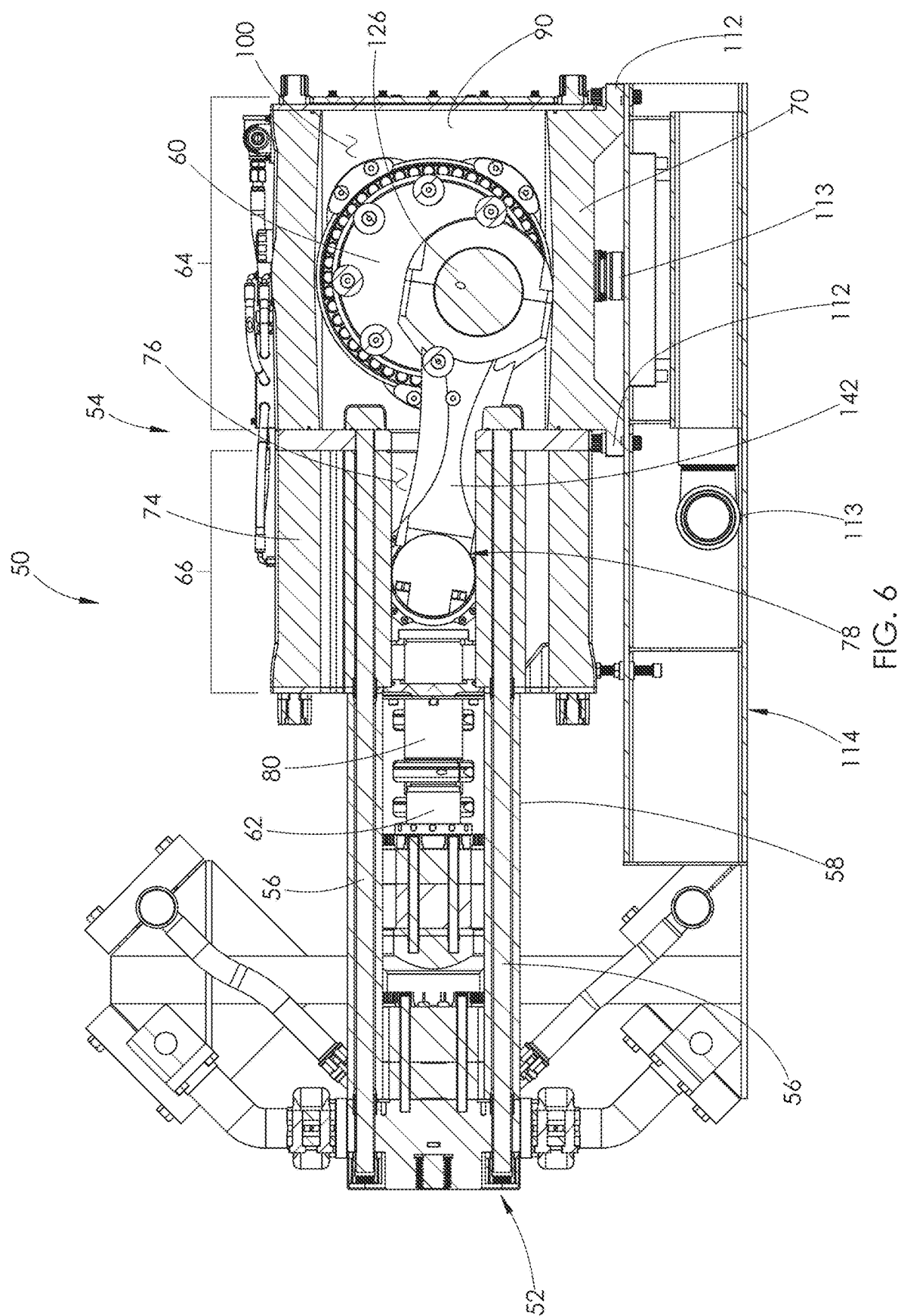
FIG. 6 is a cross-sectional view of the high-pressure pump shown in FIG. 4, taken along line B-B.

Turning now to FIGS. 3-7, one embodiment of a high-pressure pump 50 is shown. The pump 50 comprises a fluid end assembly 52 attached to a power end assembly 54 using a plurality of stay rods 56, as shown in FIG. 6. A portion of each stay rod 56 is surrounded by a sleeve 58 shown in FIGS. 3 and 5-7.

As will be described herein, the power end assembly 54 comprises a rotatable crankshaft 60, as shown in FIGS. 5-7 and 10-14. Crankshafts known in the art, like the crankshaft 60, are made from a single piece of material or are of single-piece construction. These crankshafts are typically made from a single casting, by forging, and/or by machining. However, the large size of these crankshafts makes this method of manufacture very expensive. There is a need in the art for a crankshaft that is less expensive to manufacture.

Figure 15:
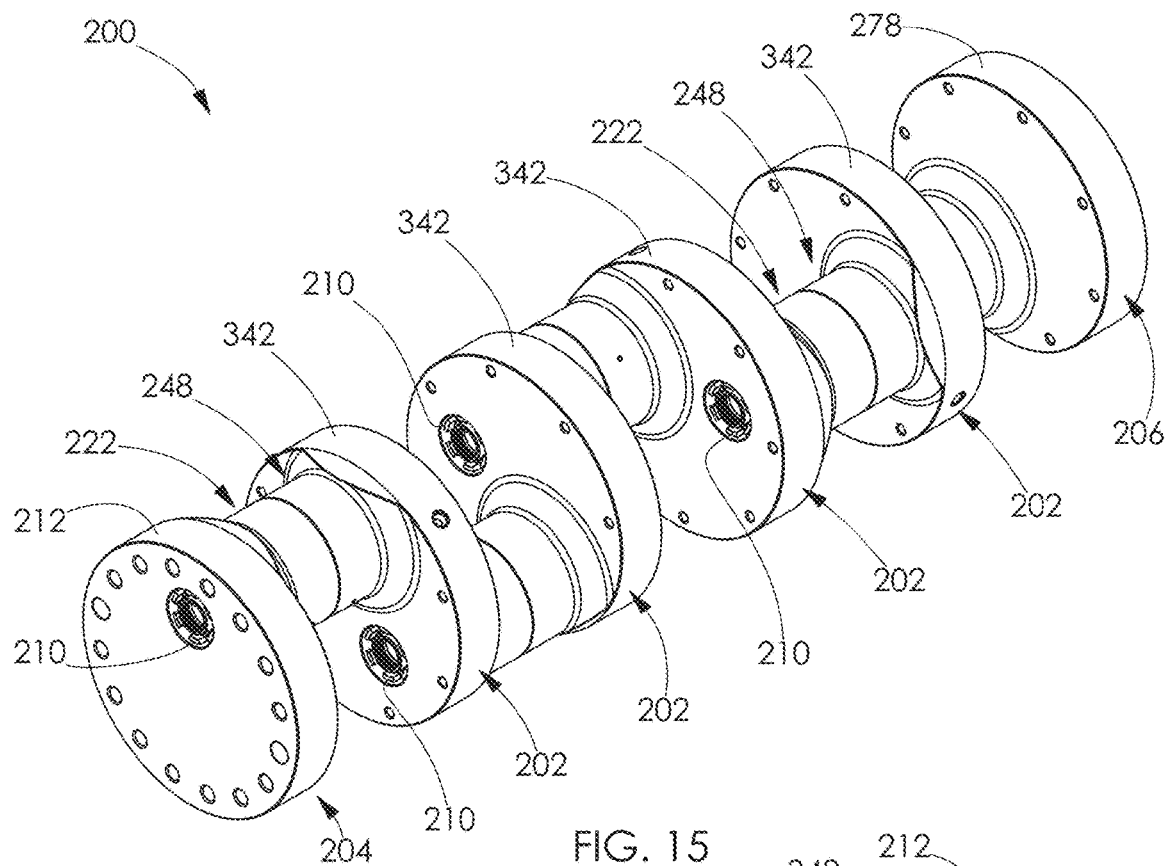
FIG. 15 is a first end perspective view of one embodiment of a modular crankshaft disclosed herein.

FIGS. 15-261 of the present application disclose a plurality of different embodiments of crankshafts that each comprise a plurality of different individual pieces attached together so that each crankshaft is of multi-piece construction. Such crankshafts may be referred to as "modular crankshafts". The individual components making up the modular crankshafts are much less expensive to manufacture than a single-piece crankshaft, resulting in an overall reduction in manufacturing costs. Thus, the various modular crankshafts disclosed herein are much less expensive to manufacture than the traditional single-piece crankshafts known in the art.

Each of the modular crankshafts disclosed herein may be used in place of the crankshaft 60 shown installed within the power end assembly 54 in FIGS. 5-7 and 10. Before describing the various embodiments of modular crankshafts disclosed herein, the high-pressure pump 50 and the installed prior art crankshaft 60 will be described in more detail to provide context for the modular crankshafts disclosed herein. The pump 50 and its corresponding power end assembly 54 described herein are just one embodiment of a power end assembly 54 that the modular crankshafts disclosed herein may be used with. The modular crankshafts disclosed herein may be installed within any embodiment of a pump or power end assembly known in the art.

Turning back to FIGS. 3 and 4, the fluid end assembly 52 comprises a plurality of fluid end sections 61 positioned in a side-by-side relationship. During operation, a plunger 62 installed within each fluid end section 61 reciprocates therein to pressurize fluid, as shown in FIG. 5. The various components of the fluid end assembly 52 are described in more detail in U.S. patent application Ser. No. 17/884,691, authored by Keith et al., the entire contents of which are incorporated herein by reference ("the '691 application").

Figure 7:
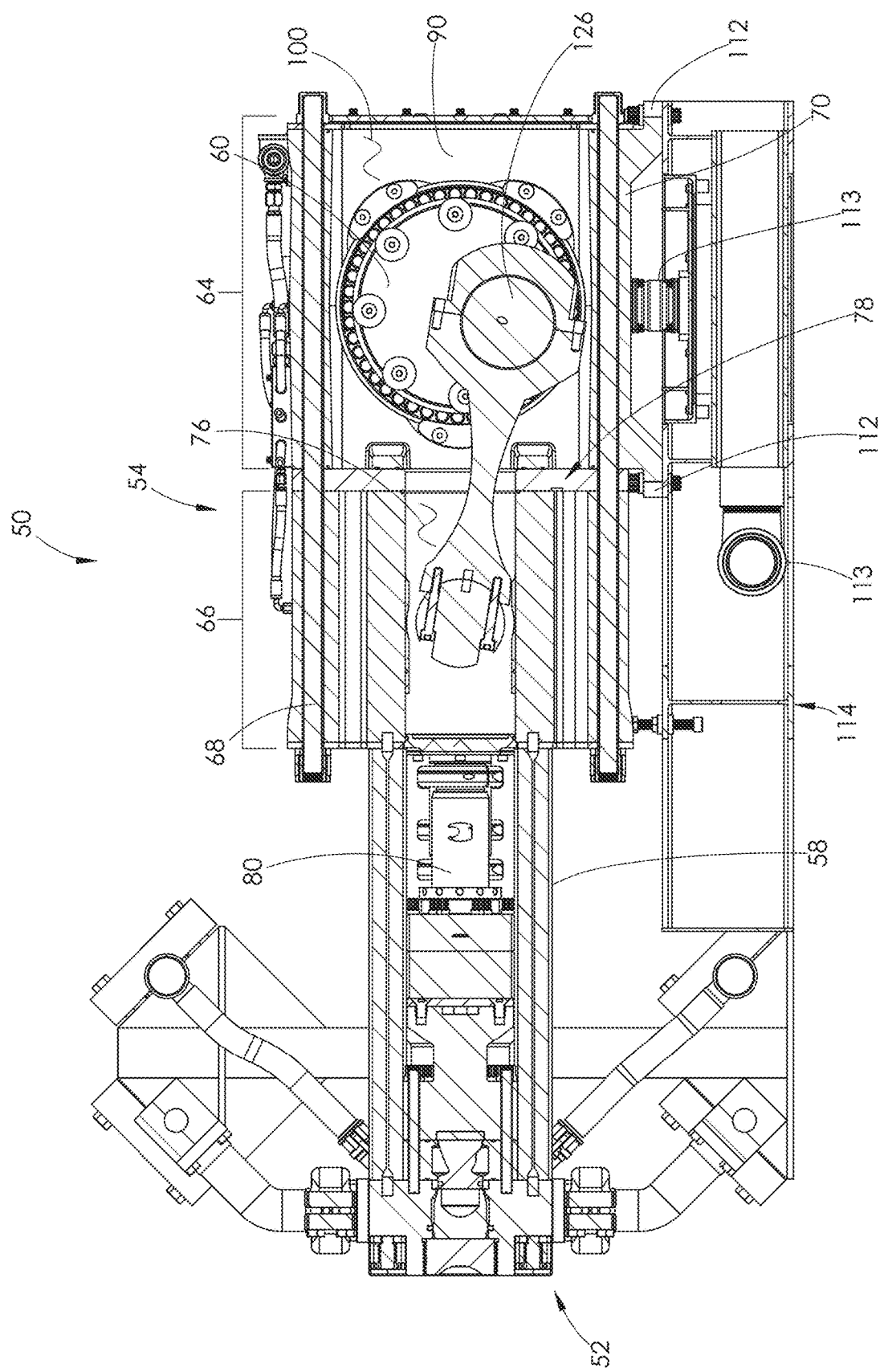
FIG. 7 is a cross-sectional view of the high-pressure pump shown in FIG. 4, taken along line C-C.

Continuing with FIGS. 5-7, the power end assembly 54 comprises a crank section 64 joined to a crosshead section 66 by a plurality of stay rods 68, as shown best in FIG. 7. The stay rods 68 may be characterized as a plurality of first stay rods or a first set of stay rods or tie rods 68, while the stay rods 56, shown best in FIG. 6, may be characterized as a plurality of second stay rods or a second set of stay rods 56. The first set of stay rods 68 secure the components of the power end assembly 54 together, while the second set of stay rods 56 secure the fluid end assembly 52 to the power end assembly 54.

Figure 1:
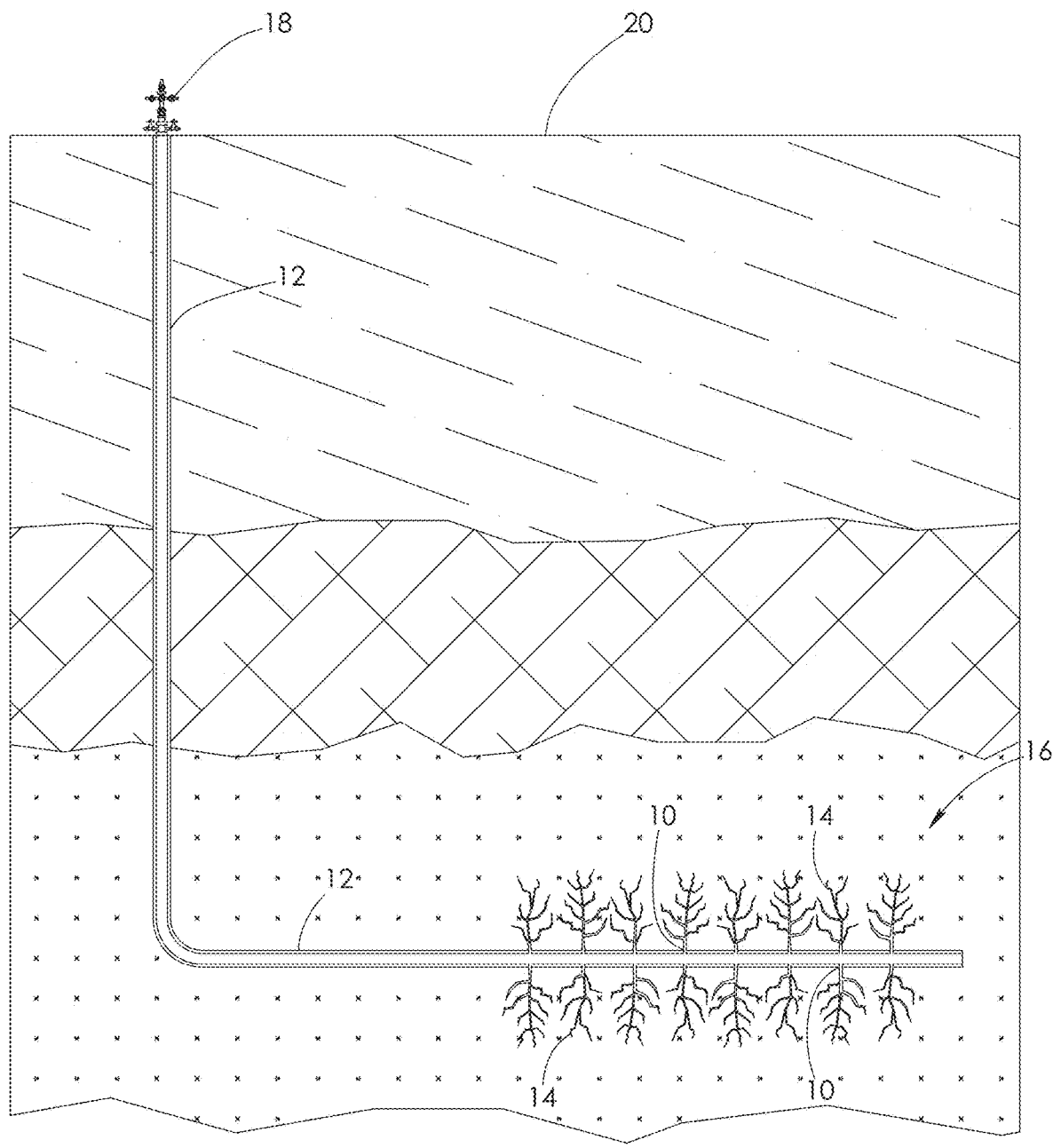
FIG. 1 is an illustration of the underground environment of a hydraulic fracturing operation.
Figure 2:
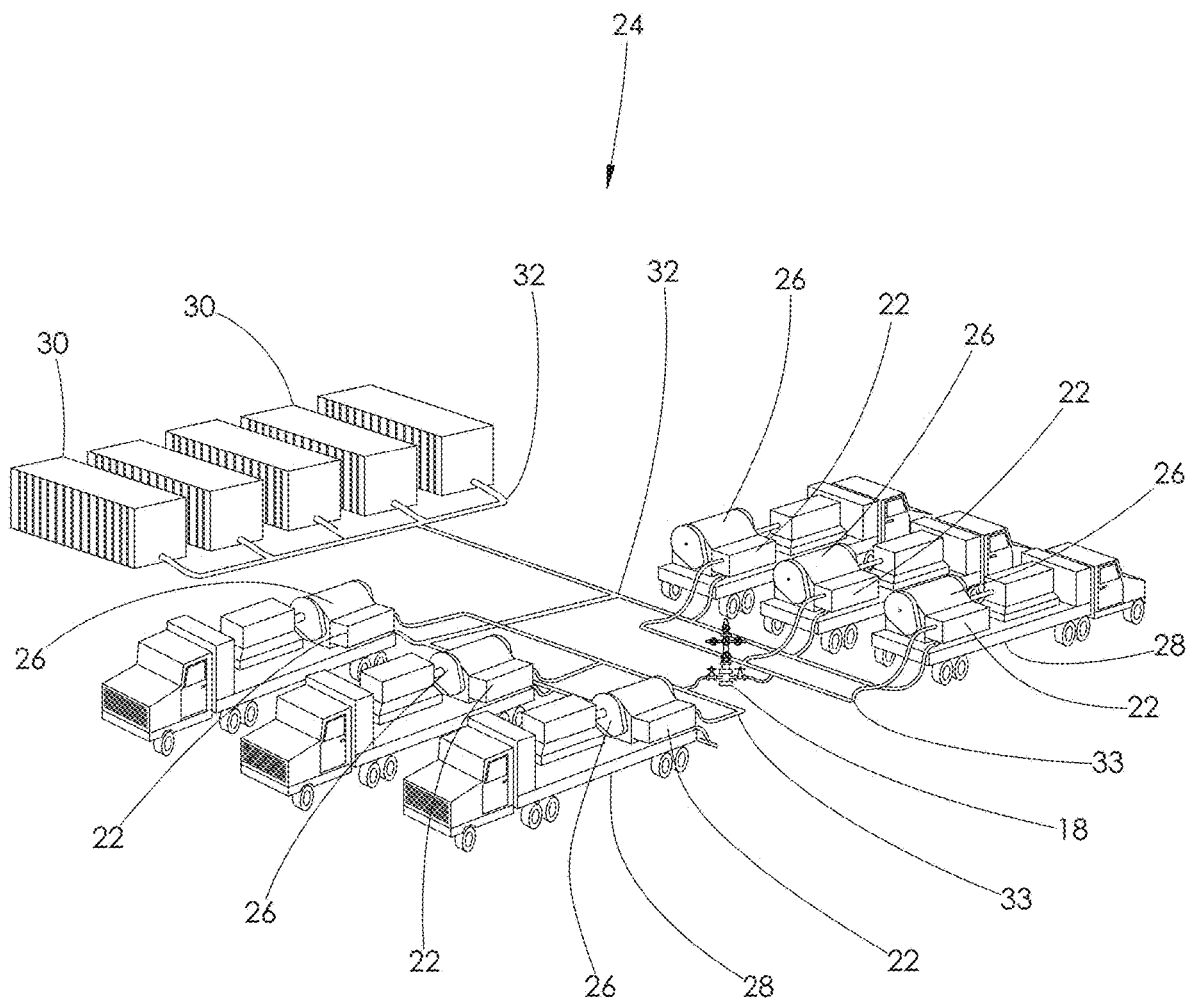
FIG. 2 illustrates above-ground equipment used in a hydraulic fracturing operation.
Figure 3:
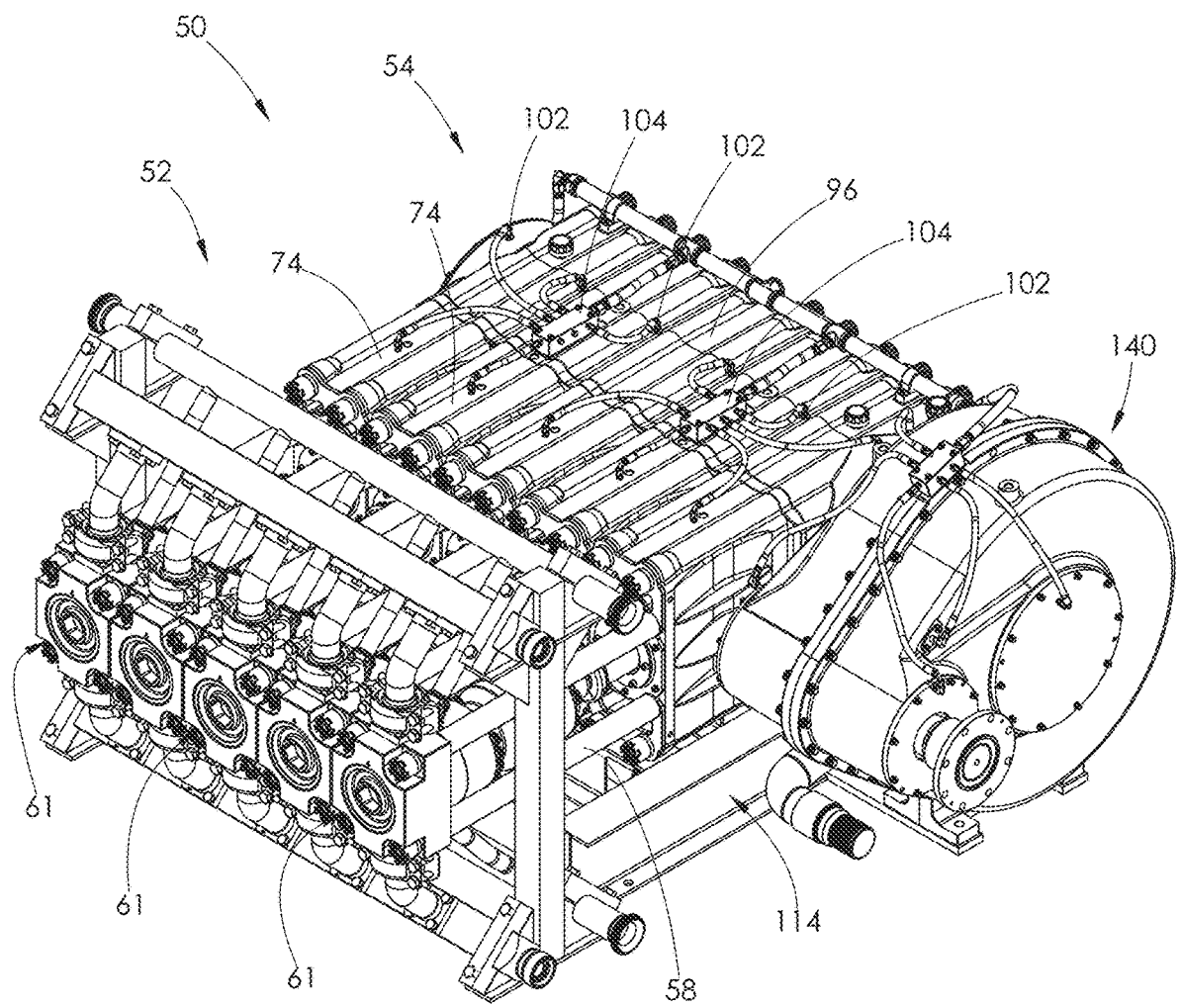
FIG. 3 is a front perspective view of one embodiment of a high-pressure pump.
Figure 4:
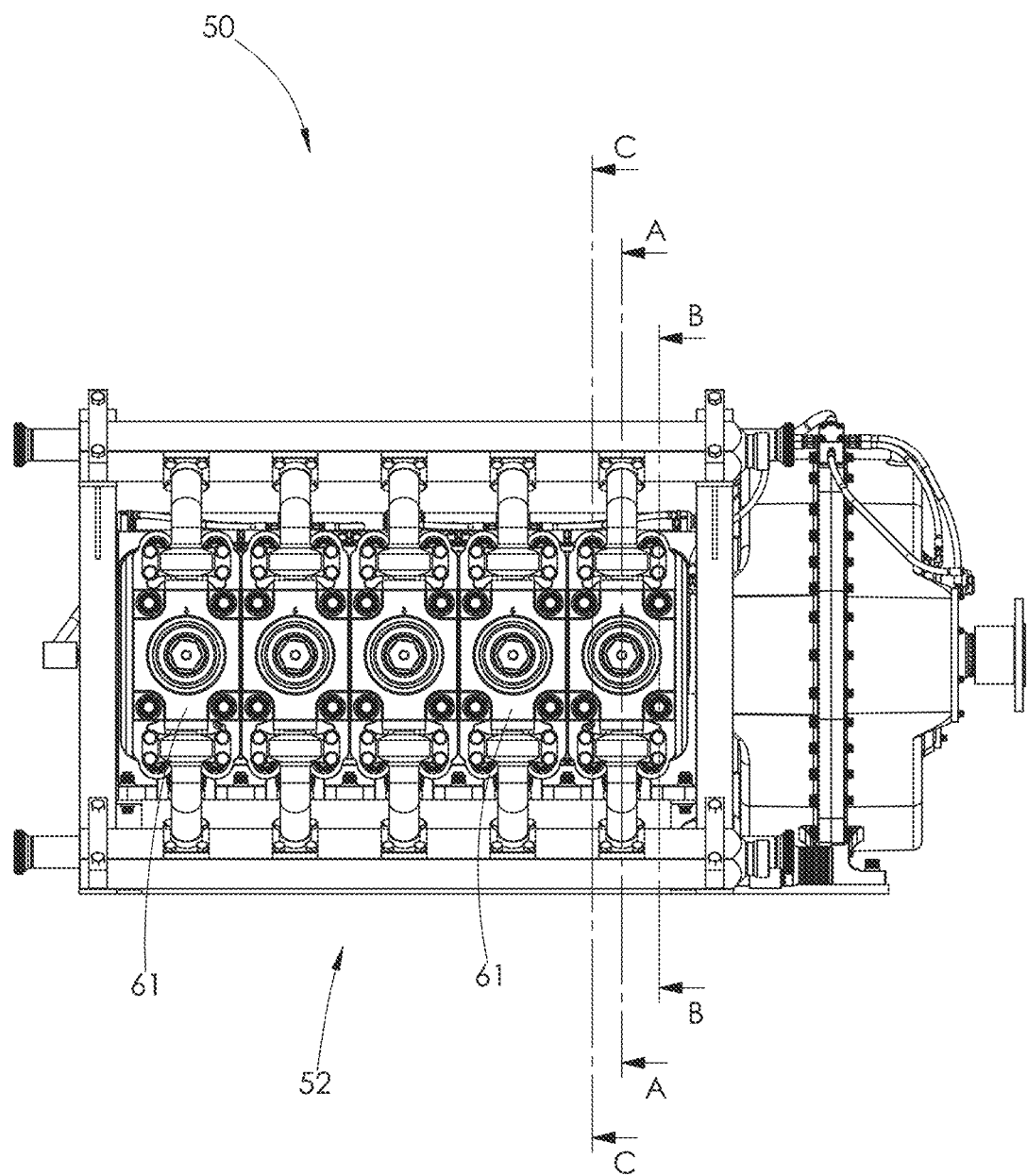
FIG. 4 is a front elevational view of the high-pressure pump shown in FIG. 3.

Continuing with FIGS. 5-7, the crank section 64 comprises an integrally formed crank frame 70 housing the crankshaft 60, and the crosshead section 66 comprises a plurality of crosshead guides 74 situated in a side-by-side relationship, as shown in FIG. 3. A crosshead bore 76 is formed within each crosshead guide 74 and each bore is sized to receive a portion of a linear drive assembly 78. Each linear drive assembly 78 interconnects the crankshaft 60 and a pony rod 80. The linear drive assemblies 78 are configured to cause the reciprocation of the pony rods 80 and the corresponding plungers 62. The various components of the power end assembly 54 are described in more detail in the '691 application, previously incorporated herein by reference. Various embodiments of a linear drive assembly that may be used in place of the linear drive assembly 78 are described in U.S. Pat. No. 11,953,000, Foster et al., the entire contents of which are incorporated herein by reference.

Figure 8:
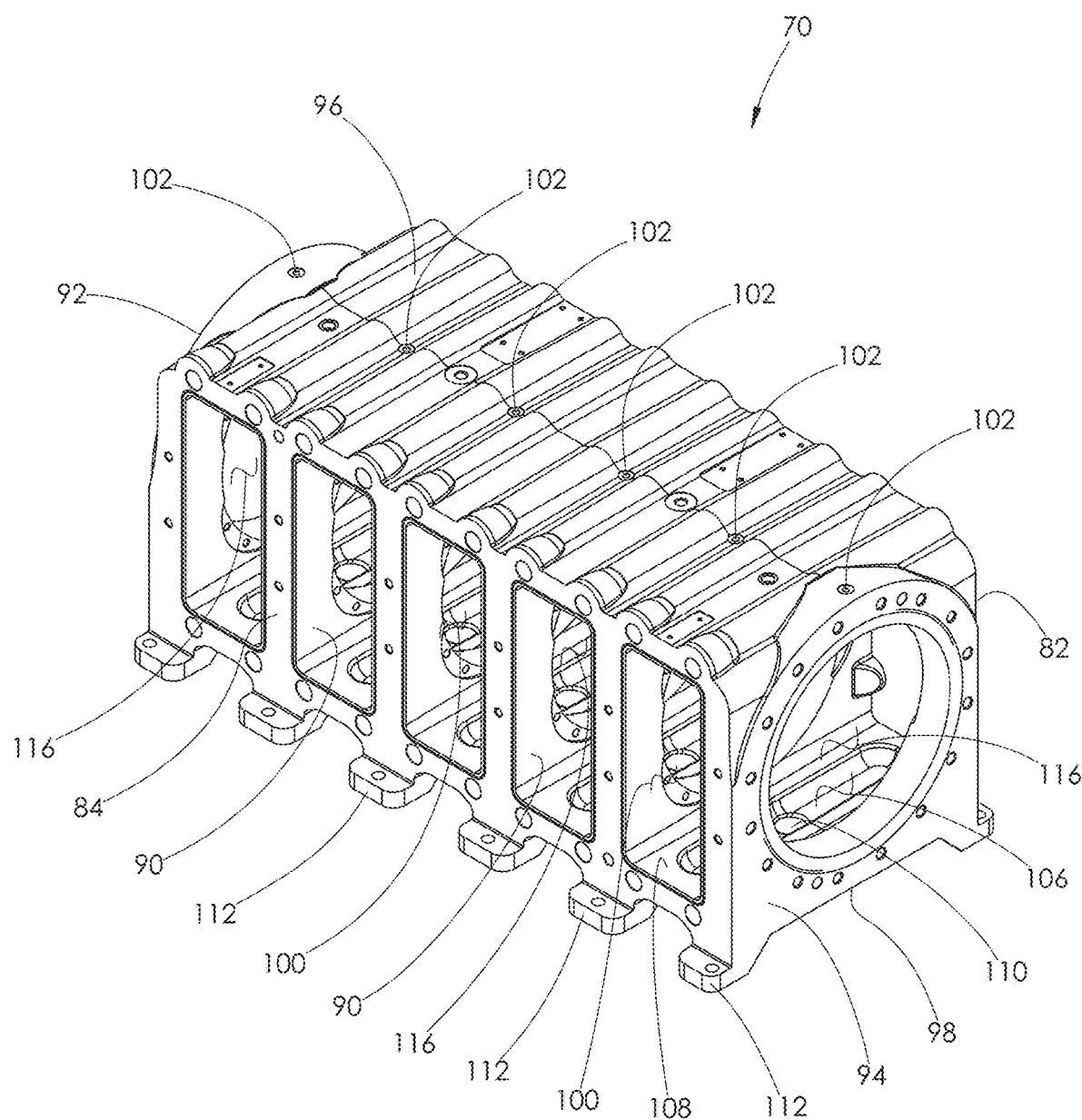
FIG. 8 is a rear perspective view of the crank frame used within the high-pressure pump shown in FIG. 3.
Figure 9:
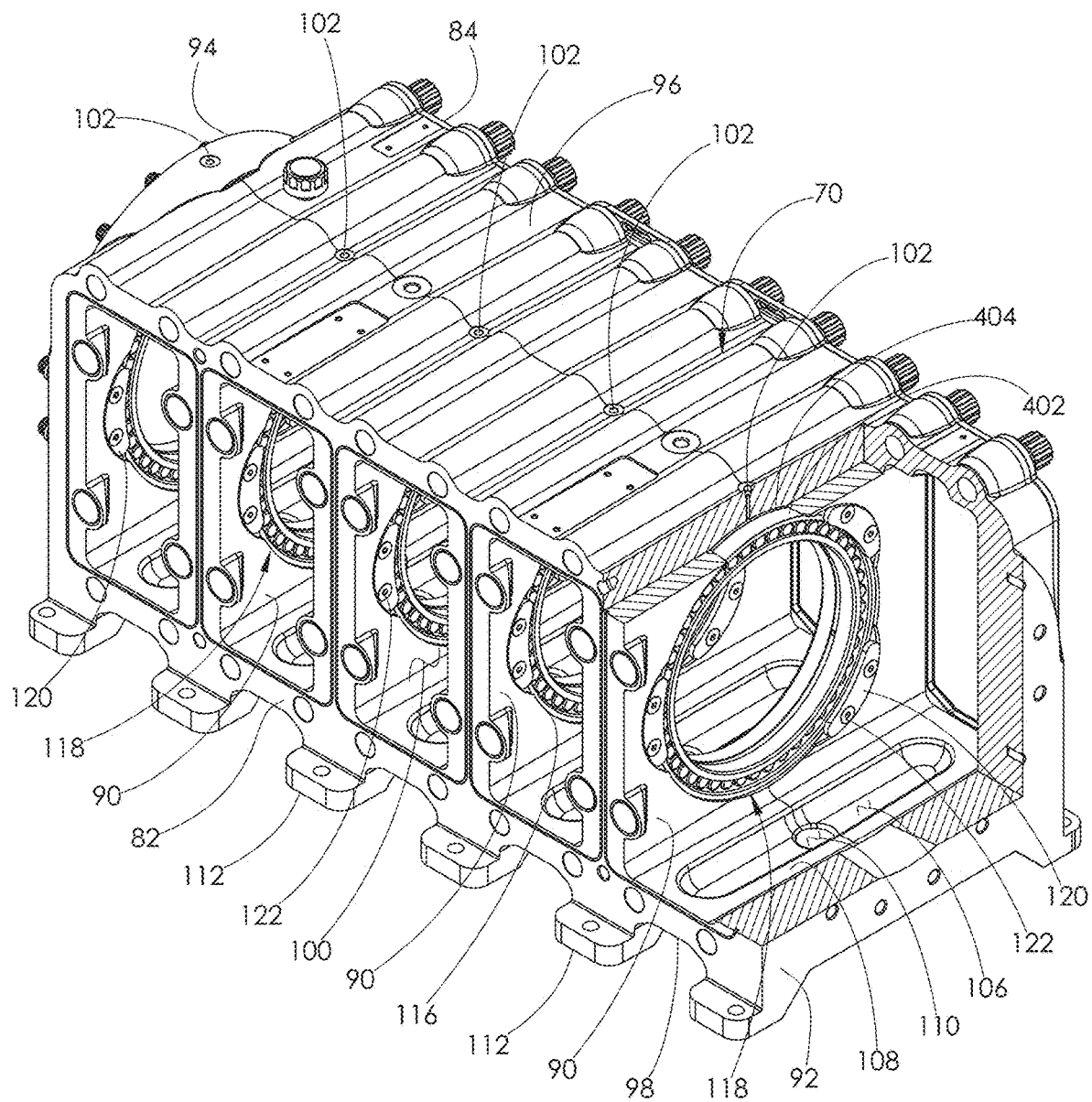
FIG. 9 is a front perspective view of the crank frame shown in FIG. 8 with roller bearings installed therein. A portion of the crank frame is cutaway to expose the interior of the crank frame.
Figure 10:
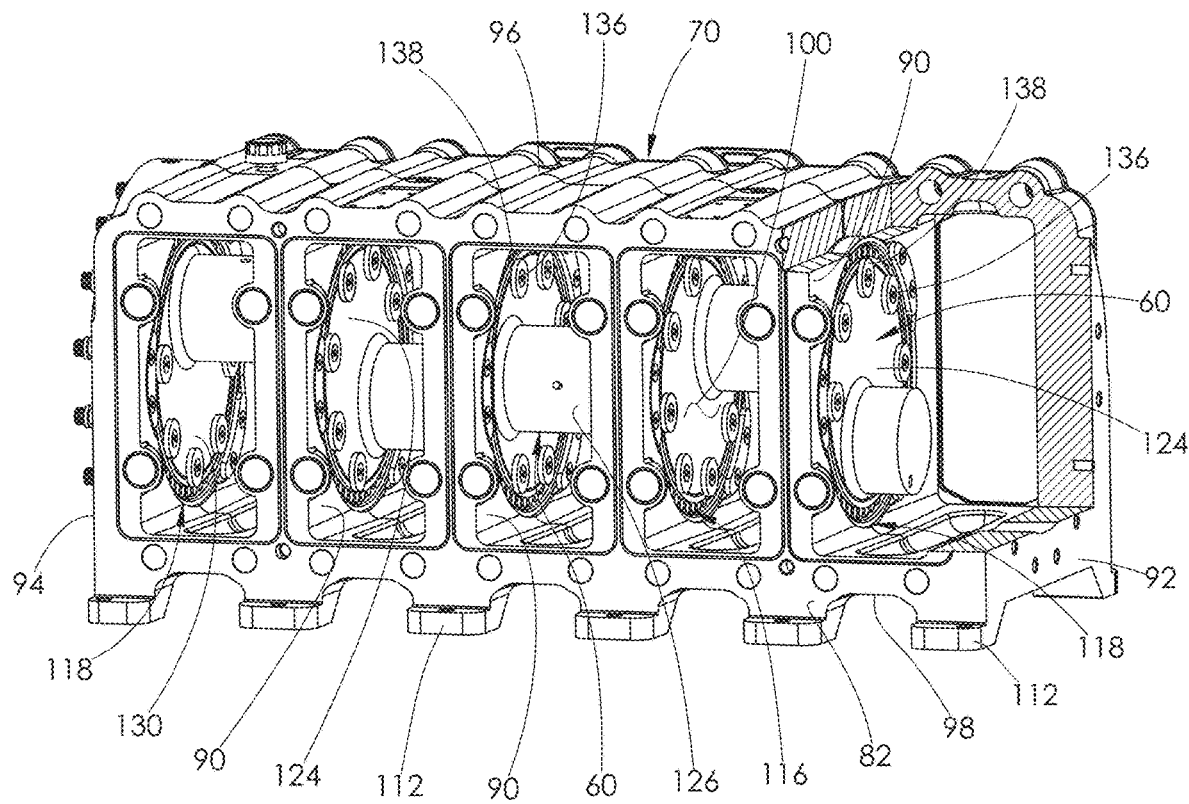
FIG. 10 is a front perspective view of the crank frame shown in FIG. 9 with a crankshaft known in the art installed therein. A portion of the crankshaft is cutaway.

Turning to FIGS. 8-10, the crank frame 70 is made of a single casting or of single-piece construction. The various components of the crank frame 70 are integrally formed. The crank frame 70 is not made of separate pieces welded together or otherwise attached together. Thus, the crank frame 70 does not have any weld points that are known to fail during operation. The crank frame 70 has the shape of a rectangular prism and comprises opposed front and rear surfaces 82 and 84, opposed first and second sides 92 and 94, and opposed upper and lower surfaces 96 and 98. An interior of the crank frame 70 is defined by a plurality of support walls 90 sized to receive and support the crankshaft 60, as shown in FIG. 10.

Continuing with FIGS. 8-10, four support walls 90 are formed within the interior of the crank frame 70. The walls 90 are equally spaced between the first and second sides 92 and 94 of the frame 70. Together, the support walls 90 and sides 92 and 94 define five rectangular shaped cavities 100 formed within the crank frame 70. As shown in FIGS. 5-7, each cavity 100 is sized to receive a portion of a corresponding one of the linear drive assemblies 78.

Continuing with FIGS. 8 and 9, the upper surface 96 of the crank frame 70 comprises one or more lubrication ports 102. The lubrication ports 102 connect with a lubrication system 104 supported on the upper surface 96, as shown in FIG. 3. During operation, lubricant is supplied to the interior of the crank frame 70 through the lubrication ports 102. A lubricant reservoir 106 is formed in a base 108 of each cavity 100 for collecting used lubricant. An opening 110 is formed in the center of each lubricant reservoir 106. During operation, lubricant draining into the opening 110 is recycled back into the lubrication system 104 using one or more conduits 113, as shown in FIGS. 5-7.

Continuing with FIGS. 8-10, the lower surface 98 of the crank frame 70 comprises a plurality of integrally formed feet 112 projecting from the front and rear surfaces 82 and 84 of the frame 70. The feet 112 are configured to support the frame 70 on a base section 114, as shown in FIGS. 5-7.

Continuing with FIGS. 8-10, the first and second sides 92 and 94 and the inner support walls 90 each comprise a circular shaped bearing opening 116. The bearing openings 116 are sized to each receive a main journal roller bearing 118, as shown in FIGS. 9 and 10. The roller bearings 118 are secured within each opening 116 by a plurality of brackets 120, as shown in FIG. 9. The brackets 120 are secured to the sides 92 and 94 and the support walls 90 using a plurality of fasteners 122. Each roller bearing 118 is sized to receive a portion of the crankshaft 60, as shown in FIG. 10.

Figure 14:
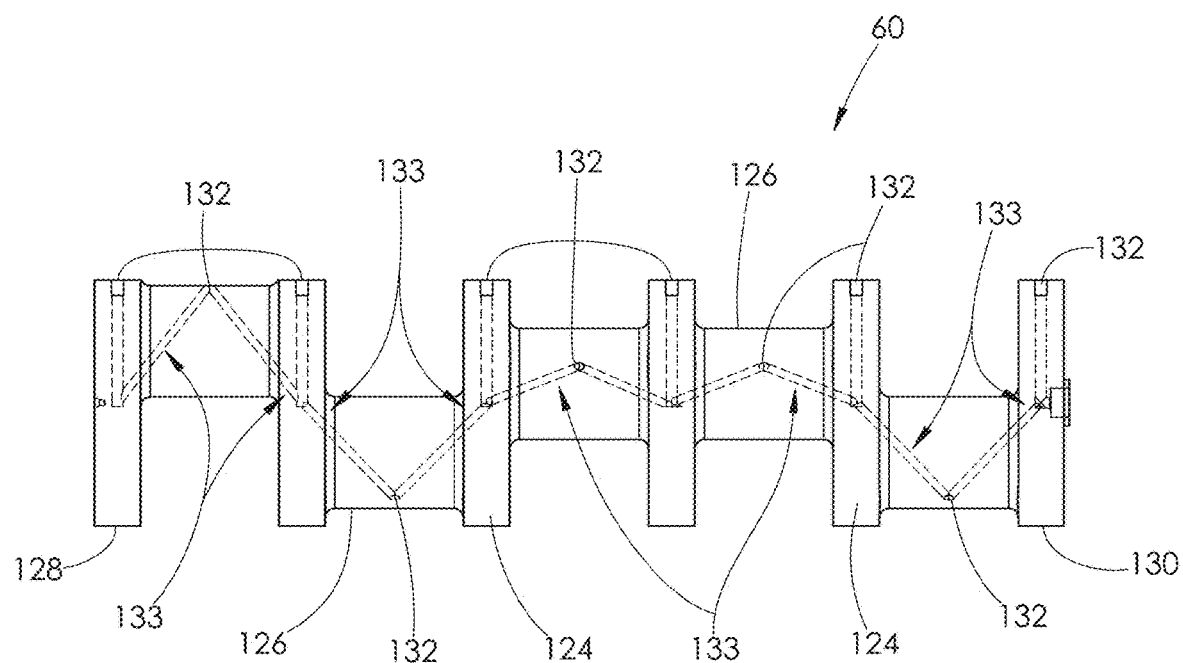
FIG. 14 is a front elevational view of the crankshaft shown in FIG. 11 with a lubricant passageway shown formed therein by hidden lines.

Turning to FIGS. 11-14, the crankshaft 60 comprises a plurality of inner main bearing journals 124 bounded by a first end main bearing journal 128 and an opposed second end main bearing journal 130. Adjacent bearing journals 124, 128, or 130 are joined together by one of a plurality of connecting rod journals 126. Adjacent connecting rod journals 126 are offset from one another. A plurality of interconnecting lubrication ports 132 are formed within the bearing journals 124, 128, and 130 and the connecting rod journals 126. Together the lubrication ports 132 form a continuous lubricant passageway 133 throughout the crankshaft 60, as shown in FIG. 14.

Figure 11:
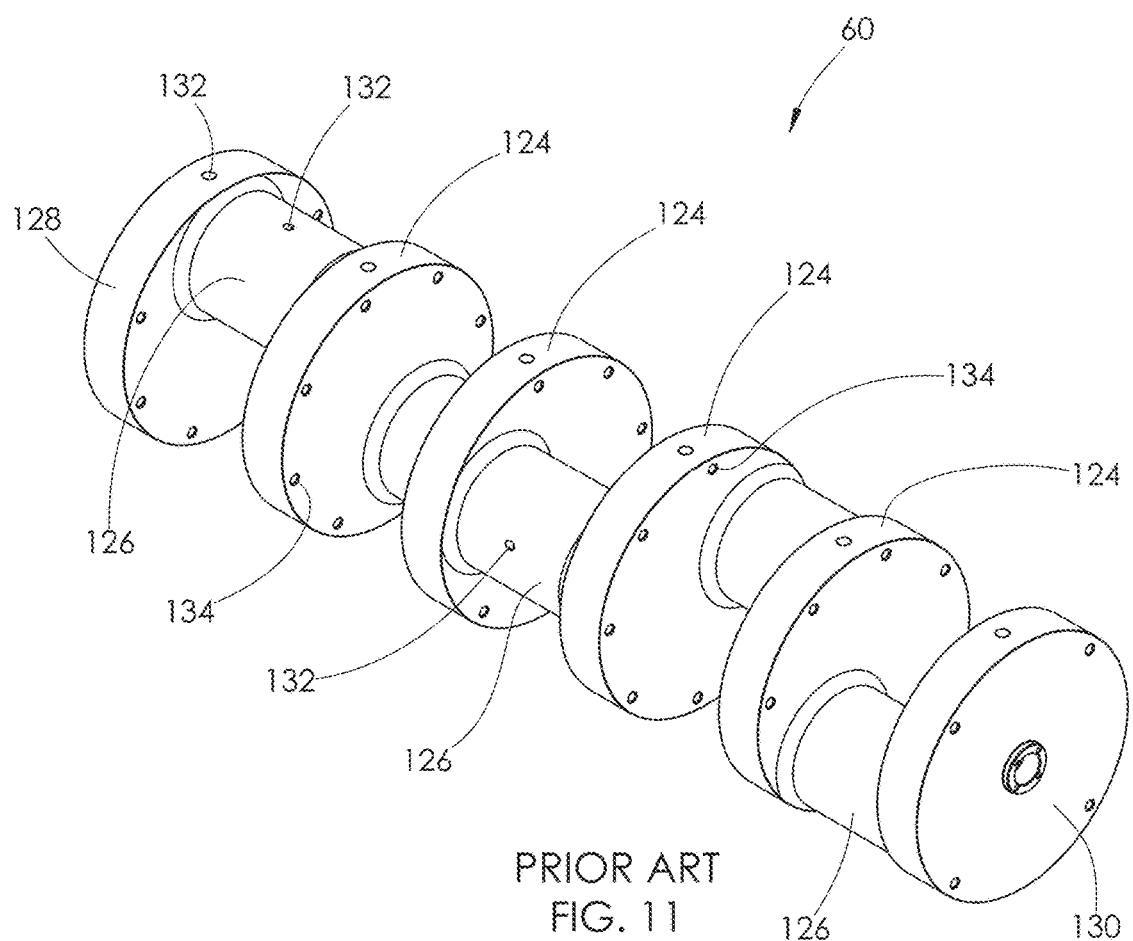
FIG. 11 is a second end perspective view of the crankshaft shown installed within the crank frame in FIG. 10.
Figure 12:
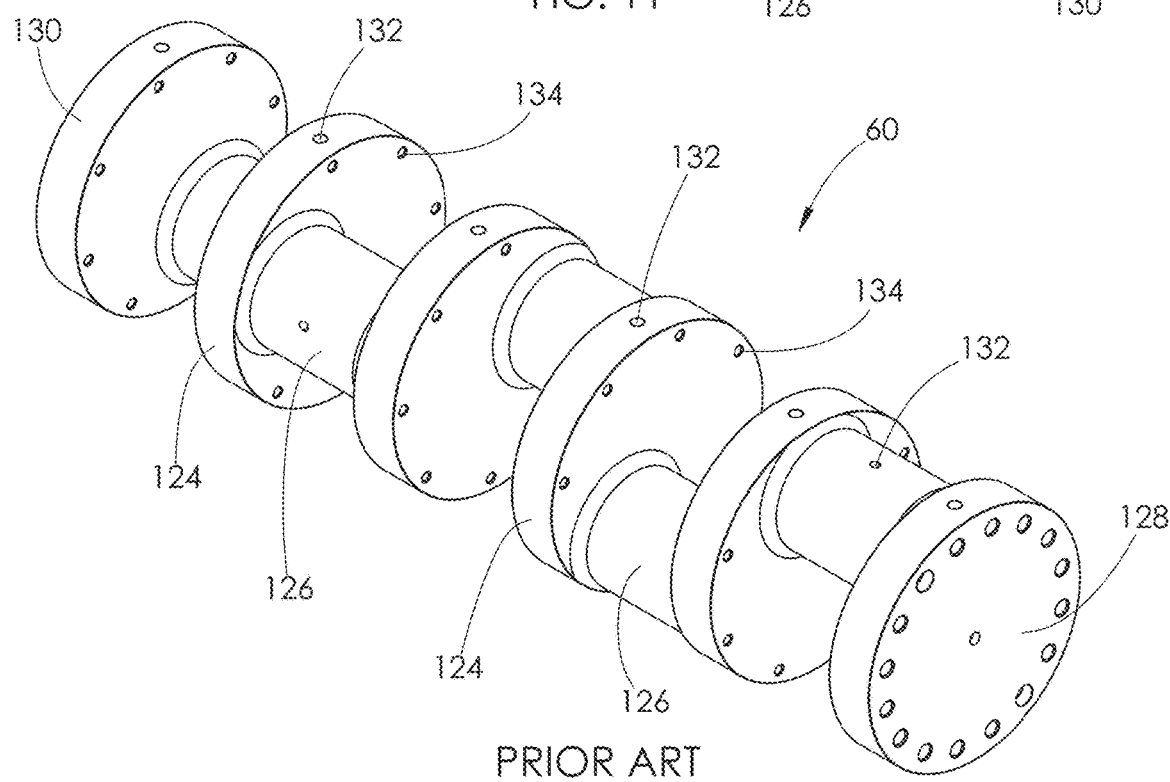
FIG. 12 is a first end perspective view of the crankshaft shown in FIG. 11.
Figure 13:
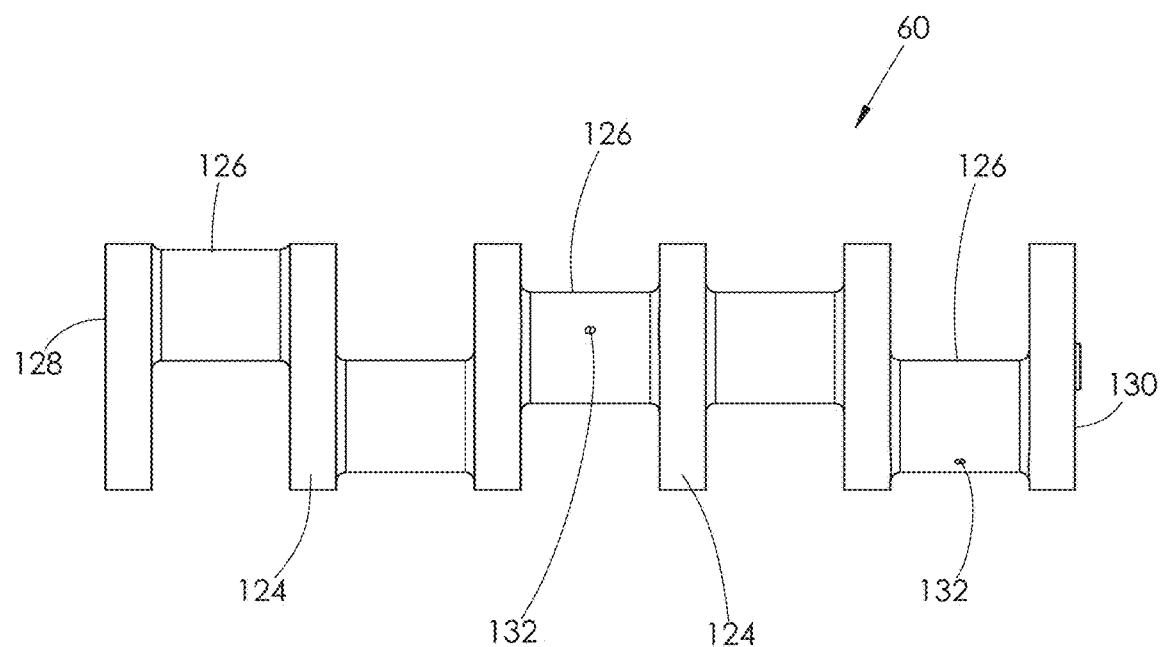
FIG. 13 is a front elevational view of the crankshaft shown in FIG. 11.

Continuing with FIGS. 11 and 12, each bearing journal 124, 128, and 130 comprises a plurality of threaded openings 134. The openings 134 are positioned around the periphery of the sides of each bearing journal 124, 128, or 130. Each opening 134 is configured to receive a threaded fastener 136, as shown in FIG. 10.

Turning back to FIG. 10, the crankshaft 60 is installed within the crank frame 70 such that each bearing journal 124, 128, and 130 is supported within a corresponding one of the main journal roller bearings 118. Each bearing journal 124, 128, and 130 is held within a corresponding roller bearing 118 by a plurality of retainers 138. The retainers 138 are attached to the sides of each bearing journal 124, 128, and 130 using the fasteners 136. Each retainer 138 extends past the periphery of each bearing journal 124, 128, or 130 and engages an edge of the corresponding roller bearing 118. Such engagement on both sides of each bearing journal 124, 128, and 130 and roller bearing 118 prevents lateral movement of each bearing journal 124, 128, and 130 relative to the corresponding roller bearing 118.

Continuing with FIG. 10, when the crankshaft 60 is installed within the crank frame 70, each bearing journal 124, 128, and 130 is rotatable within the corresponding roller bearing 118. While not specifically shown in FIG. 10, the first end journal 128 is supported within the opening 116 formed within first side 92 of the frame 70. The first end journal 128 is configured to attach to a gearbox section 140 of the power end assembly 54, as shown in FIG. 3. Rotation of the crankshaft 60 is powered by an engine (not shown) attached to the gearbox section 140. The second end journal 130 is supported within the roller bearing 118 on the second side 94 of the frame 70, as shown in FIG. 10. The second end journal 130 may be protected by a cover (not shown) attached to the second side 94 of the frame 70.

With reference to FIGS. 5-7 and 10, when the crankshaft 60 is installed within the crank frame 70, each connecting rod journal 126 spans between adjacent support walls 90 and is accessible within the corresponding cavity 100, as shown in FIG. 10. A connecting rod 142 of each linear drive assembly 78 attaches to a corresponding one of the connecting rod journals 126 within each cavity 100, as shown in FIGS. 5-7.

Modular Crankshaft 200

Turning to FIGS. 15-65, one embodiment of a modular crankshaft 200 is shown. The crankshaft 200 may be installed within the crank frame 70 in place of the crankshaft 60. The crankshaft 200 comprises a plurality of inner main bearing journals 202 joined together in a side-by-side relationship, as shown in FIGS. 15-18. The inner main bearing journals 202 may also be referred to as inner journals 202. The crankshaft 200 further comprises a first end main bearing journal 204 attached to one of the inner journals 202, and an opposed second end main bearing journal 206 attached to another one of the inner journals 202, as shown in FIGS. 15-18. The first end main bearing journal 204 may also be referred to as a first end journal or a shank journal 204, and the second end main bearing journal 206 may also be referred to as a second end journal or a receiver journal 206.

With reference to FIGS. 19-23, as will be described herein, the end journals 204 and 206 and the inner journals 202 are attached together using a plurality of tension rods or fasteners 208. Each fastener 208 is secured to a corresponding one of the inner journals 202 or the first end journal 204 using a three-piece nut 210.

Figure 25:
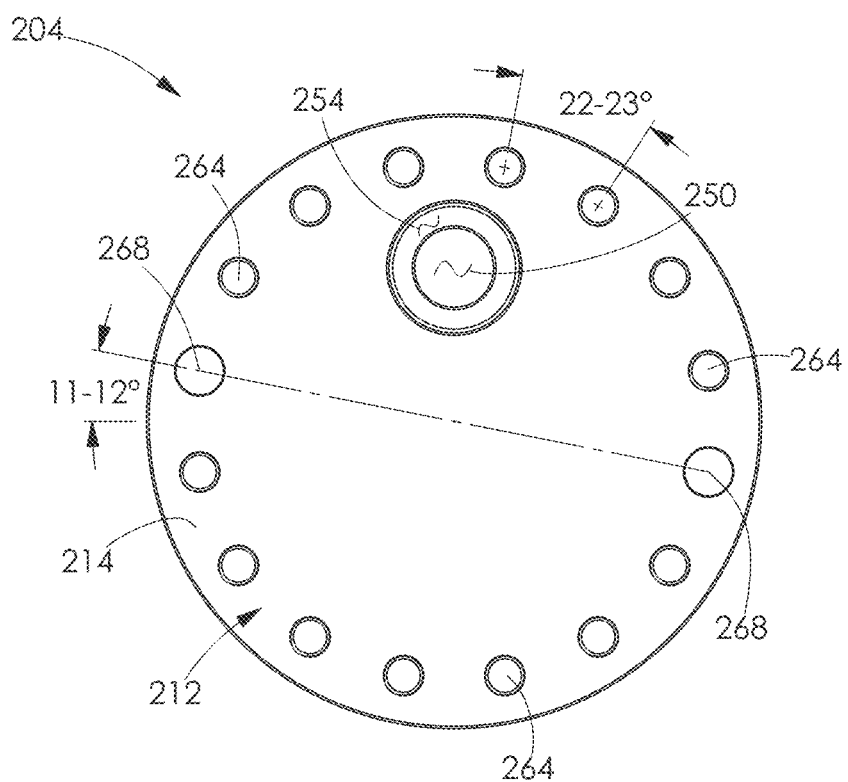
FIG. 25 is an elevational view of the first side of the first end journal shown in FIG. 24.
Figure 26:
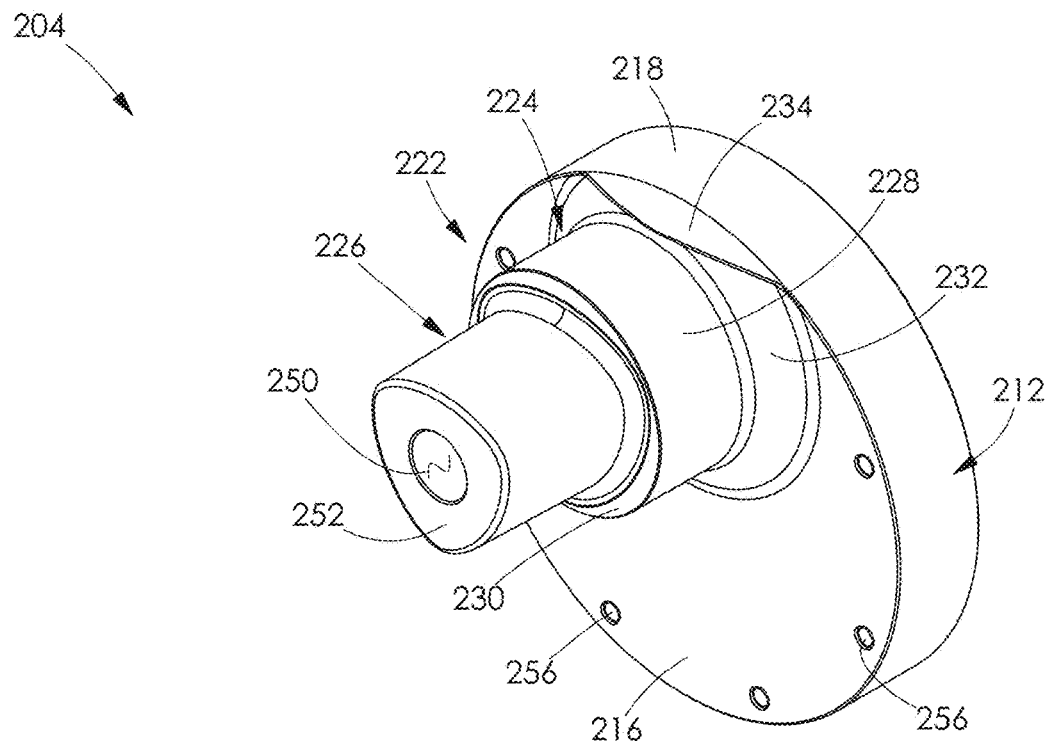
FIG. 26 is a perspective view of the second side of the first end journal shown in FIG. 24.
Figure 27:
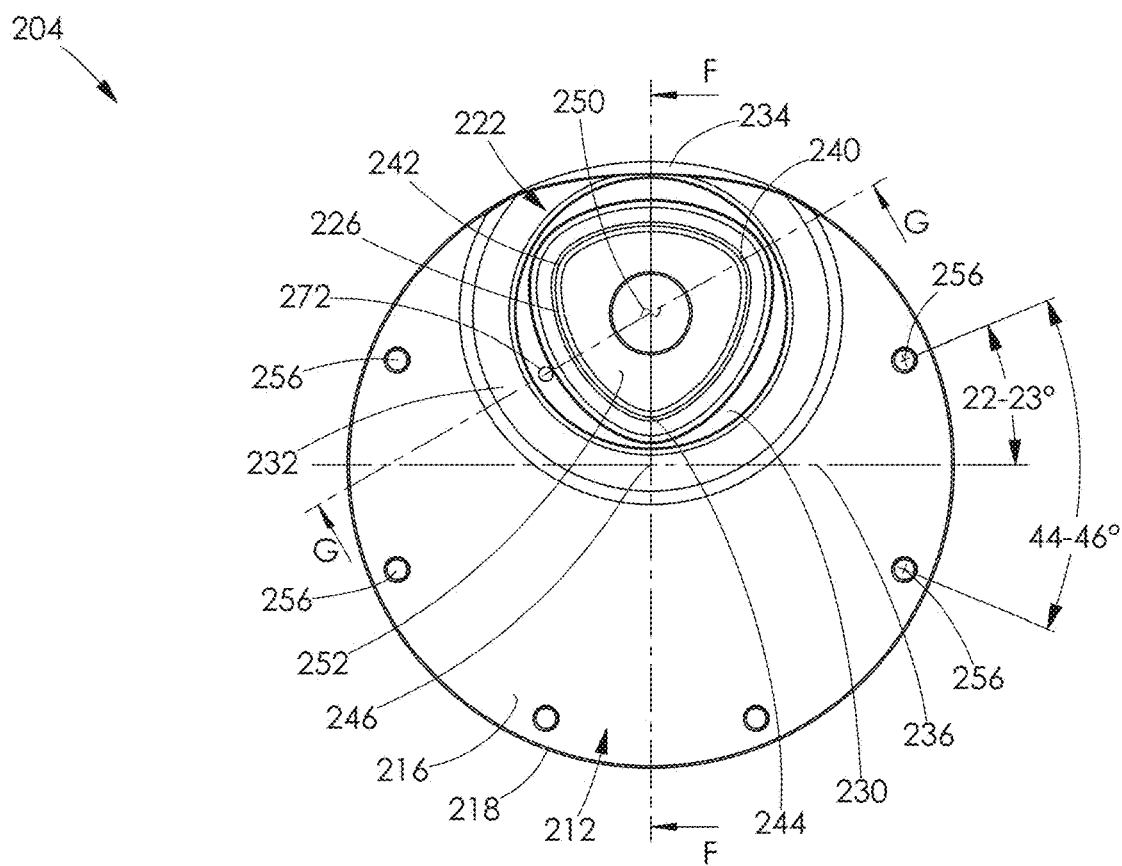
FIG. 27 is an elevational view of the second side of the first end journal shown in FIG. 24.

Turning to FIGS. 24-30, the first end journal 204 comprises a cylindrical body 212 having opposed first and second sides 214 and 216 joined by an outer rim 218. The first side 214 of the body 212 is configured to attach to a drive shaft 220, shown in FIGS. 49-50, 52, and 53, and a shank or male connection element 222 is joined to the second side 216 of the body 212, as shown in FIGS. 26 and 27. The shank connection element 222 may also be referred to as a second connection element 222 or a shank element 222.

Continuing with FIGS. 26-30, the shank element 222 is joined to the body 212 adjacent the outer rim 218 such that the shank element 222 is not centered on the body 212 and projects from or extends away from the body 212. The shank element 222 comprises a first rod journal section 224 joined to a shank 226. The first rod journal section 224 has an outer surface 228 that is cylindrical and has a greater diameter than that of the shank 226. The size difference forms an annular flange contact surface 230 between the shank 226 and the first rod journal section 224.

Continuing with FIGS. 26-30, a chamfer 232 surrounds the first rod journal section 224 and joins the first rod journal section 224 to the second side 216 of the body 212. However, a portion of the chamfer 232 is cutaway by a clearance chamfer 234. The clearance chamfer 234 extends between the first rod journal section 224 and the outer rim 218. The clearance chamfer 234 provides a transition from the first rod journal section 224 to the outer rim 218. The first rod journal section 224 and the shank 226 are positioned entirely on one side of a transverse axis 236 of the second side 216 of the body 212, while at least a portion of the chamfer 232 intersects the transverse axis 236, as shown in FIGS. 27 and 29.

Continuing with FIGS. 26 and 27, the shank 226 has a non-circular or polygonal cross-sectional shape. More specifically, the shank 226 has the cross-sectional shape of a Reuleaux triangle with radiused vertices. First, second, and third vertices 240, 242, and 244 are shown in FIG. 27. The first and second vertices 240 and 242 are both positioned adjacent the outer rim 218, while the third vertex 244 is positioned directly above or is spaced from and aligns with a centroid 246 of the second side 216 of the body 212. The shank 226 also tapers slightly between the flange contact surface 230 to a front surface 252 of the shank 226, as shown in FIGS. 29 and 30. As will be described herein, the shank 226 is configured to be installed within a receiver connection element 248 formed on one of the inner journals 202.

Continuing with FIGS. 26-30, the shank connection element 222 further comprises a first passage 250 formed therein. The first passage 250 is a straight through-bore that interconnects a flat front surface 252 of the shank 226 and the first side 214 of the body 212. The first passage 250 extends through the shank element 222 and opens into a counterbore 254 formed within the body 212, as shown in FIGS. 29 and 30. The counterbore 254 opens on the first side 214 of the body 212. As will be described herein, the first passage 250 is configured to receive one of the fasteners 208, while the counterbore 254 is configured to receive one of the three-piece nuts 210.

Figures 49, 50:
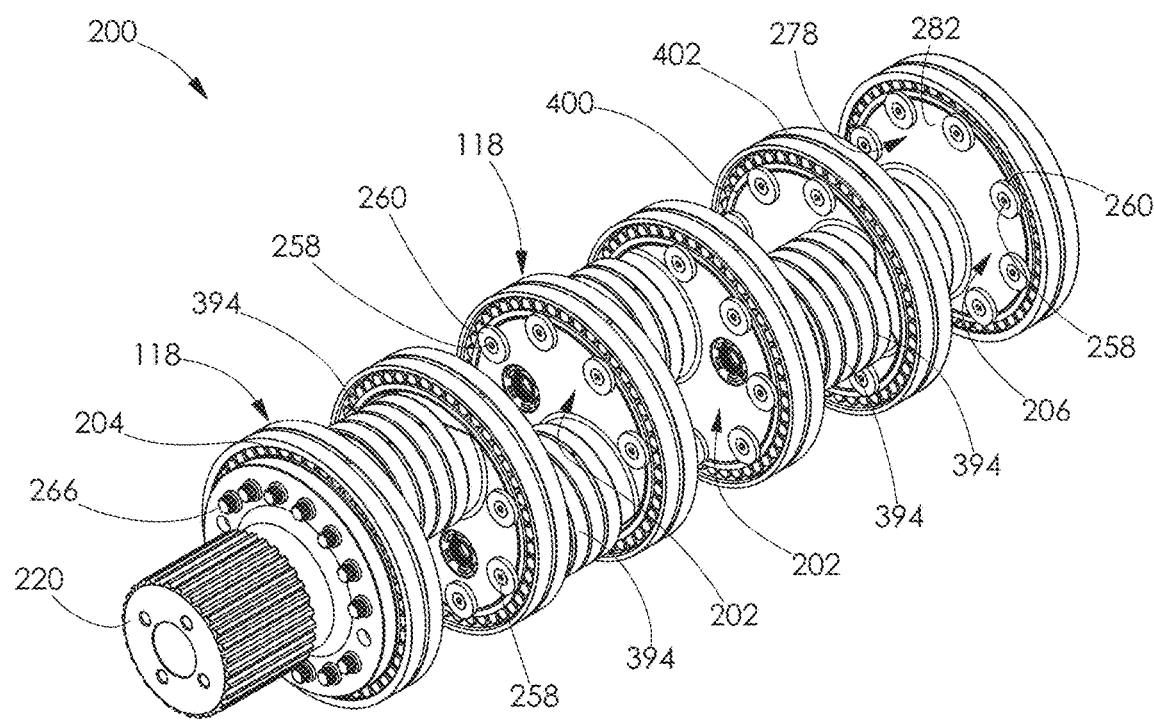
FIG. 49 is a first end perspective view of the modular crankshaft shown in FIG. 15. The crankshaft is shown installed within a plurality of roller bearings and has a driveshaft attached thereto.
FIG. 50 is a second end perspective view of the modular crankshaft, roller bearings, and drive shaft shown in FIG. 49. A lubricant swivel is also shown attached to the crankshaft.
Figure 51:
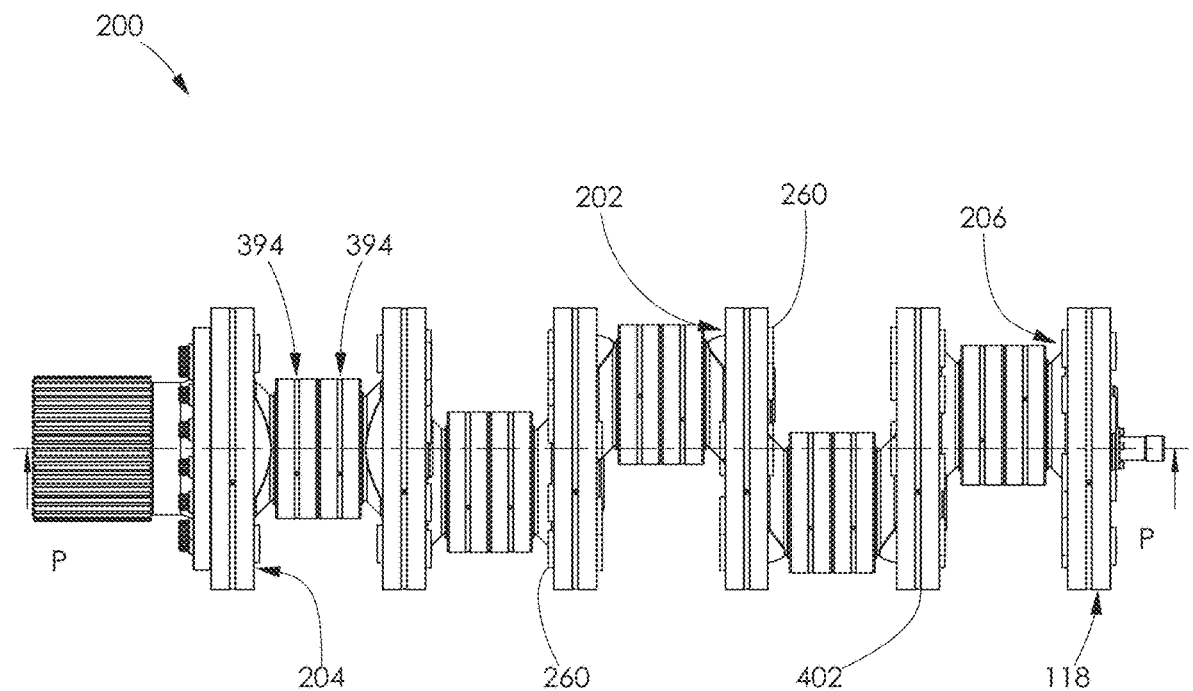
FIG. 51 is a top plan view of the modular crankshaft, roller bearings, drive shaft, and lubricant swivel shown in FIG. 49.
Figure 52:
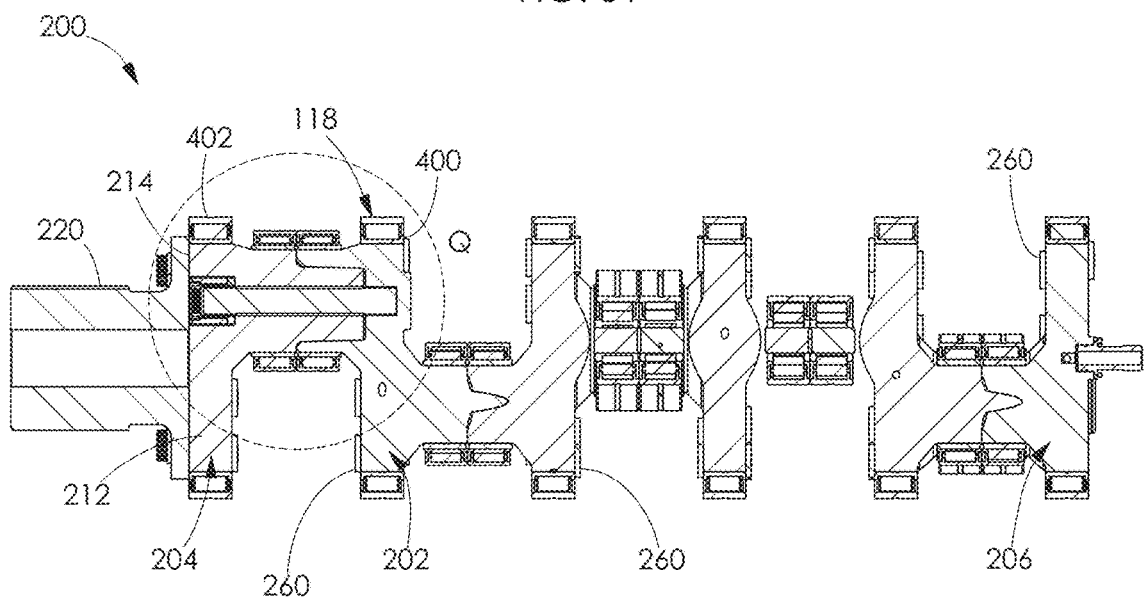
FIG. 52 is a cross-sectional view of the components shown in FIG. 51, taken along line P-P.

Continuing with FIGS. 26 and 27, the second side 216 of the body 212 further comprises a plurality of retainer mounting holes 256. Each mounting hole 256 is a threaded blind bore that is configured to receive a fastener 258 used to secure a retainer 260 to the second side 216 of the body 212, as shown in FIG. 50. As shown in FIG. 50, each retainer 260 is configured to hold the shank journal 204 within a corresponding roller bearing 118. Six mounting holes 256 are shown in FIG. 27. Except for the space occupied by the chamfer 232 and the clearance chamfer 234, the mounting holes 256 are spaced around the periphery of the second side 216 of the body 212. The mounting holes 256 are spaced circumferentially around the periphery such that adjacent mounting holes 256 are about 44-46 degrees apart from one another. The mounting holes 256 positioned on opposite sides of the chamfer 232 may be positioned about 22-23 degrees above the transverse axis 236 of the second side 216 of the body 212.

Turning back to FIGS. 24 and 25, the first side 214 of the body 212 further comprises a plurality of drive shaft mounting holes 264. The drive shaft mounting holes 264 are threaded blind bores configured to receive a plurality of fasteners 266 used to secure the drive shaft 220 to the first side 214 of the body 212, as shown in FIG. 49. The drive shaft mounting holes 264 are circumferentially spaced around the periphery of the first side 214. Fourteen mounting holes 264 are shown in FIG. 25. Except for the space occupied by two drive shaft alignment dowel holes 268 located opposite one another on the periphery of the first side 214, the mounting holes 264 are circumferentially spaced about 22-23 degrees apart from one another. The drive shaft alignment dowel holes 268 are configured to receive alignment dowels 270 used to properly align the drive shaft 220 on the first side 214 of the shank journal 204, as shown in FIG. 54.

In alternative embodiments, the first end or shank journal 202 may comprise a different number of retainer mounting holes 256 and/or drive shaft mounting holes 264 than that shown in the figures. Likewise, the mounting holes 256 and 264 may be spaced differently than that shown in the figures.

Figure 18:
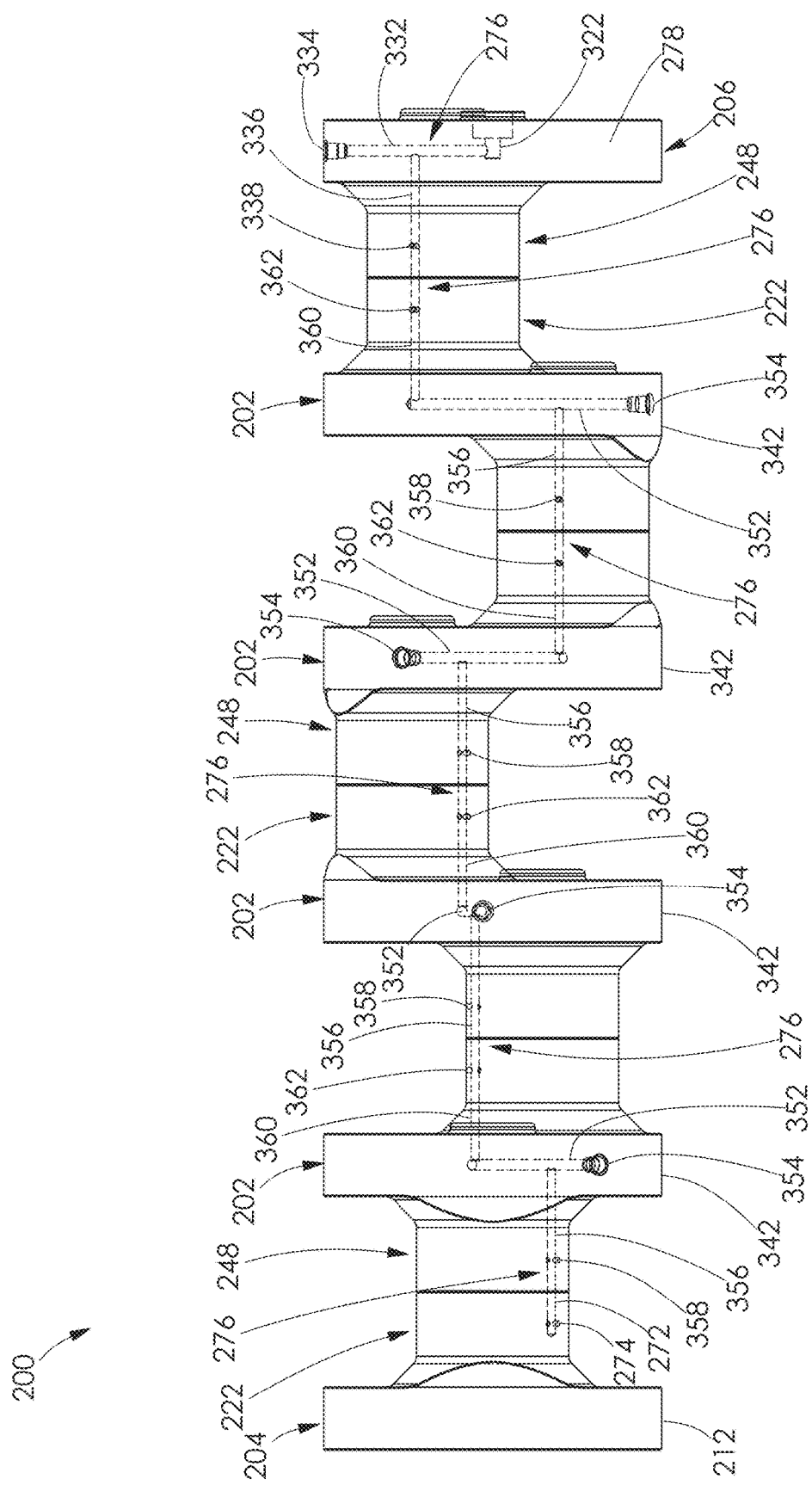
FIG. 18 is a top plan view of the modular crankshaft shown in FIG. 15 with a lubricant passageway shown formed therein by hidden lines.
Figure 19:
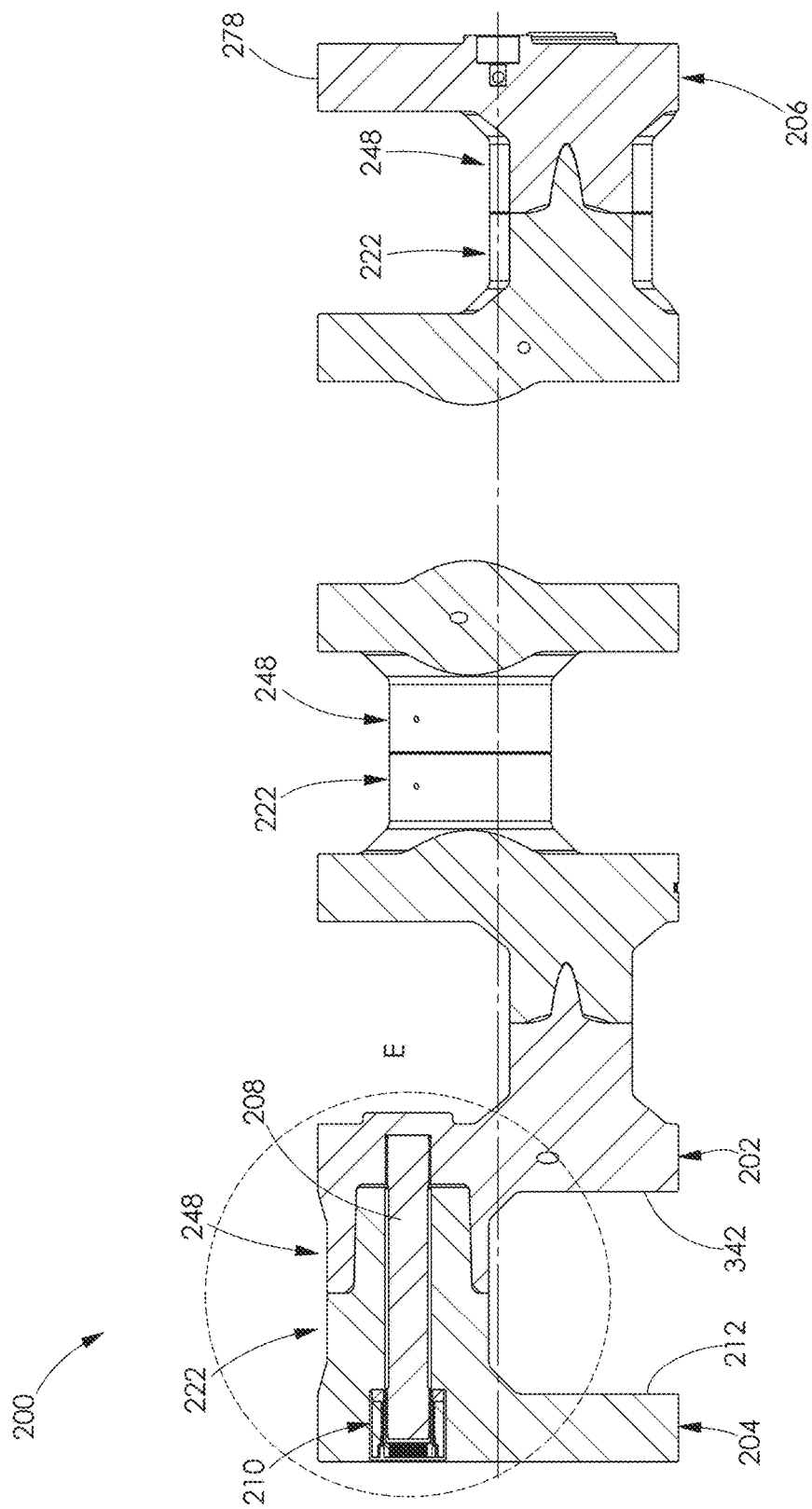
FIG. 19 is a cross-sectional view of the modular crankshaft shown in FIG. 17, taken along line D-D.

With reference to FIG. 30, the first end or shank journal 204 further comprises a plurality of lubricant passages formed therein. A first passage 272 extends partially through first rod journal section 224 and opens on the flange contact surface 230, as also shown in FIG. 27. A second passage 274 branches off from the first passage 272 at a right angle and opens on the outer surface 228 of the first rod journal section 224. As will be described herein, the first passage 272 joins other lubricant passages formed within the inner journals 202 and the second end journal 206 to form a lubricant passageway 276, as shown in FIG. 18. The lubricant passageway 276 terminates at an end of the first passage 272, as shown in FIG. 18. No lubricant passages are formed within the body 212 of the first end journal 204.

Figure 31:
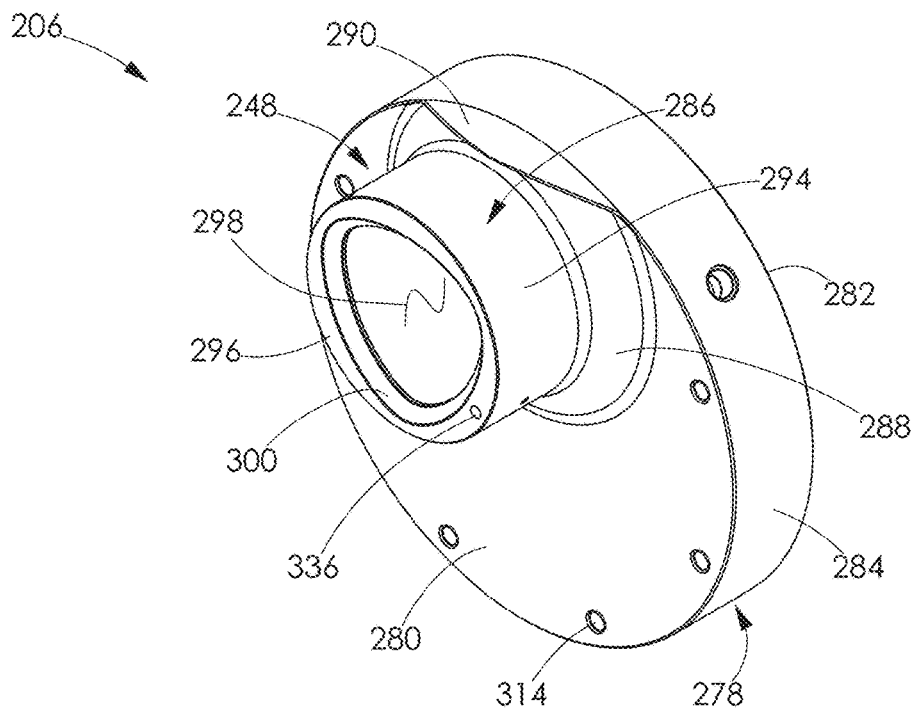
FIG. 31 is a perspective view of the first side of the second end journal used with the modular crankshaft shown in FIG. 15.
Figure 32:
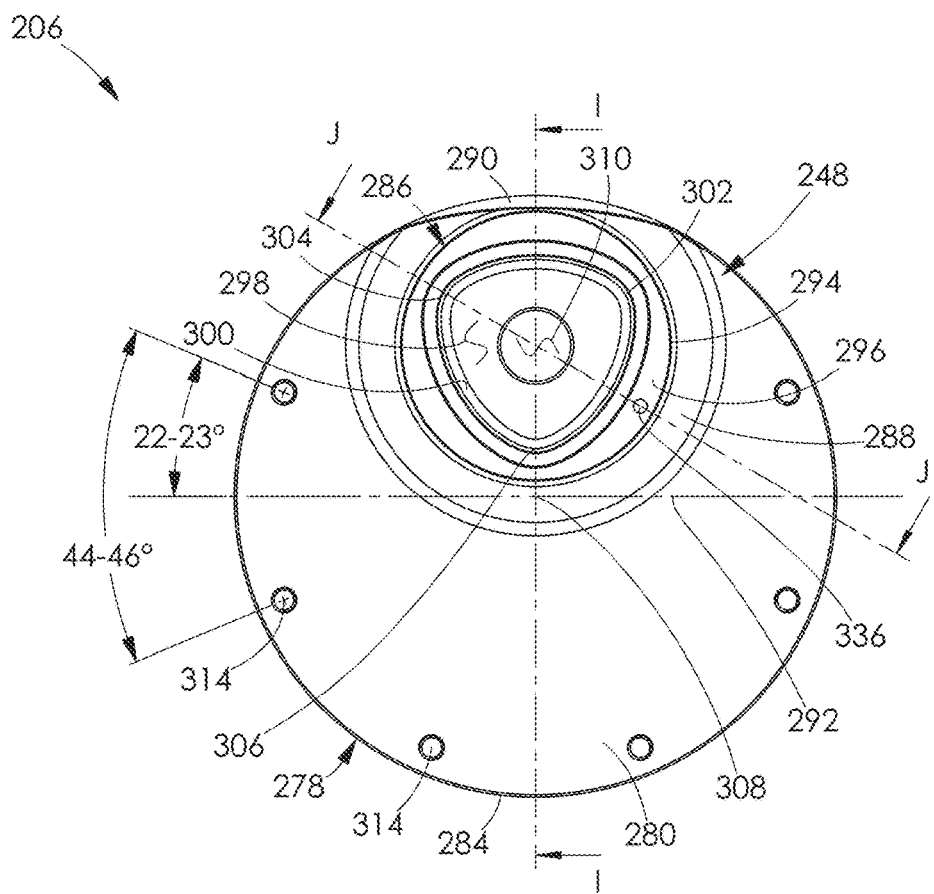
FIG. 32 is an elevational view of the first side of the second end journal shown in FIG. 31.

Turning now to FIGS. 31-38, the second end journal or receiver journal 206 comprises a cylindrical body 278 having opposed first and second sides 280 and 282 joined by an outer rim 284. A female or receiver connection element 248 is joined to the first side 280, as shown in FIGS. 31 and 32. The receiver connection element 248 may also be referred to as a first connection element 248 or a receiver element 248.

Continuing with FIGS. 31 and 32, the receiver element 248 comprises a second rod journal section 286 joined to and projecting from or extending away from the first side 280 of the body 278. A chamfer 288 surrounds the second rod journal section 286 and joins the second rod journal section 286 to the first side 280 of the body 278. However, a portion of the chamfer 288 is cutaway by a clearance chamfer 290 that extends between the outer rim 284 and the second rod journal section 286. The clearance chamfer 290 provides a transition from the second rod journal section 286 to the outer rim 284. The second rod journal section 286 is positioned entirely on one side of a transverse axis 292 of the first side 280 of the body 278, while at least a portion of the chamfer 288 intersects the transverse axis 292, as shown in FIGS. 32 and 37.

Continuing with FIGS. 31, 32, 37 and 38, the second rod journal section 286 has a cylindrical outer surface 294 and comprises a flat front surface 296 having a non-circular or polygonal shaped opening 298 formed therein. The opening 298 is joined to the front surface 296 by a chamfer 300 and is shaped to conform to the shape of the shank 226. Specifically, the opening 298 has the shape of a Reuleaux triangle with radiused vertices. Like the shank 226, first and second vertices 302 and 304 are positioned adjacent the outer rim 284, while a third vertex 306 is positioned directly above or is spaced from and aligns with a centroid 308 of the first side 280 of the body 278, as shown in FIG. 32. The opening 298 is also shaped to match the slight taper of the shank 226.

Figure 37:
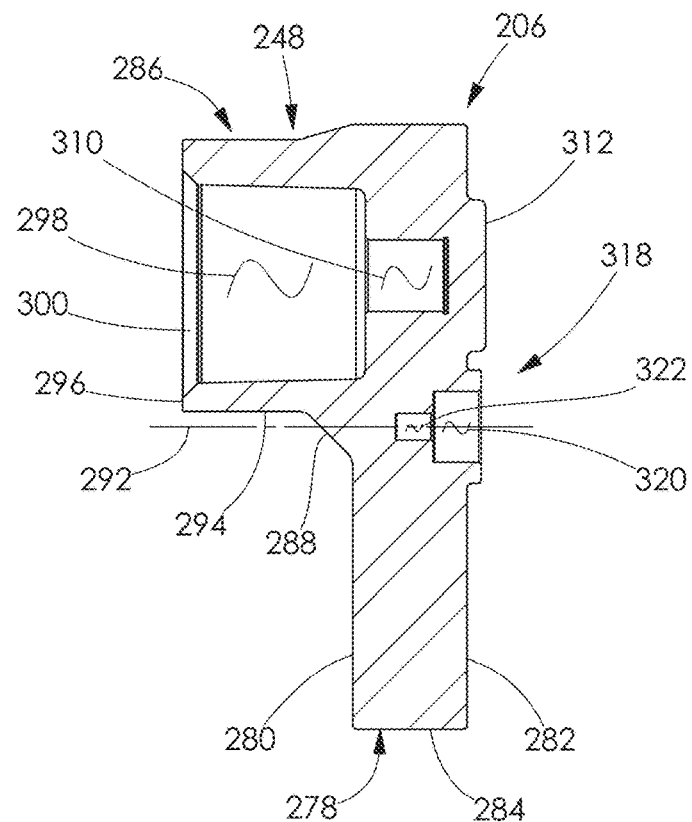
FIG. 37 is a cross-sectional view of the second end journal shown in FIG. 32, taken along line I-I.
Figure 38:
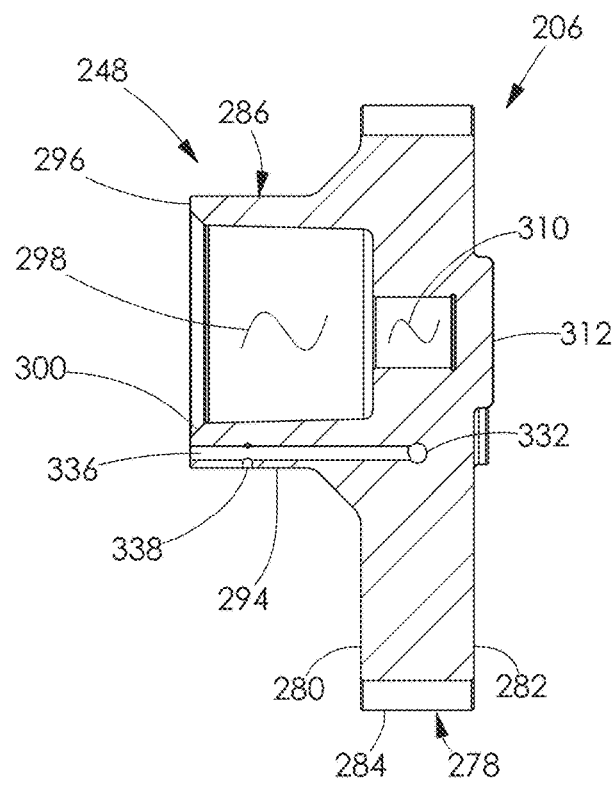
FIG. 38 is a cross-sectional view of the second end journal shown in FIG. 32, taken along line J-J.

Continuing with FIGS. 37 and 38, the opening 298 extends through the receiver element 248 and opens into a second passage 310 formed in the body 278. The second passage 310 is a threaded blind bore. As will be described herein, the second passage 310 is configured to receive a portion of one of the fasteners 208. A boss 312 is formed on the second side 282 of the body 278 that aligns with the second passage 310. The boss 312 provides extra wall thickness, thereby providing more strength to the receiver journal 206 between the second passage 310 and the second side 282 of the body 278.

Turning back to FIGS. 31 and 32, the first side 280 of the body 278 further comprises a plurality of retainer mounting holes 314. Each mounting hole 314 is a threaded blind bore that is configured to receive one of the fasteners 258 used to secure one of the retainers 260 to the second side 282 of the body 278, as shown in FIG. 49. The retainers 260 hold the receiver journal 206 within a corresponding bearing assembly 118. Six mounting holes 314 are shown in FIG. 32. Except for the space occupied by the chamfer 288 and the clearance chamfer 290, the mounting holes 314 are spaced around the periphery of the first side 280 of the body 278. The mounting holes 314 are positioned in the same manner as the mounting holes 256 formed on the second side 216 of the shank journal 204. In alternative embodiments, more or less than six mounting holes 314 may be formed in the first side 280 and the mounting holes 314 may be spaced differently from those shown in FIGS. 31 and 32.

Figure 33:
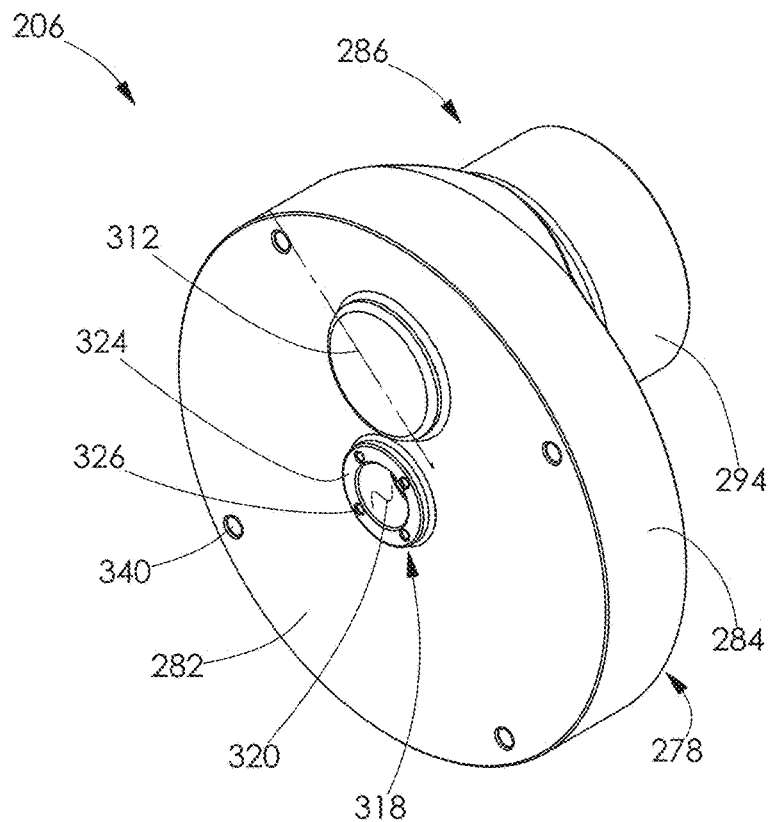
FIG. 33 is a perspective view of the second side of the second end journal shown in FIG. 31.
Figure 34:
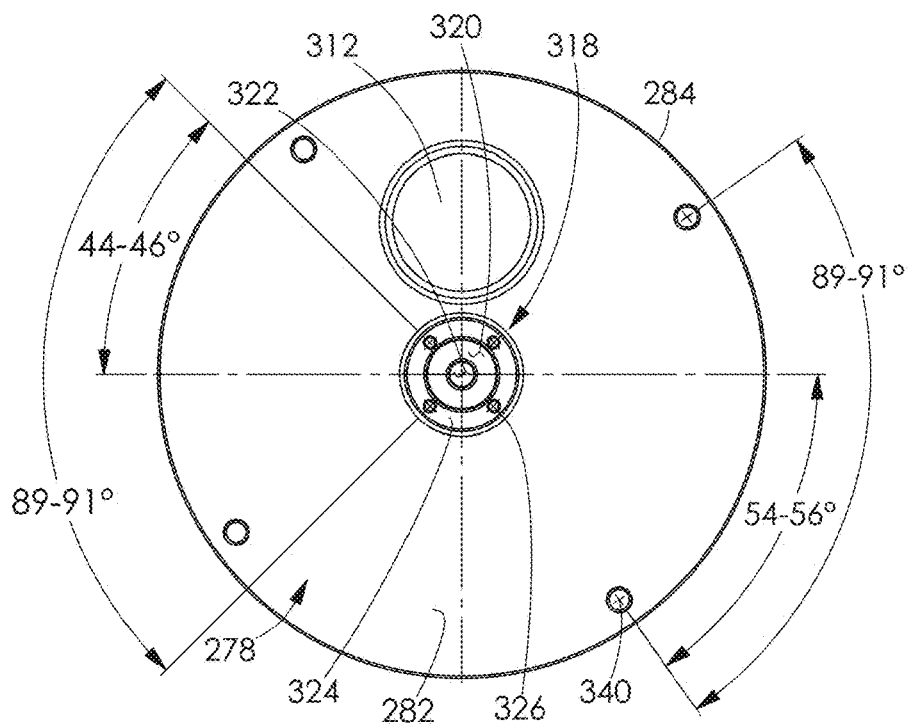
FIG. 34 is an elevational view of the second side of the second end journal shown in FIG. 31.

Turning to FIGS. 33, 34, and 37, the second side 282 of the receiver journal 206 further comprises a lubricant port 318 at the center of the second side 282. The lubricant port 318 comprises a counterbore 320 that opens into a blind bore 322 formed within the body 278, as shown in FIG. 37. An opening of the counterbore 320 on the second side 282 of the body 278 is surrounded by a circular boss 324 having a plurality of mounting holes 326 formed therein. The mounting holes 326 are configured to receive fasteners 328 used to attach a lubricant swivel 330 to the receiver journal 206, as shown in FIG. 50. Lubricant is delivered to the lubricant passageway 276 formed within the crankshaft 200 through the swivel 330.

Figure 35:
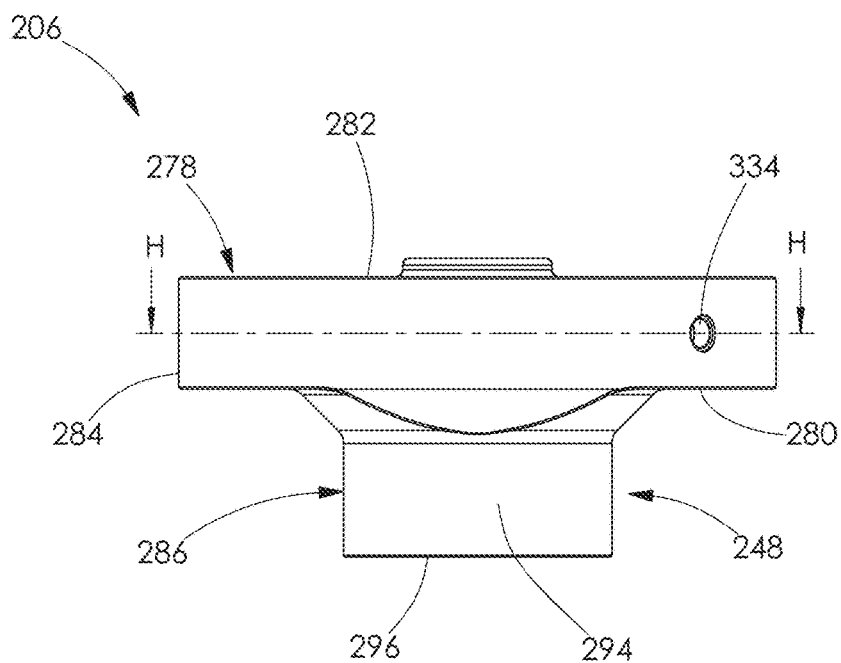
FIG. 35 is a top plan view of the second end journal shown in FIG. 31.
Figure 36:
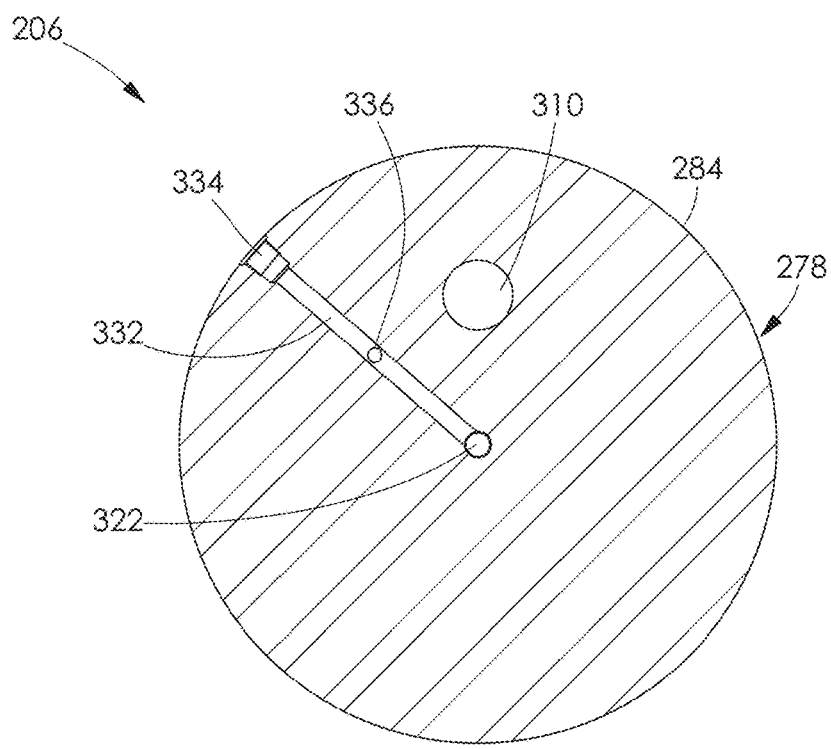
FIG. 36 is a cross-sectional view of the second end journal shown in FIG. 35, taken along line H-H.

Continuing with FIGS. 35, 36, and 38, a plurality of lubricant passages are formed within the receiver journal 206. A first passage 332 extends radially within the body 278 and interconnects the blind bore 322 and a plug bore 334 that opens on the outer rim 284, as shown in FIG. 36. As shown in FIG. 18, the blind bore 322 and the first passage 332 form the start of the lubricant passageway 276. A second passage 336 joins the first passage 332 at a right angle and extends through the receiver element 248 and opens on the front surface 296 of the second rod journal section 286, as shown in FIG. 38 and also shown in FIGS. 31 and 32. A third passage 338 joins the second passage 336 at a right angle and opens on the outer surface 294 of the second rod journal section 286, as shown in FIG. 38.

Turning back to FIGS. 33 and 34, the second side 282 of the body 278 further comprises a plurality of retainer mounting holes 340 circumferentially and equally spaced around the periphery of the second side 282. Like the mounting holes 314, the mounting holes 340 are configured to receive fasteners 258 used to secure retainers 260 to the receiver journal 206, as shown in FIG. 50. Four mounting holes 340 are shown in FIGS. 33 and 34. In alternative embodiments, more or less than four mounting holes 340 may be formed in the second side 282 and the mounting holes 340 may be spaced differently from those shown in FIG. 34.

Figure 39:
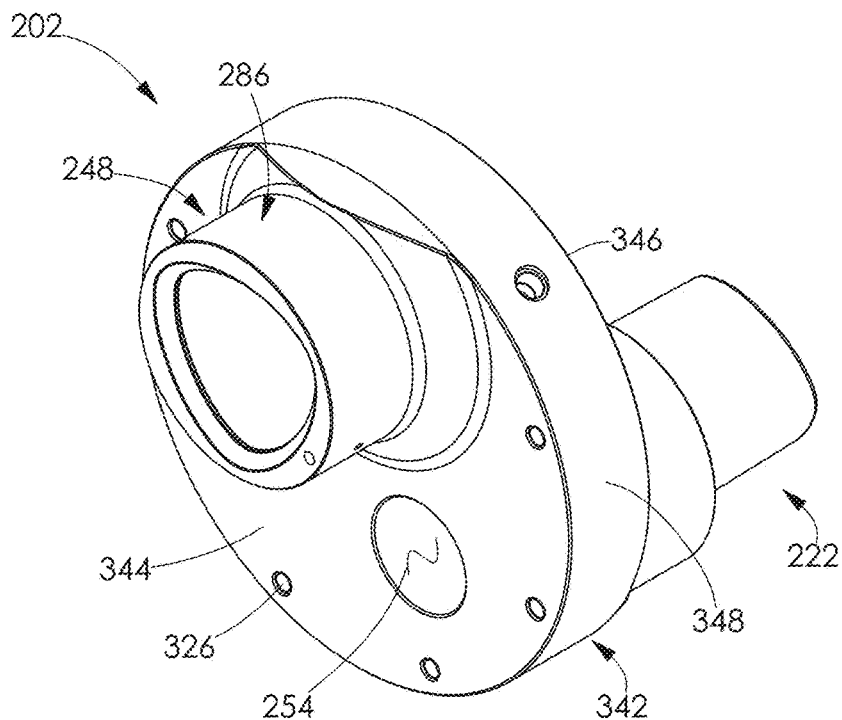
FIG. 39 is a perspective view of the first side of an inner journal used with the modular crankshaft shown in FIG. 15.
Figure 40:
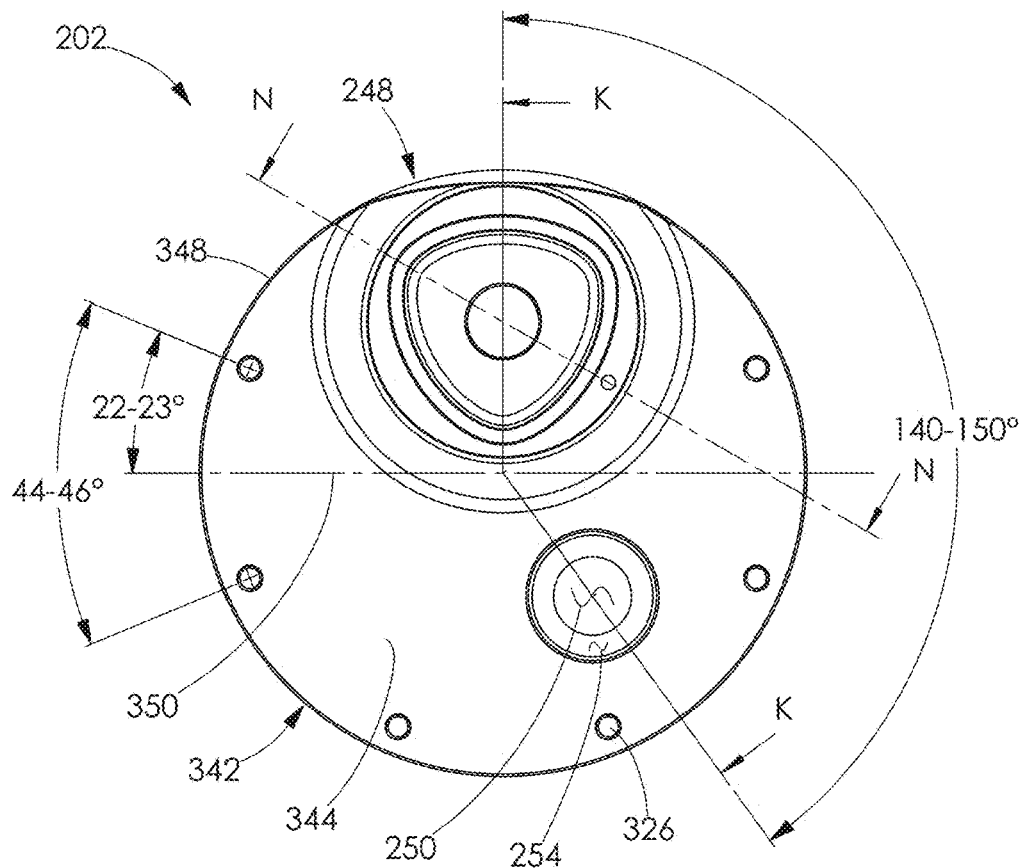
FIG. 40 is an elevational view of the first side of the inner journal shown in FIG. 39.
Figure 41:
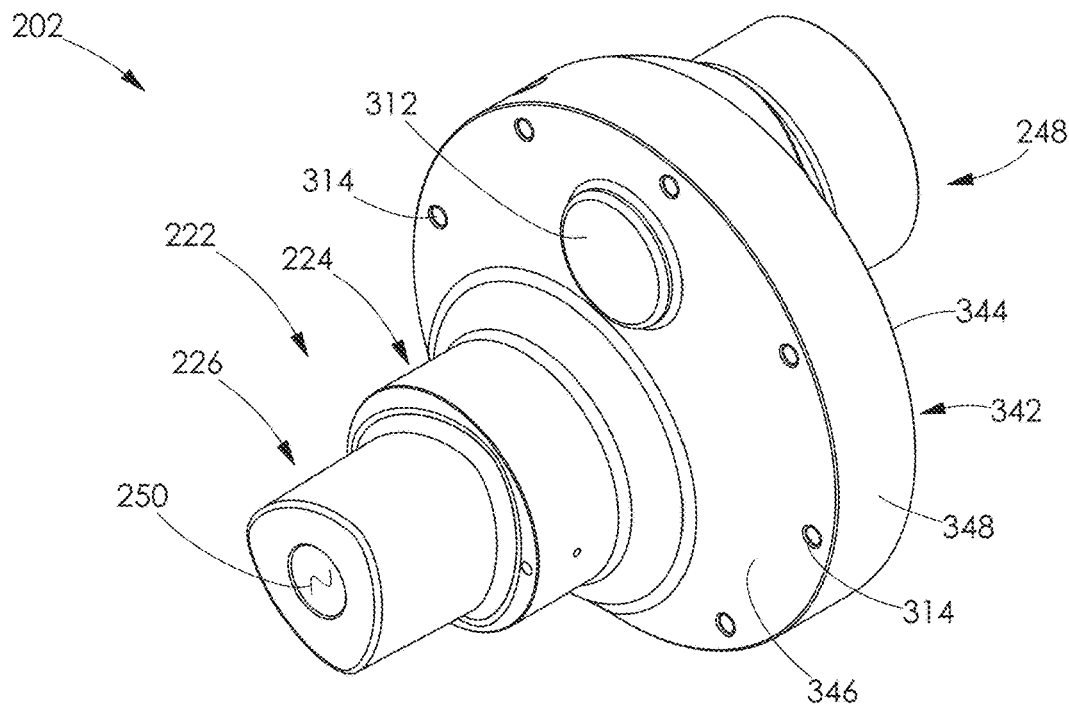
FIG. 41 is a perspective view of the second side of the inner journal shown in FIG. 39.
Figure 42:
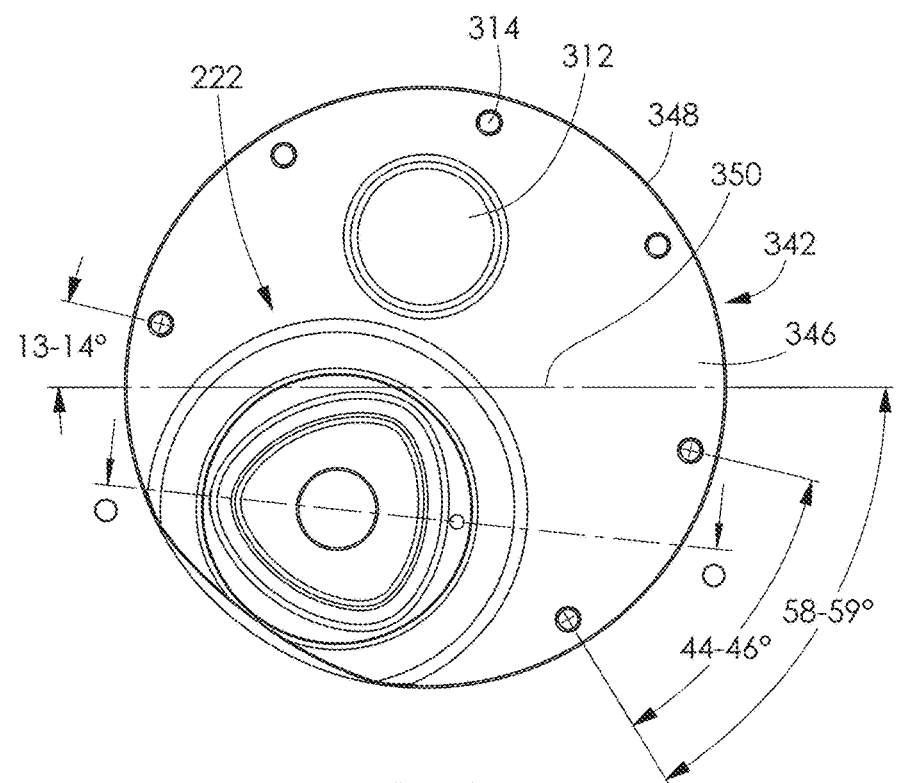
FIG. 42 is an elevational view of the second side of the inner journal shown in FIG. 39.
Figure 43:
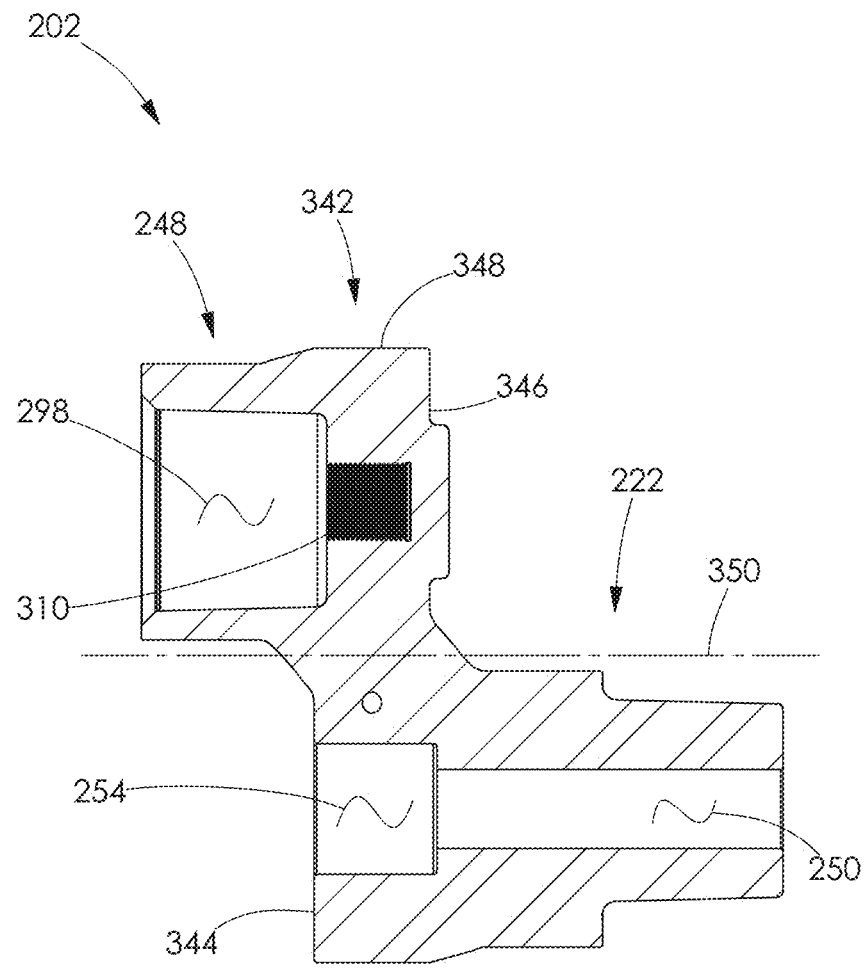
FIG. 43 is a cross-sectional view of the inner journal shown in FIG. 40, taken along line K-K.

Turning now to FIGS. 39-48, each inner journal 202 comprises a cylindrical body 342 having opposed first and second sides 344 and 346 joined by an outer rim 348. The same receiver element 248 joined to the first side 280 of the receiver journal 206 is also joined to the first side 344 of each inner journal 202, as shown in FIGS. 39 and 40. Likewise, the same shank element 222 joined to the second side 216 of the shank journal 204 is also joined to the second side 346 of each inner journal 202, as shown in FIGS. 41 and 42. The receiver element 248 and the shank element 222 are positioned offset from one another. The receiver element 248 is positioned on one side of a transverse axis 350 of the body 342 while the shank element 222 is positioned on the other side of the transverse axis 350, as shown in FIGS. 40, 42, and 43.

Continuing with FIGS. 39-42, the first side 344 of the body 342 further comprises an opening of the counterbore 254 and the plurality of retainer mounting holes 326 circumferentially spaced around the periphery of the first side 344 of the body 342, as shown in FIGS. 39 and 40. The second side 346 of the body 342 further comprises the boss 312 and the plurality of retainer mounting holes 314 circumferentially spaced around the periphery of the second side 346 of the body 342, as shown in FIGS. 41 and 42.

Figure 44:
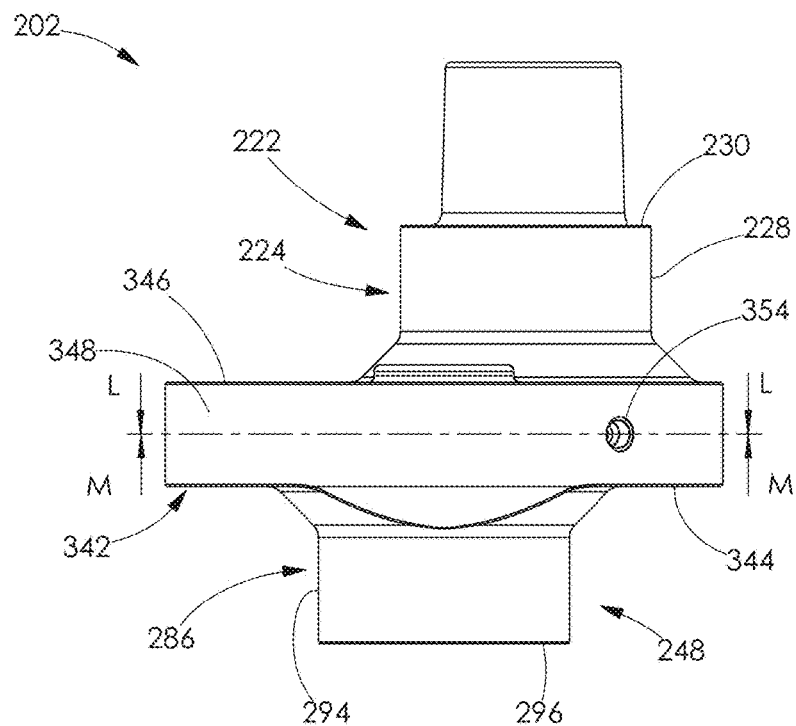
FIG. 44 is a top plan view of the inner journal shown in FIG. 39.
Figures 45, 46:
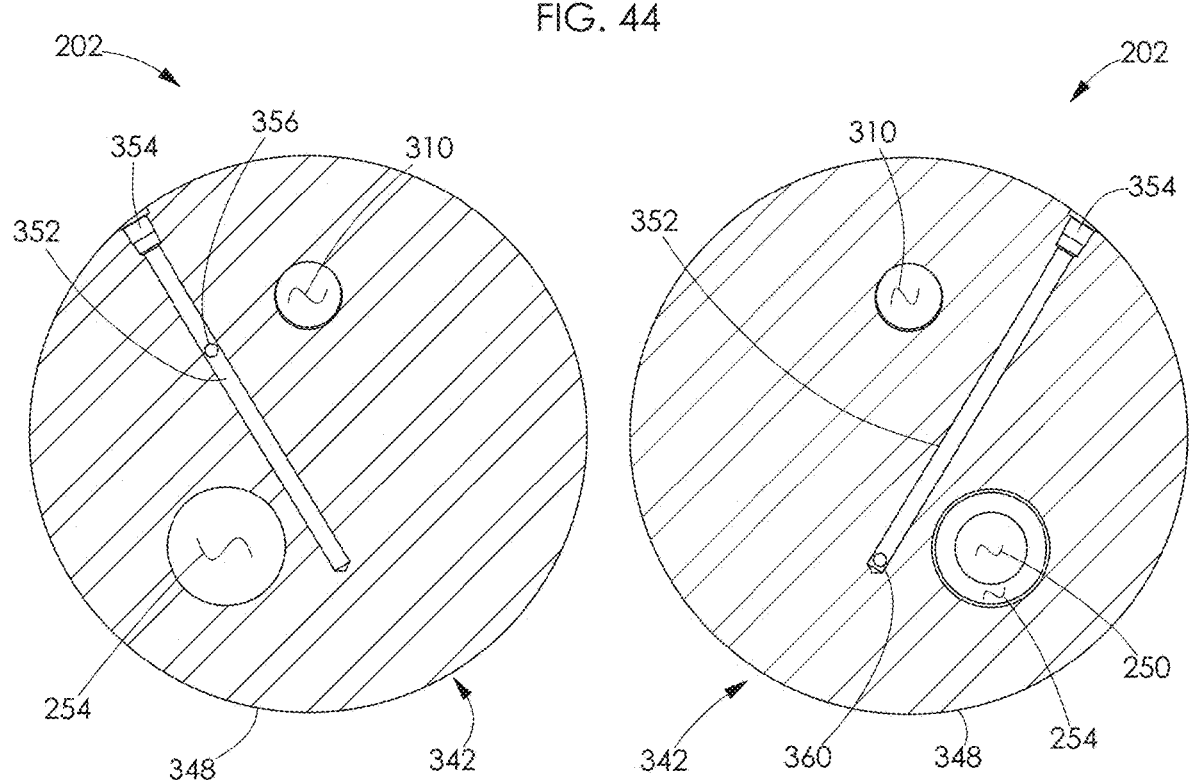
FIG. 45 is a cross-sectional view of the inner journal shown in FIG. 44, taken along line L-L.
FIG. 46 is a cross-sectional view of the inner journal shown in FIG. 44, taken along line M-M.
Figure 47:
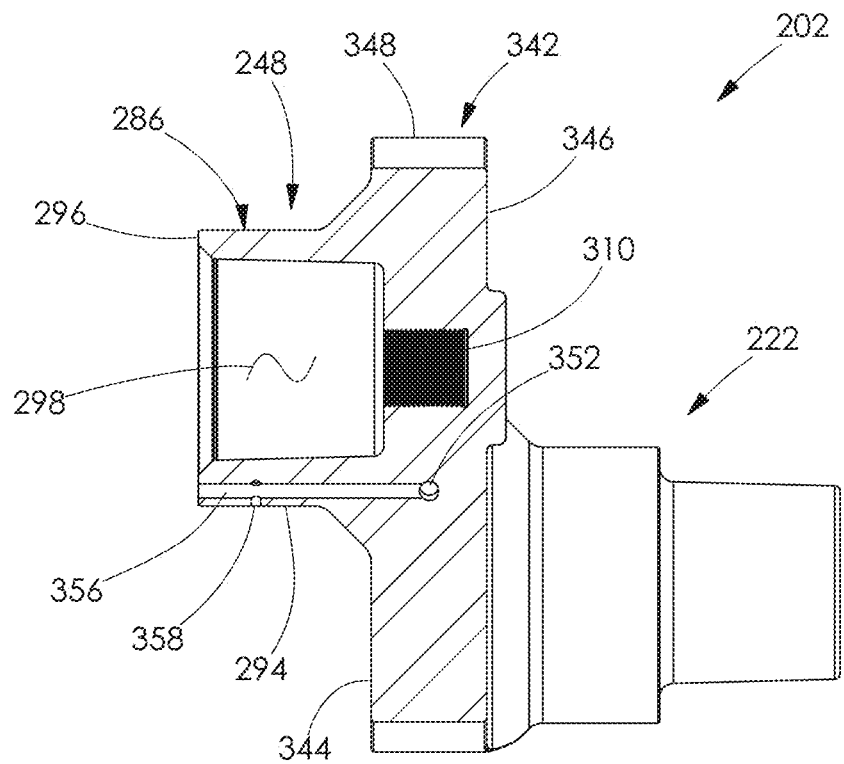
FIG. 47 is a cross-sectional view of the inner journal shown in FIG. 40, taken along line N-N.
Figure 48:
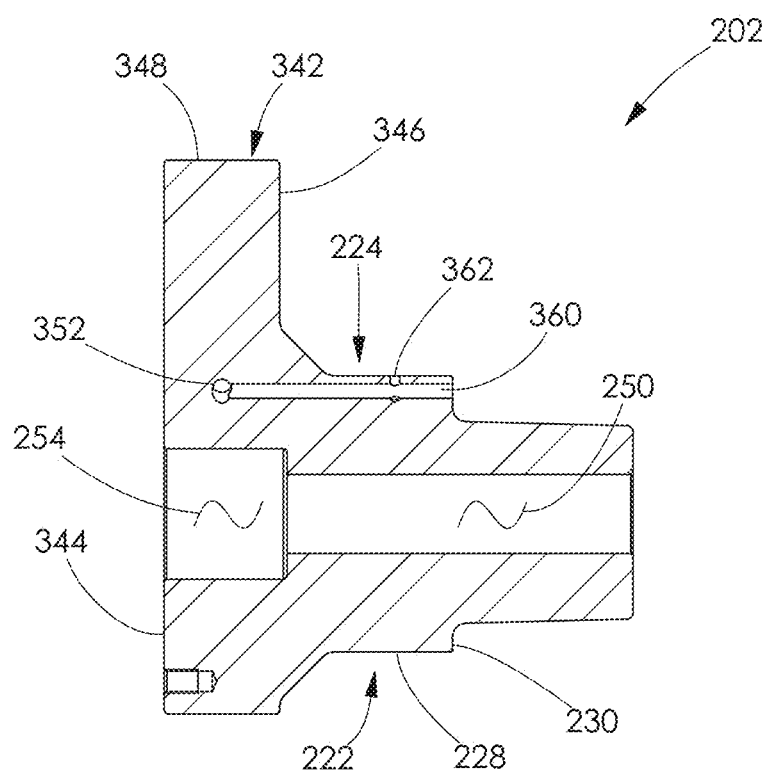
FIG. 48 is a cross-sectional view of the inner journal shown in FIG. 42, taken along line O-O.

Turning to FIGS. 44-48, a plurality of lubricant passages are also formed within the inner journal 202. A first passage 352 extends radially through the body 342 and opens into a plug bore 354 that opens on the outer rim 348, as shown in FIGS. 44-46. A second passage 356 joins the first passage 352 at a right angle and extends through the receiver element 248 and opens on the front surface 296 of the second rod journal section 286, as shown in FIGS. 45 and 47. A third passage 358 branches off from the second passage 356 at a right angle and opens on the outer surface 294 of the second rod journal section 286, as shown in FIG. 47. A fourth passage 360 joins the first passage 352 at a right angle and extends through the first rod journal section 224 of the shank element 222 and opens on the flange contact surface 230, as shown in FIGS. 46 and 48. A fifth passage 362 branches off from the fourth passage 360 at a right angle and opens on the outer surface 228 of the first rod journal section 224, as shown in FIG. 48. Such passages are shown within the lubricant passageway 276 in FIG. 18.

Turning back to FIGS. 19-22, to assemble the crankshaft 200, the shank element 222 of the shank journal 204 is brought together with the receiver element 248 of one of the inner journals 202. When brought together, the shank 226 is installed within the opening 298 until the flange contact surface 230 of the first rod journal section 224 abuts the front surface 296 of the second rod journal section 286 and the first passage 250 aligns with the second passage 310. The abutting first and second rod journal sections 224 and 286 together form a connecting rod journal 364.

Figure 20:
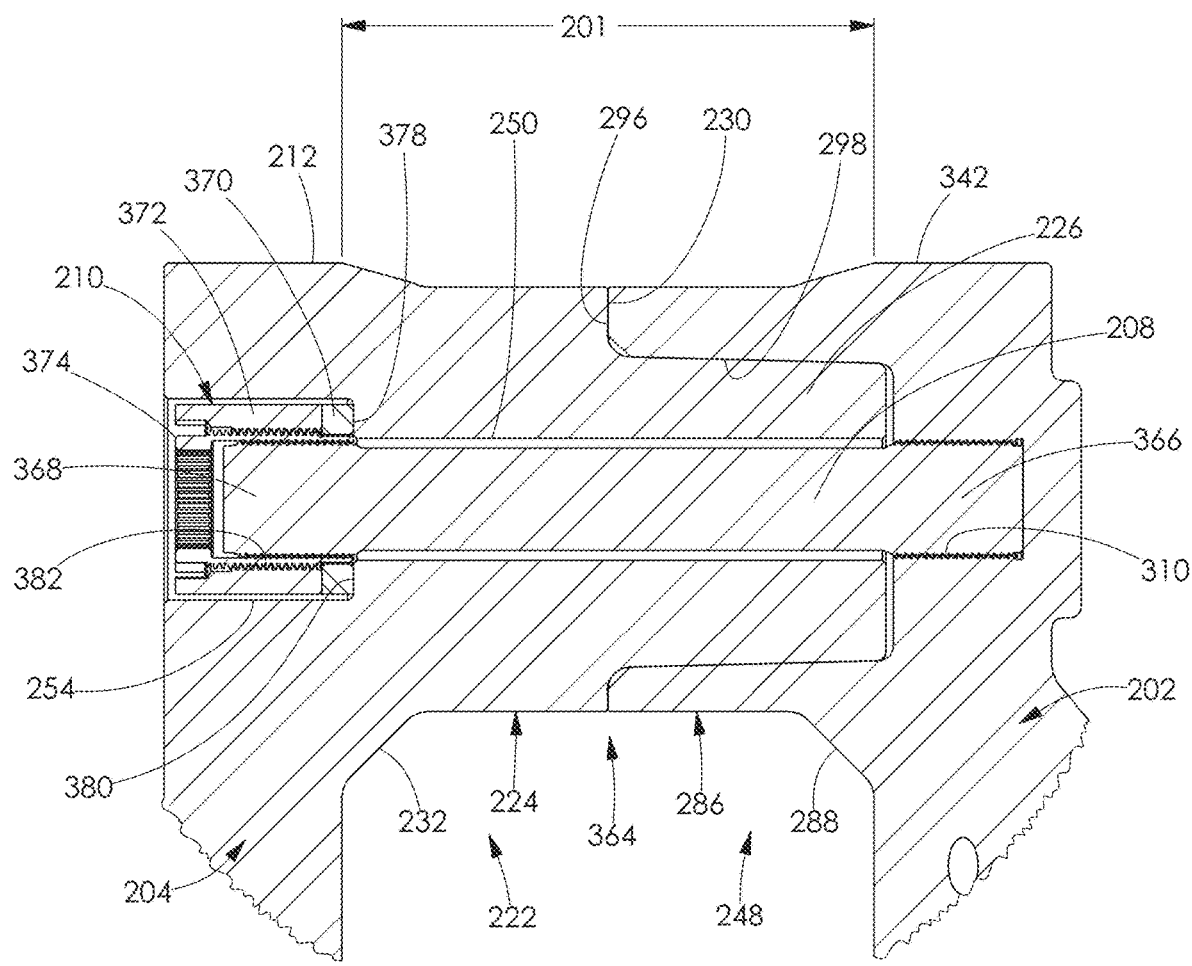
FIG. 20 is an enlarged view of area E shown in FIG. 19.
Figure 21:
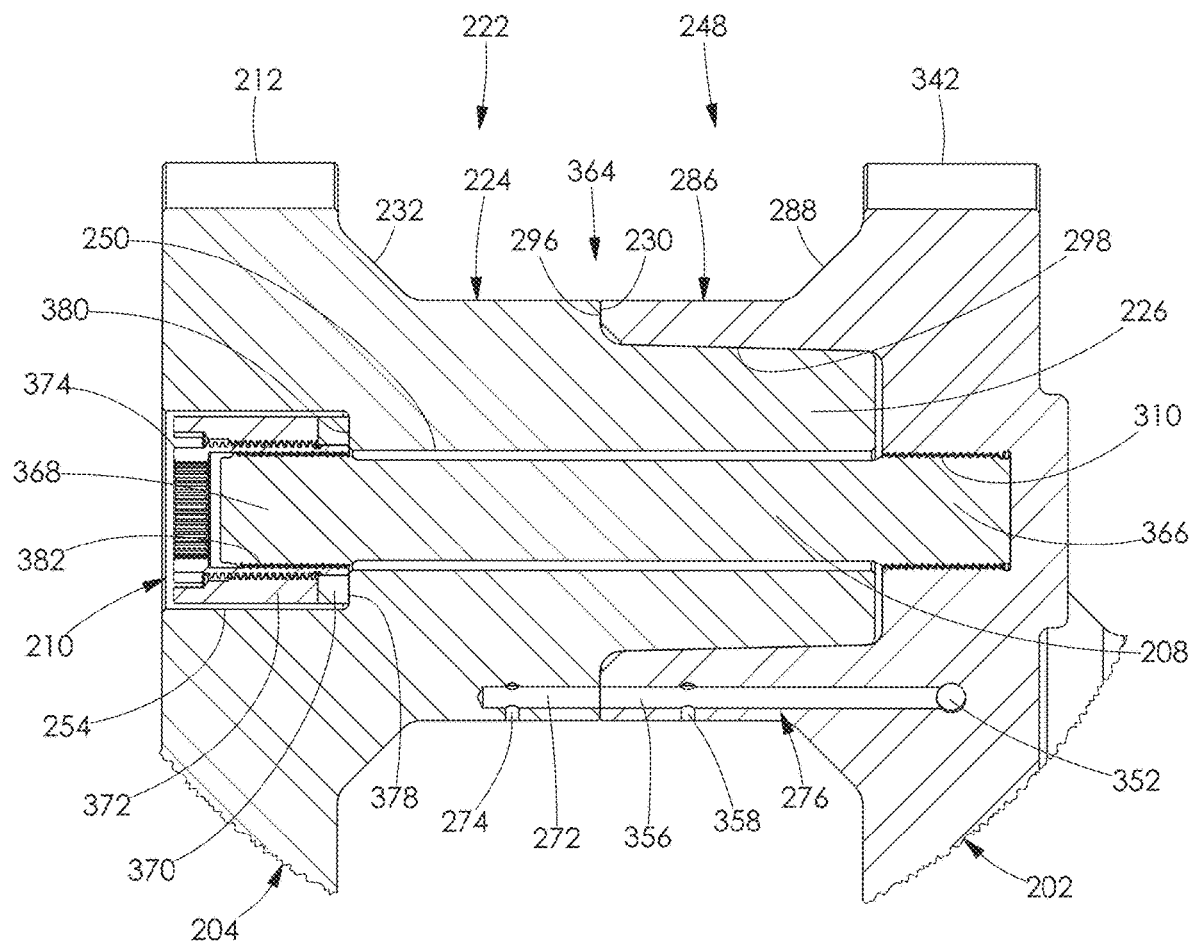
FIG. 21 is an enlarged view of area E shown in FIG. 19 but taken along a different cross-sectional line so as to expose a portion of the lubricant passageway shown in FIG. 18.
Figure 22:
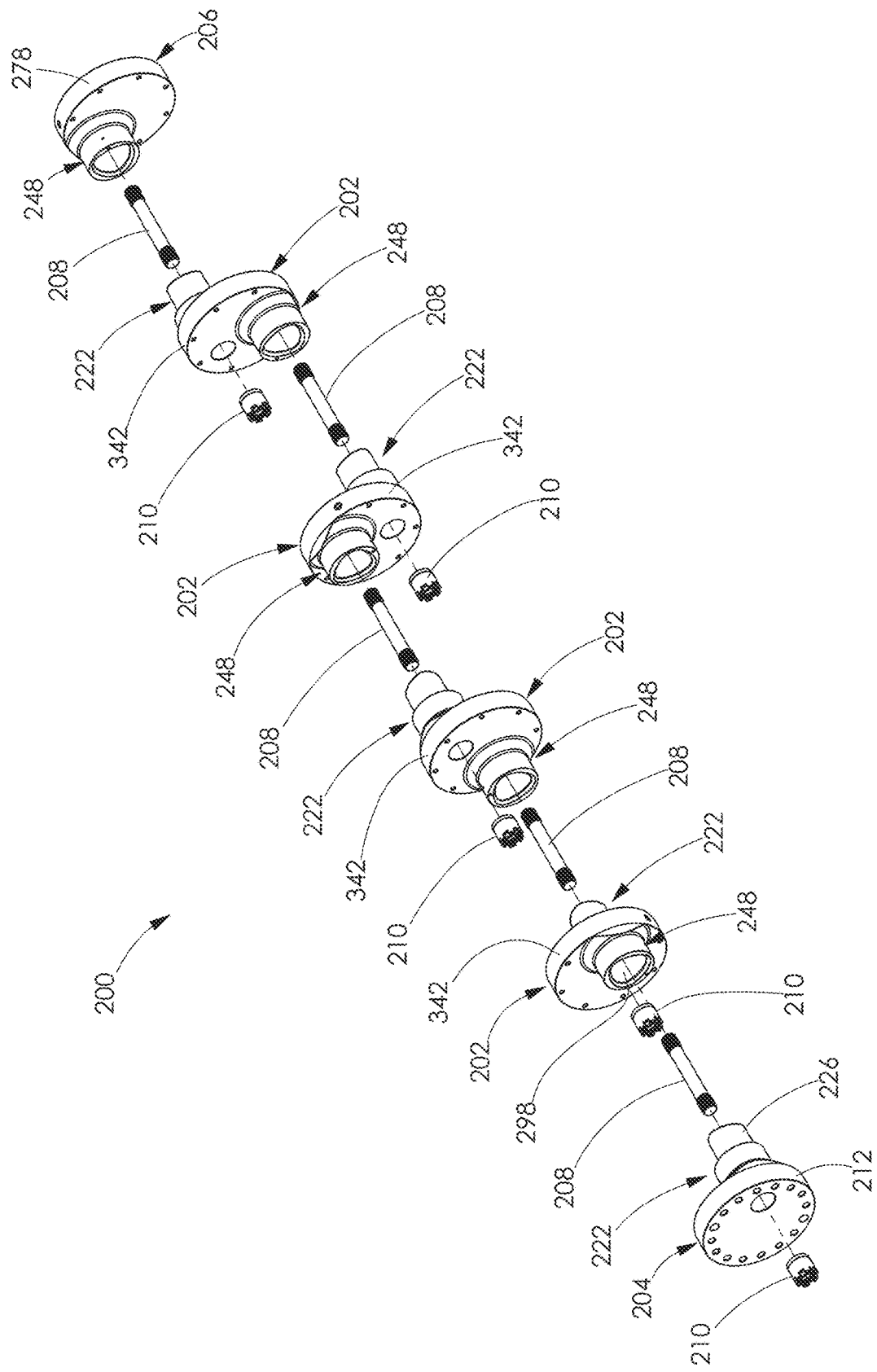
FIG. 22 is a first end perspective and exploded view of the modular crankshaft shown in FIG. 15.

Continuing with FIGS. 20 and 21, a fastener 208 is then inserted through the counterbore 254 until a first threaded end 366 of the fastener 208 mates with the threads formed in the second passage 310. The fastener 208 is turned until the first end 366 is secured within the second passage 310 and a second threaded end 368 of the fastener 208 is disposed within the counterbore 254. A three-piece nut 210 is then installed on the second end 368 of the fastener 208 and turned until the nut 210 is attached to the fastener 208 and fully recessed within the counterbore 254. The fastener 208 and corresponding nut 210 secure the shank journal 204 to the inner journal 202. When secured thereto, the fastener or tension rod 208 extends between the cylindrical bodies 212 and 342 of the shank journal 204 and the inner journal 202.

Figure 23:
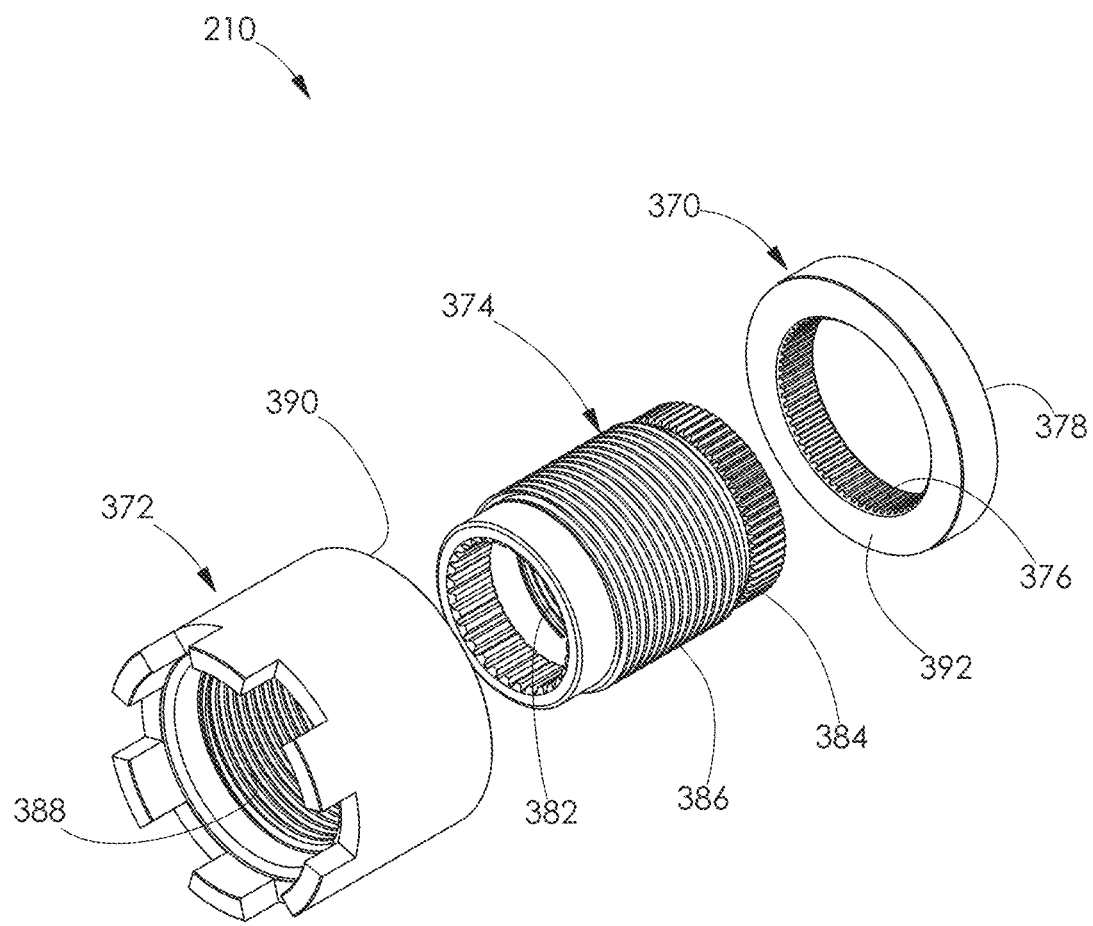
FIG. 23 is a front perspective and exploded view of a three-piece nut shown in FIGS. 20-22.
Figure 24:
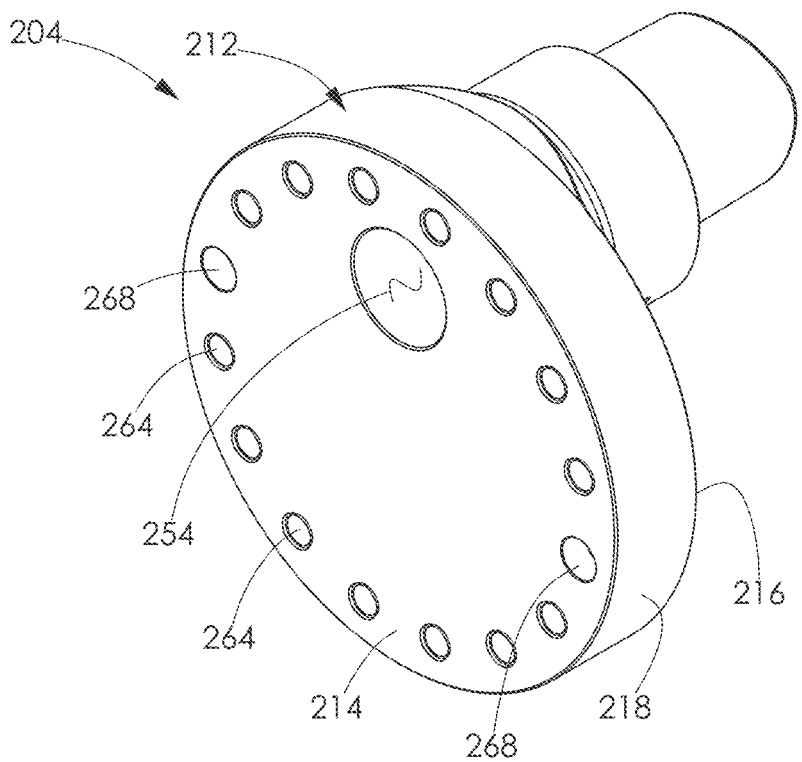
FIG. 24 is a perspective view of the first side of the first end journal used with the modular crankshaft shown in FIG. 15.

Turning to FIG. 23, the three-piece nut 210 may also be referred to as a three-piece fastener, a torque nut, or a castle nut 210. The nut 210 comprises a washer 370, an outer castle nut 372, and an inner nut 374. The washer 370 has a smooth outer surface and a splined inner surface 376. When positioned over the second end 368 of the fastener 208, a flat rear surface 378 of the washer 370 abuts a base 380 of the counterbore 254, as shown in FIGS. 20 and 21.

Continuing with FIG. 23, the inner nut 374 comprises an inner threaded surface 382 that mates with outer threads on the second end 368 of the fastener 208, as shown in FIGS. 20 and 21. The inner nut 374 further comprises a splined outer surface 384 positioned adjacent a threaded outer surface 386. The splined outer surface 384 mates with the splined inner surface 376 of the washer 370. The outer nut 372 comprises a threaded inner surface 388 that mates with the threaded outer surface 386 of the inner nut 374. A flat rear surface 390 of the outer nut 372 abuts a flat front surface 392 of the washer 370.

During assembly, as the outer nut 372 is turned, the inner nut 374 moves axially away from the base 380 of the counterbore 354, thereby applying a tensile load to the fastener or tension rod 208. The engagement of the splined surfaces 376 and 384 between the inner nut 374 and the washer 370 rotationally couples the inner nut 374 to the washer 370. Such coupling prevents the inner nut 374 from turning while providing a solid reaction point for turning the outer nut 372.

Continuing with FIGS. 20 and 21, the construction of the three-piece nut 210 allows the nut 210 to load the fastener 208 in tension with only a minimal amount of torsional stress. By reducing the amount of torsional stress applied to the fastener 208, the life of the fastener 208 is increased. The construction of the three-piece nut 210 also applies a repeatable tensile force to the fastener 208 when a known torque is applied to the three-piece nut 210.

Turning back to FIGS. 15-19 and 22, after the first end or shank journal 204 is attached to one of the inner journals 202, a plurality of additional inner journals 202 are attached together in a row. The inner journals 202 are attached together by connecting the shank element 222 and the receiver element 248 of adjacent inner journals 202 and securing the journals 202 together using a fastener 208 and a three-piece nut 210. Adjacent inner journals 202 are attached together using the same method as described with reference to the assembly of the first end journal 204 and an inner journal 202. Four inner journals 202 are shown attached together in the figures. Once the fourth inner journal 202 is attached, the second end or receiver journal 206 is attached to the fourth inner journal 202. The second end journal 206 is attached to the fourth inner journal 202 by attaching the shank element 222 of the inner journal 202 to the receiver element 248 of the second end journal 206 using the same method as described above. The crankshaft 200 may be assembled in a different order than that described herein.

Figure 16:
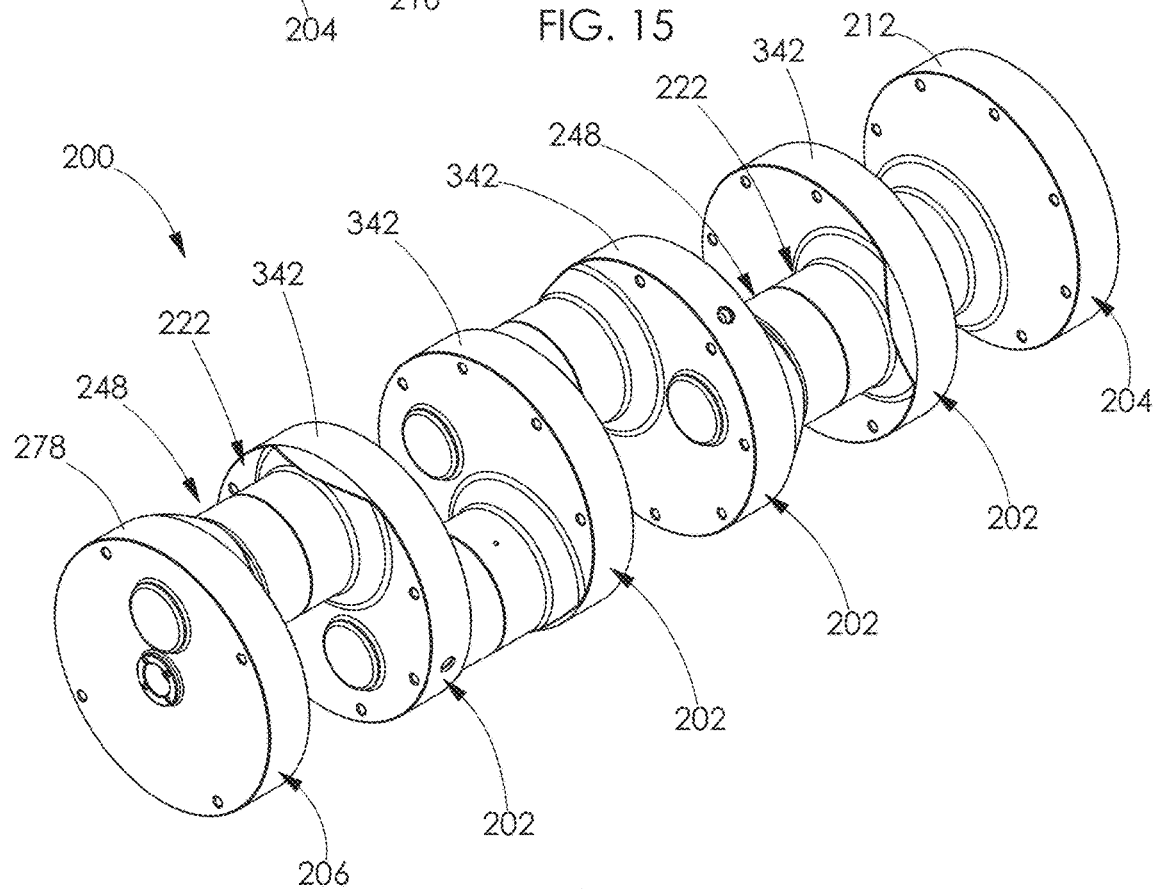
FIG. 16 is a second end perspective view of the modular crankshaft shown in FIG. 15.
Figure 17:
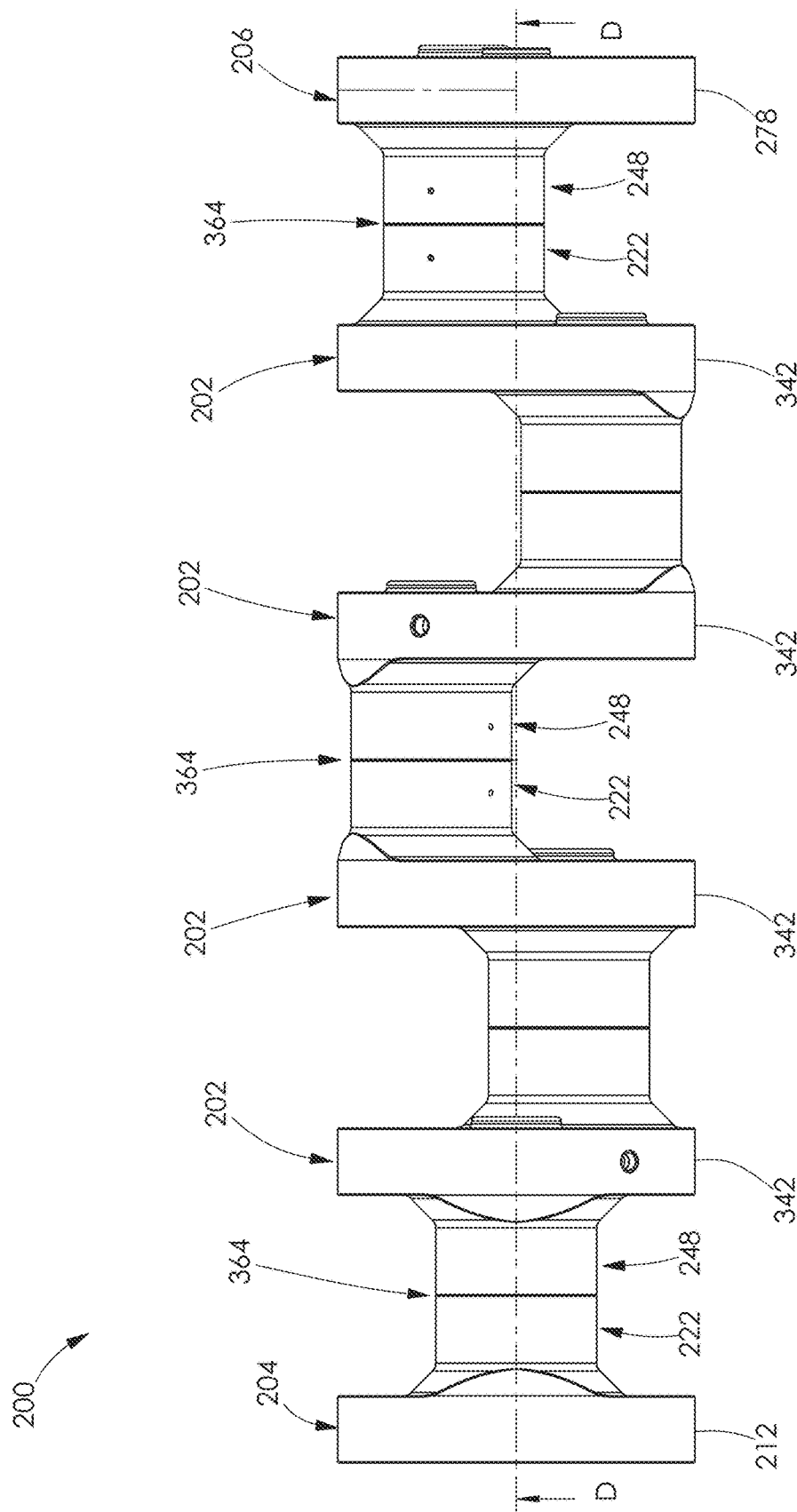
FIG. 17 is a top plan view of the modular crankshaft shown in FIG. 15.

As shown in FIGS. 15 and 16, when assembling the crankshaft 200, the journals 204, 202, and 206 are oriented such that adjacent connecting rod journals 364 are offset from one another. The journals 204, 202, and 206 are further aligned such that the bodies 212, 278, and 342 of the corresponding journals are concentric with one another.

When the crankshaft 200 is assembled, the cylindrical bodies 212, 278, and 342 of the corresponding journals 204, 206, and 202 are in a side-by-side and spaced apart relationship. The bodies 212, 278, and 342 are spaced apart by a gap 201 shown in FIG. 20. The gap 201 is filled by the connecting rod journals 364. The fasteners 208 may be characterized as extending through a corresponding gap 201 and interconnecting corresponding bodies 212 and 342, 342 and 342, and 342 and 278.

Continuing with FIGS. 20 and 21, the shank 226 and corresponding opening 298 are shaped so that they interlock with one another when assembled. In operation, torque is transferred through the form lock function of the polygonal taper interface between the shank 226 and the opening 298. That is, the compression force applied to the tapered connection by the fastener 208 locks the tapered polygon shank 226 into the tapered polygonal opening 298, thereby preventing relative rotational movement between the components. The chamfers 232 and 288 help reduce stress in the shank element 222 and corresponding receiver element 248 during operation. The crankshaft 200 is further configured so that the first and second rod journal sections 224 and 286 are equal in length. The equal lengths help to evenly distribute the bending load applied by the connecting rod 142 of the linear drive assembly 78 to the first and second rod journal sections 224 and 286.

Turning back to FIG. 18, once the crankshaft 200 is assembled, the various lubrication passages align and interconnect to form the lubrication passageway 276, as shown for example in FIG. 21. The lubrication passageway 276 is configured to supply lubricant to the outer surfaces 228 and 294 of each rod journal section 224 and 286 to lubricate connecting rod roller bearings 394, shown in FIGS. 64 and 65. A plug (not shown) is installed within each plug bore 334 and 354 formed in the bodies 278 and 342 of the second end journal 206 and the inner journal 202. The plugs and corresponding plug bores 334 and 354 may be configured to mate together using threads. The plugs may be ported to allow lubrication of the main bearings 118 from the inner race 400 or they may be left closed, forcing all lubricant flow out of the rod journal sections 224 and 286.

Turning to FIGS. 49-55, the crankshaft 200 is shown installed within the main journal roller bearings 118 as it would be if installed within the crank frame 70. Each main journal roller bearing 118 comprises a plurality of rollers 398 positioned between an inner race 400 and an outer race 402, as shown in FIGS. 56-59. When installed within the crank frame 70, the outer race 402 is retained within the bearing opening 116 of the support walls 90 using the brackets 120, as shown in FIG. 9. The corresponding journals 202, 204, or 206 are tightly fit or even press-fit within the inner race 400 and held in place by the retainers 260. During operation, the inner races 400 rotate with the crankshaft 200.

Continuing with FIGS. 56-59, the main roller bearings 118 shown in FIGS. 56-59 are what is known in the art as "fixed" bearings. The rollers 398 are prevented from moving axially between the inner and outer races 400 and 402 by lips 399. "Fixed" bearings are traditionally installed on the end journals 204 and 206. In contrast, the main roller bearings 118 installed on the inner journals 202, shown for example in FIG. 53, comprise an outer race 402 that does not include the lips 399, only the inner race 400 has lips 399. Such main roller bearing 118 is known in the art as a "floating" bearing. Because the outer race 402 shown on the inner journal 202 in FIG. 53 does not have any lips 399, the rollers 398 and the inner race 400 can move axially relative to the outer race 402. This allows room for slight location adjustments when installing the journals 202 within the corresponding inner races 400.

Continuing with FIGS. 56-59, when the main roller bearings 118 are installed within a corresponding bearing opening 116 in a corresponding support wall 90, an annular groove 404 formed in the outer race 402 aligns with a lubrication port 102 formed in the crank frame 70, as shown in FIG. 9. A plurality of openings 406 are formed in the annular groove 404 that allow lubricant to flow between the outer and inner races 402 and 400 and around the rollers 398. Likewise, an annular groove 405 is formed in the inner race 400 and has openings 407 formed therein. The annular groove 405 aligns with the plug bores 334 and 354 in the receiver journal 206 and inner journals 202. If the plugs are ported lubricant from the lubricant passageway 276 will flow into the groove 405 and through the openings 407 into the bearing 118 to lubricate the rollers 398. If the plugs are not ported there will be no lubricant flow and the groove 405 and openings 407 are not used.

Figure 53:
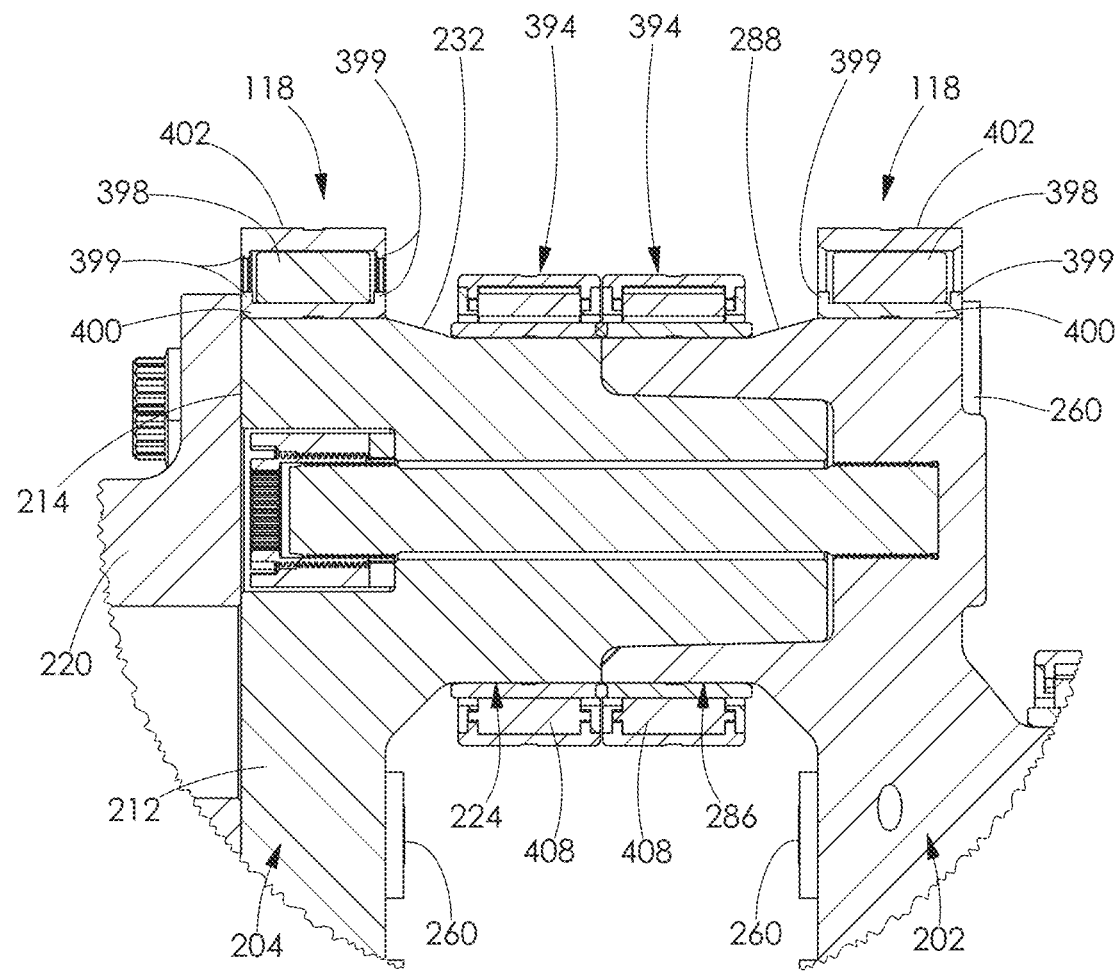
FIG. 53 is an enlarged view of area Q shown in FIG. 52.
Figure 56:
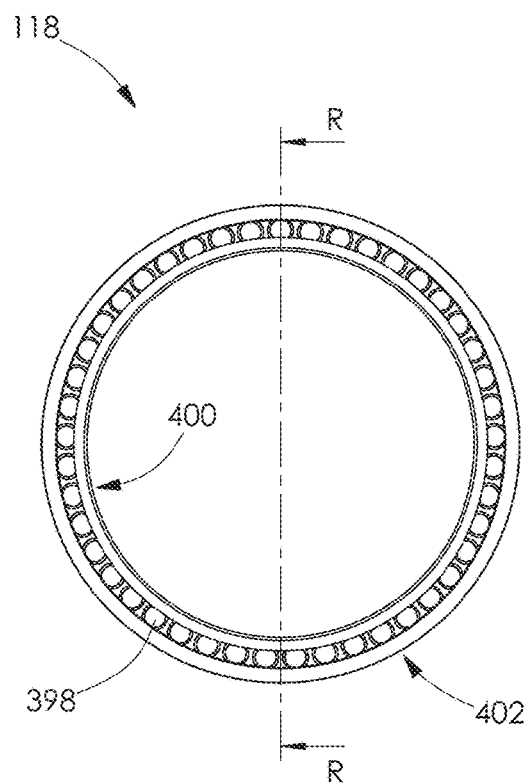
FIG. 56 is a side elevational view of one of the main journal roller bearings shown in FIG. 49.
Figure 57:
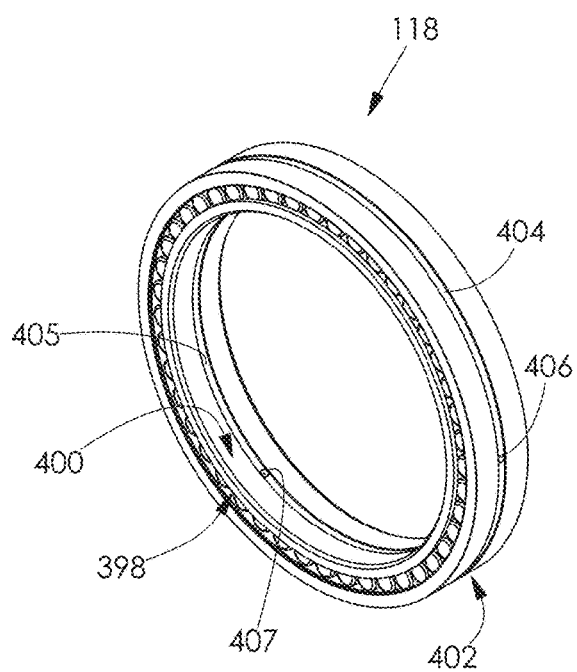
FIG. 57 is a side perspective view of the main journal roller bearing shown in FIG. 56.
Figure 58:
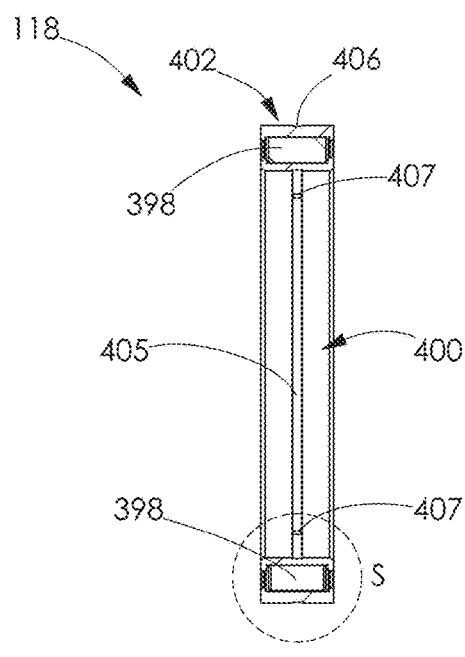
FIG. 58 is a cross-sectional view of the main journal roller bearing shown in FIG. 56, taken along line R-R.
Figure 59:
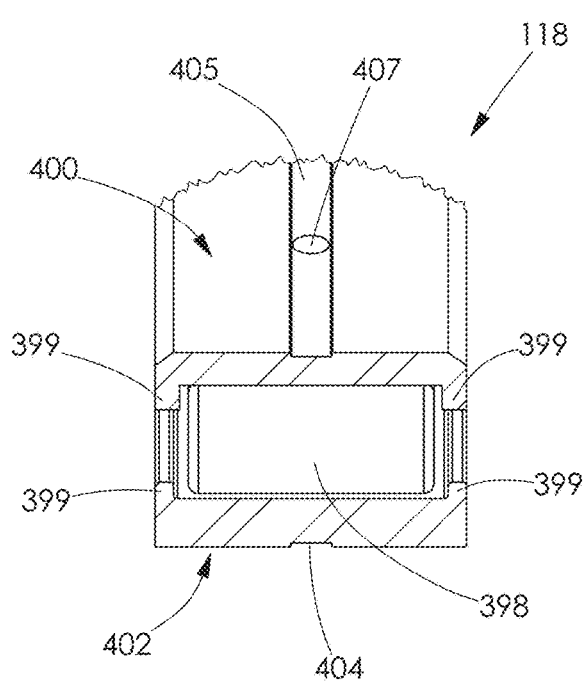
FIG. 59 is an enlarged view of area S, shown in FIG. 58.
Figure 60:
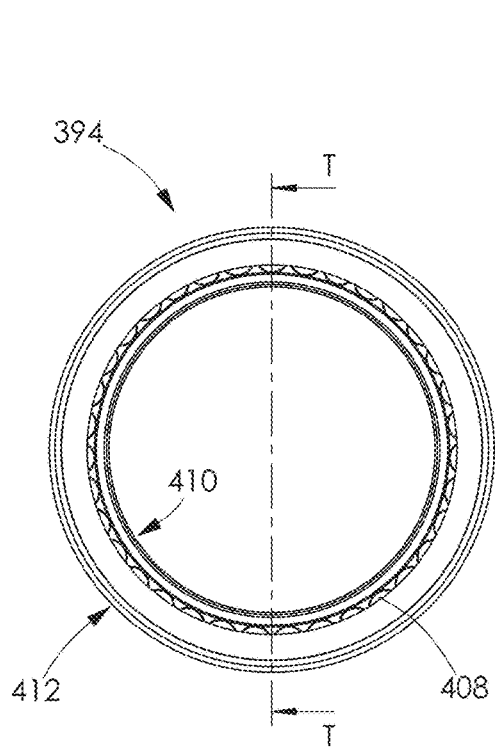
FIG. 60 is a side elevational view of one of the connecting rod journal roller bearings shown in FIG. 49.
Figure 61:
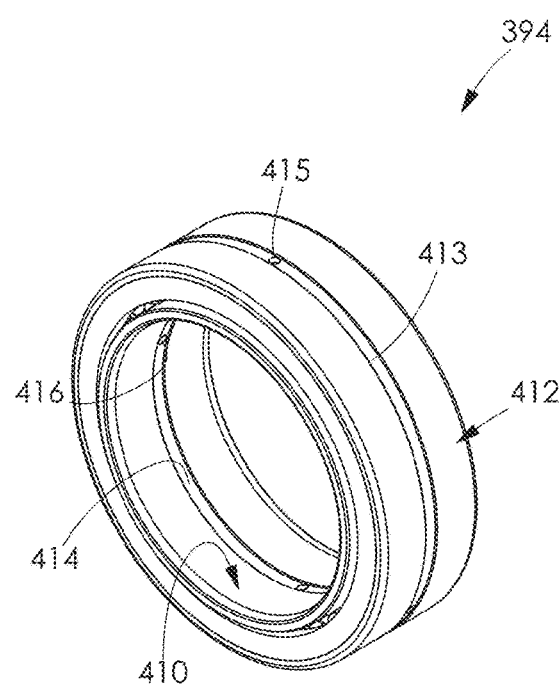
FIG. 61 is a side perspective view of the connecting rod journal roller bearing shown in FIG. 60.
Figure 62:
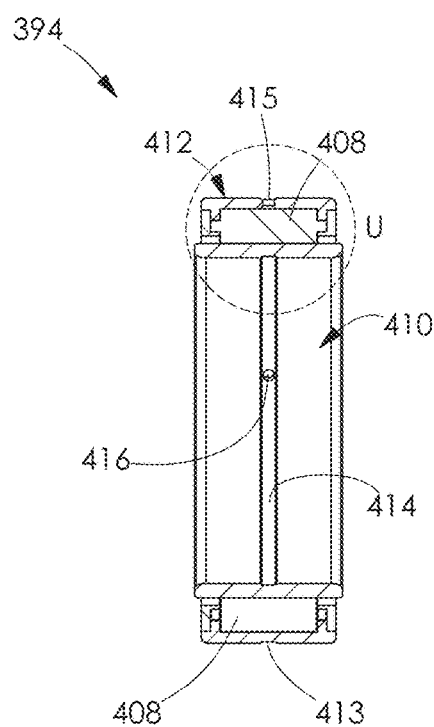
FIG. 62 is a cross-sectional view of the connecting rod journal roller bearing shown in FIG. 60, taken along line T-T.
Figure 63:
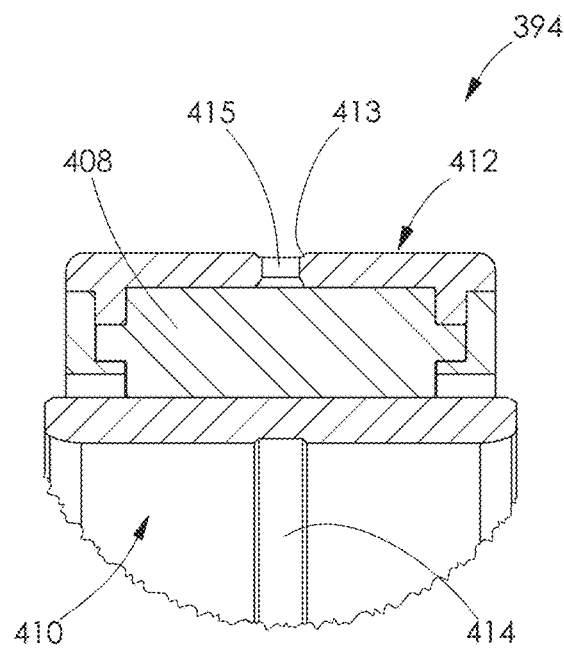
FIG. 63 is an enlarged view of area U, shown in FIG. 62.

Continuing with FIGS. 49-55, a plurality of connecting rod roller bearings 394 are also shown installed on the crankshaft 200. A connecting rod roller bearing 394 is shown disposed around each first and second rod journal section 224 and 286, as shown in FIG. 53. A connecting rod 142, shown in FIGS. 5-7, used with each linear drive assembly 78 is configured to clamp around a corresponding pair of connecting rod roller bearings 394. Each connecting rod roller bearing 394 comprises a plurality of rollers 408 positioned between inner and outer races 410 and 412, as shown in FIGS. 60-63.

Figure 64:
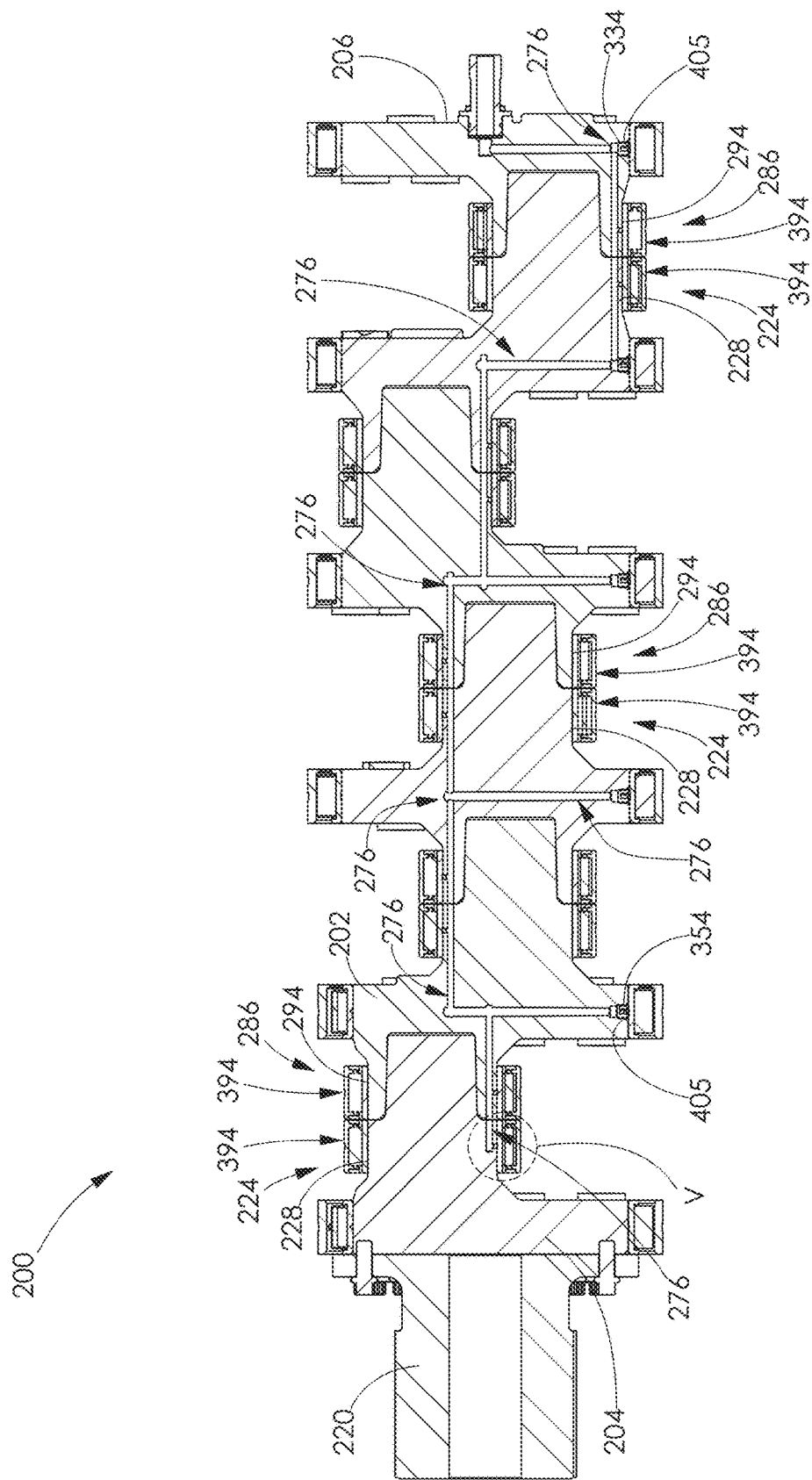
FIG. 64 is a front elevational and cutaway view of the modular crankshaft, roller bearings, drive shaft, and lubricant swivel shown in FIG. 49. Portions of the components are cutaway to expose the lubricant passageway formed within the crankshaft.
Figure 65:
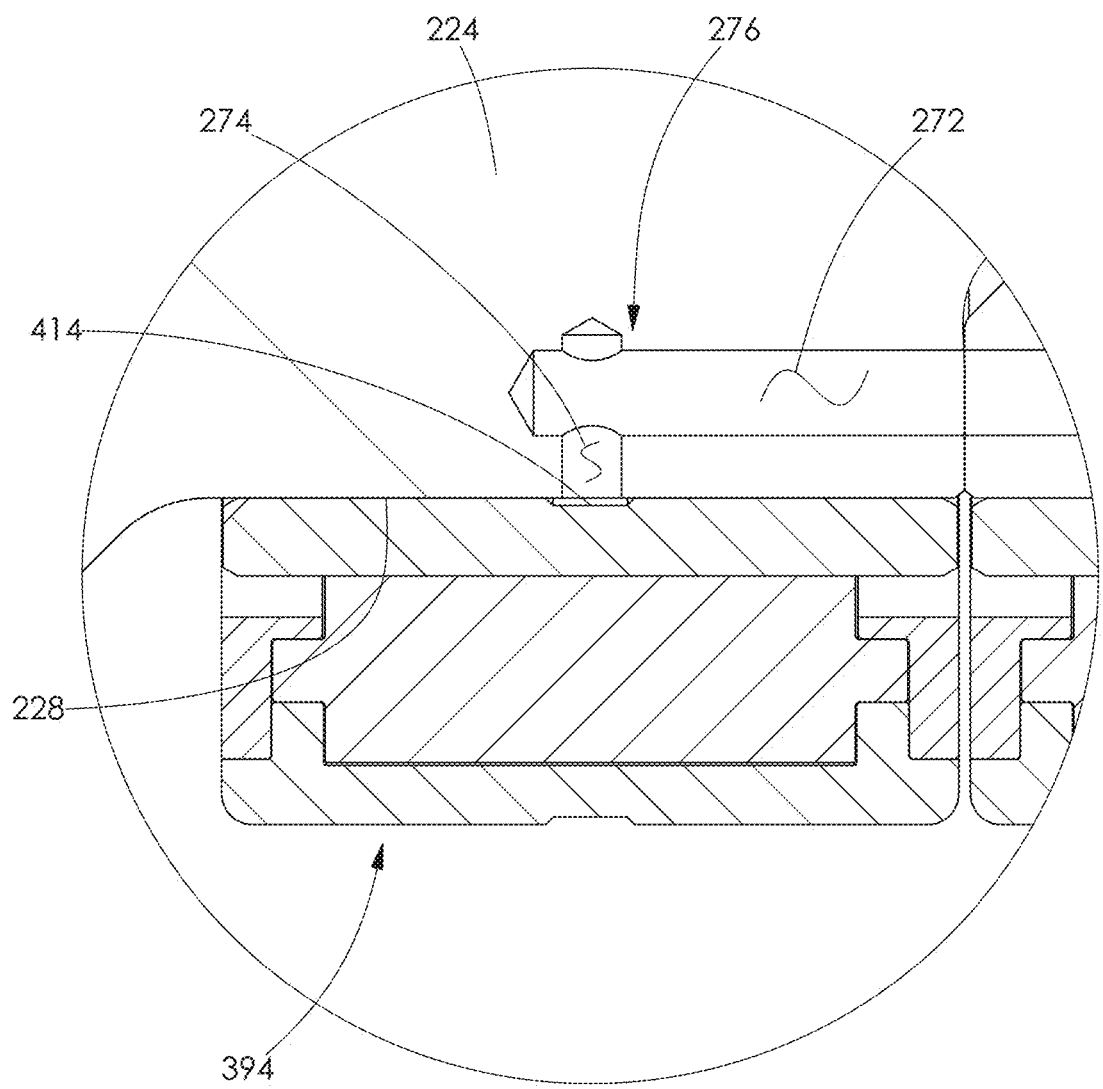
FIG. 65 is an enlarged view of area V shown in FIG. 64.
Figure 66:
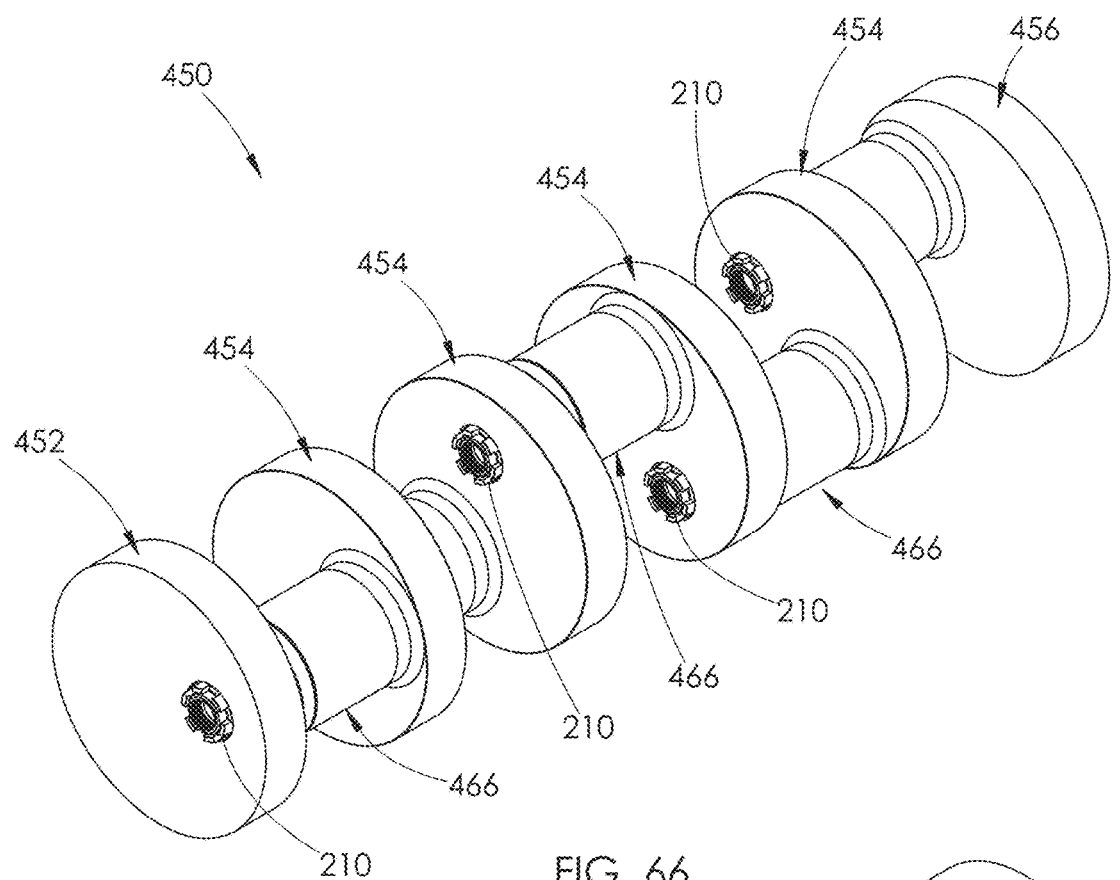
FIG. 66 is a first end perspective view of another embodiment of a modular crankshaft disclosed herein.
Figure 67:
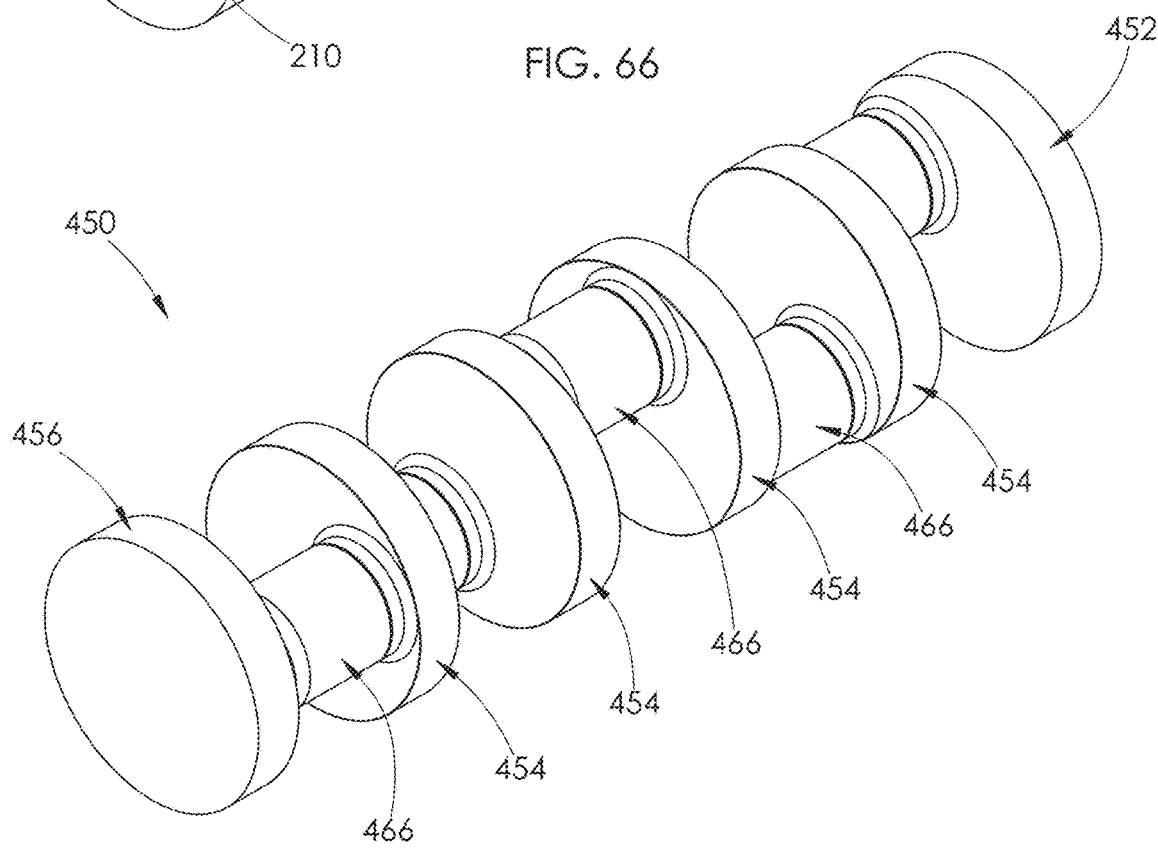
FIG. 67 is a second end perspective view of the modular crankshaft shown in FIG. 66.

Continuing with FIGS. 60-63, an annular groove 414 is formed in the inner race 410 that aligns with a corresponding one of the lubricant passages 274, 338, 358, or 362, as shown in FIGS. 64 and 65. Lubricant is delivered to the connecting rod roller bearings 394 using the lubricant passageway 276. A plurality of openings 416 are formed in the annular groove 414 to allow lubricant to flow between the inner and outer races 410 and 412 and around the rollers 408. Likewise, an annular groove 413 is formed in the outer race 412 and has openings 415 formed therein. The groove 413 allows lubricant flow from a connecting rod lubrication system through the openings 415 into the bearing 394 to lubricate the rollers 408. An example of a connecting rod lubrication system is shown in U.S. Pat. No. 11,208,996, issued to Foster et al., the entire contents of which are incorporated herein by reference.

With reference to FIG. 54, during assembly, the connecting rod roller bearings 394 are disposed around each rod journal section 224 and 286 prior to attaching the shank element 222 to the receiver element 248. The chamfers 232 and 288 surrounding the corresponding rod journal section 224 and 286 help axially locate and properly align each roller bearing 394 during assembly, as shown in FIG. 53. One benefit of the modular crankshaft 200 is that solid or non-split roller bearings 394 are able to be disposed around each connecting rod journal 364. In contrast, single-piece crankshafts cannot be split apart to allow for the installation of a solid roller bearing 394. Instead, a split-ring crankshaft bearing must be installed around the connecting rod journals. The ability to use a solid connecting rod roller bearing 394 increases the life of such bearings, thereby increasing the time between maintenance intervals and reducing repair time.

Modular Crankshaft 450

Turning to FIGS. 66-72, another embodiment of a modular crankshaft 450 is shown. The modular crankshaft 450 is like the crankshaft 200, but with a few modifications. The modular crankshaft 450 comprises a first end main bearing journal 452 joined to a plurality of inner main bearing journals 454 and a second end main bearing journal 456.

Figure 71:
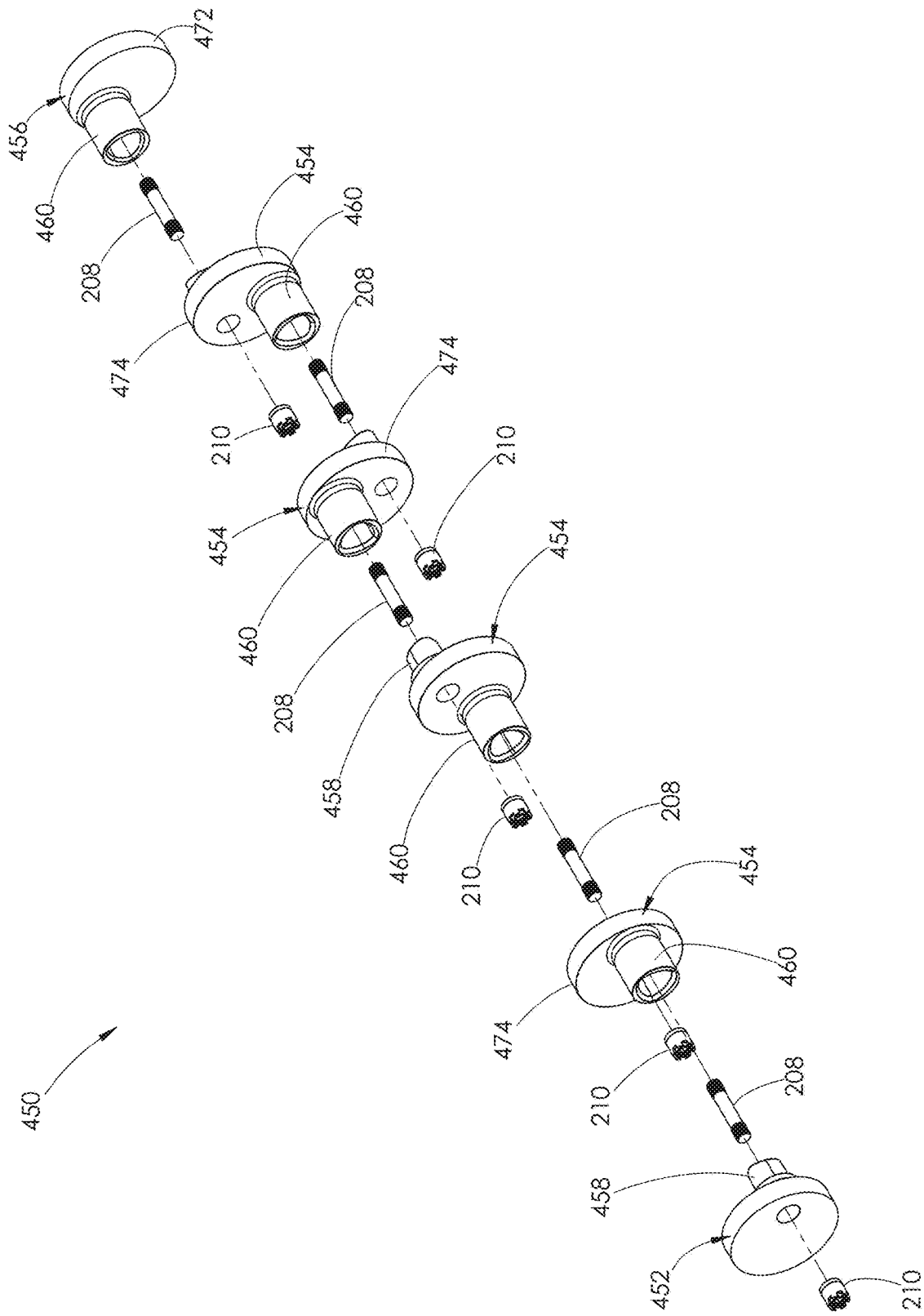
FIG. 71 is a first end perspective and exploded view of the modular crankshaft shown in FIG. 66.
Figure 72:
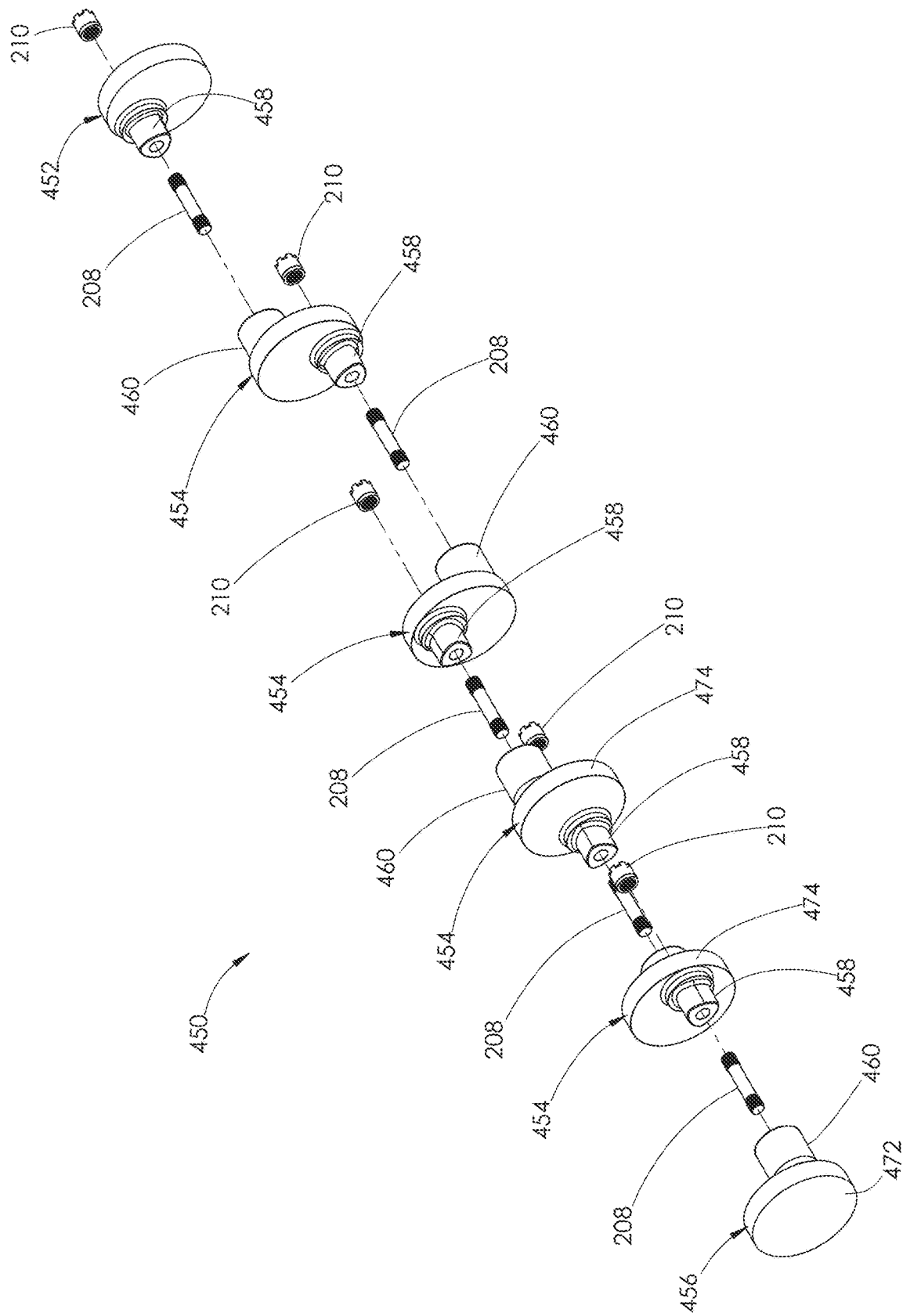
FIG. 72 is a second end perspective and exploded view of the modular crankshaft shown in FIG. 66.
Figure 73:
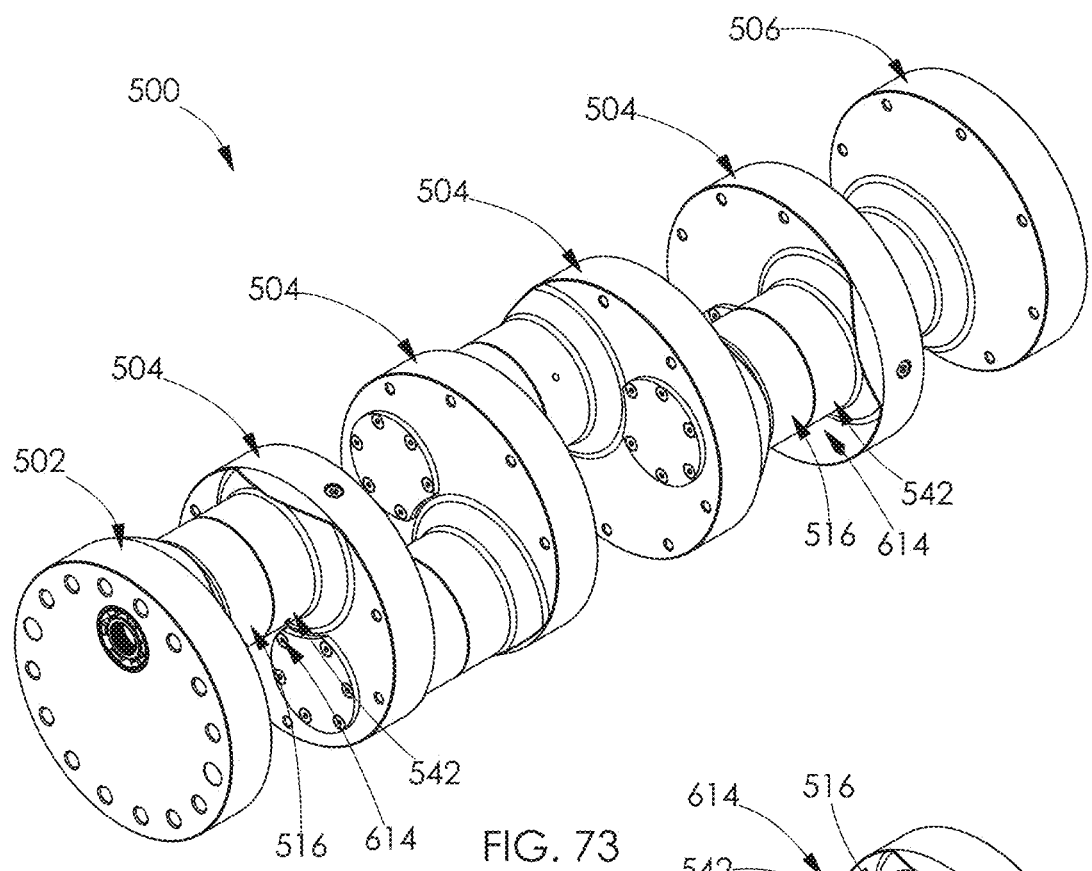
FIG. 73 is a first end perspective view of another embodiment of a modular crankshaft disclosed herein.
Figure 74:
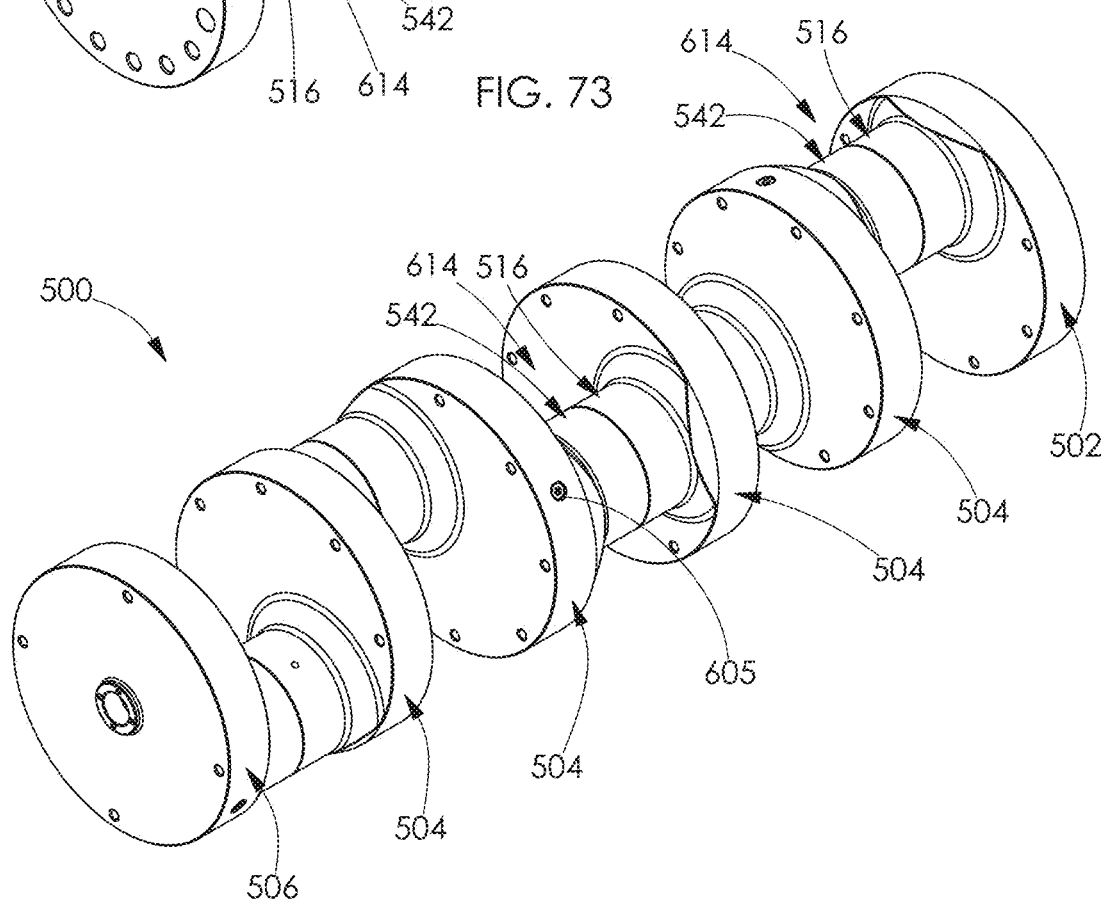
FIG. 74 is a second end perspective view of the modular crankshaft shown in FIG. 73.
Figure 75:
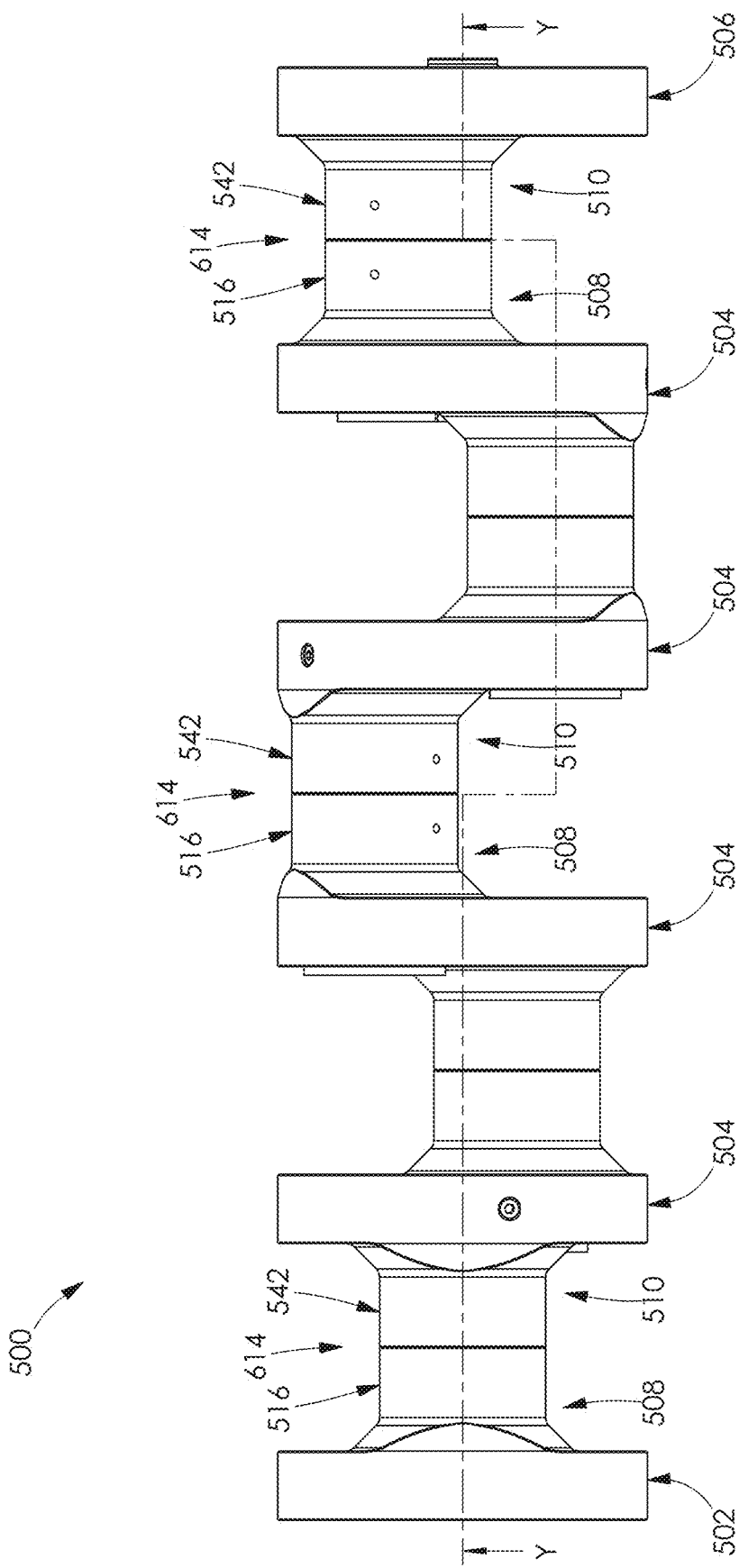
FIG. 75 is a top plan view of the modular crankshaft shown in FIG. 73.

With reference to FIGS. 71 and 72, the first end journal 452 comprises a shank connection element 458, and the second end journal 456 comprises a receiver connection element 460. The inner journals 454 each comprise the shank element 458 and the receiver element 460. The corresponding shank and receiver elements 458 and 460 are connected using the three-piece nuts 210 and the fasteners 208 used with the crankshaft 200.

Turning back to FIGS. 68-70, the shank element 458 is like the shank element 222, shown in FIG. 20, but a first rod journal section 462 has a shorter length than the first rod journal section 224 of the shank element 222, shown in FIG. 20. Likewise, the receiver element 460 is like the receiver element 248, shown in FIG. 20, but the second rod journal section 464 has a greater length than the second rod journal section 286 of the receiver element 248.

Figure 68:
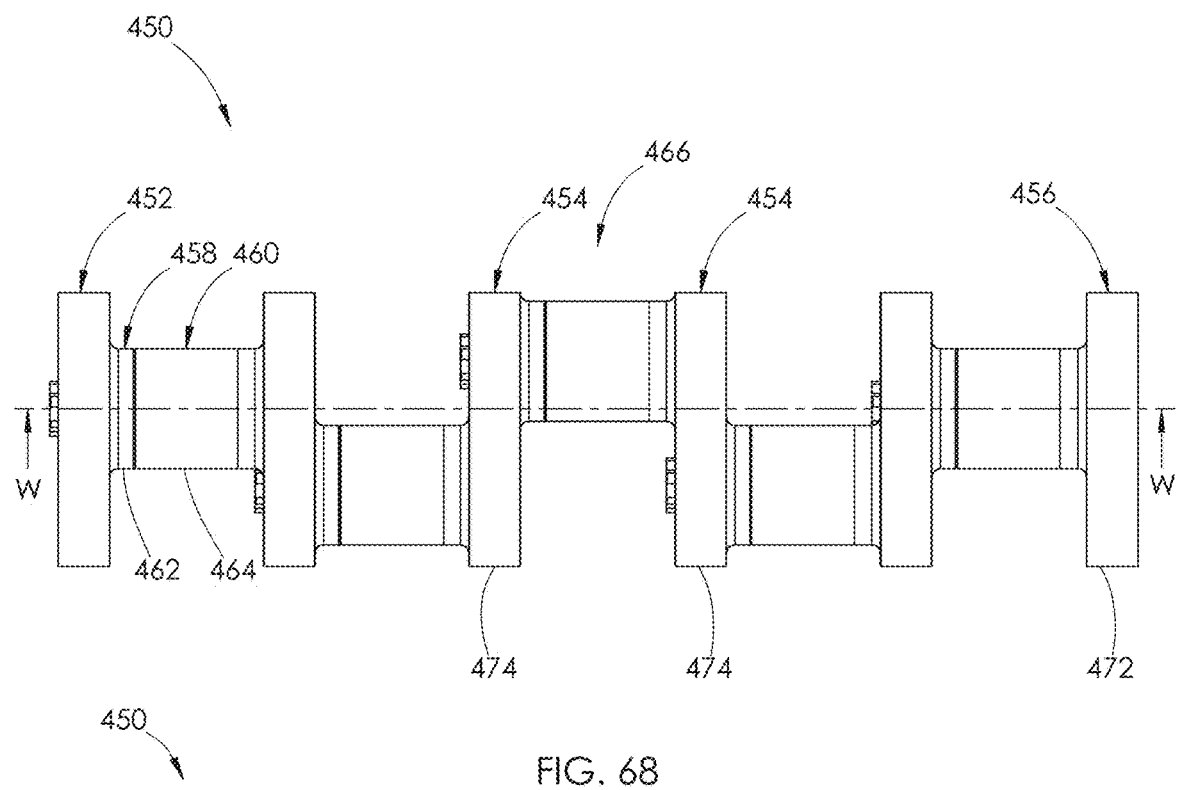
FIG. 68 is a front elevational view of the modular crankshaft shown in FIG. 66.
Figure 69:
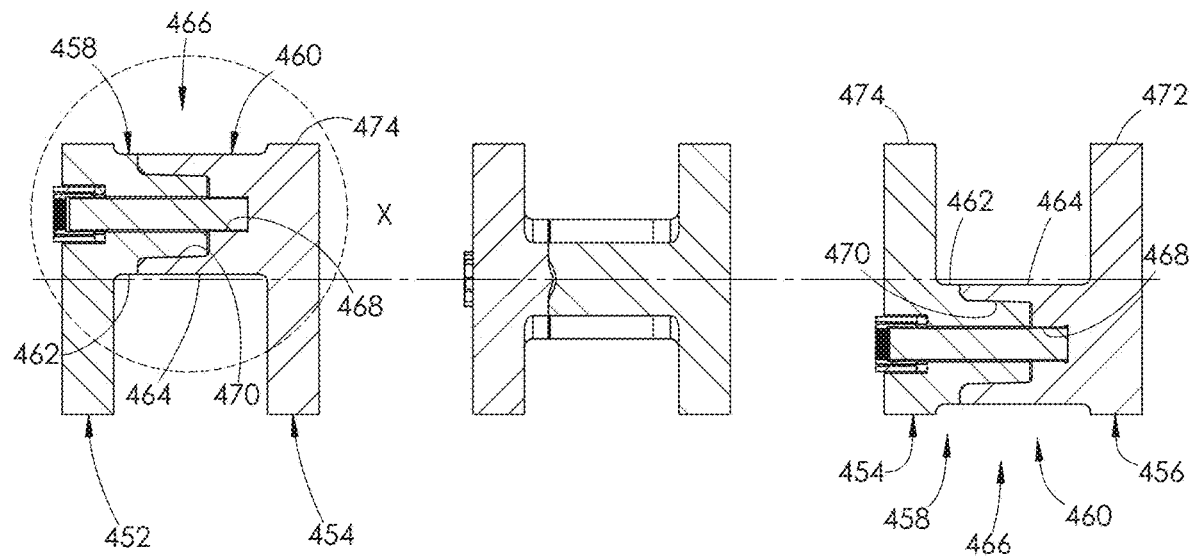
FIG. 69 is a cross-sectional view of the modular crankshaft shown in FIG. 68, taken along line W-W.
Figure 70:
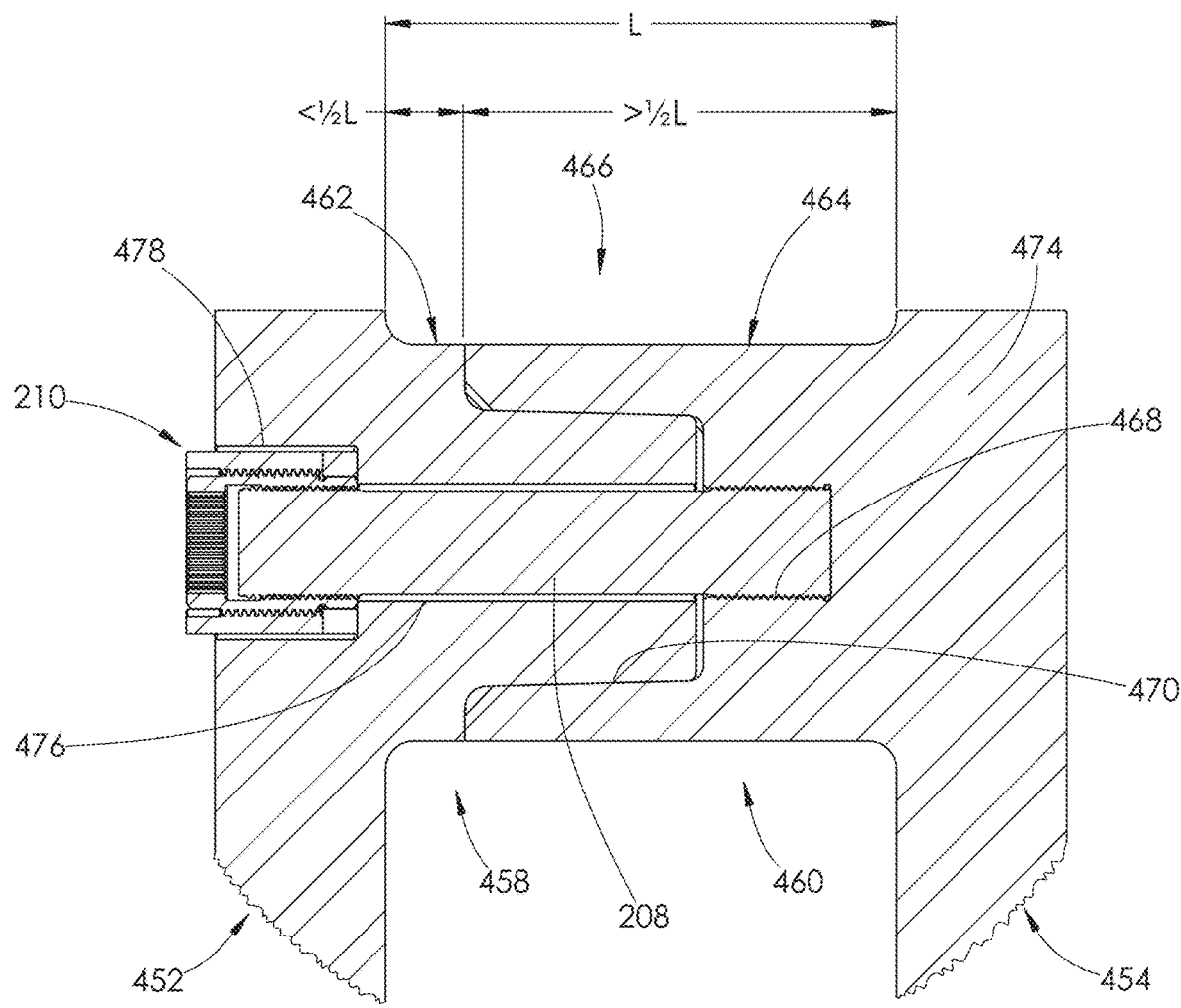
FIG. 70 is an enlarged view of area X, shown in FIG. 69.

Continuing with FIGS. 68-70, the connected rod journal sections 462 and 464 form a connecting rod journal 466. In contrast to the connecting rod journal 364, shown in FIG. 20, the lengths of the rod journal sections 462 and 464 are not equal. Instead, the second rod journal section 464 comprises more than one-half of the length of the connecting rod journal 466, as shown in FIG. 70. As a result, a second passage 468 joined to an opening 470 formed in the receiver element 460 is formed within the receiver element 460 and not within a cylindrical body 472 of the second end journal 456 or a cylindrical body 474 of each of the inner journals 454. Because the second passage 468 does not extend into the bodies 472 or 474, there is no need for the cylindrical boss 312, shown in FIG. 38.

Continuing with FIG. 70, a first passage 476 extends through the shank element 458. Because the shank element 458 comprises a shorter first rod journal section 462, a counterbore 478 of the first passage 476 is shallower than the counterbore 254 shown in FIG. 20. As a result, a portion of the three-piece nut 210 secured to the fastener 208 projects from the counterbore 478. While not shown, the crankshaft 450 may also comprise the various mounting holes and lube ports formed in the crankshaft 200.

Modular Crankshaft 500

Turning to FIGS. 73-105, another embodiment of a modular crankshaft 500 is shown. The modular crankshaft 500 is like the crankshaft 200, but with a few modifications. Any features of the crankshaft 500 not specifically described herein are identical or nearly identical to those same features described with reference to the crankshaft 200. The modular crankshaft 500 comprises a first end main bearing journal 502 joined to a plurality of inner main bearing journals 504 and a second end main bearing journal 506.

Figure 80:
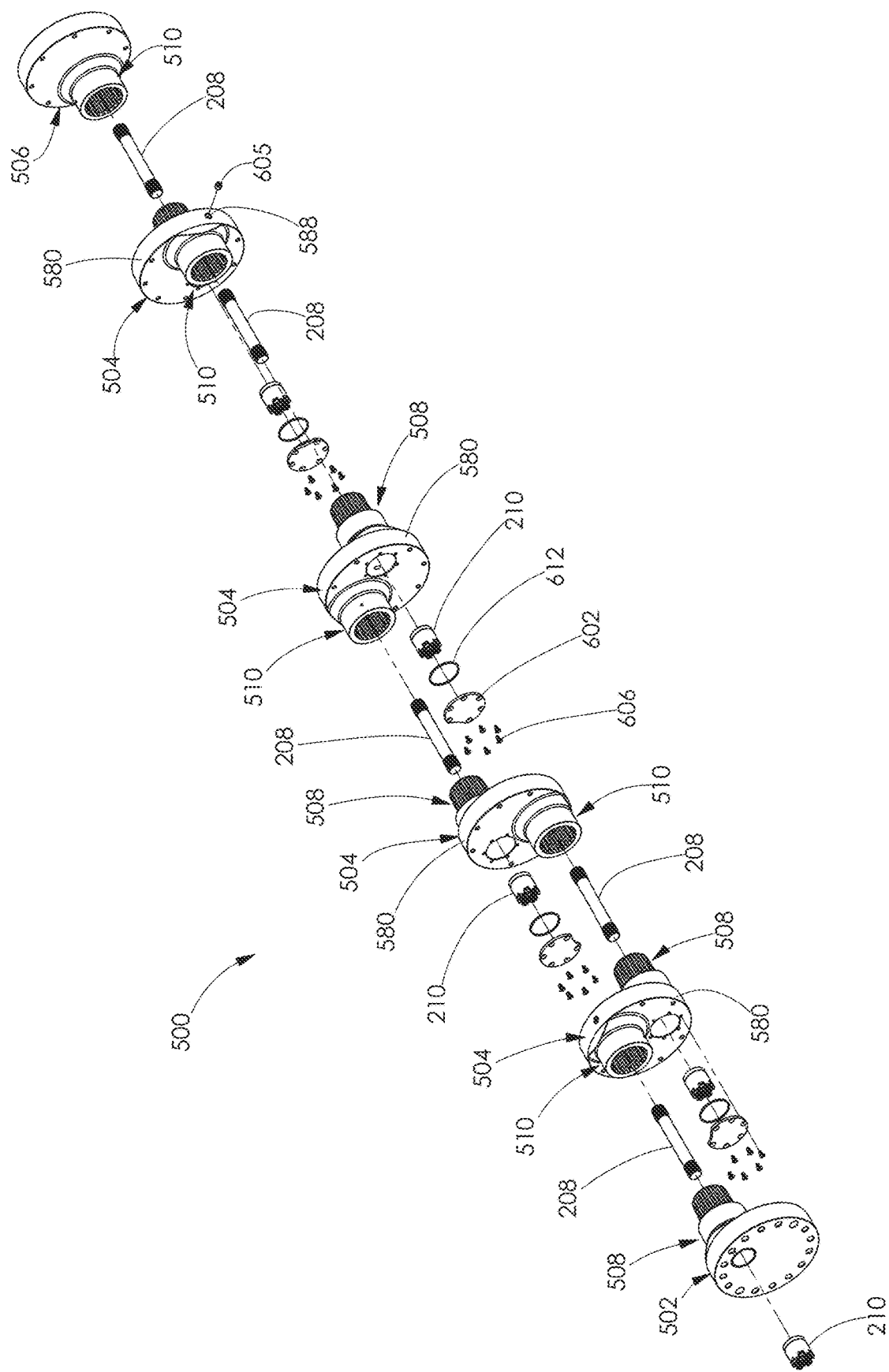
FIG. 80 is a first end perspective and exploded view of the modular crankshaft shown in FIG. 73.
Figure 81:
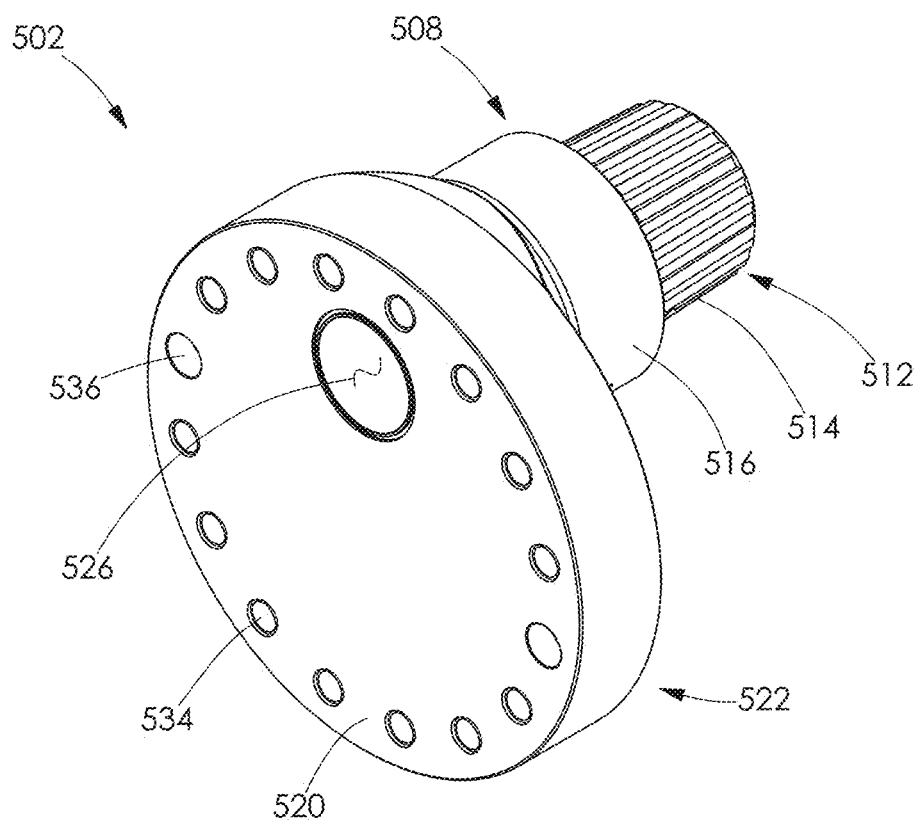
FIG. 81 is a perspective view of the first side of the first end journal used with the modular crankshaft shown in FIG. 73.
Figure 82:
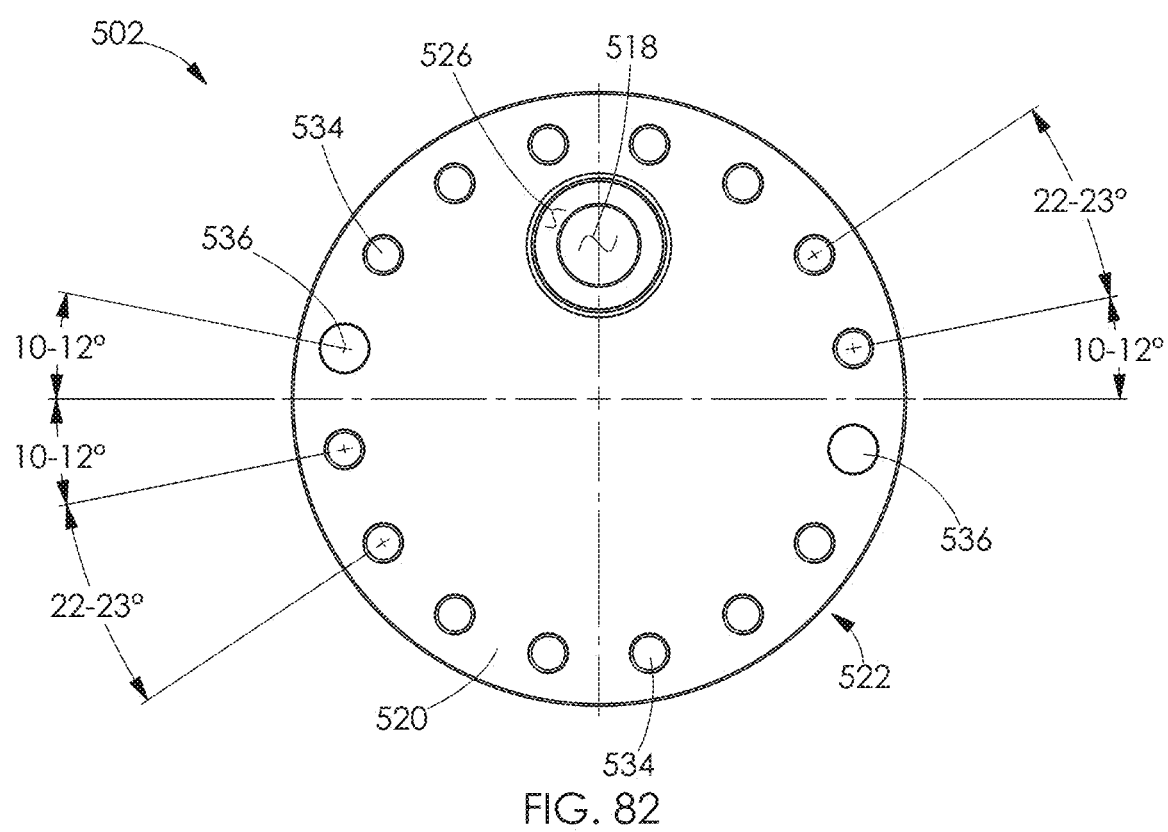
FIG. 82 is an elevational view of the first side of the first end journal shown in FIG. 81.

With reference to FIG. 80, the first end journal 502 comprises a shank connection element 508, and the second end journal 506 comprises a receiver connection element 510. The inner journals 504 each comprise the shank element 508 and the receiver element 510. The corresponding shank and receiver elements 508 and 510 are connected using the three-piece nuts 210 and the fasteners 208 used with the crankshaft 200.

Figures 86, 87:
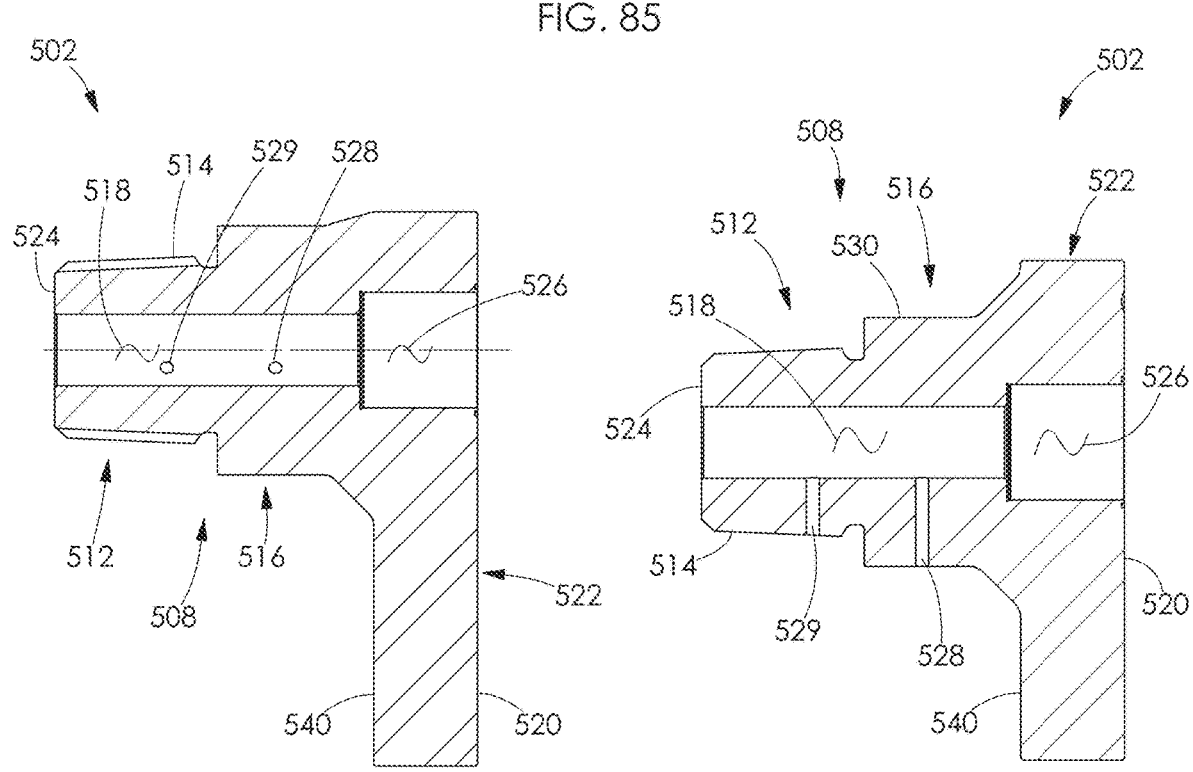
FIG. 86 is a cross-sectional view of the first end journal shown in FIG. 84, taken along line AA-AA.
FIG. 87 is a cross-sectional view of the first end journal shown in FIG. 84, taken along line AB-AB.

Turning to FIGS. 81-87, the first end or shank journal 502 is like the first end journal 204, shown in FIGS. 24-30, but the shank element 508 comprises another embodiment of a shank 512. The shank 512 has a cylindrical shape with a splined outer surface 514. The shank element 508 further comprises a first rod journal section 516 that is identical to the first rod journal section 224, shown in FIG. 26, except for the lubricant ports formed therein which will be described in more detail herein. Like the shank 226, shown in FIG. 29, the outer surface 514 of the shank 512 is tapered from the first rod journal section 516 to a front surface 524 of the shank 512, as shown in FIG. 86.

Continuing with FIGS. 81-87, like the shank element 222 shown in FIGS. 29 and 30, a first passage 518 is formed within the shank element 508 for receiving the fastener 208. The first passage 518 extends between a first side 520 of a cylindrical body 522 of the first end journal 502 and the front surface 524 of the shank 512. The first passage 518 opens into a counterbore 526 formed within the body 522. The counterbore 526 opens on the first side 520 of the body 522. The first passage 518 and the counterbore 526 are identical to the first passage 250 and counterbore 254 shown in FIGS. 29 and 30.

Continuing with FIG. 87, a first lubricant passage 528 is formed in the first end journal 502. The first lubricant passage 528 interconnects the first passage 518 and an outer surface 530 of the first rod journal section 516. A second lubricant passage 529 is formed in the shank 512. The second passage 529 interconnects the first passage 518 and the outer splined surface 514 of the shank 512. In contrast to the crankshaft 200, each first passage 518 formed in each shank element 508 forms a portion of a lubricant passageway 532, shown in FIG. 76.

Figure 83:
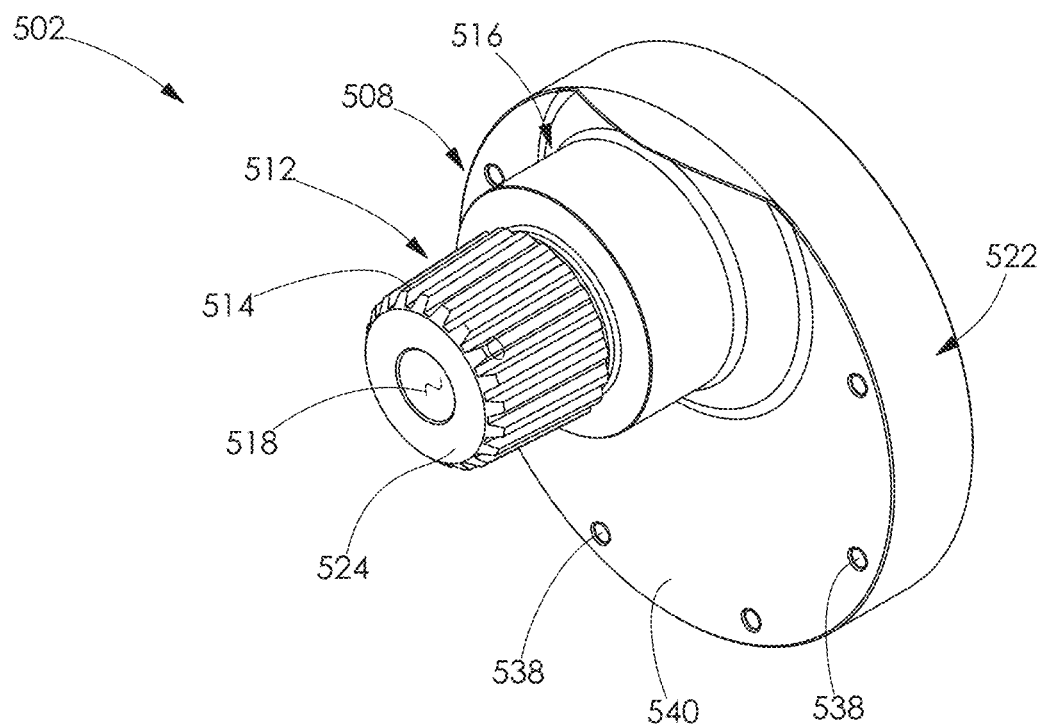
FIG. 83 is a perspective view of the second side of the first end journal shown in FIG. 81.
Figure 84:
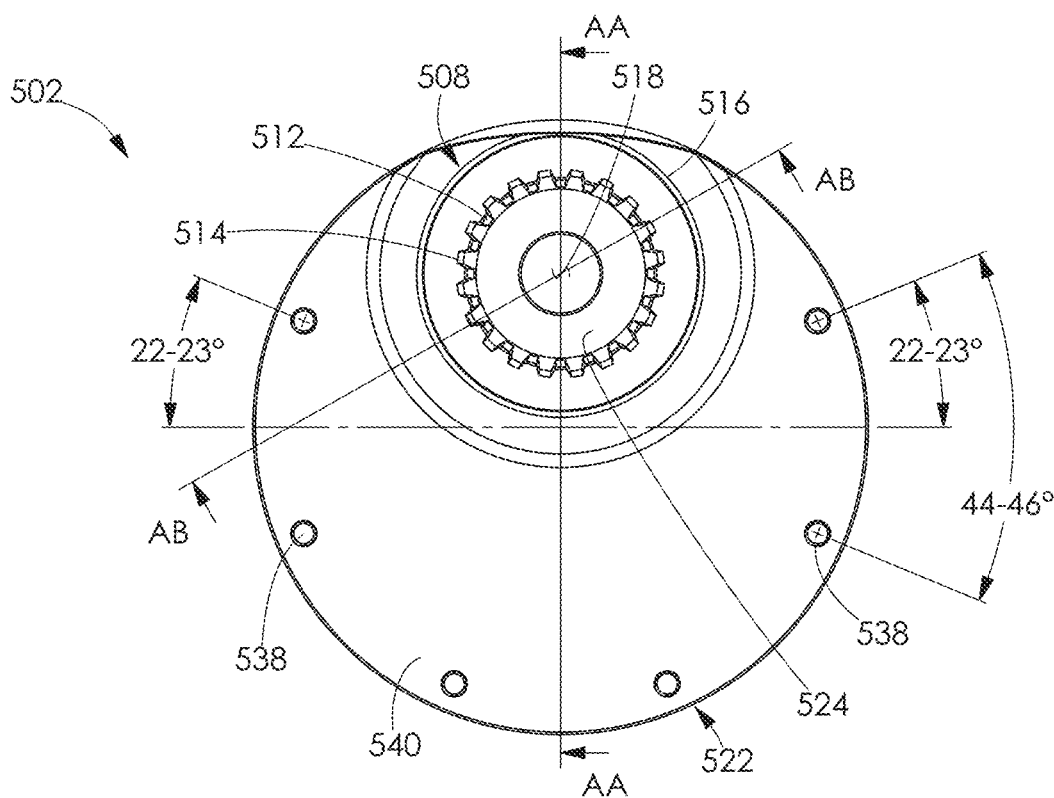
FIG. 84 is an elevational view of the second side of the first end journal shown in FIG. 81.
Figure 85:
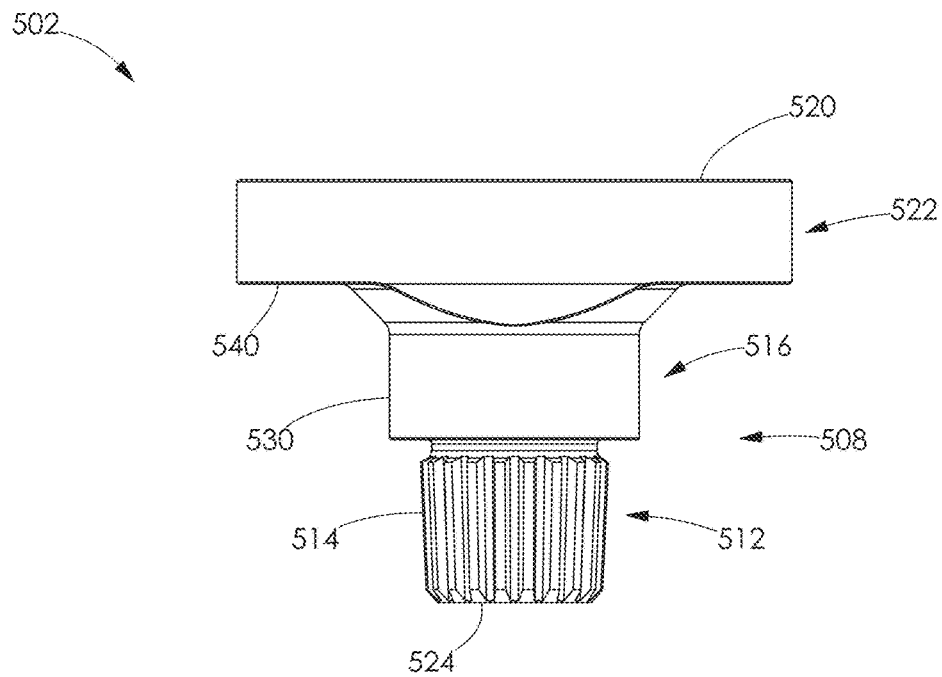
FIG. 85 is a top plan view of the first end journal shown in FIG. 81.

Turning back to FIGS. 81-84, the first end journal 502 further comprises a plurality of drive shaft mounting holes 534 and a plurality of drive shaft alignment dowel holes 536 formed in the first side 520 of its body 522, as shown in FIGS. 81 and 82. The holes 534 and 536 are identical to the drive shaft mounting holes 264 and drive shaft alignment dowel holes 268 shown in FIGS. 24 and 25. A plurality of retainer mounting holes 538 are likewise formed in a second side 540 of the body 522, as shown in FIGS. 83 and 84. The holes 538 are identical to the retainer mounting holes 256 shown in FIGS. 26 and 27.

Turning to FIGS. 88-95, the second end or receiver journal 506 is like the second end journal 206 shown in FIGS. 31-38, but the receiver element 510 comprises another embodiment of a second rod journal section 542. The second rod journal section 542 is like the second rod journal section 286 shown in FIGS. 31 and 32, but it comprises another embodiment of an opening 544. The opening 544 is generally cylindrical but a plurality of internal splines 546 are formed within the walls surrounding the opening 544. The splines 546 are configured to mate with the splined outer surface 514 of the shank 512. The opening 544 is also tapered so as to conform to the taper of the splined outer surface 514 of the shank 512.

Figure 94:
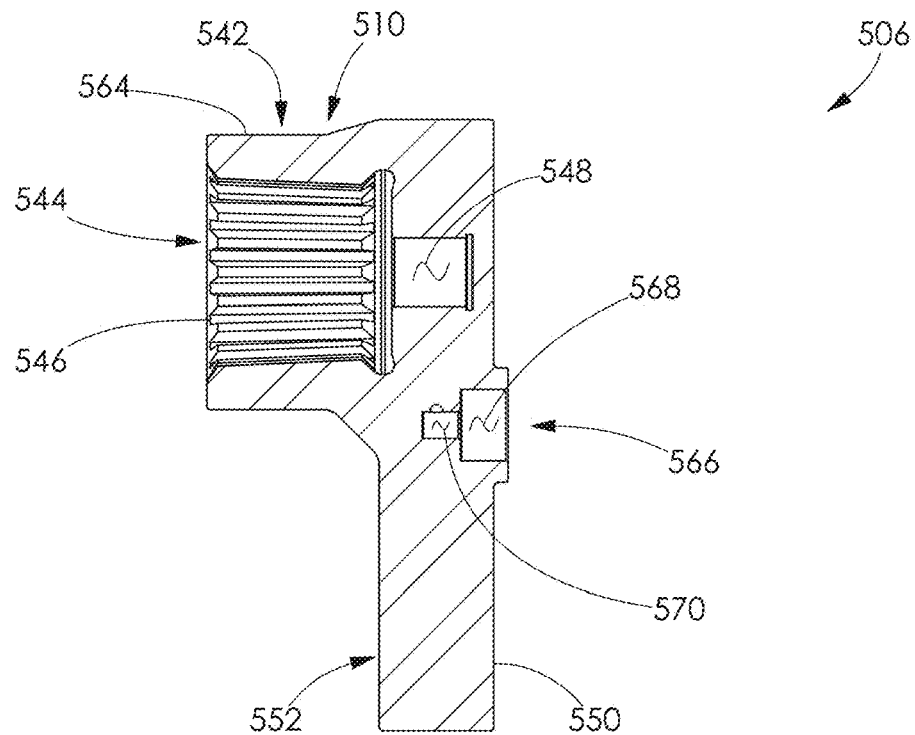
FIG. 94 is a cross-sectional view of the second end journal shown in FIG. 89, taken along line AD-AD.
Figure 95:
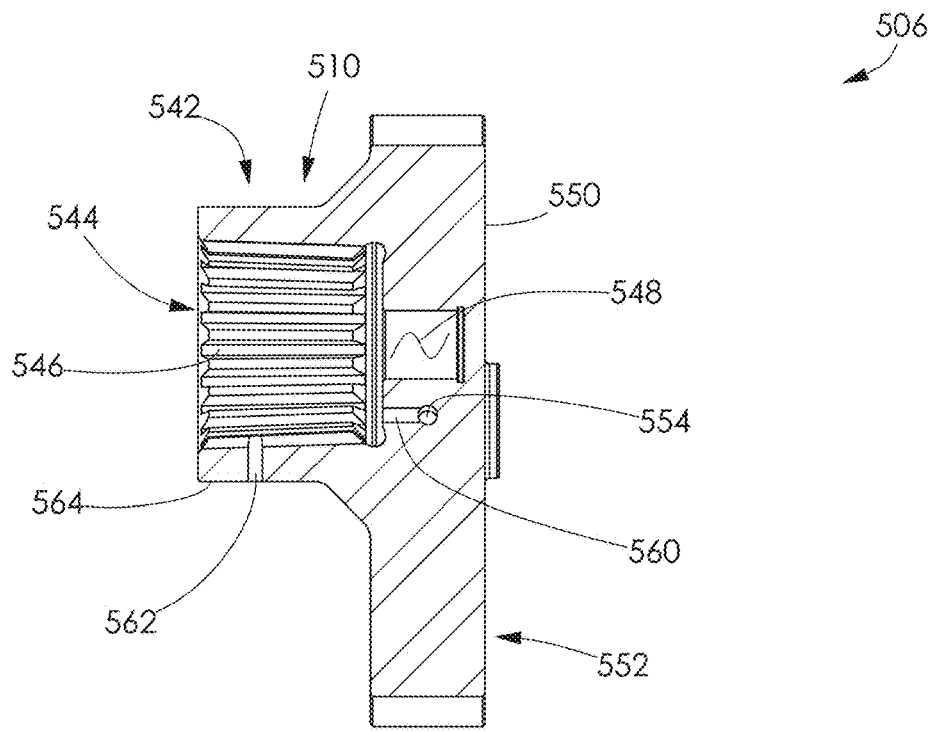
FIG. 95 is a cross-sectional view of the second end journal shown in FIG. 89, taken along line AE-AE.

Continuing with FIGS. 94 and 95, like the opening 298 of the receiver element 248, shown in FIGS. 37 and 38, the opening 544 opens into a second passage 548, which is a threaded blind bore configured to mate with the fastener 208. While not shown, a cylindrical boss may be formed in a second side 550 of a body 552 of the receiver journal 506, like the boss 312, shown in FIGS. 33 and 34.

Figure 92:
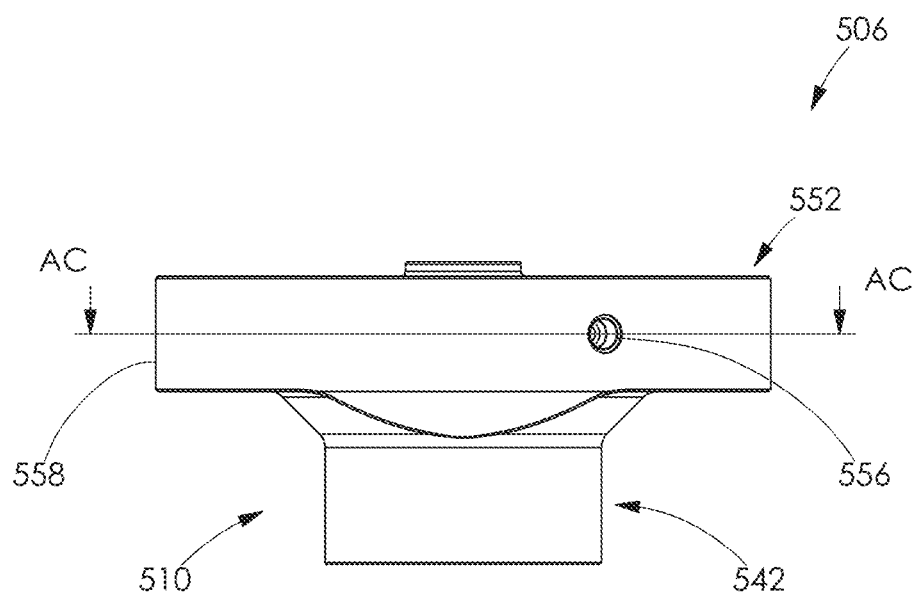
FIG. 92 is a top plan view of the second end journal shown in FIG. 88.
Figure 93:
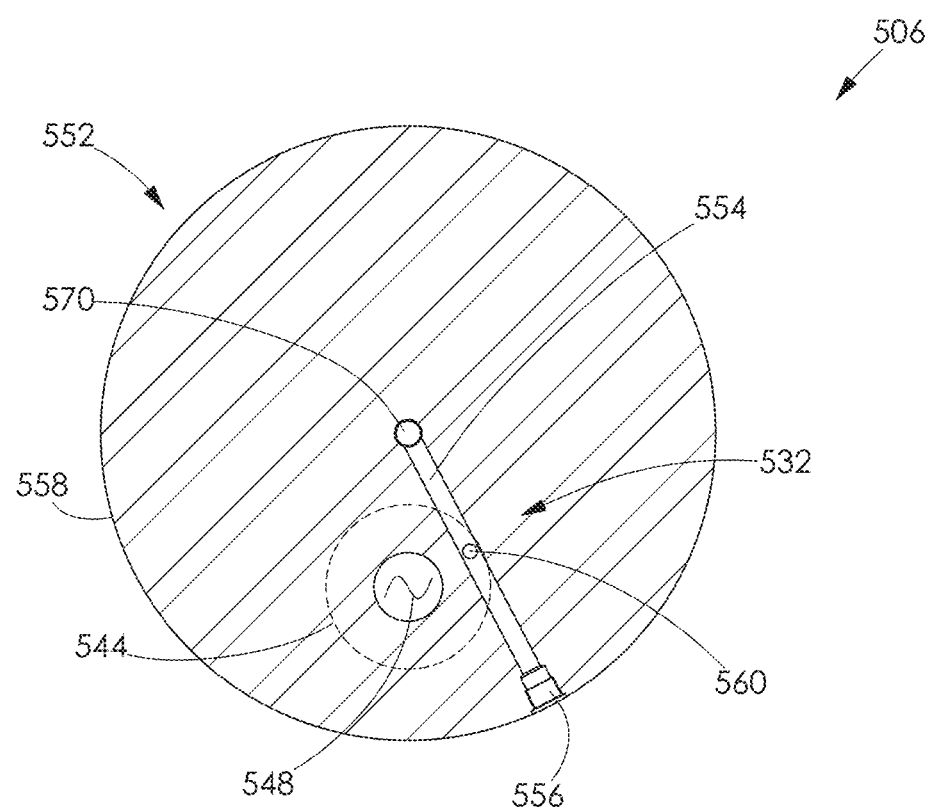
FIG. 93 is a cross-sectional view of the second end journal shown in FIG. 92, taken along line AC-AC.

Continuing with FIGS. 92 and 93, a plurality of lubricant passages are formed within the second end journal 506. A first lubricant passage 554 is formed within the body 552 and extends radially therethrough. The first passage 554 opens into a plug bore 556 that opens on an outer rim 558 of the body 552.

With reference to FIG. 95, a second lubricant passage 560 joins the first passage 554 at a right angle and extends into the opening 544. A third lubricant passage 562 interconnects the opening 544 and an outer surface 564 of the second rod journal section 542.

Turning back to FIGS. 90 and 91, the second end journal 506 further comprises a lubricant port 566 formed in its second side 550. The lubricant port 566 is identical to the lubricant port 318 shown in FIGS. 33 and 34. The lubricant port 566 comprises a counterbore 568 that opens into a blind bore 570, as shown in FIG. 94. The first lubricant passage 554 joins the blind bore 570 and forms the start of the lubricant passageway 532, as shown in FIGS. 93 and 76.

Figure 88:
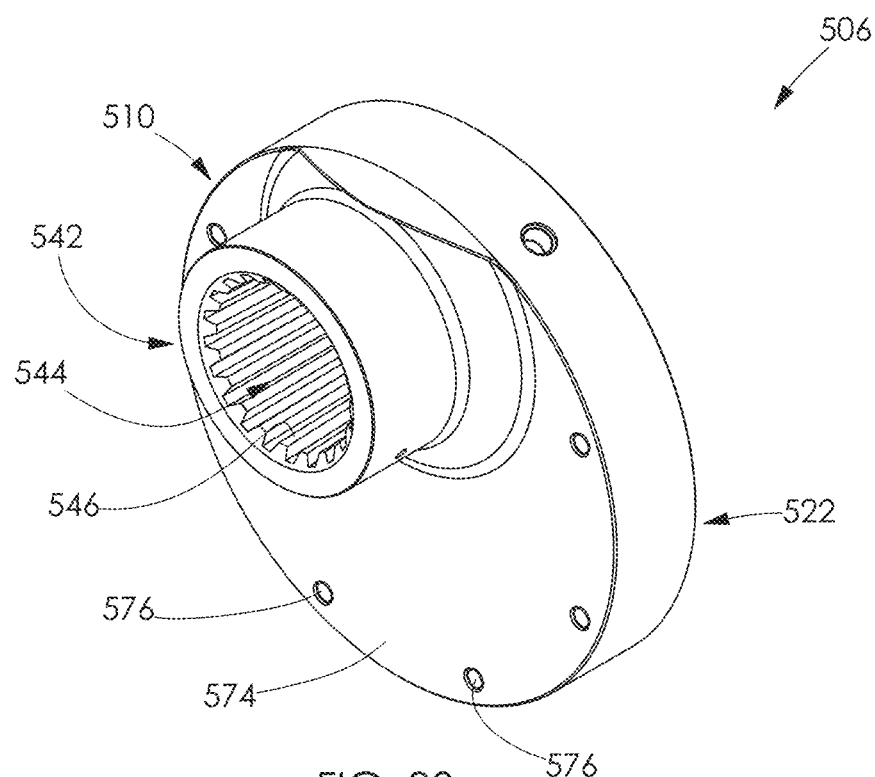
FIG. 88 is a perspective view of the first side of the second end journal used with the modular crankshaft shown in FIG. 73.
Figure 89:
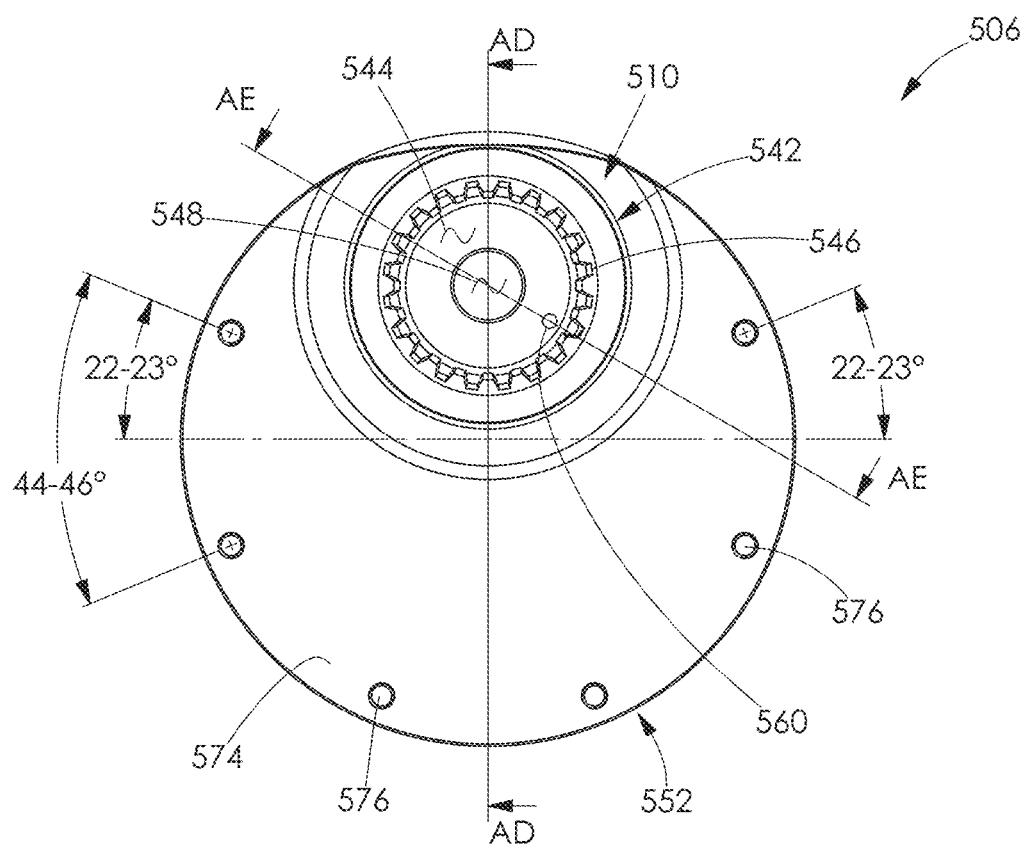
FIG. 89 is an elevational view of the first side of the second end journal shown in FIG. 88.
Figure 90:
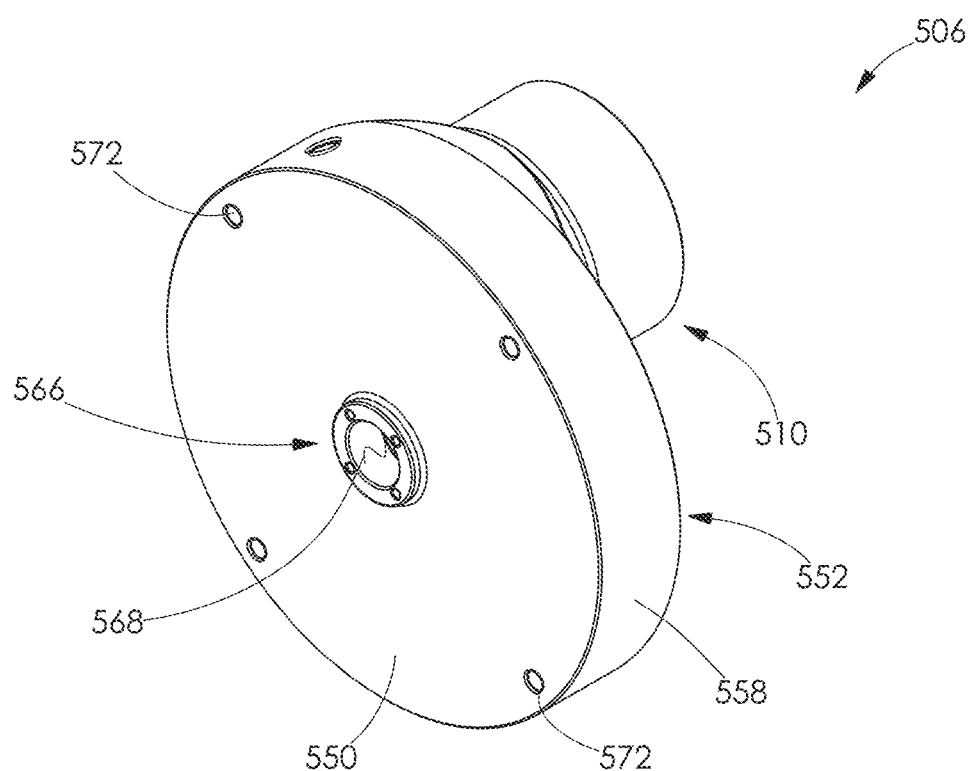
FIG. 90 is a perspective view of the second side of the second end journal shown in FIG. 88.
Figure 91:
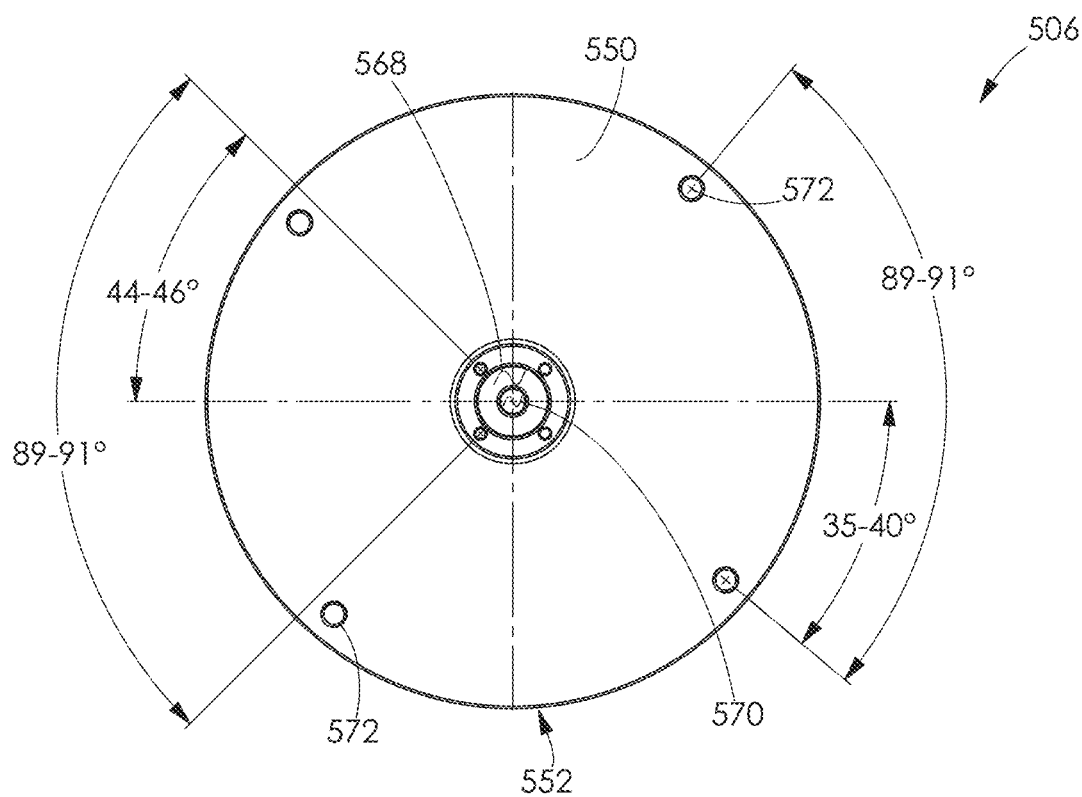
FIG. 91 is an elevational view of the second side of the second end journal shown in FIG. 88.

Continuing with FIGS. 88-91, the second side 550 of the body 552 further comprises a plurality of retainer mounting holes 572, as shown in FIGS. 90 and 91. The mounting holes 572 are identical to the mounting holes 340 shown in FIGS. 33 and 34. A first side 574 of the body 552 further comprises a plurality of retainer mounting holes 576, as shown in FIGS. 88 and 89. The mounting holes 576 are identical to the mounting holes 314, shown in FIGS. 31 and 32.

Figure 79:
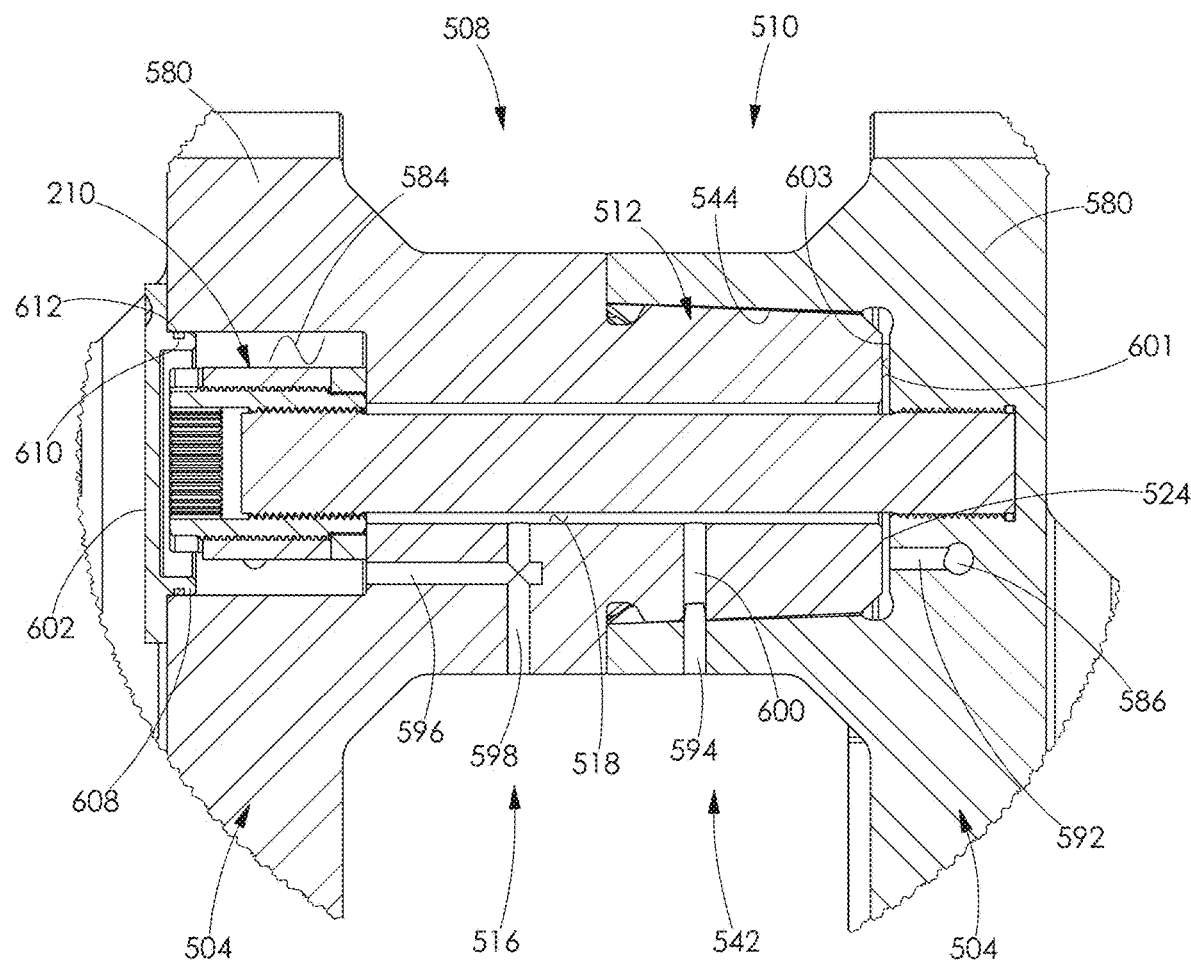
FIG. 79 is an enlarged view of area Z shown in FIG. 77, but taken along a different cross-sectional line so as to expose a portion of the lubricant passageway shown in FIG. 76.

Turning now to FIGS. 96-105, each inner journal 504 comprises the receiver element 510 joined to a first side 578 of its body 580 and the shank element 508 joined to a second side 582 of its body 580. However, each body 580 of each inner journal 504 has a counterbore 584 formed therein that is larger than the counterbore 526, shown in FIGS. 86 and 87. As will be described herein, the counterbore 584 is larger because it serves as a connection point along the lubricant passageway 532. When the three-piece nut 210 is installed within the counterbore 584, space exists between the sidewalls of the counterbore 584 and an outer surface of the nut 210, as shown in FIG. 79, for lubricant to flow. The first side 578 of each inner journal 504 further comprises the retainer mounting holes 576, and the second side 582 further comprises the retainer mounting holes 538.

Figure 76:
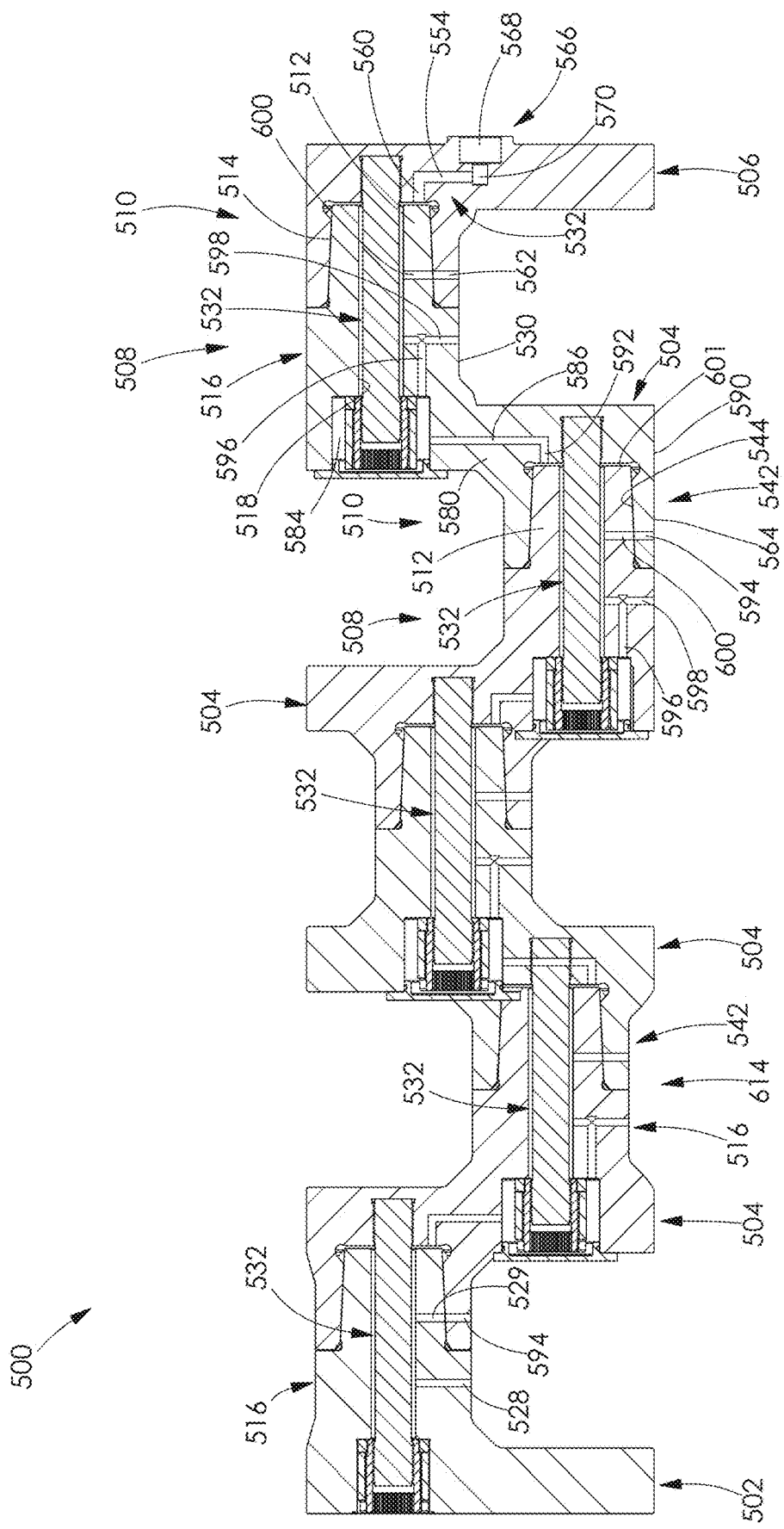
FIG. 76 is the front elevational view of the modular crankshaft shown in FIG. 75, but portions of the crankshaft have been cutaway to expose a lubricant passageway.
Figure 77:
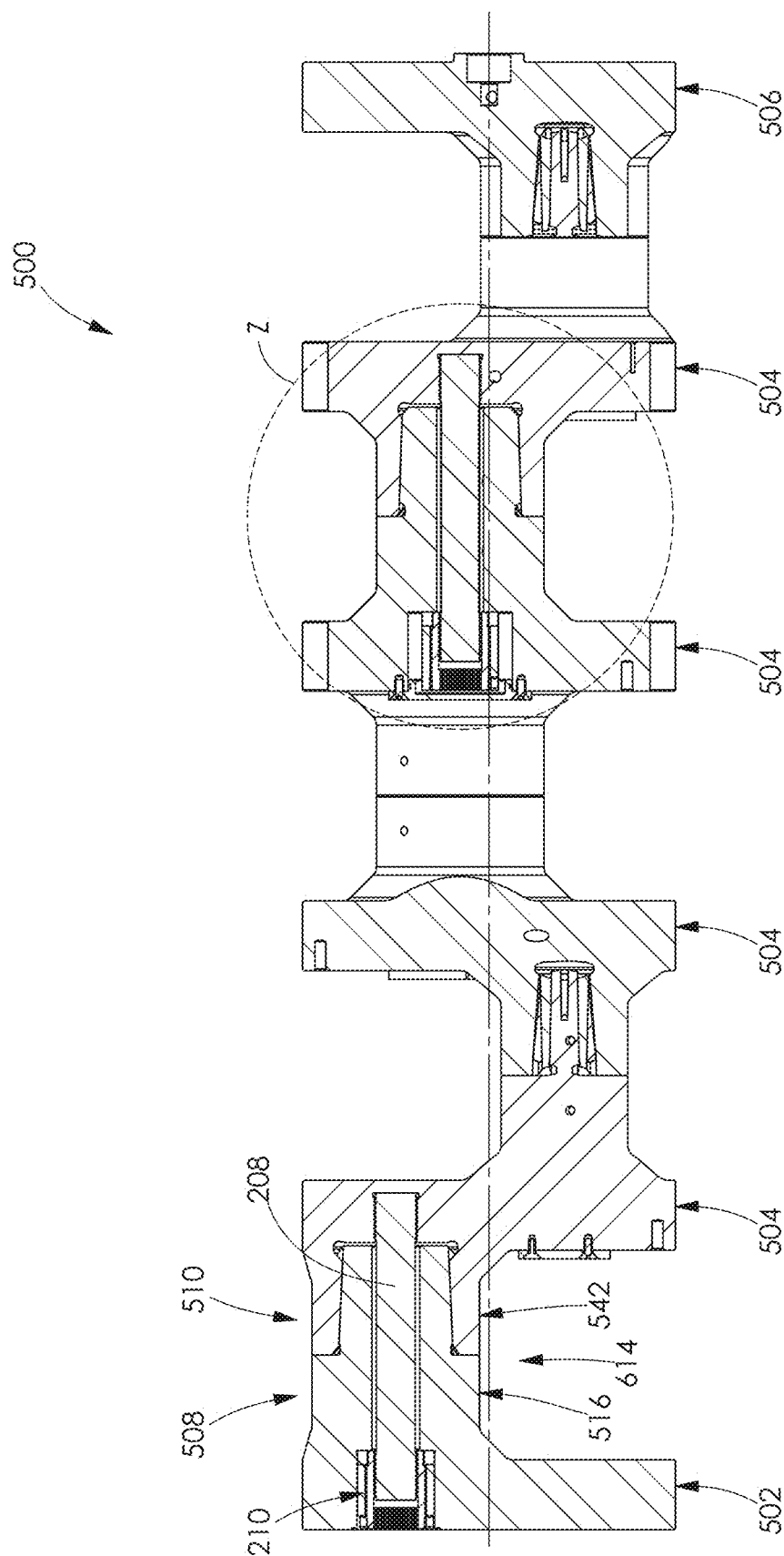
FIG. 77 is a cross-sectional view of the modular crankshaft shown in FIG. 75, taken along line Y-Y.
Figures 101, 102:
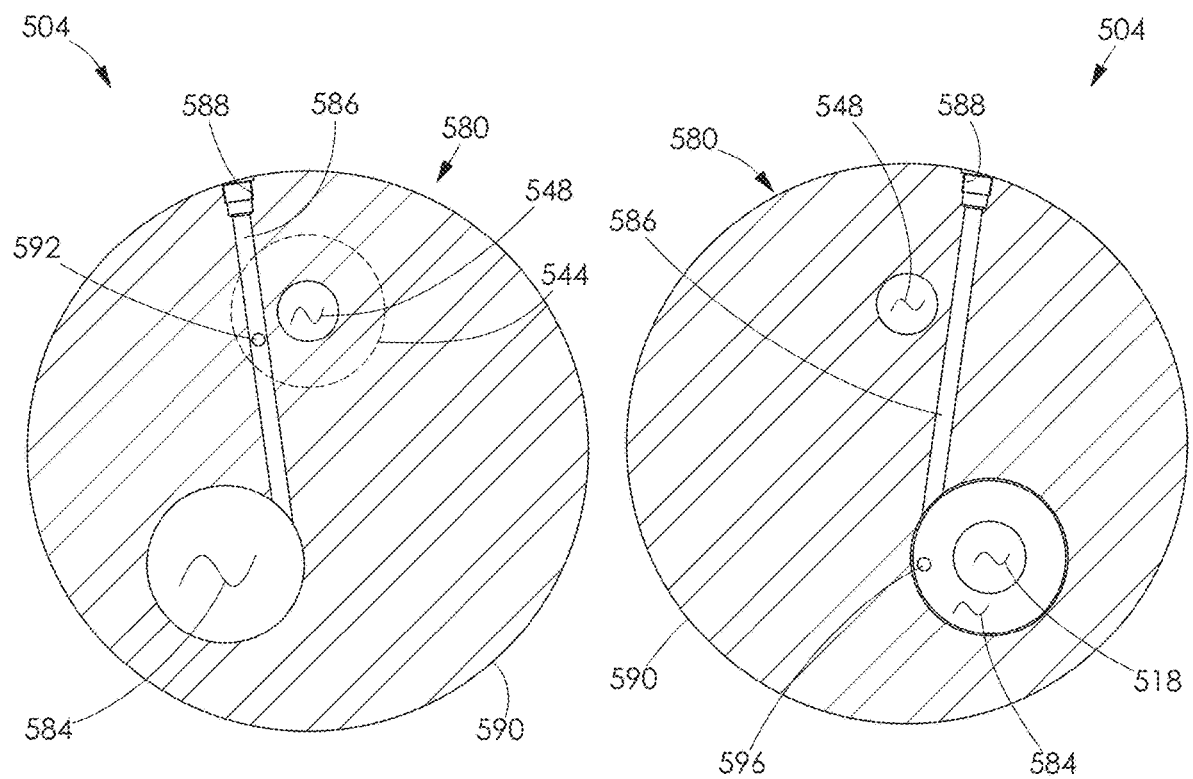
FIG. 101 is a cross-sectional view of the inner journal shown in FIG. 100, taken along line AF-AF.
FIG. 102 is a cross-sectional view of the inner journal shown in FIG. 100, taken along line AG-AG.
Figure 103:
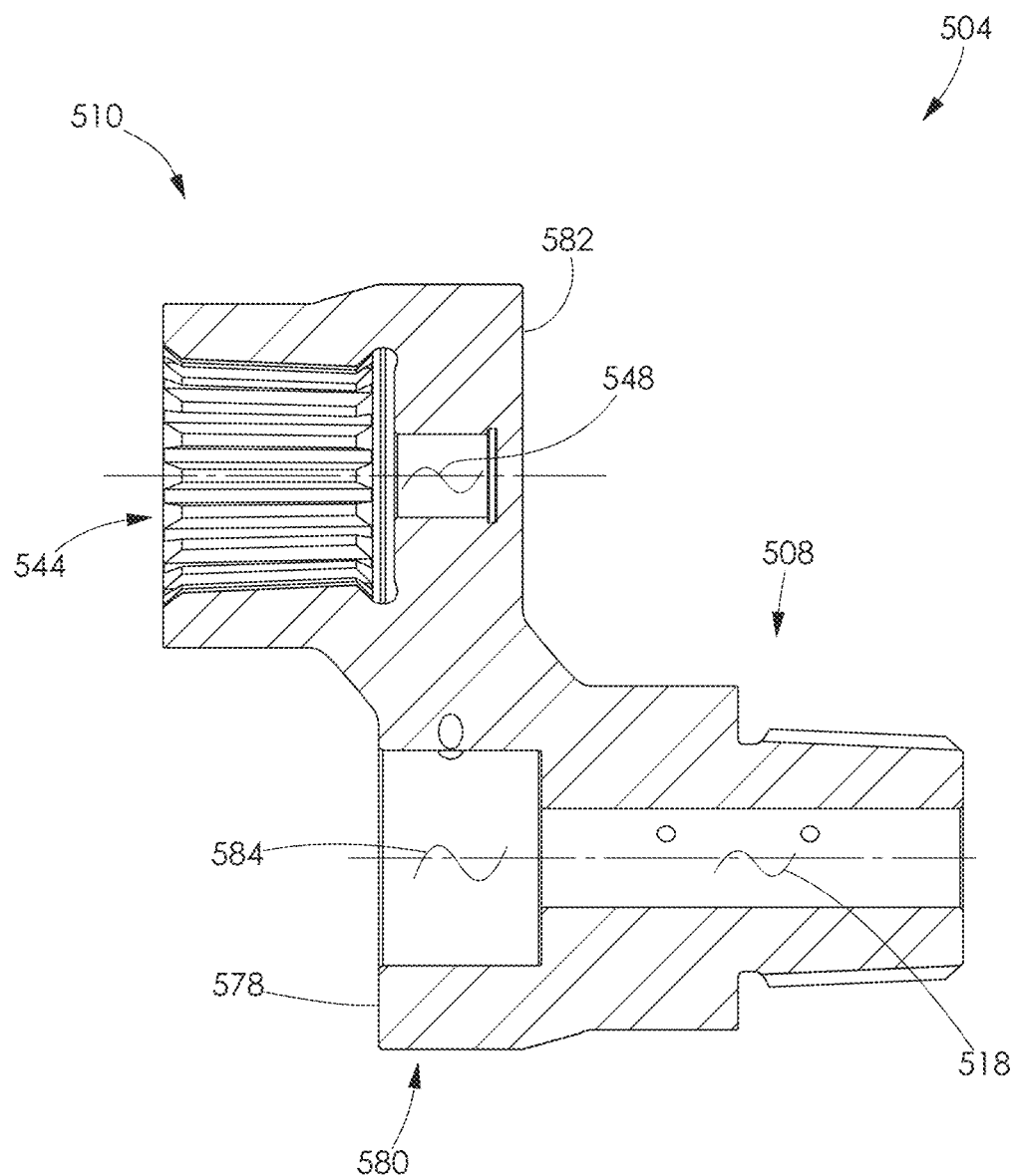
FIG. 103 is a cross-sectional view of the inner journal shown in FIG. 97, taken along line AH-AH.
Figure 104:
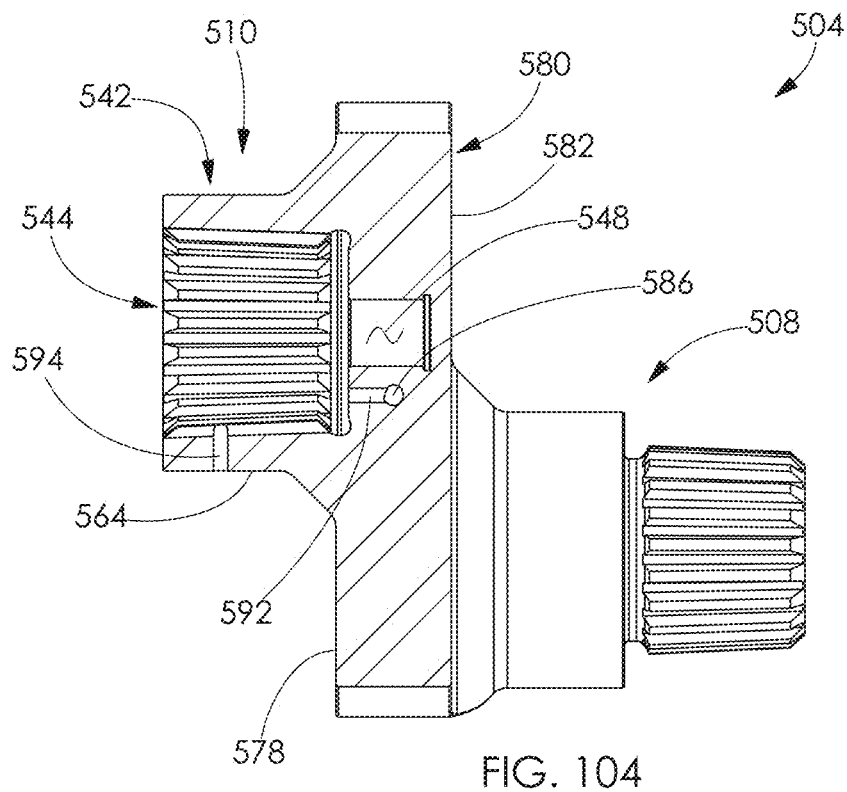
FIG. 104 is a cross-sectional view of the inner journal shown in FIG. 97, taken along line AI-AI.

Continuing with FIGS. 76 and 101-104, a plurality of lubricant passages are formed in each inner journal 504. A first lubricant passage 586 extends radially through the body 580 and interconnects the counterbore 584 and a plug bore 588 that opens on an outer rim 590 of the body 580, as shown in FIGS. 101, 102, and 76. A second lubricant passage 592 joins the first lubricant passage 586 at a right angle and extends into the opening 544 of the second rod journal section 542, as shown in FIGS. 101, 104, and 76. A third lubricant passage 594 interconnects the opening 544 and the outer surface 564 of the second rod journal section 542, as shown in FIGS. 104 and 76.

Figure 105:
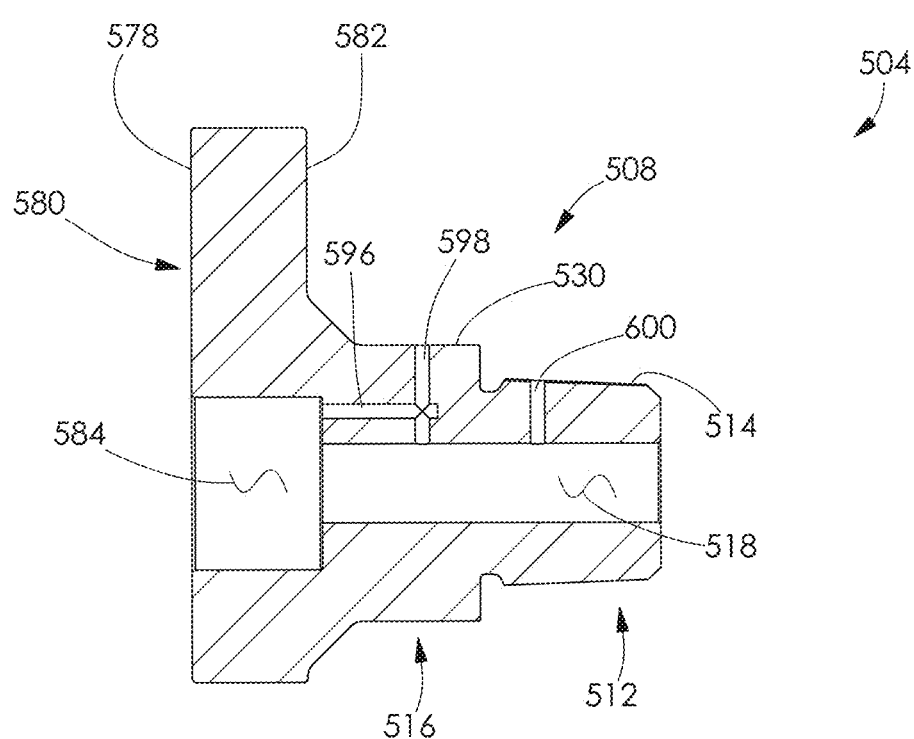
FIG. 105 is a cross-sectional view of the inner journal shown in FIG. 99, taken along line AJ-AJ.
Figure 106:
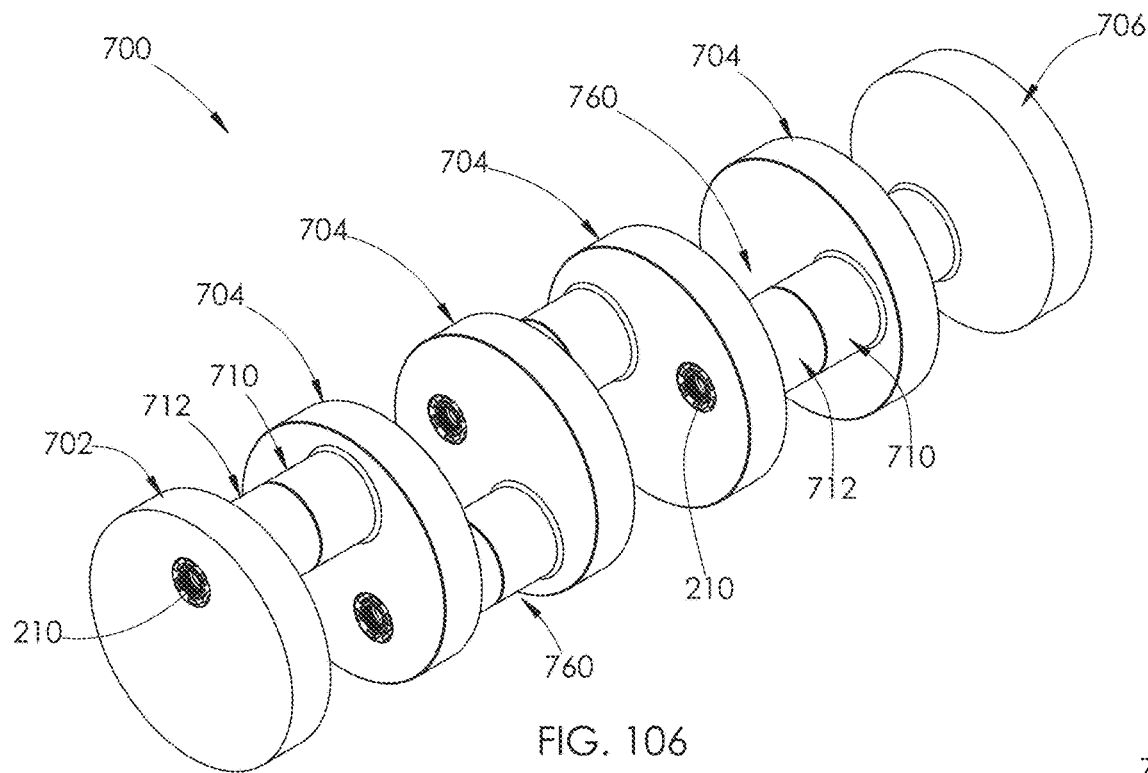
FIG. 106 is a first end perspective view of another embodiment of a modular crankshaft disclosed herein.
Figure 107:
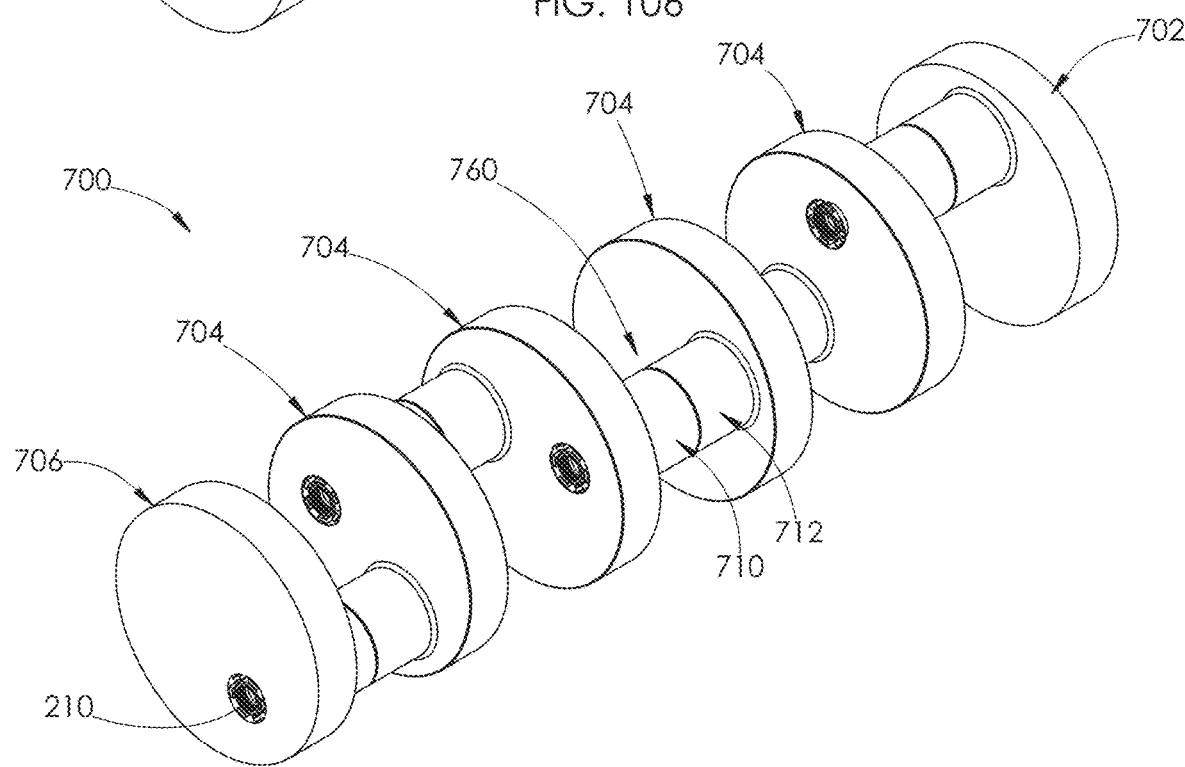
FIG. 107 is a second end perspective view of the modular crankshaft shown in FIG. 106.
Figure 108:
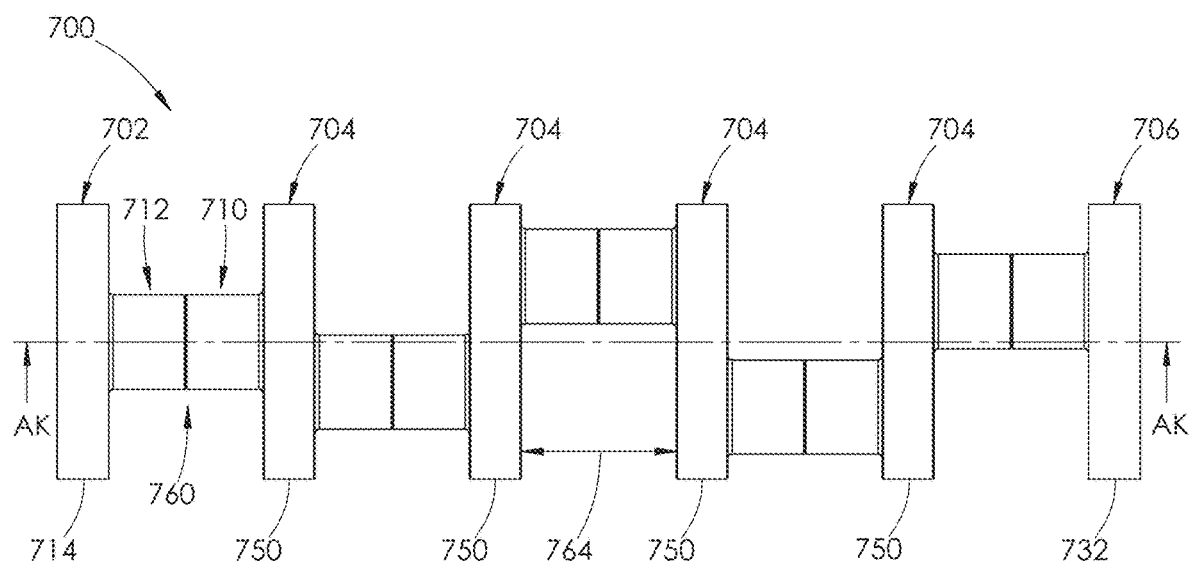
FIG. 108 is a top plan view of the modular crankshaft shown in FIG. 106.
Figure 109:
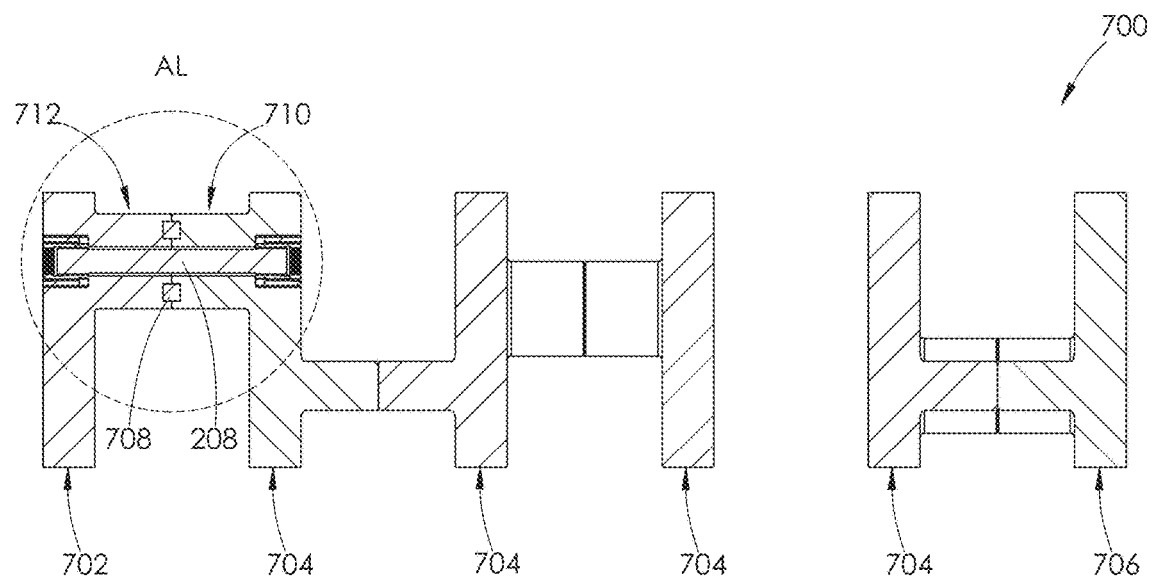
FIG. 109 is a cross-sectional view of the modular crankshaft shown in FIG. 108, taken along line AK-AK.

Continuing with FIGS. 76 and 105, a fourth lubricant passage 596 interconnects the counterbore 584 and a fifth lubricant passage 598 formed within the first rod journal section 516 of the shank element 508. The fifth lubricant passage 598 interconnects the first passage 518 and the outer surface 530 of the first rod journal section 516. A sixth lubricant passage 600 interconnects the first passage 518 and the outer splined surface 514 of the shank 512.

Continuing with FIG. 76, when the shank element 508 of an inner journal 504 is installed within the receiver element 510 of an adjacent inner journal 504, the sixth lubricant passage 600 formed in the shank 512 and the third lubricant passage 594 formed within the second rod journal section 542 align with one another, as shown in FIG. 79. Likewise, the third passage 562 formed in the second rod journal section 542 of the second end journal 506 aligns with the sixth passage 600 formed in the shank 512 of an inner journal 504. The second lubricant passage 529 formed in the shank 512 of the first end journal 502 likewise aligns with the third lubricant passage 594 of the second rod journal section 542 of an inner journal 504.

Continuing with FIGS. 76 and 79, the lubricant passageway 532 follows a different path than the lubricant passageway 276, shown in FIG. 18. Lubricant enters the crankshaft 500 through the lubricant port 566 and flows through the first and second lubricant passages 554 and 560 and into the opening 544. When the shank 512 is installed within the opening 544, a gap 601 exists between the front surface 524 of the shank 512 and a base 603 of the opening 544, as shown in FIG. 79. Lubricant entering the opening 544 flows within the gap 601 and around the front surface 524 of the shank 512 and into the first passage 518, as shown in FIG. 79.

Continuing with FIG. 76, lubricant within the first passage 518 flows into the aligned sixth and third lubricant passages 600 and 562 and flows into the fifth lubricant passage 598. Lubricant flowing along the passages 600, 562, and 598 may flow into the connecting rod roller bearings 394 in the same manner as the lubricant passages formed within the crankshaft 200, as shown in FIGS. 64 and 65.

Continuing with FIGS. 76 and 79, lubricant within the fifth lubricant passage 598 can also flow into the fourth lubricant passage 596. From the fourth lubricant passage 596, lubricant flows into the counterbore 584 and around the three-piece nut 210. From the counterbore 584, lubricant flows into the first lubricant passage 586 formed in the body 580 of the inner journal 504 and into the second lubricant passage 592, as shown in FIG. 76. Lubricant in the second lubricant passage 592 flows into the gap 601 between the shank 512 and the receiver element 510 and back into the first passage 518. The lubricant passageway 532 ends at the first passage 528 formed in the first rod journal section 516 of the shank element 508 on the first end journal 502, as shown in FIG. 76.

Continuing with FIG. 79, to maintain the integrity of the lubricant passageway 532, the counterbores 584 are covered by a seal plate 602. The plate 602 prevents lubricant within the counterbore 584 from leaking out of the bodies 580 of the inner journals 504. Likewise, a plug 605 may be installed within each plug bore 556 and 588 for preventing lubricant from leaking from the lubricant passageway 532, as shown in FIG. 80.

Figure 96:
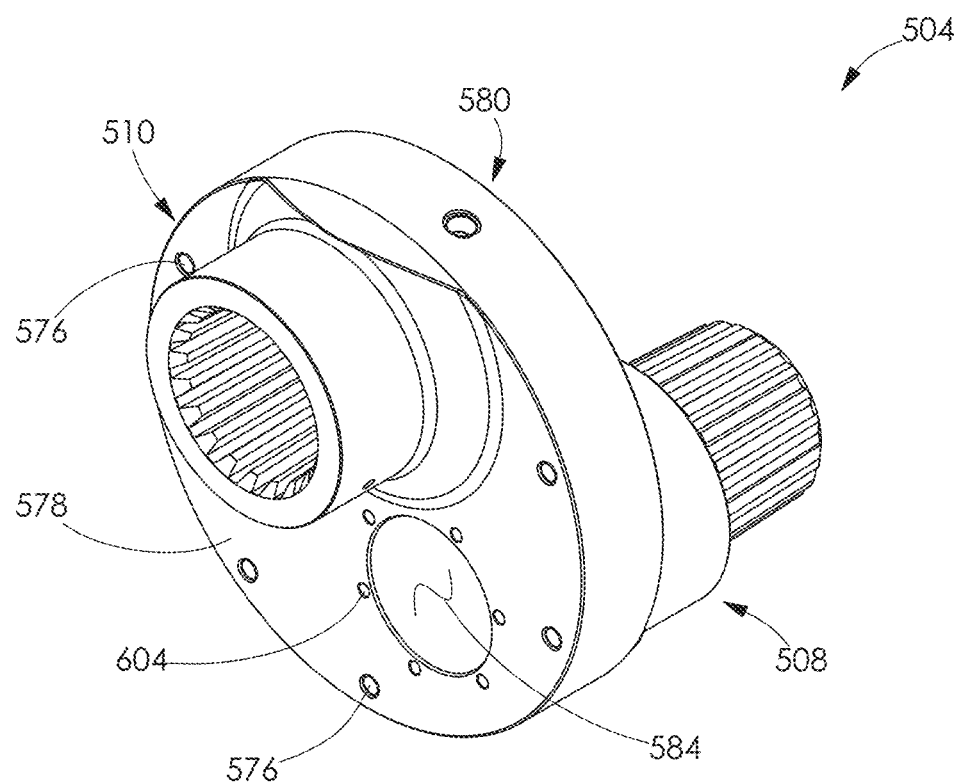
FIG. 96 is a perspective view of the first side of an inner journal used with the modular crankshaft shown in FIG. 73.
Figure 97:
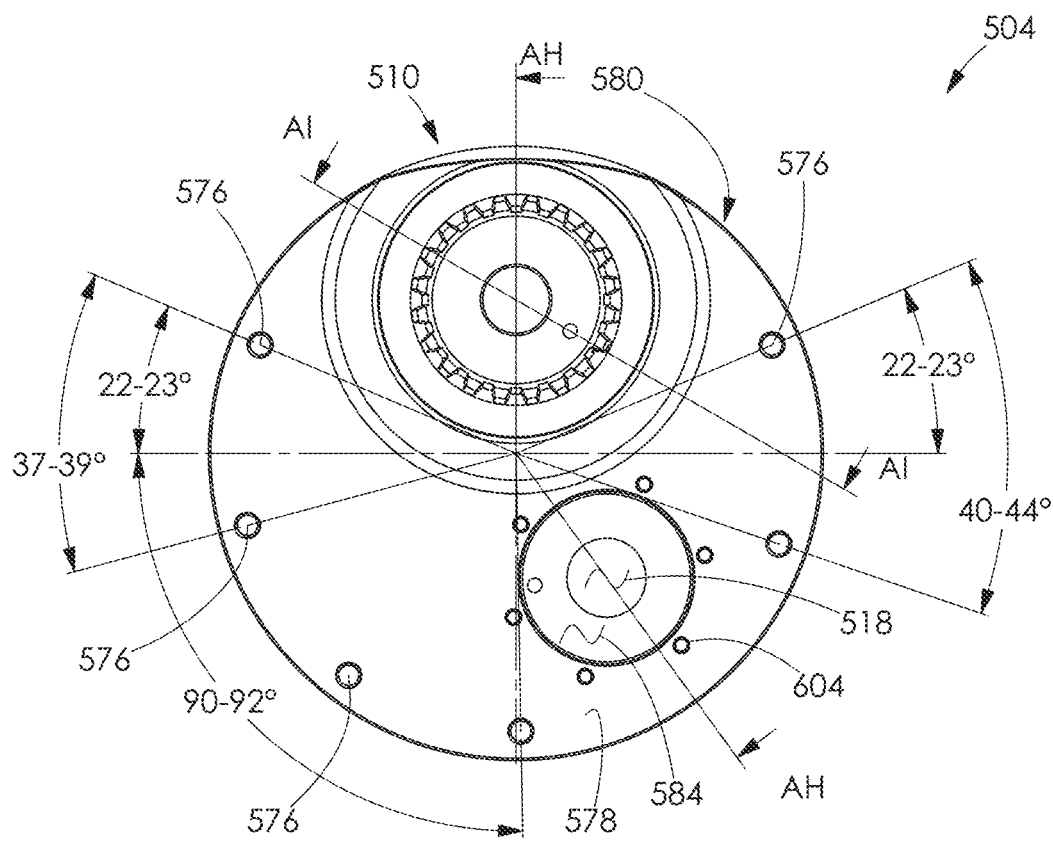
FIG. 97 is an elevational view of the first side of the inner journal shown in FIG. 96.
Figure 98:
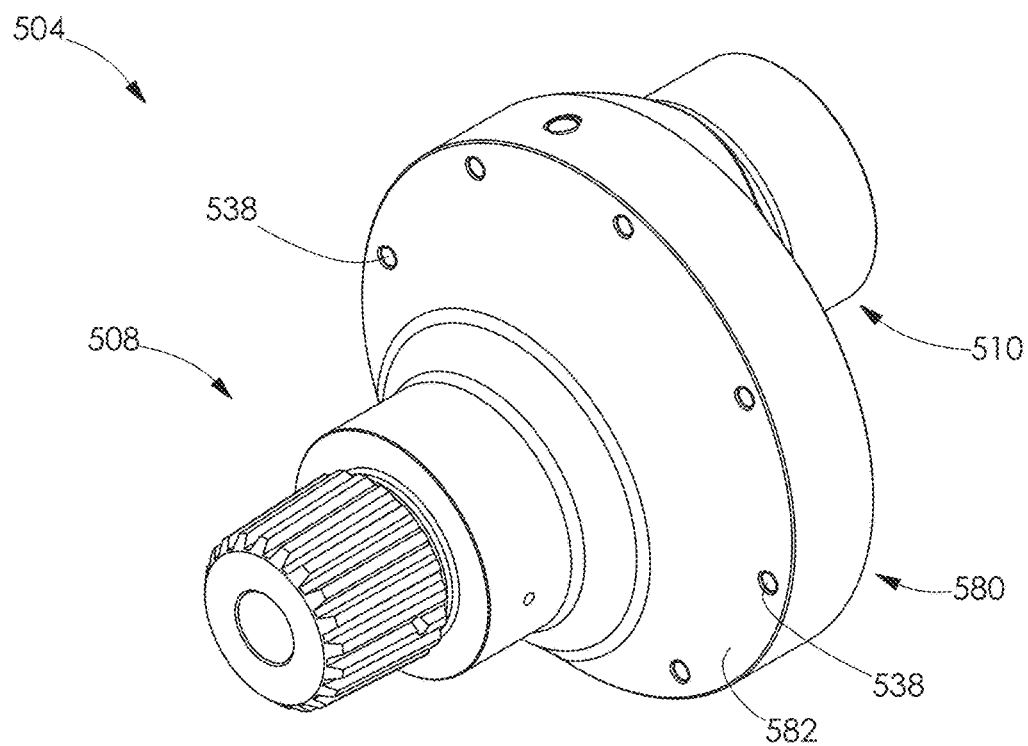
FIG. 98 is a perspective view of the second side of the inner journal shown in FIG. 96.
Figure 99:
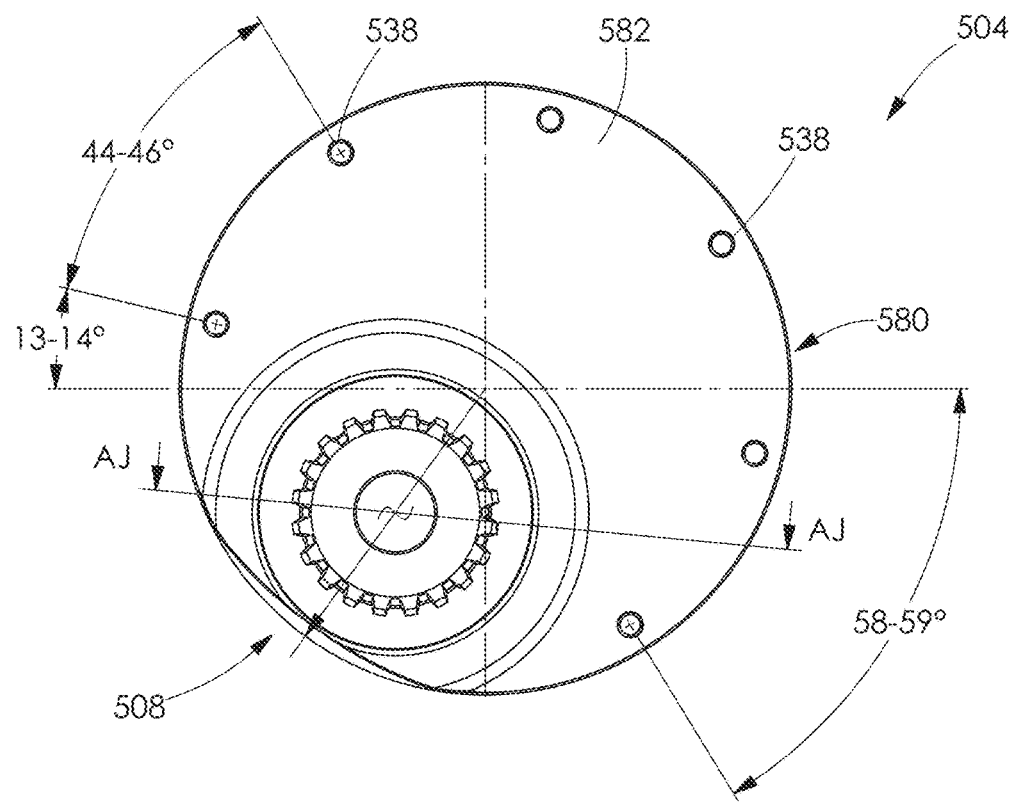
FIG. 99 is an elevational view of the second side of the inner journal shown in FIG. 96.
Figure 100:
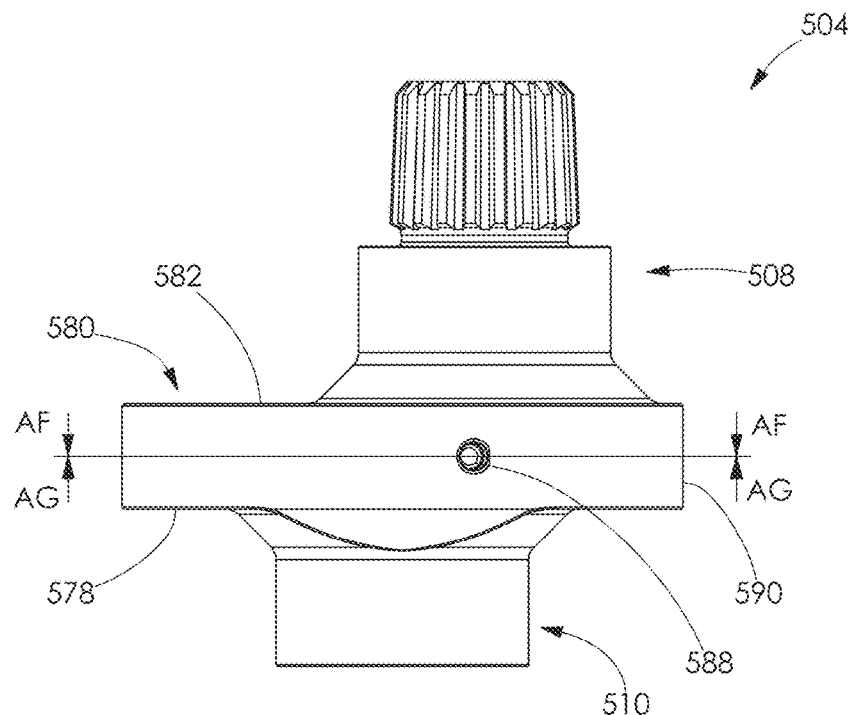
FIG. 100 is a top plan view of the inner journal shown in FIG. 96.

With reference to FIGS. 96 and 97, a plurality of mounting holes 604 are formed in the first side 578 of each inner journal 504 for receiving fasteners 606 used to attach each plate 602 to a corresponding body 580, as shown in FIG. 80. The mounting holes 604 surround an opening of each counterbore 584. When a plate 602 is attached to a body 580, an inner flange 608 of each plate 602 engages the inner side walls of the counterbore 584, as shown in FIG. 79. An annular groove 610 is formed in the outer surface of the flange 608 for housing a seal 612 that prevents lubricant from leaking between the body 580 and the plate 602, as shown in FIG. 79.

Figure 78:
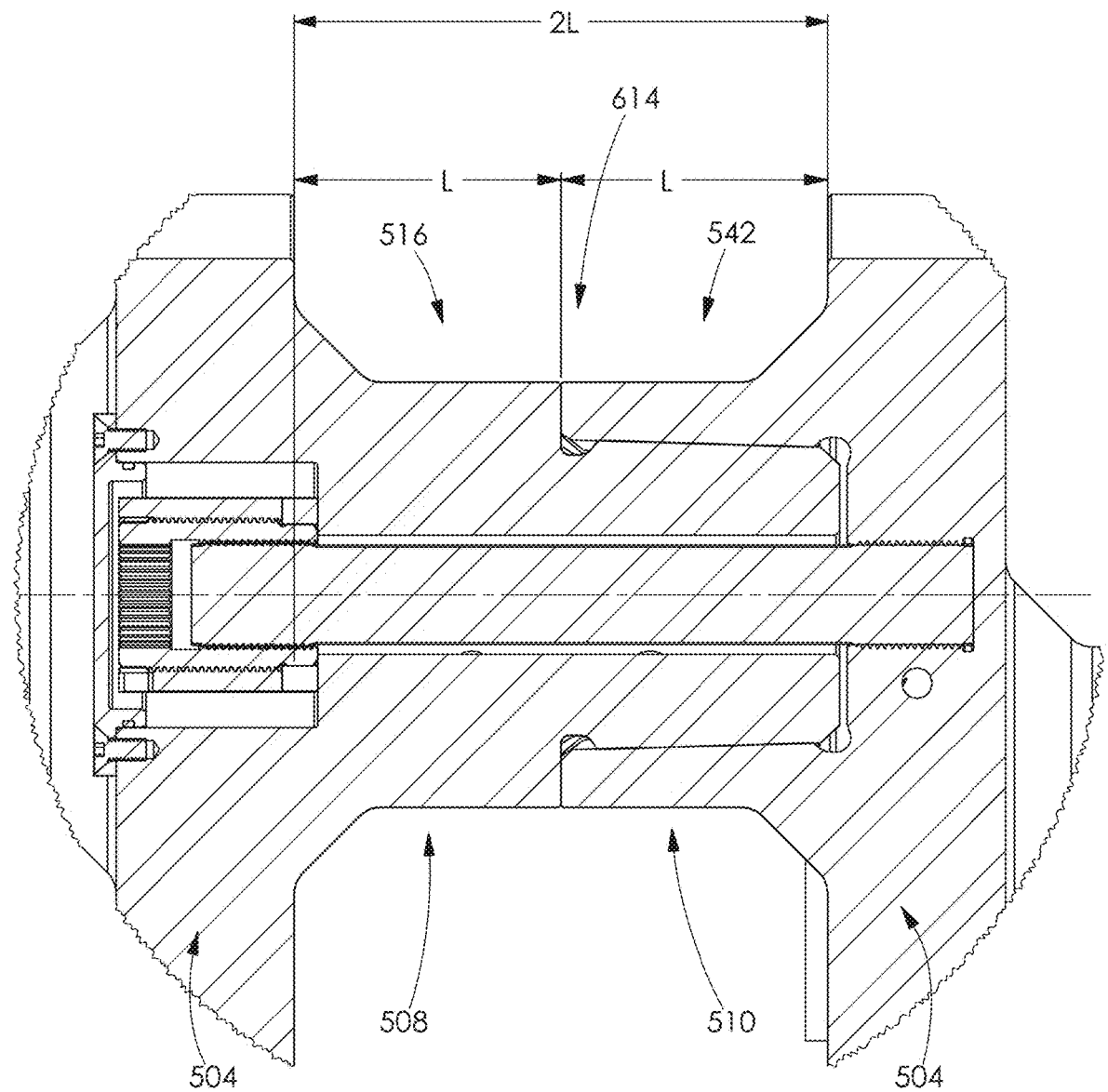
FIG. 78 is an enlarged view of area Z, shown in FIG. 77.

Turning back to FIGS. 73-78, when the journals 502, 504, and 506 are interconnected, adjacent rod journal sections 516 and 542 form a connecting rod journal 614. The rod journal sections 516 and 542 making up the connecting rod journal 614 are equal in length, L, as shown in FIG. 78.

During operation, torque is transmitted between the interconnecting journals 502, 504, and 506 through the form lock function of the tapered and mated splined surfaces 514 and 546. That is, the compression force applied to the tapered connection by the fastener 208 locks the tapered and splined shank 512 into the tapered and splined opening 544, preventing relative rotational movement between the components. The size and shape of the connected rod journal sections 516 and 542 also have the same advantages of those found in the crankshaft 200. The main journal roller bearings 118 and connecting rod bearings 394, shown in FIGS. 49-65, may be attached to or installed on the corresponding journals 502, 504, and 506 and corresponding connecting rod journals 614 in the same manner as the crankshaft 200.

Modular Crankshaft 700

Figure 110:
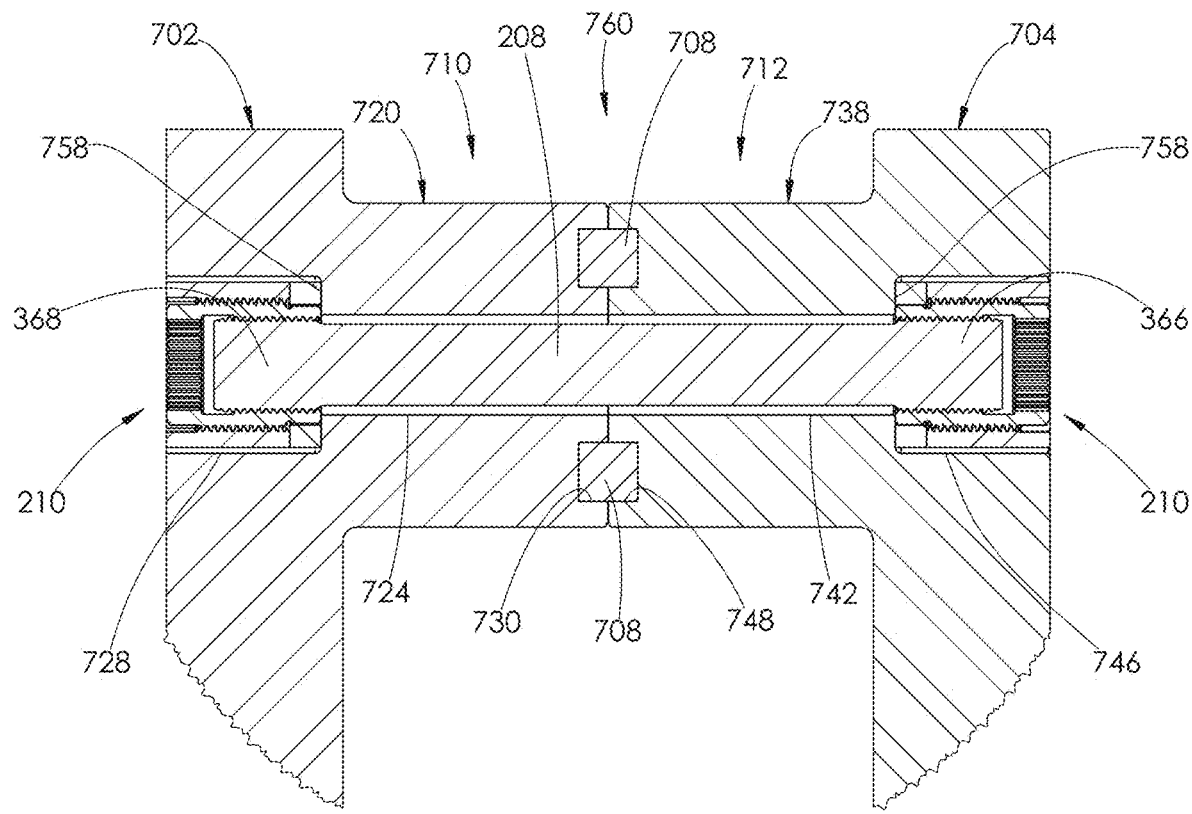
FIG. 110 is an enlarged view of area AL, shown in FIG. 109.

Turning to FIGS. 106-123, another embodiment of a modular crankshaft 700 is shown. The modular crankshaft 700 comprises a first end main bearing journal 702 joined to a plurality of inner main bearing journals 704 and a second end main bearing journal 706. The crankshaft 700 comprises another method of interconnecting the journals 702, 704, and 706 than is used with the crankshafts 200, 450, and 500. In contrast to the crankshafts 200, 450, and 500, the crankshaft 700 does not use a shank element installed within a corresponding receiver element. Instead, the crankshaft 700 interconnects the corresponding journals 702, 704, and 706, using a plurality of dowel pins 708 that span between abutted first and second connection elements 710 and 712, as shown in FIG. 110.

Continuing with FIGS. 112-115, the first end journal 702 comprises a cylindrical body 714 having opposed first and second sides 716 and 718. A second connection element 712 is joined to the second side 718. The second connection element 712 comprises a first rod journal section 720 having a cylindrical outer surface 722. A first passage 724 is formed in the first end journal 702 that interconnects a front surface 726 of the first rod journal section 720 and the first side 716 of the body 714. The first passage 724 opens into a first counterbore 728 that opens on the first side 716 of the body 714.

Figure 114:
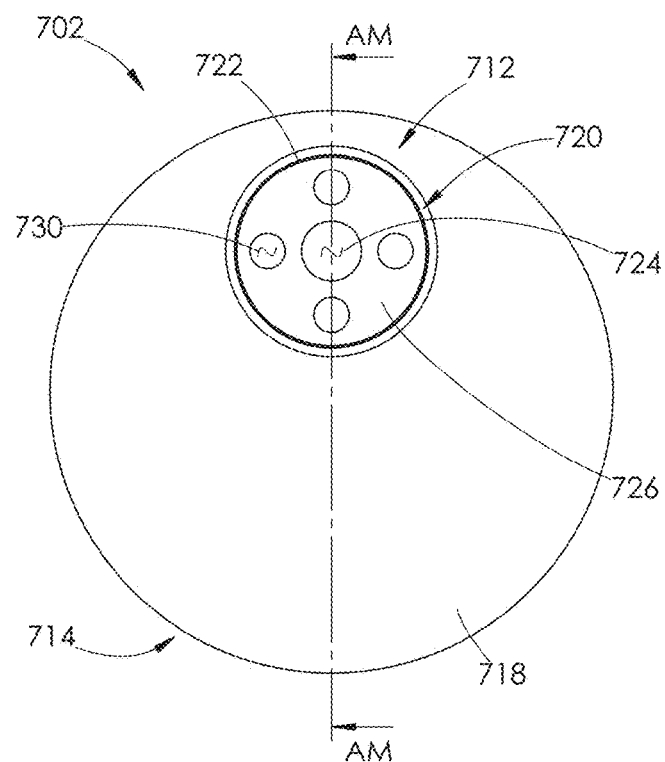
FIG. 114 is an elevational view of the second side of the first end journal shown in FIG. 112.
Figure 115:
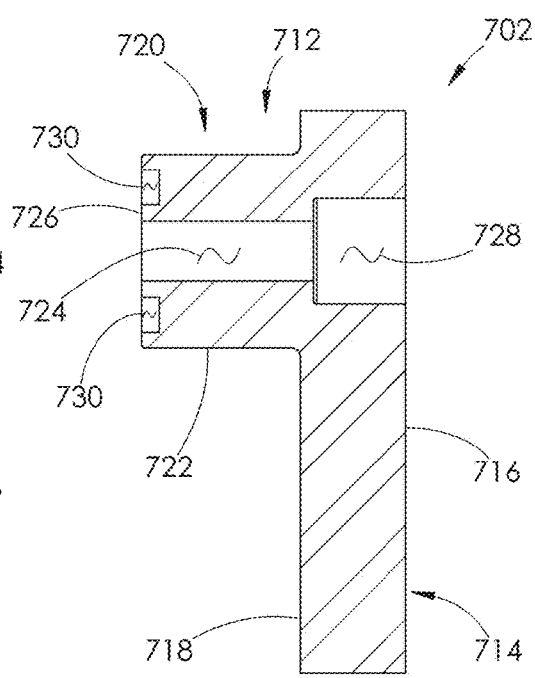
FIG. 115 is a cross-sectional view of the first end journal shown in FIG. 114, taken along line AM-AM.
Figure 116:
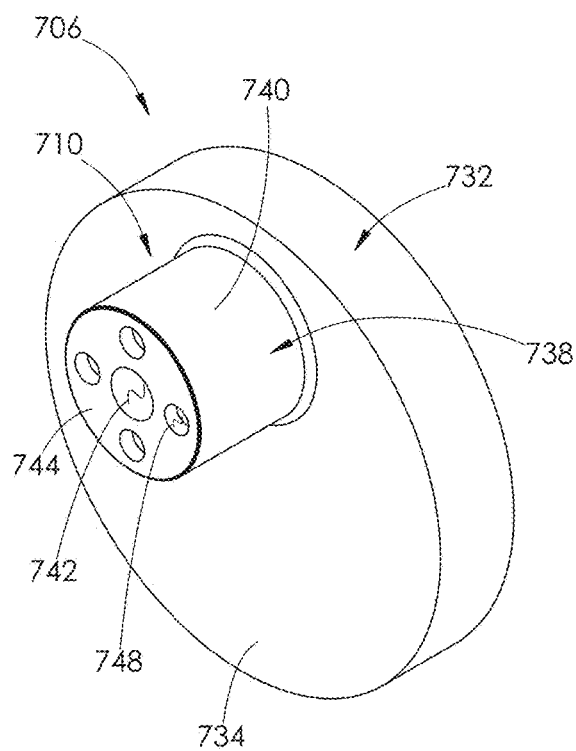
FIG. 116 is a perspective view of the first side of the second end journal used with the modular crankshaft shown in FIG. 106.
Figure 117:
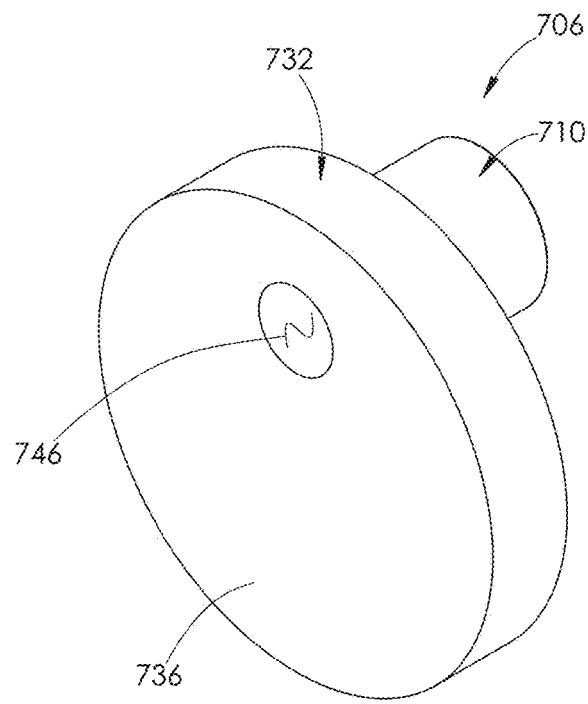
FIG. 117 is a perspective view of the second side of the second end journal shown in FIG. 116.
Figure 118:
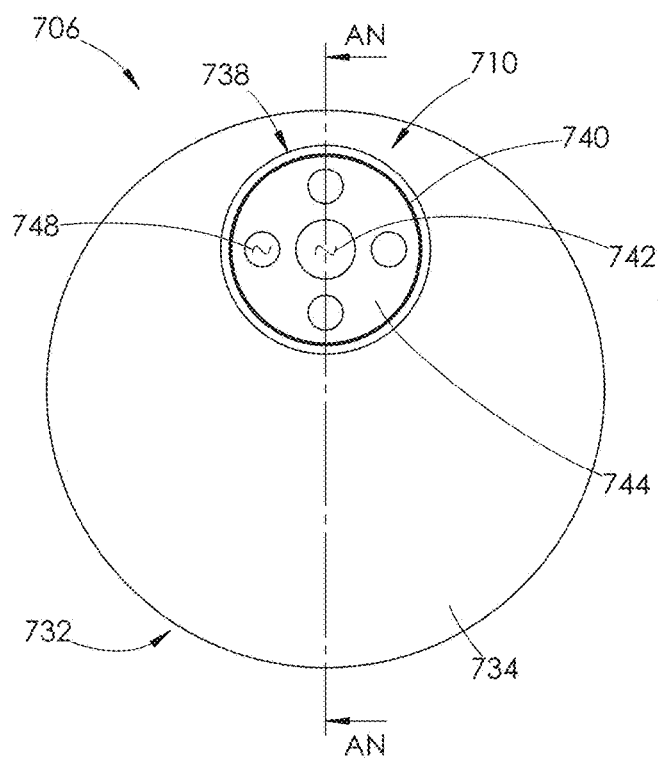
FIG. 118 is an elevational view of the first side of the second end journal shown in FIG. 116.
Figure 119:
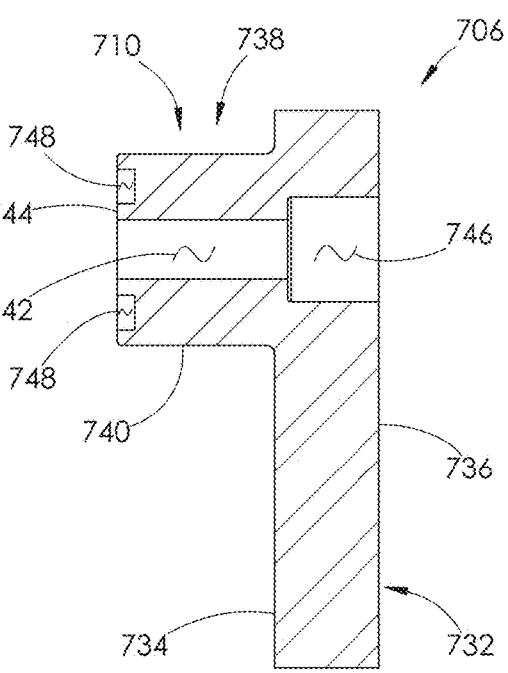
FIG. 119 is a cross-sectional view of the second end journal shown in FIG. 118, taken along line AN-AN.

Continuing with FIGS. 112-115, the first rod journal section 720 further comprises a plurality of first dowel pin openings 730 formed in its front surface 726. The dowel pin openings 730 surround a portion of the first passage 724, as shown in FIG. 115. Four equally spaced dowel pin openings 730 are shown in FIG. 114. In alternative embodiments, more or less than four dowel pin openings 730 may be formed in the first rod journal section 720.

Turning to FIGS. 116-119, the second end journal 706 comprises a cylindrical body 732 having opposed first and second sides 734 and 736. A first connection element 710 is joined to the first side 734 of the body 732. The first connection element 710 comprises a second rod journal section 738 having a cylindrical outer surface 740. A second passage 742 is formed in the second end journal 706 that interconnects a front surface 744 of the second rod journal section 738 and the second side 736 of the body 732. The second passage 742 opens into a second counterbore 746 that opens on the second side 736 of the body 732.

Continuing with FIGS. 116-119, the second rod journal section 738 further comprises a plurality of second dowel pin openings 748 formed in its front surface 744. The dowel pin openings 748 surround a portion of the second passage 742 and are configured to align with first dowel pin openings 730 formed in a first rod journal section 720, as shown in FIG. 110.

Turning to FIGS. 120-123, each inner journal 704 comprises a body 750 having opposed first and second sides 752 and 754. A first connection element 710 is joined to the first side 752 and a second connection element 712 is joined to the second side 754.

Turning back to FIGS. 106-111, the first end journal 702 is attached to an inner journal 704 by bringing the corresponding first and second connection elements 710 and 712 together. When brought together, a plurality of dowel pins 708 are installed within the aligned first and second dowel pin openings 730 and 748 and one of the fasteners 208 is installed within the aligned first and second passages 724 and 742, as shown in FIG. 110.

Figure 111:
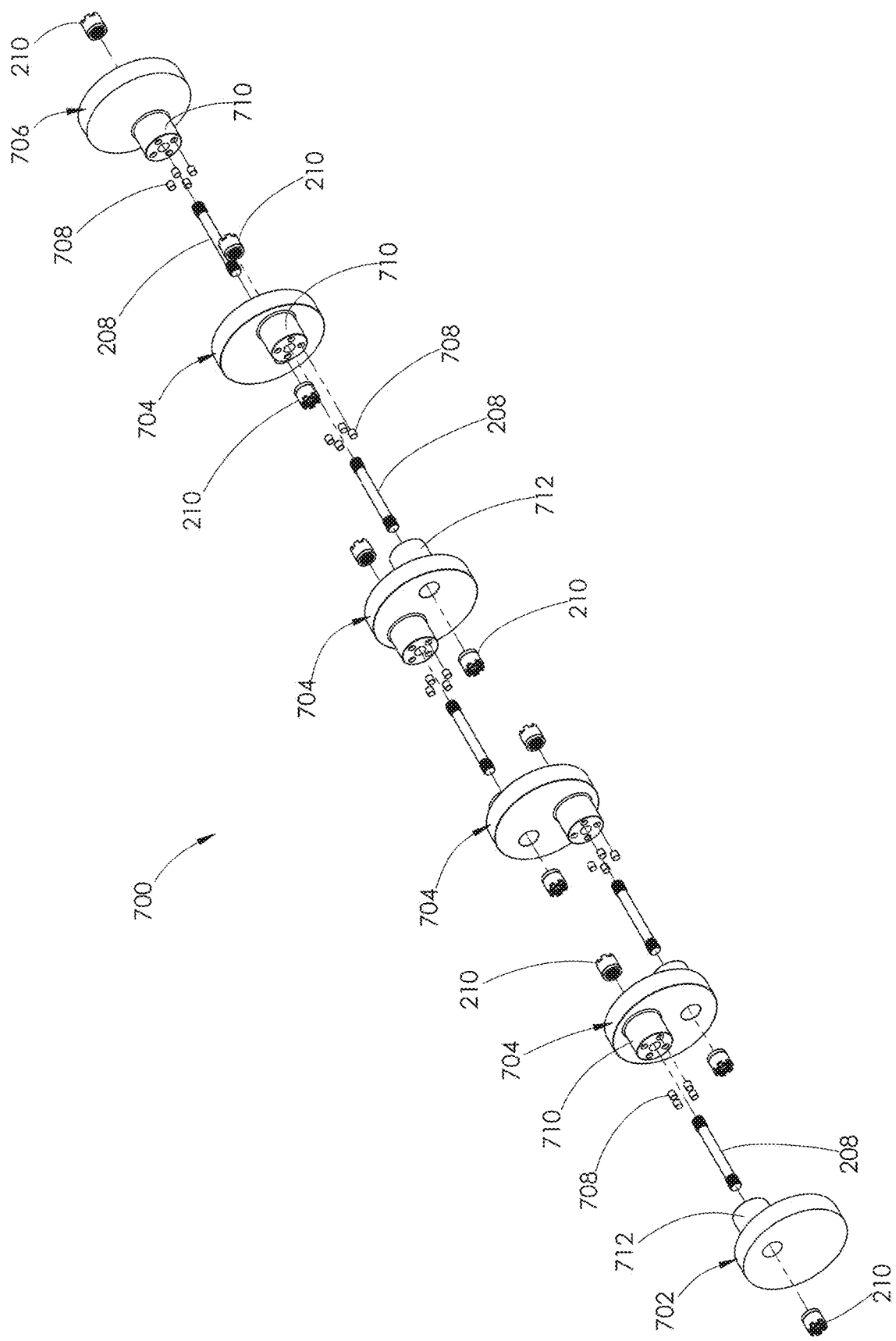
FIG. 111 is a first end perspective and exploded view of the modular crankshaft shown in FIG. 106.
Figure 112:
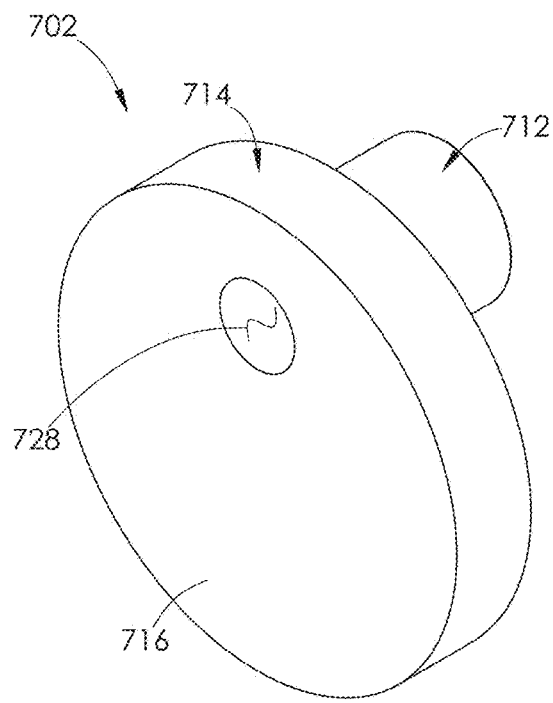
FIG. 112 is a perspective view of the first side of the first end journal used with the modular crankshaft shown in FIG. 106.
Figure 113:
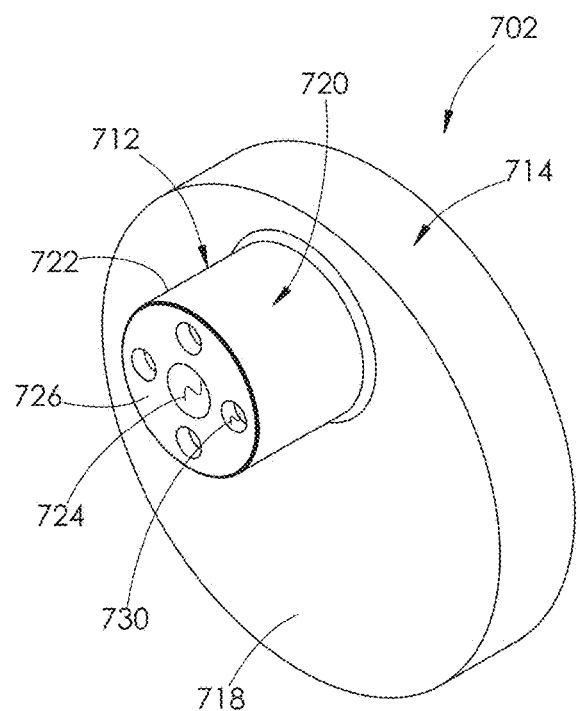
FIG. 113 is a perspective view of the second side of the first end journal shown in FIG. 112.

Continuing with FIG. 110, when the fastener 208 is installed within the aligned passages 724 and 742, a first threaded end 366 of the fastener 208 is positioned within the second counterbore 746 and a second threaded end 368 is positioned within the first counterbore 728. The adjacent journals 702 and 704 are secured together by attaching a three-piece nut 210 to both threaded ends 366 and 368 of the fastener 208. Each nut 210 is turned until it is fully recessed within a corresponding counterbore 728 or 746 and engaging a base 758 of each counterbore 728 and 746. The remaining inner journals 704 and the second end journal 706 are interconnected using the same connection method, as shown in FIG. 111. When the crankshaft 700 is assembled, the joined first and second rod journal sections 720 and 738 together form a connecting rod journal 760.

During operation, the journals 702, 704, and 706 are prohibited from rotating relative to another by the fasteners 208, three-piece nuts 210, and the dowel pins 708. Likewise, torque is transmitted between adjacent journals 702, 704, and 706 by the fasteners 208, three-piece nuts 210, and the dowel pins 708. The crankshaft 700 may be easily manufactured because the various components have the same size and shape and may be easily interchanged with one another.

When the crankshaft 700 is assembled, the cylindrical bodies 714, 732, and 750 of the corresponding journals 702, 706, and 704 are in a side-by-side and spaced apart relationship. The bodies 714, 732, and 750 are spaced apart by a gap 764 shown in FIG. 108. The gap 764 is filled by the connecting rod journals 760. The fasteners 208 may be characterized as extending through a corresponding gap 764 and interconnecting corresponding bodies 714 and 750, 750 and 750, and 750 and 732.

While not shown, the crankshaft 700 may further comprise the various mounting holes formed in the crankshaft 200. The crankshaft 700 may further comprise a plurality of lubricant passages and a lube port, similar to those formed in the crankshaft 200. In alternative embodiments, a different number of dowel pins or dowel pins of a different size and/or shape and corresponding openings may be used in place of the dowel pins 708 and dowel pin openings 730 and 748.

Modular Crankshaft 800

Turning to FIGS. 124-152, another embodiment of a modular crankshaft 800 is shown. The crankshaft 800 comprises a first end main bearing journal 802, a plurality of inner main bearing journals 804, and a second end main bearing journal 806. In contrast to the crankshafts 200, 450, 500, and 700 discussed above, the crankshaft 800 further comprises a plurality of separate connecting rod journals 808. Each connecting rod journal 808 interconnects the adjacent main bearing journals 802, 804, and 806. As will be described herein, adjacent main bearing journals 802, 804, and 806 and connecting rod journals 808 are secured together using the fasteners 208, the three-piece nut 210, a flanged nut 838, and a flanged washer 868.

With reference to FIGS. 130-133, the first end journal 802 comprises a cylindrical body 810 having opposed first and second sides 812 and 814 joined by an outer rim 816. A second connection element 818 is joined to the second side 814. The second connection element 818 comprises a second shank 820. The shank 820 has a non-circular or polygonal cross-sectional shape. Specifically, the shank 820 has the cross-sectional shape of a Reuleaux triangle with radiused vertices. First and second vertices 824 and 826 are positioned adjacent the outer rim 816 while a third vertex 828 is positioned directly above or is spaced from and aligned with a centroid 830 of the second side 814 of the body 810, as shown in FIG. 132.

Continuing with FIGS. 130-133, a first passage 832 is formed within the body 810 and interconnects a front surface 834 of the second shank 820 and the first side 812 of the body 810. The first passage 832 comprises a first counterbore 836 which opens on the first side 812 of the body 810. As will be described herein, the first counterbore 836 is sized to receive a flanged nut 838 or a flanged washer 868.

Turning to FIGS. 134-137, the second end journal 806 comprises a cylindrical body 840 having opposed first and second sides 842 and 844 joined by an outer rim 846. A first connection element 848 is joined to the first side 842 of the body 840. The first connection element 848 comprises a first shank 850. Like the second shank 820, the first shank 850 has a non-circular or polygonal cross-sectional shape. Specifically, the first shank 850 has the cross-sectional shape of a Reuleaux triangle with radiused vertices. First and second vertices 854 and 856 are positioned adjacent the outer rim 846 while a third vertex 858 is positioned directly above or is spaced from and aligned with a centroid 860 of the first side 842 of the body 840, as shown in FIG. 136.

Continuing with FIGS. 134-137, a second passage 862 is formed within the body 840 and interconnects a front surface 864 of the first shank 850 and the second side 844 of the body 840. The second passage 862 comprises a second counterbore 866 which opens on the second side 844 of the body 840. As will be described herein, the second counterbore 866 is sized to receive a flanged nut 838 or a flanged washer 868. While the first and second end journals 802 and 806 are oriented differently when assembled within the first crankshaft 800, the first and second end journals 802 and 806 are identical and interchangeable with one another. The shanks 820 and 850 may also be tapered like the shank 226 shown in FIG. 30.

Turning to FIGS. 138-141, each inner journal 804 comprises a cylindrical body 870 having opposed first and second sides 872 and 874 joined by an outer rim 876. The first connection element 848 is joined to the first side 872 of the body 870 and the second connection element 818 is joined to the second side 874 of the body 870. Each inner journal 804 further comprises the first passage 832 and the first counterbore 836 formed within the body 870 and the second shank 820 of the second connection element 818. Likewise, each inner journal 804 further comprises the second passage 862 and the second counterbore 866 formed within the body 870 and the first shank 850 of the first connection element 848. The connection elements 848 and 818 are positioned on opposite sides of a transverse axis 878 of the body 870 and are offset from one another, as shown in FIG. 140.

Turning to FIGS. 142-144, the connecting rod journal 808 comprises a cylindrical elongate body 880 having opposed first and second sides 882 and 884 joined by an outer surface 886. A first opening 888 is formed in the first side 882 and a second opening 890 is formed in the second side 884. The openings 888 and 890 are joined by an internal passage 892. Each opening 888 and 890 has a non-circular or polygonal shape. Specifically, each opening has the shape of a Reuleaux triangle with radiused vertices. Each opening 888 and 890 is shaped to conform to the shape of each shank 820 and 850. The openings 888 and 890 are likewise tapered to conform to the tapered shape of the shanks 820 and 850.

Figure 128:
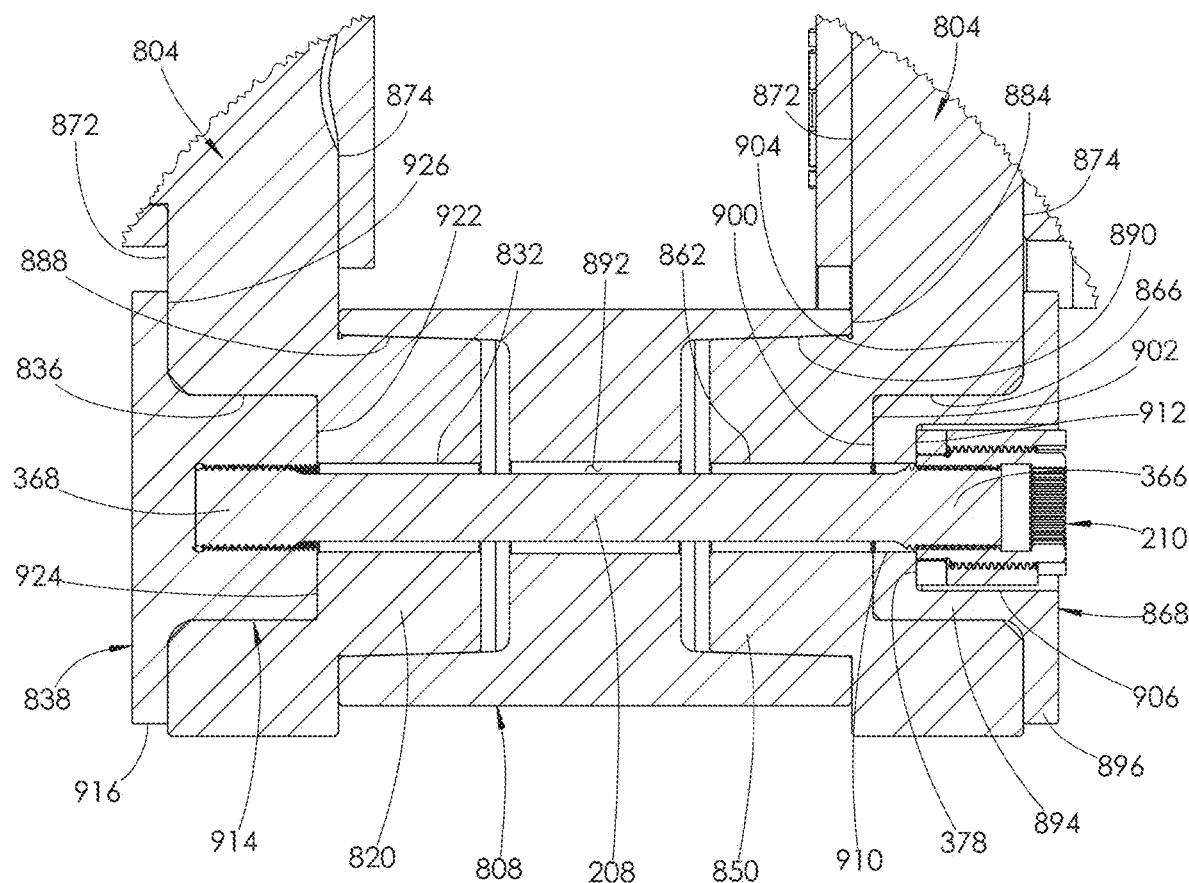

Turning back to FIGS. 124-129, to assemble the crankshaft 800, the second shank 820 of the first end journal 802 or one of the inner journals 804 is installed within the first opening 888 of a connecting rod journal 808. Likewise, the first shank 850 of an inner journal 804 or the second end journal 806 is installed within the second opening 890 of the same connecting rod journal 808. When adjacent journals 802, 804, and/or 806 and the corresponding connecting rod journal 808 are brought together, the first and second passages 832 and 862 formed in each shank 820 and 850 align with the inner passage 892 formed in the connecting rod journal 808, as shown in FIG. 128. To secure adjacent journals 802, 804, or 806 and the corresponding connecting rod journal 808 together, a fastener 208 is installed within the aligned passages 832, 892, and 862, as shown in FIG. 128.

Continuing with FIG. 128, the fastener 208 is installed within adjacent journals 802, 804, or 806 and the corresponding connecting rod journal 808 such that a first threaded end 366 of the fastener 208 is positioned within the second counterbore 866 formed in the inner journal 804 or the second end journal 806 and the second threaded end 368 of the fastener 208 is installed within the first counterbore 836 formed in the first end journal 802 or an inner journal 804. As will be described herein, each fastener 208 is secured in place using a flanged nut 838, a flanged washer 868, and a three-piece nut 210.

Turning to FIGS. 145-148, the flanged washer 868 comprises a body 894 having a cylindrical flange 896 formed at its front end 898. The body 894 is sized to be closely received within one of the counterbores 836 and 866. When the flanged washer 868 is installed within the second counterbore 866, a rear surface 900 of the body 894 abuts a base 902 of the second counterbore 866, as shown in FIG. 128. When the flanged washer 868 is installed within the first counterbore 836, the rear surface 900 of the body 894 abuts a base 924, shown in FIG. 128, of the first counterbore 836. Likewise, a rear surface 904 of the flange 896 abuts the first or second side 872 or 874 of the inner journals 804.

Continuing with FIGS. 145-148, a counterbore 906 is formed within the body 894 of the flanged washer 868 that opens on a front surface 908 of the flange 896. The counterbore 906 also opens into a passage 910 that opens on the rear surface 900 of the body 894. The passage 910 is sized to receive a portion of the fastener 208 while the counterbore 906 is sized to receive the three-piece nut 210, as shown in FIG. 128.

As shown in FIGS. 124-129, the flanged washers 868 are only installed within the inner journals 804. The first end journal 802 and the second end journal 806 receive a flanged nut 838. Thus, inner journals 804 attached directly to a corresponding first end or second end journal 802 or 806 receive a flanged washer 868 within both counterbores 836 and 866 formed within the inner journal 804. Such assembly keeps the three-piece nuts 210 accessible from the interior of the crank frame 70. When the fastener 208, the inner journal 804, and the flanged washer 868 are brought together, the first or second threaded end 366 or 368 of the fastener 208 is installed within the counterbore 906 formed in the flanged washer 868. The three-piece nut 210 is secured on the first or second end 366 or 368 of the fastener 208 such that the rear surface 378 of the nut 210 abuts a base 912 of the counterbore 906.

Turning to FIGS. 149-152, the flanged nut 838 comprises a body 914 having a cylindrical flange 916 formed at its front end 918. The body 914 is sized to be closely received within one of the first or second counterbores 836 or 866. A threaded blind hole 920 is formed within the body 914 of the flanged nut 838 and opens on a rear surface 922 of the body 914. The threaded blind hole 920 is sized to mate with the first or second threaded ends 366 or 368 of the fastener 208. When the flanged nut 838 is installed within the first counterbore 836, the rear surface 922 of the body 914 abuts a base 924 of the first counterbore 836 and a rear surface 926 of the flange 916 abuts the first side 812 of the first end journal 802 or the first side 882 of the inner journal 804, as shown in FIG. 128. When the flanged nut 838 is installed within the second counterbore 866, the rear surface 922 of the body 914 abuts a base 902, shown in FIG. 128, of the second counterbore 866 and a rear surface 926 of the flange 916 abuts the second side 844 of the second end journal 806.

Continuing with FIGS. 124-129, during assembly, the flanged nut 838 and three-piece nuts 210 are turned on the corresponding end 368 or 366 of the fastener 208 until the adjacent journals 802, 804, or 806 and the connecting rod journal 808 are rigidly secured together. The flanged nuts and washers 838 and 868 are interchangeable within the various first or second counterbores 836 and 866. In alternative embodiments, the flanged nuts and washers 838 and 868 may be used in a different order than what is described herein, as long as each fastener 208 receives one of each. For example, the first and second end journals 802 and 806 may receive a flanged washer 868 instead of the flanged nut 838 and the corresponding inner journal 804 may receive a corresponding flanged nut 838 instead of the flanged washer 868.

When the crankshaft 800 is assembled, the cylindrical bodies 810, 840, and 870 of the corresponding journals 802, 804, or 806 are in a side-by-side and spaced apart relationship. The bodies 810, 840, and 870 are spaced apart by a gap 928 shown in FIG. 126. The gap 928 is filled by the connecting rod journals 808. The fasteners 208 may be characterized as extending through a corresponding gap 928 and interconnecting corresponding bodies 810, 840, and 870.

While not shown, the crankshaft 800 may further comprise the various mounting holes formed in the crankshaft 200. The crankshaft 800 may further comprise a plurality of lubricant passages and a lubrication port, similar to those formed in the crankshaft 200. The main journal roller bearings 118 and connecting rod bearings 394, shown in FIGS. 49-65, may be attached to or installed on the corresponding journals 802, 804, or 806 and corresponding connecting rod journals 808 in the same general manner as the crankshaft 200.

During operation, torque is transmitted between the interconnecting journals 802, 804, and 806 through the form lock function of the tapered and mated shanks 820 and 850 and openings 888 and 890. That is, the compression force applied to the tapered connection by the fastener 208 locks the tapered shanks 820 and 850 into the tapered openings 888 and 890 preventing relative rotational movement between the components. The crankshaft 800 may be easily manufactured because the various components have the same size and shape and may be easily interchanged with one another.

Modular Crankshaft 950

Turning to FIGS. 153-158, another embodiment of a modular crankshaft 950 is shown. The crankshaft 950 is like the crankshaft 800 shown in FIGS. 124 and 125, but with a few modifications. The crankshaft 950 comprises a first end journal 952 attached to a plurality of inner journals 954 and a second end journal 956. The crankshaft 950 further comprises a plurality of connecting rod journals 958. Adjacent journals 952, 954, and 956 are joined by one of the connecting rod journals 958.

Figure 129:
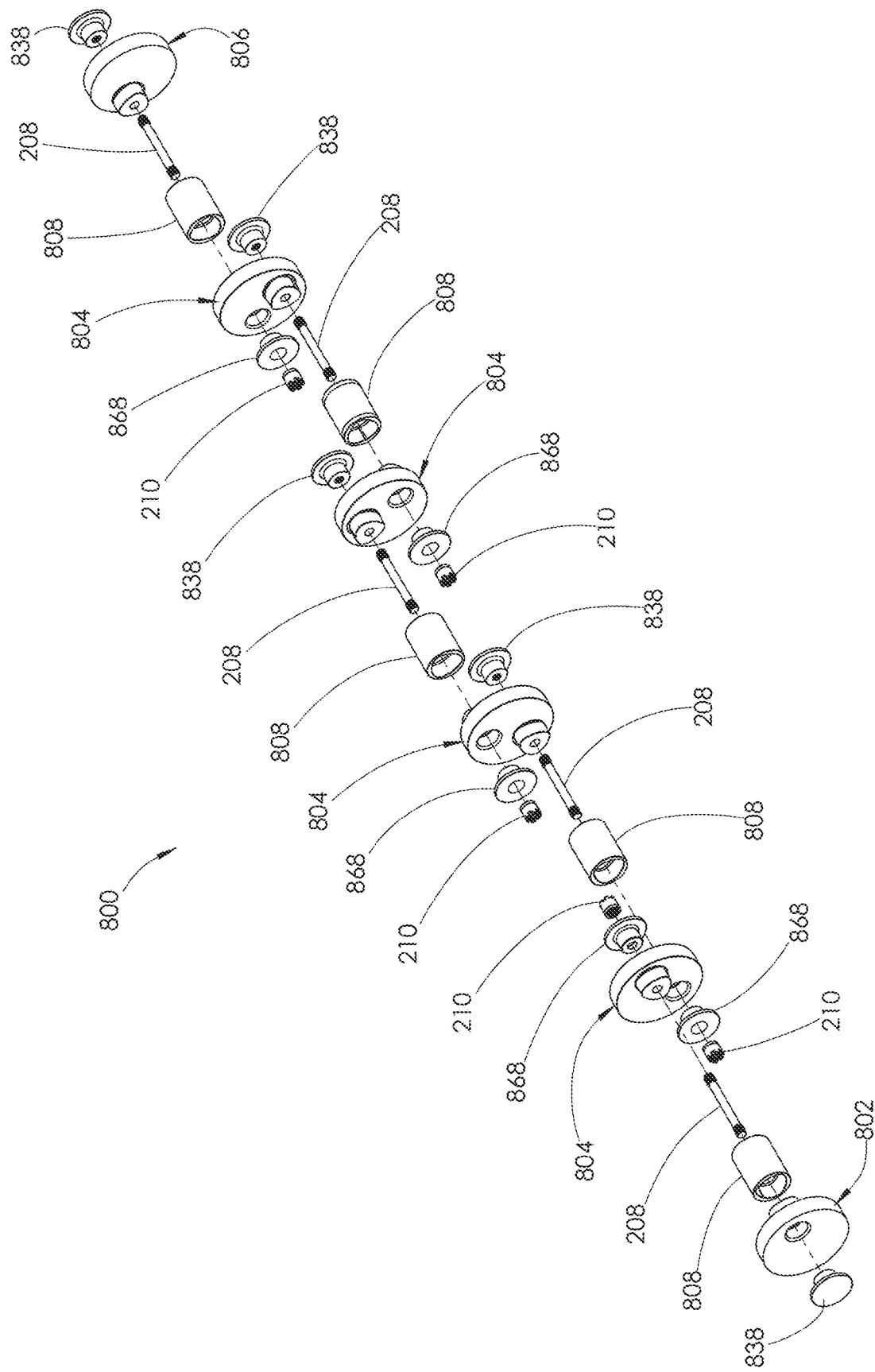

Continuing with FIGS. 156-158, like the first and second end journals 802 and 806 shown in FIG. 129, the first end journal 952 comprises a second connection element 960 comprising a second shank 962, and the second end journal 956 comprises a first connection element 964 comprising a first shank 966. Like the inner journals 804, shown in FIG. 129, the inner journals 954 each comprise the first and second connection elements 960 and 964. The first and second shanks 962 and 966 have the same shape as the first and second shanks 850 and 820 shown in FIGS. 131 and 134. The connecting rod journals 958 are identical to the connecting rod journals 808 shown in FIGS. 142-144.

In contrast to the journals 802, 804, and 806 shown in FIGS. 128 and 129, the journals 952, 954, and 956 are not configured to receive a flanged nut or a flanged washer. Instead, the second shank 962 has a first passage 968 formed therein that comprises a first counterbore 970. The first counterbore 970 is sized to directly receive the three-piece nut 210, as shown in FIG. 157. The first shank 966 comprises a second passage 972 that opens into a threaded blind bore 974, as shown in FIG. 157.

The crankshaft 950 is assembled in the same general manner as the crankshaft 800. However, the first threaded end 366 of the fastener 208 is threaded directly into threaded blind bore 974 instead of into a flanged nut or being positioned within a flanged washer. A three-piece nut 210 is then installed on the second threaded end 368 of the fastener 208 within the first counterbore 970. A portion of the three-piece nut 210 may project from the counterbore 970.

While not shown, the crankshaft 950 may further comprise the various mounting holes formed in the crankshaft 200. The crankshaft 950 may further comprise a plurality of lubricant passages and a lube port, similar to those formed in the crankshaft 200. The main journal roller bearings 118 and connecting rod bearings 394, shown in FIGS. 49-65, may be attached to or installed on the corresponding journals 952, 954, and 956 and corresponding connecting rod journals 958 in the same general manner as the crankshaft 200.

Modular Crankshaft 1000

Turning to FIGS. 159-180, another embodiment of a modular crankshaft 1000 is shown. The crankshaft 1000 comprises a first end main bearing journal 1002 attached to a plurality of inner main bearing journals 1004 and a second end main bearing journal 1006. The crankshaft 1000 further comprises a plurality of connecting rod journals 1008. The crankshaft 1000 is similar to the crankshaft 800, but comprises another method of interconnecting the journals 1002, 1004, and 1006 and the connecting rod journals 1008.

With reference to FIGS. 165-168, the first end journal 1002 comprises a cylindrical body 1010 having opposed first and second sides 1012 and 1014 joined by an outer rim 1016. In contrast to the first end journals described above, the first end journal 1002 does not comprise a connection element.

Instead, a first opening 1018 is formed within the body 1010 and interconnects the first and second sides 1012 and 1014 of the body 1010.

Continuing with FIGS. 165-168, the first opening 1018 has a non-circular or polygonal shape. Specifically, the first opening 1018 has the shape of a Reuleaux triangle with radiused vertices. First and second vertices 1020 and 1022 are positioned adjacent the outer rim 1016 while a third vertex 1024 is positioned directly above or is spaced from and aligned with a centroid 1026 of the body 1010, as shown in FIG. 167. The shape of the first opening 1018 also tapers from the first side 1012 to the second side 1014 of the body 1010. The first opening 1018 is positioned entirely on one side of a transverse axis 1028 of the body 1010. As will be described herein, the first opening 1018 is configured to receive a portion of one of the connecting rod journals 1008.

Turning to FIGS. 169-172, the second end journal 1006 comprises a cylindrical body 1030 having opposed first and second sides 1032 and 1034 joined by an outer rim 1036. A second opening 1038 is formed within the body 1030 and interconnects the first and second sides 1032 and 1034. The second opening 1038 is identical in shape and size to the first opening 1018. As will be described herein, the second opening 1038 is configured to receive a portion of one of the connecting rod journals 1008. While the first and second end journals 1002 and 1006 may be oriented differently when attached to the crankshaft 1000, they are identical in size and shape and may be interchanged within one another during assembly.

Turning to FIGS. 173-176, each inner journal 1004 comprises a cylindrical body 1040 having opposed first and second sides 1042 and 1044 joined by an outer rim 1046. The first opening 1018 and the second opening 1038 are formed within the body 1040. The openings 1018 and 1038 are positioned on opposite sides of a transverse axis 1048 of the body 1040 and are positioned offset from one another, as shown in FIG. 175.

Turning to FIGS. 177-180, each connecting rod journal 1008 comprises a body 1050 having opposed first and second sides 1052 and 1054 joined by an outer surface 1056. A connection element 1058 comprising a shank 1060 is joined to each side 1052 and 1054 of the body 1050. Each shank 1060 has a non-circular or polygonal shape. Specifically, each shank 1060 has the cross-sectional shape of a Reuleaux triangle with radiused vertices. Each shank 1060 tapers from the corresponding side 1052 or 1054 of the body 1050 to a front surface 1064 of the shank 1060. The shanks 1060 are sized and shaped to conform to the shape of the first and second openings 1018 and 1038.

Continuing with FIGS. 177-180, a cylindrical opening 1066 is formed in each shank 1060. The openings 1066 are interconnected by an internal passage 1068, as shown in FIG. 180. As shown in FIG. 163, the openings 1066 are each sized to receive a selected one of a flanged nut 838 or a flanged washer 868 also used with the crankshaft 800 and shown in detail in FIGS. 145-152. The internal passage 1068 is sized to receive one of the fasteners 208, as shown in FIG. 163.

With reference to FIGS. 163 and 164, the crankshaft 1000 is assembled by installing a connecting rod journal 1008 within aligned first and second openings 1018 and 1038 formed in adjacent journals 1002, 1004, or 1006. The shanks 1060 are pushed into the openings 1018 and 1038 until each side 1052 and 1054 of the connecting rod journal 1008 abuts the corresponding sides of the corresponding journals 1002, 1004, or 1006. A fastener 208 is then installed within the internal passage 1068 such that the threaded ends 366 and 368 of the fastener 208 are positioned within the openings 1066 formed in each shank 1060, as shown in FIG. 163. Adjacent journals 1002, 1004, or 1006 and connecting rod journals 1008 are secured together by installing a flanged nut 838 into the opening 1066 of one of the shanks 1060 and installing a flanged washer 868 into the opening 1066 formed in the other shank 1060.

Continuing with FIGS. 163 and 164, the fastener 208 is threaded into the threaded blind bore 920 formed in the flanged nut 838 and a three-piece nut 210 is secured to the other end of the fastener 208 within the flanged washer 868. Like the crankshaft 800, the first end journal 1002 and the second end journal 1006 may each receive a flanged nut 838 so that the three-piece nuts 210 are all accessible within the interior of the crank frame 70.

When the crankshaft 1000 is assembled, the cylindrical bodies 1010, 1030, and 1050 of the corresponding journals 1002, 1004, or 1006 are in a side-by-side and spaced apart relationship. The bodies 1010, 1030, and 1050 are spaced apart by a gap 1070 shown in FIG. 161. The gap 1070 is filled by the connecting rod journals 1008. The fasteners 208 may be characterized as extending through a corresponding gap 1070 and interconnecting corresponding bodies 1010, 1030, and 1050, as shown in FIG. 162.

While not shown, the crankshaft 1000 may further comprise the various mounting holes formed in the crankshaft 200. The crankshaft 1000 may further comprise a plurality of lubricant passages and a lube port, similar to those formed in the crankshaft 200. The main journal roller bearings 118 and connecting rod bearings 394, shown in FIGS. 49-65, may be attached to or installed on the corresponding journals 1002, 1004, or 1006 and corresponding connecting rod journals 1008 in the same general manner as the crankshaft 200.

During operation, torque is transmitted between the interconnecting journals 1002, 1004, and 1006 through the form lock function of the tapered and mated shanks 1060 and openings 1018 and 1038. That is, the compression force applied to the tapered connection by the fastener 208 locks the tapered shanks 1060 into the tapered openings 1018 and 1038 preventing relative rotational movement between the components. The crankshaft 1000 may be easily manufactured because the various components have the same size and shape and may be easily interchanged with one another.

Modular Crankshaft 1100

Turning now to FIGS. 181-213, another embodiment of a modular crankshaft 1100 is shown. The crankshaft 1100 comprises a first end journal 1102 attached to a plurality of inner journals 1104 and a second end journal 1106. The crankshaft 1100 further comprises a plurality of connecting rod journals 1108. The crankshaft 1100 is similar to the crankshaft 1000 with a few modifications described herein.

With reference to FIGS. 188-191, the first end journal 1102 comprises a cylindrical body 1110 having opposed first and second sides 1112 and 1114 joined by an outer rim 1116. A second opening 1118 is formed in the second side 1114 of the body 1110. In contrast to the opening 1038 formed in the first end journal 1002 shown in FIGS. 165-168, the second opening 1118 does not extend entirely between the first and second sides 1112 and 1114 of the body 1116. Instead, the second opening 1118 extends into the body 1110 until it reaches a base 1120. A cylindrical flanged nut opening 1122 is formed in the base 1120 and opens on the first side 1112 of the body 1110.

Continuing with FIGS. 188-191, the second opening 1118 has a non-cylindrical or polygonal shape. Specifically, the second opening 1118 has the shape of an equilateral triangle with radiused vertices. First and second vertices 1124 and 1126 are positioned adjacent the outer rim 1116. A third vertex 1128 is spaced from and aligns with a centroid 1130 of the second side 1114 of the body 1110. Like the opening 1018 formed in the first end journal 1002 shown in FIGS. 165-168, the second opening 1118 is configured to receive a portion of one of the connecting rod journals 1108, as shown in FIG. 186.

Continuing with FIGS. 188-191, the first end journal 1102 further comprises a first lubricant passage 1132 formed within the body 1110. The first lubricant passage 1132 extends radially through the body 1110 and interconnects the second opening 1118 and the outer rim 1116, as shown in FIG. 191. As will be described herein, the first lubricant passage 1132 is configured to align with a lubricant passage formed within a connecting rod journal 1108, as shown in FIG. 186.

Turning to FIGS. 192-195, the second end journal 1106 comprises a cylindrical body 1134 having opposed first and second sides 1136 and 1138 joined by an outer rim 1140. A first opening 1142 is formed in the first side 1136 of the body 1134. Like the second opening 1118, the first opening 1142 extends into the body 1134 until it reaches a base 1144. A cylindrical flanged nut opening 1146 is formed in the base 1144 and opens on the second side 1138 of the body 1134. The first opening 1142 has the same shape as the second opening 1118 and is configured to receive a portion of one of the connecting rod journals 1108.

Continuing with FIGS. 192-195, the second end journal 1106 further comprises a first lubricant passage 1148 formed within the body 1134. The first lubricant passage 1148 extends radially through the body 1134 and interconnects the first opening 1142 and the outer rim 1140, as shown in FIG. 195. As will be described herein, the first lubricant passage 1148 is configured to align with a lubricant passage formed within a connecting rod journal 1108, as shown in FIG. 186. While the first and second end journals 1102 and 1106 may be oriented differently when attached to the crankshaft 1100, they are identical in size and shape and may be interchanged within one another during assembly.

Turning to FIGS. 196-201, each inner journal 1104 comprises a cylindrical body 1150 having opposed first and second sides 1152 and 1154 joined by an outer rim 1156. The first opening 1142 is formed in the first side 1152 of the body 1150. The flanged nut opening 1146 is formed in the base 1144 of the first opening 1142 and opens on the second side 1154 of the body 1150. Likewise, the second opening 1118 is formed in the second side 1154 of the body 1150. The flanged nut opening 1122 is formed in the base 1120 of the second opening 1118 and opens on the first side 1152 of the body 1150. Like the openings 1018 and 1038 formed in the inner journal 1004 shown in FIGS. 173-176, the openings 1142 and 1118 are positioned on opposite sides of a transverse axis 1158 of the body 1150 and are offset from one another, as shown in FIG. 198.

Continuing with FIGS. 196-201, each inner journal 1104 further comprises first and second lubricant passages 1160 and 1162 formed within the body 1150. The first lubricant passage 1160 extends radially through the body 1150 and interconnects the first opening 1142 and the outer rim 1156, as shown in FIG. 201. Likewise, the second lubricant passage 1162 extends radially through the body 1150 and interconnects the second opening 1118 and the outer rim 1156. As will be described herein, the lubricant passages 1160 and 1162 are configured to align with lubricant passages formed within each connecting rod journal 1108, as shown in FIG. 186.

Turning to FIGS. 202-205, each connecting rod journal 1108 comprises a body 1164 having opposed first and second ends 1166 and 1168 joined by an outer surface 1170. Portions of the first and second ends 1166 and 1168 of the body 1164 have been cutaway to form a connection element 1172 in each end 1166 and 1168. Flanged contact surfaces 1174 are formed between the body 1164 and portions of each connection element 1172. Each connection element 1172 comprises a shank 1176. The shank 1176 has a non-circular or polygonal cross-sectional shape. Specifically, the shank 1176 has the cross-sectional shape of an equilateral triangle with radiused vertices. Each shank 1176 is configured to conform to the size and shape of the first and second openings 1142 and 1118. Like the other shanks disclosed herein, each shank 1176 may also taper between a front surface 1178 of the shank 1176 and the flanged contact surface 1174 of the body 1164. The openings 1142 and 1118 may likewise taper to conform to the taper of the shanks 1176.

Continuing with FIGS. 202-205, each connecting rod journal 1108 further comprises an internal passage 1180 formed therein. The internal passage 1180 extends through the center of the body 1164 and opens on the front surface 1178 of each shank 1176. As will be described herein, the internal passage 1180 is configured to receive one of the fasteners 208, as well as a first flanged nut 1182 and a second flanged nut 1184, as shown in FIG. 186.

Continuing with FIG. 205, a plurality of lubricant passages are formed within each connecting rod journal 1108. A first lubricant passage 1186 extends through the body 1164 parallel to the internal passage 1180 and interconnects the front surfaces 1178 of each shank 1176. A pair of second lubricant passages 1188 interconnect the first lubricant passage 1186 and an outer surface of each shank 1176. A third lubricant passage 1190 interconnects the first lubricant passage 1186 and the outer surface 1170 of the body 1164.

Continuing with FIGS. 202-205, the first lubricant passage 1186, the pair of second lubricant passages 1188, and the third lubricant passage 1190 may be characterized as a group of lubricant passages 1192. Three groups of lubricant passages 1192 are formed within each connecting rod journal 1108. One group of lubricant passages 1192 is aligned with the center of each side of the shank 1176 and formed within the body 1164. Only one group of lubricant passages 1192 is utilized once assembled, as shown in FIG. 186.

The multiple groups of lubricant passages 1192 allow the connecting rod journals 1108 to be assembled in any orientation without consideration for alignment of the groups of lubricant passages 1192. No matter the orientation when assembled one group of lubricant passages 1192 will align with the lubricant passages 1132, 1148, 1160, and 1162 formed within the journals 1102, 1104, and 1106 to form a lubricant passageway 1194 within the crankshaft 1100 as shown in FIG. 184. Another advantage of the multiple groups of lubricant passages 1192 is that the stress within the connecting rod journal 1108 is distributed more evenly than if only one group of lubricant passages 1192 were formed. The more even distribution of stress increases the life of the connecting rod journal 1108. Turning to FIGS. 206-209, the first flanged nut 1182 comprises a body 1196 having a cylindrical flange 1198 formed at its front end 1200. The body 1196 is sized to be closely received within the internal passage 1180 of a connecting rod journal 1108. A threaded blind hole 1202 is formed within the body 1196 of the first flanged nut 1182 and opens on a rear surface 1204 of the body 1196. The threaded blind hole 1202 is configured to mate with the first or second threaded ends 366 or 368 of the fastener 208.

Turning to FIGS. 210-213, the second flanged nut 1184 is identical to the first flanged nut 1182, but a threaded blind hole 1206 formed in its body 1208 opens into a polygonal shaped opening 1210 also formed within the body 1208. The polygonal opening 1210 opens on a flange 1212 joined to the body 1208. The polygonal opening 1210 is configured to receive a tool, such as a socket wrench, used to turn the second flanged nut 1184.

Like the first flanged nut 1182, the body 1208 of the second flanged nut 1184 is sized to be closely received within the internal passage 1180, and the threaded blind bore 1206 is configured to mate with the first or second threaded ends 366 or 368 of the fastener 208. In contrast to the crankshaft 1000 shown in FIGS. 163 and 164, the crankshaft 1100 does not utilize a three-piece nut 210. Instead, the ends 366 and 368 of the fastener 208 are both secured to a flanged nut 1182 or 1184.

Turning back to FIGS. 186 and 187, to assemble the crankshaft 1100, a connecting rod journal 1108 is installed within aligned openings 1118 and 1142 formed in adjacent journals 1102, 1104, or 1106. The shanks 1176 are inserted into the openings 1118 and 1142 until the front surface 1178 of each shank 1176 abuts the base 1120 or 1144 of the corresponding opening 1118 or 1142 and each flanged contact surface 1174 of the connecting rod journal 1108 abuts the corresponding sides of the corresponding journals 1102, 1104, or 1106. A fastener 208 is then installed through the flange nut opening 1122 or 1146 formed in one of the journals 1102, 1104, or 1106 and into the internal passage 1180. The fastener 208 is installed within the internal passage 1180 such that the threaded ends 366 and 368 of the fastener 208 are still positioned within the internal passage 1180, as shown in FIG. 186.

Adjacent journals 1102, 1104, or 1106 and connecting rod journals 1108 are secured together by installing a first flanged nut 1182 into one of the flanged nut openings 1122 or 1146 within the corresponding journal 1102,1104, or 1106 and into an opening of the internal passage 1180 on one of the shanks 1176. A second flanged nut 1184 is then installed into the other flanged nut opening 1122 or 1146 and into the opening of the internal passage 1180 of the other shank 1176. The flanged nuts 1182 and 1184 are turned on the ends 366 and 368 of the fastener 208 until a rear surface 1214 of each flange 1198 or 1212 abuts a corresponding side surface of the corresponding journal 1102, 1104, or 1106.

Like the crankshafts 800 and 1000, the first end journal 1102 and the second end journal 1106 may each receive a first flanged nut 1182 so that the polygonal openings 1210 on the second flanged nuts 1184 are all accessible within the interior of the crank frame 70, as shown in FIGS. 181 and 182.

When the crankshaft 1100 is assembled, the cylindrical bodies 1110, 1134, and 1164 of the corresponding journals 1102, 1104, or 1106 are in a side-by-side and spaced apart relationship. The bodies 1110, 1134, and 1164 are spaced apart by a gap 1216 shown in FIG. 183. The gap 1216 is filled by the connecting rod journals 1108. The fasteners 208 may be characterized as extending through a corresponding gap 1216 and interconnecting corresponding bodies 1110, 1134, and 1164, as shown in FIG. 185.

While not shown, the crankshaft 1100 may further comprise the various mounting holes formed in the crankshaft 200. The main journal roller bearings 118 and connecting rod bearings 394, shown in FIGS. 49-65, may be attached to or installed on the corresponding journals 1102, 1104, or 1106 and corresponding connecting rod journals 1108 in the same general manner as the crankshaft 200.

During operation, torque is transmitted between the interconnecting journals 1102, 1104, and 1106 through the form lock function of the tapered and mated shanks 1176 and openings 1118 and 1142. That is, the compression force applied to the tapered connection by the fastener 208 locks the tapered shanks 1176 into the tapered openings 1118 and 1142 preventing relative rotational movement between the components. The crankshaft 1100 may be easily manufactured because the various components have the same size and shape and may be easily interchanged with one another.

Turning now to FIGS. 214-261, alternative embodiments of inner journals and connecting rod journals are shown. Each alternative embodiment of an inner journal shown in FIGS. 214-261 is identical to the inner journal 1104 used with the crankshaft 1100, but each inner journal comprises an alternative embodiment of a first and second opening, like the openings 1118 and 1142 shown in FIGS. 196-201. The alternative embodiments of first and second openings shown in FIGS. 214-261 are identical to the corresponding first and second openings 1118 and 1142 except for their shape. While not shown, the alternative embodiments of first and second openings shown in FIGS. 214-262 may also be formed in the corresponding first and second ends journals.

Each alternative embodiment of a connecting rod journal shown in FIGS. 214-261 is identical to the connecting rod journal 1108 used with the crankshaft 1100, but each connecting rod journal shown in FIGS. 214-261 comprises an alternative embodiment of a connection element and shank. The alternative embodiments of shanks are identical to the shanks 1176 shown in FIGS. 202-205, except for their cross-sectional shape. Each alternative embodiment of a shank has a cross-sectional shape that corresponds to the shape of the corresponding alternative embodiments of openings formed in the corresponding inner journal.

The various embodiments of shanks and corresponding openings shown in FIGS. 214-261 are assembled in the same manner as the shanks 1176 and openings 1118 and 1142, shown in FIGS. 186 and 187. The various embodiments of shanks and corresponding openings shown in FIGS. 214-261 also provide the same advantages as the shanks 1176 and openings 1118 and 1142, shown in FIGS. 186 and 187. The various embodiments of shanks and corresponding openings shown in FIGS. 214-261 may also taper in the same manner as the shanks 1176 and corresponding openings 1118 and 1142, shown in FIGS. 186, 202-205.

With reference to FIGS. 214-221, another embodiment of an inner journal 1218 is shown in FIGS. 214-217, and another embodiment of corresponding connecting rod journal 1219 is shown in FIGS. 218-221. The inner journal 1218 has a first and second opening 1220 and 1222 formed therein. The openings 1220 and 1222 each have the general shape of a four-leafed clover. More specifically, the openings 1220 and 1222 each have the shape of a quatrefoil within a square with the square truncating the outer portion of each lobe. A truncated portion 1221 of a lobe 1223 of the first opening 1220 is spaced from and aligns with a centroid 1225 of a first side 1227 of the inner journal 1218, as shown in FIG. 216.

Continuing with FIGS. 218-221, the connecting rod journal 1219 comprises connection elements 1224. Each connection element 1224 comprises a shank 1226. Each shank 1226 is sized and shaped to conform to the shape of the openings 1220 and 1222.

With reference to FIGS. 222-229, another embodiment of an inner journal 1228 is shown in FIGS. 222-225, and another embodiment of corresponding connecting rod journal 1230 is shown in FIGS. 226-229. The inner journal 1228 has a first and second opening 1232 and 1234 formed therein. The openings 1232 and 1234 each have the shape of a regular hexagon. A vertex 1235 of the hexagon shape of the first opening 1232 is spaced from and aligns with a centroid 1237 of a first side 1239 of the inner journal 1228, as shown in FIG. 224.

Continuing with FIGS. 226-229, the connecting rod journal 1230 comprises connection elements 1236. Each connection element 1236 comprises a shank 1238. Each shank 1238 is sized and shaped to conform to the shape of the openings 1232 and 1234.

With reference to FIGS. 230-237, another embodiment of an inner journal 1240 is shown in FIGS. 230-233, and another embodiment of corresponding connecting rod journal 1242 is shown in FIGS. 234-237. The inner journal 1240 has a first and second opening 1244 and 1246 formed therein. The openings 1244 and 1246 each have the shape of a square. A corner 1248 of the square shape of the first opening 1244 is spaced from and aligns with a centroid 1250 of a first side 1252 of the inner journal 1240, as shown in FIG. 232.

Continuing with FIGS. 234-237, the connecting rod journal 1242 comprises connection elements 1254. Each connection element 1254 comprises a shank 1256. Each shank 1256 is sized and shaped to conform to the shape of the openings 1244 and 1246.

With reference to FIGS. 238-245, another embodiment of an inner journal 1260 is shown in FIGS. 238-241, and another embodiment of corresponding connecting rod journal 1262 is shown in FIGS. 242-245. The inner journal 1260 has a first and second opening 1264 and 1266 formed therein. The openings 1264 and 1266 each have the shape of a square having radiused corners. A radiused corner 1268 of the square shape of the first opening 1264 is spaced from and aligns with a centroid 1270 of a first side 1272 of the inner journal 1260, as shown in FIG. 240.

Continuing with FIGS. 242-245, the connecting rod journal 1262 comprises connection elements 1274. Each connection element 1274 comprises a shank 1276. Each shank 1276 is sized and shaped to conform to the shape of the openings 1264 and 1266.

With reference to FIGS. 246-253, another embodiment of an inner journal 1280 is shown in FIGS. 246-249, and another embodiment of corresponding connecting rod journal 1282 is shown in FIGS. 250-253. The inner journal 1280 has a first and second opening 1284 and 1286 formed therein. The openings 1284 and 1286 each have the general shape of a regular hexagram or six-pointed star. More specifically, each opening 1284 and 1286 has the shape of regular hexagram within a regular hexagon with the hexagon truncating the outer vertices of the regular hexagram. A truncated portion 1288 of the star shaped first opening 1264 is spaced from and aligns with a centroid 1292 of a first side 1294 of the inner journal 1280, as shown in FIG. 248.

Continuing with FIGS. 250-253, the connecting rod journal 1282 comprises connection elements 1296. Each connection element 1296 comprises a shank 1298. Each shank 1298 is sized and shaped to conform to the shape of the openings 1284 and 1286.

With reference to FIGS. 254-261, another embodiment of an inner journal 1300 is shown in FIGS. 254-257, and another embodiment of corresponding connecting rod journal 1302 is shown in FIGS. 258-261. The inner journal 1300 has a first and second opening 1304 and 1306 formed therein. The openings 1304 and 1306 each have a splined shape. More specifically, the openings 1304 and 1306 each have the general shape of a 24-tooth serrated internal spline with a very small, or no, root radius. At least one tooth 1311 of the splined shaped first opening 1304 is spaced from and aligns with a centroid 1312 of a first side 1314 of the inner journal 1300, as shown in FIG. 256.

Continuing with FIGS. 258-261, the connecting rod journal 1302 comprises connection elements 1308. Each connection element 1308 comprises a shank 1310. Each shank 1310 is sized and shaped to conform to the shape of the openings 1304 and 1306.

Crank Frame 1400

Turning to FIGS. 262-268, another embodiment of a crank frame 1400 is shown. The crank frame 1400 may be used in place of the crank frame 70, shown in FIGS. 3-10. The crank frame 1400 is like the crank frame 70, but the crank frame 1400 does not comprise a plurality of feet, like the feet 112, shown in FIGS. 8-10. Instead, the crank frame 1400 comprises a pair of mounting flanges 1402 joined to a lower surface 1404 of the frame 1400. Except for the mounting flanges 1402, the crank frame 1400 is identical to the crank frame 70 shown in FIGS. 3-10.

Continuing with FIGS. 262-268, one mounting flange 1402 projects from a front surface 1406 of the frame 1400 and the other mounting flange 1402 projects from a rear surface 1408 of the frame 1400. The mounting flanges 1402 extend entirely between opposed first and second sides 1410 and 1412 of the frame 1400. In alternative embodiments, the mounting flanges 1402 may not extend entirely between the first and second sides 1410 and 1412 of the frame 1400. The mounting flanges 1402 are configured to support the frame 1400 on the base section 114, shown in FIGS. 5-7. Like the feet 112 shown in FIGS. 8-10, the mounting flanges 1402 are integrally formed with the rest of the crank frame 1400.

Continuing with FIGS. 262-268, a plurality of through-holes 1414 are formed along the length of each mounting flange 1402. The through-holes 1414 are each configured to receive a fastener (not shown) used to secure the crank frame 1400 to the base 114. The through-holes 1414 are aligned with the support walls 90 and end walls 92 and 94 formed within the frame 1400. Placing the through-holes 1414 at the same longitudinal location as the support walls 90, 92, and 94 provides maximum support at the point of maximum load during operation.

Using a continuous mounting flange 1402 instead of a plurality of spaced apart feet helps to increase the rigidity of the crank frame 1400. Increasing the rigidity of the crank frame 1400 results in smaller deflections of the frame 1400 during operation and helps extend the operation life of the crank fame 1400.

With reference to FIGS. 15-261, the various embodiments of modular crankshafts described herein are shown in more detail. Many of the embodiments share some of the same features, as can be seen in the figures. If a detail of one embodiment is not specifically described herein with regard to that embodiment, but the same detail is specifically described with regard to another embodiment, such description is considered to apply to both embodiments.

Even if not specifically shown in FIGS. 15-261, an artisan will recognize that certain features of one embodiment of a modular crankshaft may be incorporated into another embodiment of a modular crankshaft. Additionally, the various features of each embodiment shown in FIGS. 15-261 may have different shapes or sizes than those specifically shown in the figures as long as the embodiments still function in the same manner.

Each first end journal disclosed herein may also be referred to as a first end main bearing journal or a shank journal, if applicable. Each second end journal disclosed herein may also be referred to as a second end main bearing journal or a receiver journal, if applicable. Each inner journal disclosed herein may also be referred to as an inner main bearing journal or a first, second, third, or fourth main bearing journal. Collectively, the first end journals, the second end journals, and the inner journals disclosed herein may be referred to as journals or as main bearing journals.

Even if not specifically discussed regarding each embodiment disclosed herein, an artisan will recognize that each modular crankshaft is assembled by positioning the main bearing journals so that the bodies of each journal coincide with one another. Each modular crankshaft disclosed herein is further assembled by positioning the connecting rod journals so that adjacent connecting rod journals are offset from one another.

One or more embodiments of modular crankshafts shown in FIGS. 15-261 disclose a plurality of different embodiments of shanks and corresponding openings. Each shank and corresponding opening disclosed with each embodiment may comprise any of the various shapes disclosed in FIGS. 214-261. For example, the shanks and corresponding openings used with the crankshaft 200 may have the cross-sectional shape and shape of any of the shanks and openings disclosed in FIGS. 214-261. In further alternative embodiments, the shanks and corresponding openings disclosed herein may have any desired non-circular or polygonal shape, as long as the shape allows the interconnected components to transfer torque between one another.

One or more kits may be used with the modular crankshafts disclosed herein. One kit may comprise one of the first end journals disclosed herein, one of the second end journals disclosed herein, a plurality of inner journals disclosed herein, and a plurality of the fasteners or tension rods disclosed herein. The kit may also comprise a plurality of one of the connecting rod journals disclosed herein. The kit may further comprise a plurality of the three-piece nuts disclosed herein, a plurality of the flanged washers, and/or a plurality of one or more of the flanged nuts disclosed herein. The kit may further comprise a plurality of main journal roller bearings disclosed herein and a plurality of connecting rod journal bearings disclosed herein. The kit may even further comprise one of the crank frames disclosed herein. Another kit may comprise any number of the various components disclosed herein.

Each embodiment of a modular crankshaft disclosed herein may be referred to as "a means for translating rotational movement into linear movement" or "a means for interconnecting a drive shaft and a plurality of linear drive assemblies". Various embodiments of main bearing journals disclosed herein may be referred to as "a means for interconnecting a plurality of connecting rod journals". Various embodiments of connecting rod journals disclosed herein may be referred to as "a means for interconnecting a plurality of main bearing journals". Various methods of securing the fasteners to the various components of the various embodiments of modular crankshafts disclosed herein, including the use of threaded bores, flanged nuts, flanged washers, and three-piece nuts, may be referred to as "a means for securing a plurality of main bearing journals and a plurality of connecting rod journals together".

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only, and changes may be made in detail. Changes may especially be made in matters of structure and arrangements of parts within the principles of the present technology to the full extent indicated by the broad general meaning of the terms in which the appended claims are expressed.

The invention claimed is:

1. An apparatus, comprising:
a crankshaft, comprising:
a first main bearing journal positioned in a side-by-side relationship with a second main bearing journal, the first and second main bearing journals each comprising:
a cylindrical body with opposed first and second sides;
a first connection element on the first side; and
a second connection element on the second side;
a rod journal having opposed first and second sides connected by an exterior surface, the first side having an opening configured to receive the first connection element of the first main bearing journal and the second side having an opening configured to receive the second connection element of the second main bearing journal, wherein the first opening and second opening are connected by a through-passage; and
a fastener installed in the through-passage of the rod journal, the fastener having first and second threaded ends, each of the first and second threaded ends being configured for threaded connection to a selected one of the first and second connection element.

2. The apparatus of claim 1, wherein the second connection element has a non-circular cross-sectional shape; and wherein the rod journal comprises an opening having a shape that conforms to the cross-sectional shape of the second connection element.

3. An apparatus comprising:
a crank frame; and
the crankshaft of claim 1, wherein the crankshaft is disposed within the crank frame.

4. The apparatus of claim 3 wherein the crank frame is integrally formed.

5. The apparatus of claim 4 wherein the crank frame comprises a first side wall, a second side wall, and a plurality of internal support walls, such that the first side wall and second side wall define an interior region, and wherein the interior region of the crank frame is separated into a plurality of cavities by the plurality of internal support walls.

6. The apparatus of claim 5 wherein the first main bearing journal is engaged with the first side wall.

7. The apparatus of claim 6 wherein the second main bearing journal is engaged with one of the plurality of internal support walls.

8. The apparatus of claim 5, further comprising a plurality of rod bearings disposed about the crankshaft, wherein at least one of the plurality of rod bearings is disposed between the first main bearing journal and the second main bearing journal.

9. The apparatus of claim 8, further comprising a plurality of pony rods, each of the plurality of pony rods connected to the crank shaft at a corresponding one of the plurality of rod bearings.

10. A pump, comprising:
a fluid end;
a plurality of plungers disposed within the fluid end; and
the apparatus of claim 9, in which each of the plurality of pony rods is disposed within a corresponding one of the plurality of cavities.

11. The apparatus of claim 3, wherein the crank frame comprises a plurality of integrally-formed feet.

12. The apparatus of claim 3, wherein the crank frame comprises a mounting flange joined to the crank frame, and extending along a width of the crank frame.

13. The apparatus of claim 12 wherein the mounting flange comprises a plurality of through-holes.

14. The apparatus of claim 1, wherein the fastener is characterized as a first fastener and the rod journal is characterized as a first rod journal, and the crankshaft further comprises:
  a third main bearing journal positioned in a side-by-side relationship with the second main bearing journal; and
  a fourth main bearing journal positioned in a side-by-side relationship with the third main bearing journal, the third and fourth main bearing journals each comprising:
    a cylindrical body having opposed first and second sides;
    a first connection element joined to the first side; and
    a second connection element joined to the second side;
  a second rod journal having a through-passage, the second rod journal having opposed first and second sides connected by an exterior surface, the first side being configured to receive the first connection element of the second main bearing journal and the second side being configured to receive the second connection element of the third main bearing journal;
  a third rod journal having a through-passage, the third rod journal having opposed first and second sides connected by an exterior surface, the first side being configured to receive the first connection element of the third main bearing journal and the second side being configured to receive the second connection element of the fourth main bearing journal;
  a second fastener installed in the through-passage of the second rod journal, engaged with the second and first connection elements of the corresponding second and third main bearing journals and attached to the second and third main bearing journals; and
  a third fastener installed in the through-passage of the third rod journal, engaged with the second and first connection elements of the corresponding third and fourth main bearing journals and attached to the third and fourth main bearing journals.

15. An apparatus, comprising:
a crankshaft including a first main bearing journal and a second main bearing journal, each having:
  a cylindrical body with opposed first and second sides;
  a first connection element on the first side; and
  a second connection element on the second side;
a rod journal having a first opening configured to receive the first connection element of the first main bearing journal, a second opening configured to receive the second connection element of the second main bearing journal, and a through-passage interconnecting the first opening and the second opening; and
a fastener installed through the through-passage of the rod journal and the first and second connection elements, wherein the fastener has first and second threaded ends, and the second connection element is threaded to receive the first threaded end of the fastener.

16. The apparatus of claim 15 further comprising a rod bearing disposed about the crankshaft between the first main bearing journal and the second main bearing journal.

17. The apparatus of claim 16 wherein the crankshaft is at least partially disposed within a crank frame, the crank frame being segmented into a plurality of individual cavities, wherein the rod bearing is disposed within one of the plurality of individual cavities.

* * * * *